United States Patent [19]

Smalley et al.

[11] Patent Number: 5,192,469
[45] Date of Patent: Mar. 9, 1993

[54] SIMULTANEOUS MULTIPLE LAYER CURING IN STEREOLITHOGRAPHY

[75] Inventors: Dennis R. Smalley, Baldwin Park; Thomas J. Vorgitch, Simi Valley, both of Calif.

[73] Assignee: 3D Systems, Inc., Valencia, Calif.

[21] Appl. No.: 606,802

[22] Filed: Oct. 30, 1990

[51] Int. Cl.$^5$ .................. B29C 35/08; B29C 41/02; B29C 41/52
[52] U.S. Cl. .................... 264/22; 118/429; 118/620; 118/713; 156/64; 156/273.3; 156/273.5; 156/275.5; 156/307.1; 156/378; 156/379.6; 250/492.1; 264/40.1; 264/308; 364/476; 365/106; 365/107; 425/135; 425/174.4; 427/53.1; 427/54.1; 427/393.5
[58] Field of Search .............. 264/22, 40.1, 255, 308; 156/64, 242, 273.3, 273.5, 275.5, 307.1, 378, 379.6; 427/53.1, 54.1, 393.5, 407.1, 430.1; 250/492.1; 364/468, 476, 522, 523; 365/106, 107, 119, 120, 126, 127; 430/270, 327, 328; 425/135, 174, 174.4; 118/429, 620, 713

[56] References Cited

U.S. PATENT DOCUMENTS

| | | | |
|---|---|---|---|
| 4,575,330 | 3/1986 | Hull | 425/174.4 |
| 4,752,498 | 6/1988 | Fudim | 427/54.1 |
| 4,801,477 | 1/1989 | Fudim | 427/54.1 |
| 4,961,154 | 10/1990 | Pomerantz et al. | 364/522 |

FOREIGN PATENT DOCUMENTS

| | | | |
|---|---|---|---|
| 61-225012 | 10/1986 | Japan | 264/22 |
| 63-145015 | 6/1988 | Japan | 425/174.4 |

OTHER PUBLICATIONS

Japanese Patent Publication 2-95830, Y. Nakamura et al., "Method of Formation of Three-Dimensional Configurations", Published Apr. 6, 1990; Japanese and English translation, pp. 176 and 177.

JP 2-95831, A. Kuribayashi et al., "Method of Formation of Three-Dimensional Configurations and Its Apparatus", Published Apr. 6, 1990; Japanese and English translation; p. 179, Claims 1, p. 183.

"A Photopolymerization Method of Preparing Three-dimensional Terrain Models", C. Claus et al., Published in Photographic Science and Engineering, vol. 5, No. 4, Jul.-Aug. 1961, pp. 211-215.

"A New Method of Three-Dimensional Micromachining", E. Fudim, Published in Mechanical Engineering, Sep. 1985, pp. 54-59.

"Sculpting with Light", E. Fudim, published in Machine Design, Mar. 6, 1985, pp. 102-106.

*Primary Examiner*—Leo B. Tentoni
*Attorney, Agent, or Firm*—Lyon & Lyon

[57] ABSTRACT

A method and apparatus for making an object by stereolithography from layers of a medium solidifiable upon exposure to synergistic stimulation by selecting an area element of a first layer of medium. The depth of the medium within the object underlying the area element is determined and compared to the depth to the minimum solidification depth of the medium. The area element is exposed to solidifying synergistic stimulation only if the depth of the medium equals or exceeds the minimum solidification depth. A next layer is created over the first layer without exposing the first layer to solidifying synergistic stimulation, if the depth is less than the minimum solidification depth. The layers may have a thickness selected such that the minimum solidification depth is a integer multiple of the layer thickness.

42 Claims, 117 Drawing Sheets

PRIOR ART METHOD USING HIGH RESOLUTION MATERIAL

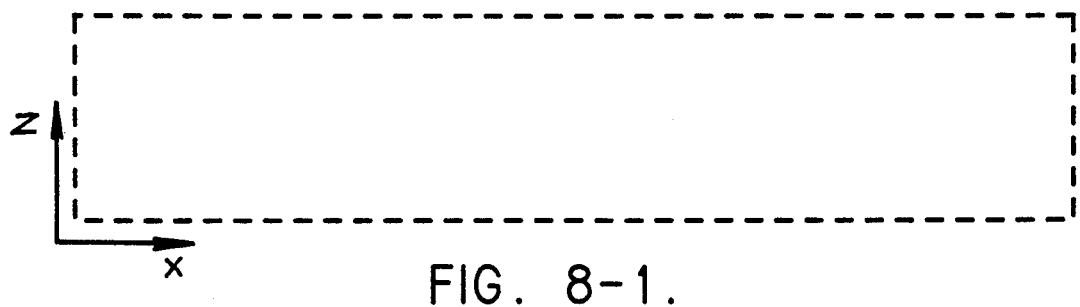
FIG. 8-1.
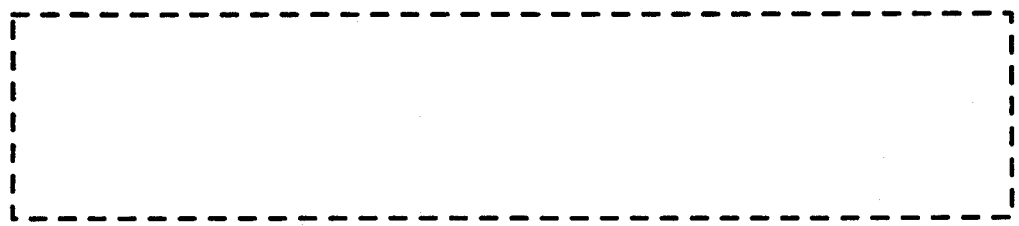
FIG. 8-2.
FIG. 8-3
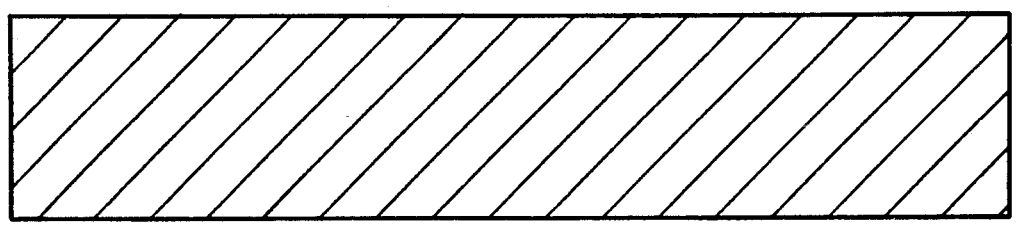
FIG. 8-4.
 = MSD CURE DEPTH
 = NOT NECESSARILY
MSD CURE DEPTH

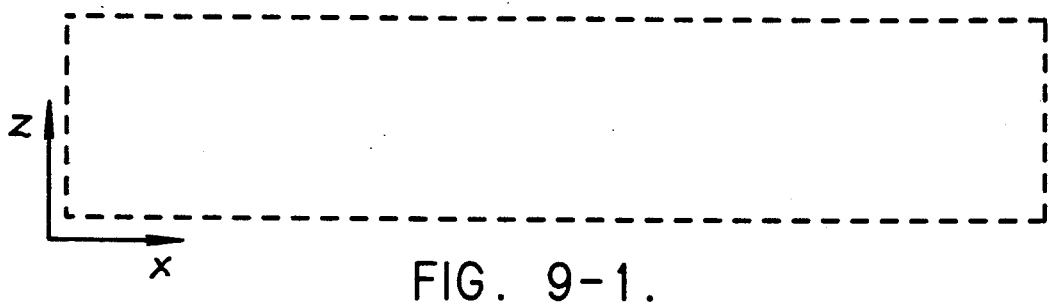
FIG. 9-1.
FIG. 9-2.
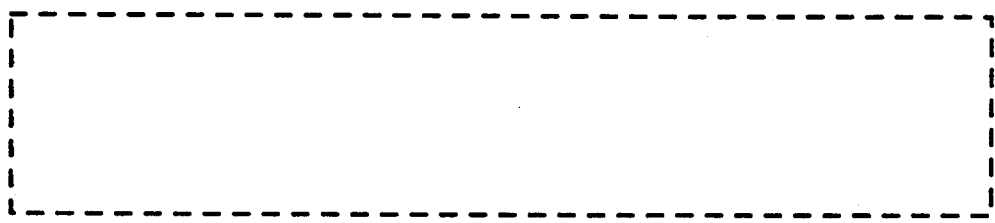
FIG. 9-3.
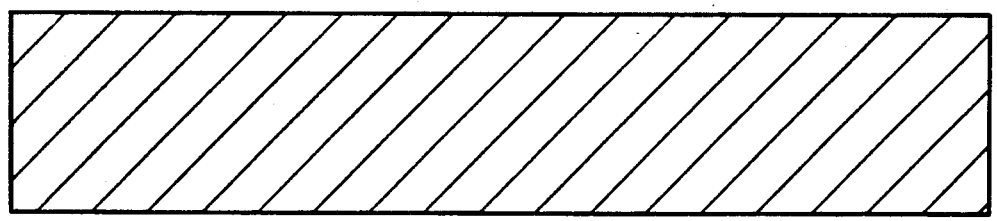
FIG. 9-4.
= MSD CURE DEPTH
= NOT NECESSARILY MSD CURE DEPTH

PRIOR ART METHOD USING
A HIGH RESOLUTION MATERIAL

FIG. 17FDB-1 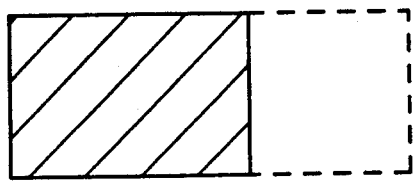
FIG. 17FDB-2 
FIG. 17NFDB-1 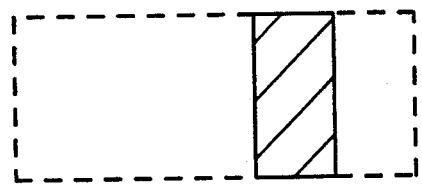
FIG. 17NFDB-2 
FIG. 17FUB-1 
FIG. 17FUB-2 
FIG. 17NFUB-1 
FIG. 17NFUB-2 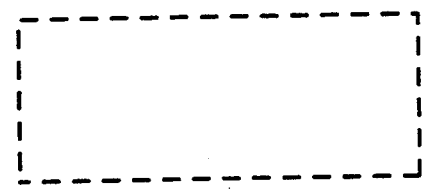

FIG. 17LB-3
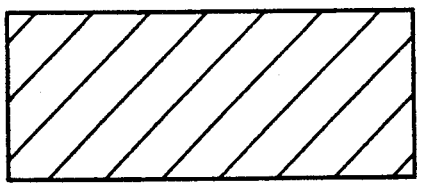
FIG. 17LB-4
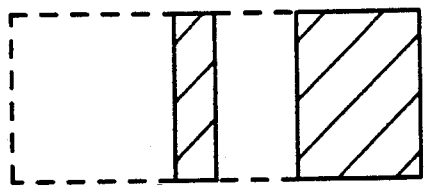
FIG. 17FDB-3
FIG. 17FDB-4
FIG. 17NFDB-3
FIG. 17NFDB-4
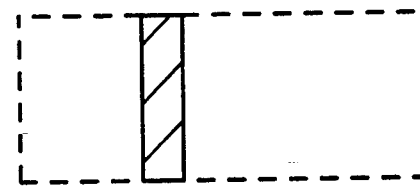
FIG. 17FUB-3
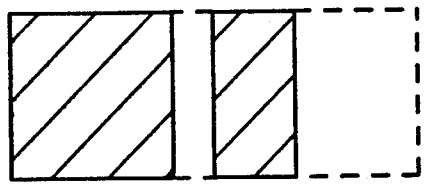
FIG. 17FUB-4
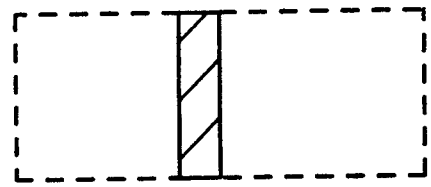
FIG. 17NFUB-3
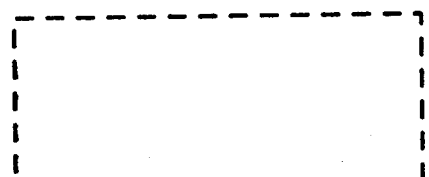
FIG. 17NFUB-4

FIG. 17FDB-5 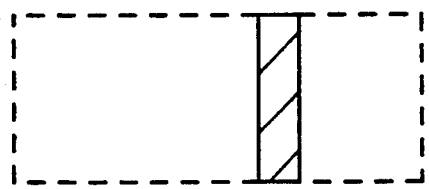
FIG. 17FDB-6 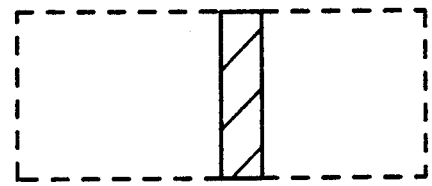
FIG. 17NFDB-5 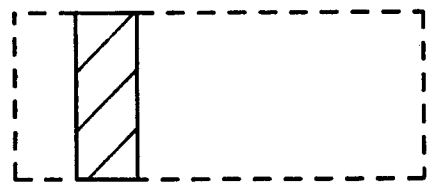
FIG. 17NFDB-6 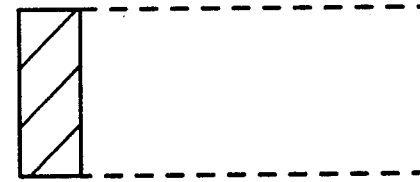
FIG. 17FUB-5 
FIG. 17FUB-6 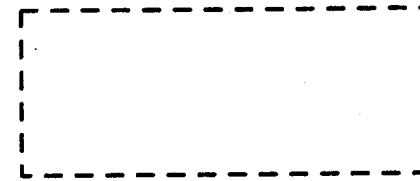
FIG. 17NFUB-5 
FIG. 17NFUB-6 

FIG. 17LB-7
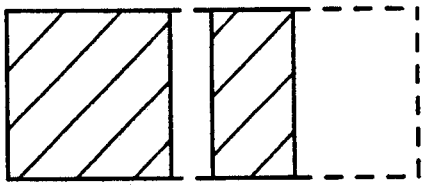
FIG. 17LB-8
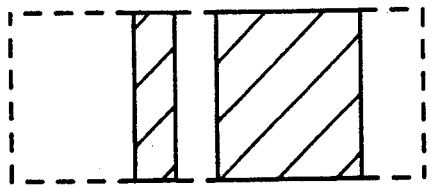
FIG. 17FDB-7
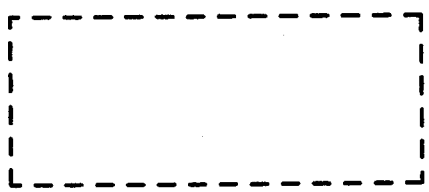
FIG. 17FDB-8
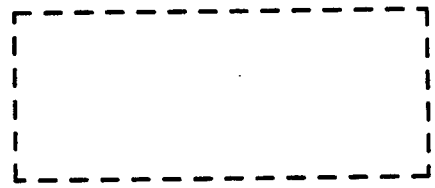
FIG. 17NFDB-7
FIG. 17NFDB-8
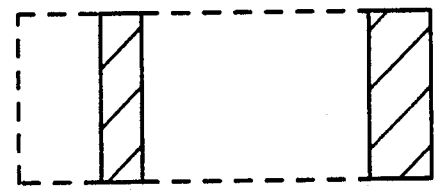
FIG. 17FUB-7
FIG. 17FUB-8
FIG. 17NFUB-7
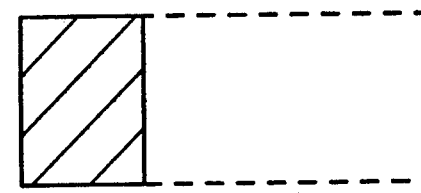
FIG. 17NFUB-8
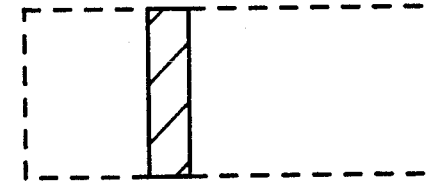

FIG. 17LB-9
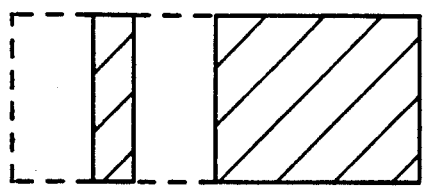
FIG. 17LB-10
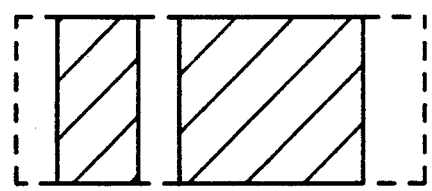
FIG. 17FDB-9
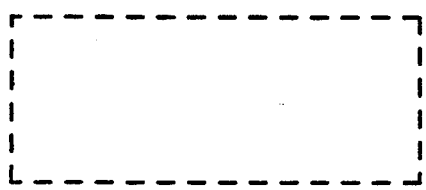
FIG. 17FDB-10
FIG. 17NFDB-9
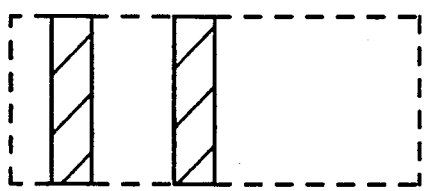
FIG. 17NFDB-10
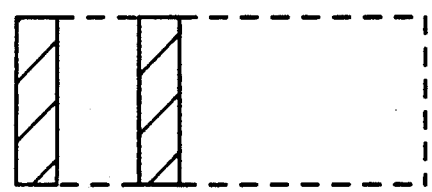
FIG. 17FUB-9
FIG. 17FUB-10
FIG. 17NFUB-9
FIG. 17NFUB-10
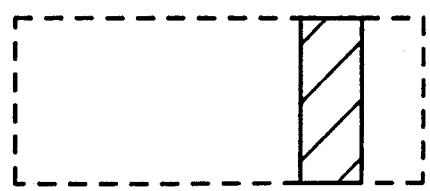

FIG. 17LB-11
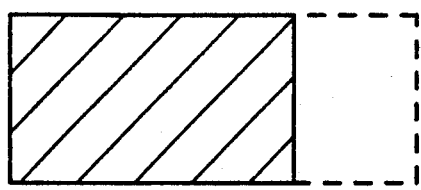
FIG. 17LB-12
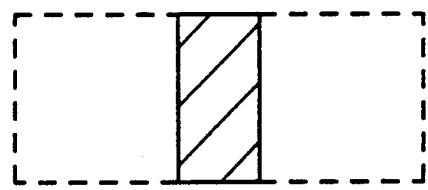
FIG. 17FDB-11
FIG. 17FDB-12
FIG. 17NFDB-11
FIG. 17NFDB-12
FIG. 17FUB-11
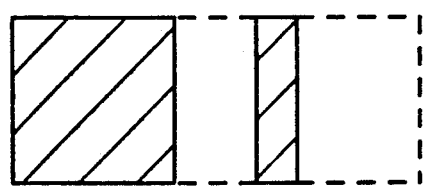
FIG. 17FUB-12
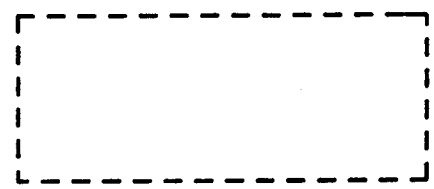
FIG. 17NFUB-11
FIG. 17NFUB-12
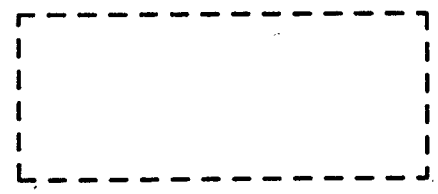

FIG. 17LB-13
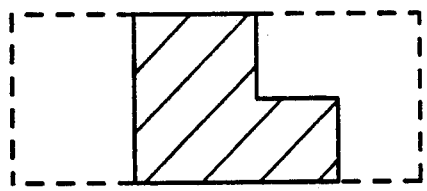
FIG. 17LB-14
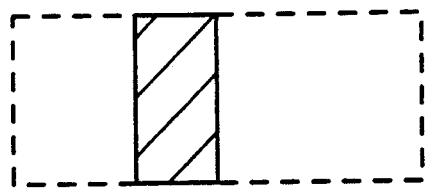
FIG. 17FDB-13
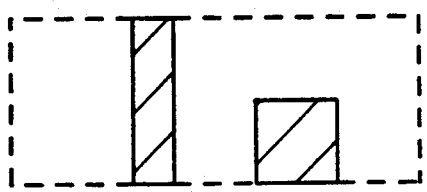
FIG. 17FDB-14
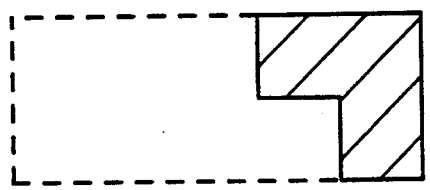
FIG. 17NFDB-13
FIG. 17NFDB-14
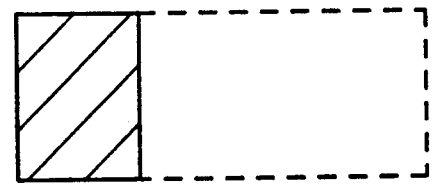
FIG. 17FUB-13
FIG. 17FUB-14
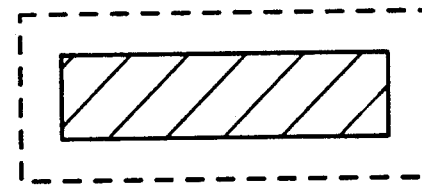
FIG. 17NFUB-13
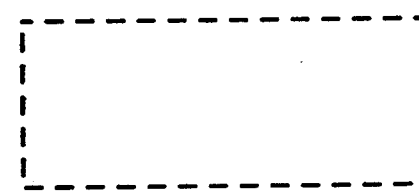
FIG. 17NFUB-14
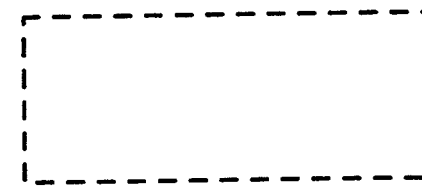

FIG. 17LB-15
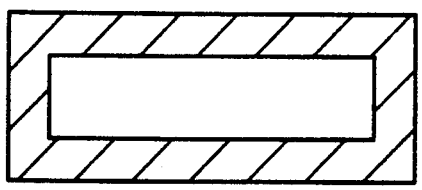
FIG. 17LB-16
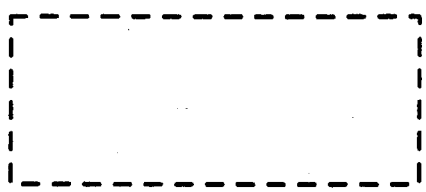
FIG. 17FDB-15
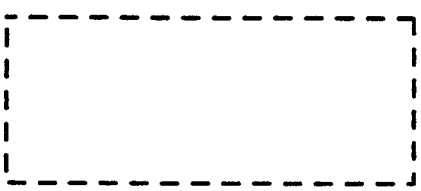
FIG. 17FDB-16
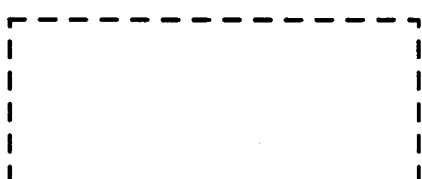
FIG. 17NFDB-15
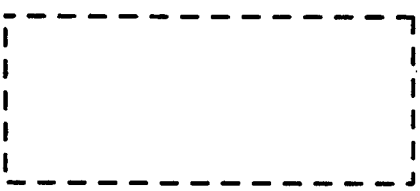
FIG. 17NFDB-16
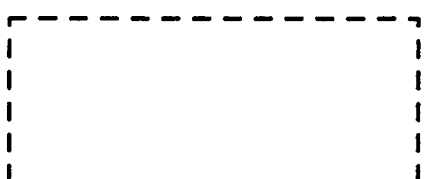
FIG. 17FUB-15
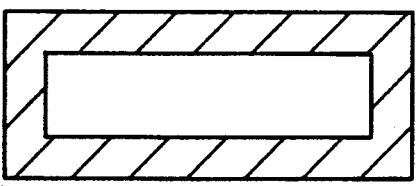
FIG. 17FUB-16
FIG. 17NFUB-15
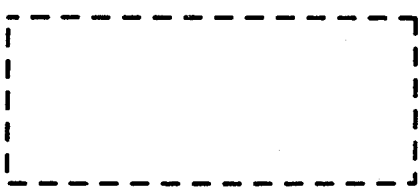
FIG. 17NFUB-16
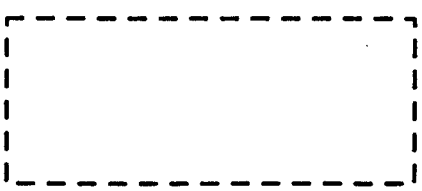

BIN 2

A107
CCSB2 FROM PREVIOUS LAYER

BIN 3

A112
BIN 2 FROM PREVIOUS LAYER

A108
ABOVE + NFDB + FDB

A113
ABOVE + NFDB + FDB

A109
ABOVE − NFUB − FUB

A114
ABOVE − NFUB − FUB

A110
BOUNDARIES TESTED

A115
BOUNDARIES TESTED

A111
PLV

A116
PLV

FIG. 19-10L
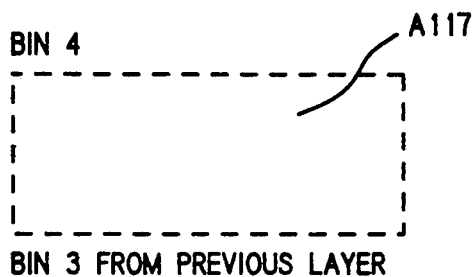
BIN 4     A117
BIN 3 FROM PREVIOUS LAYER
FIG. 19-10R
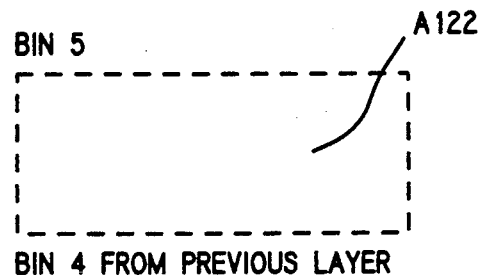
BIN 5     A122
BIN 4 FROM PREVIOUS LAYER
FIG. 19-11L   A118
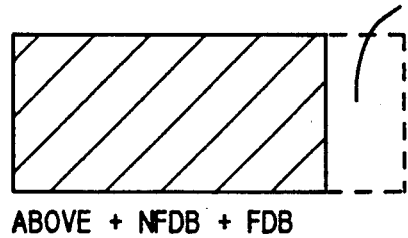
ABOVE + NFDB + FDB
FIG. 19-11R   A123
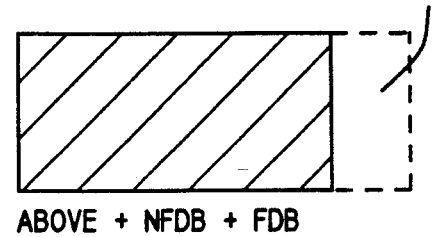
ABOVE + NFDB + FDB
FIG. 19-12L   A119
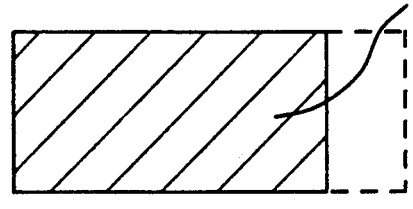
ABOVE − NFUB − FUB
FIG. 19-12R   A124
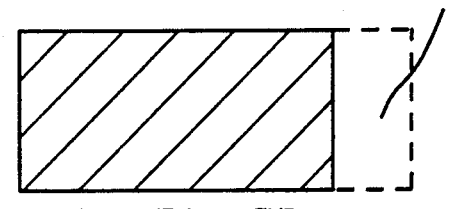
ABOVE − NFUB − FUB
FIG. 19-13L   A120
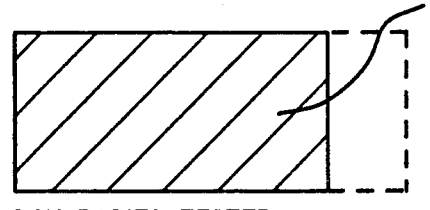
BOUNDARIES TESTED
FIG. 19-13R   A125
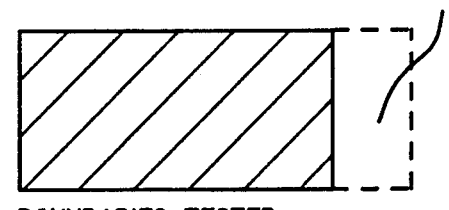
BOUNDARIES TESTED
FIG. 19-14L   A121
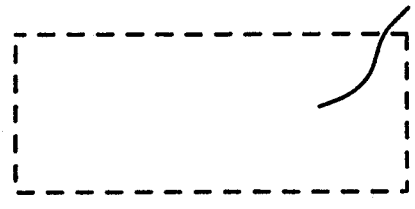
PLV
FIG. 19-14R   A126
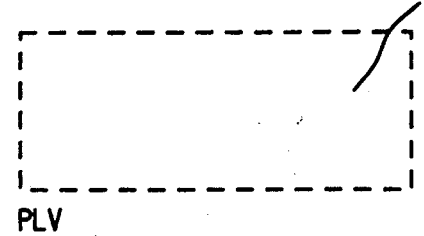
PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4

BIN 3 FROM PREVIOUS LAYER

BIN 5

BIN 4 FROM PREVIOUS LAYER

ABOVE + NFDB + FDB

ABOVE + NFDB + FDB

ABOVE - NFUB - FUB

ABOVE - NFUB - FUB

BOUNDARIES TESTED

BOUNDARIES TESTED

PLV

PLV

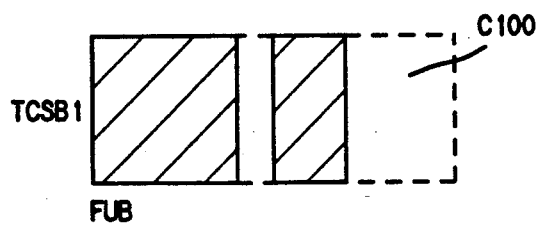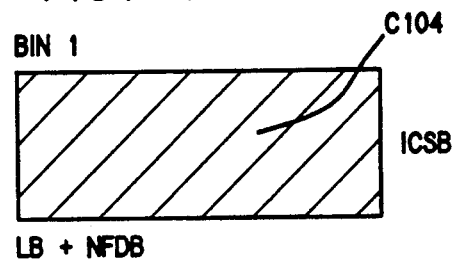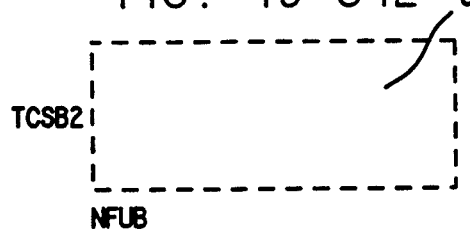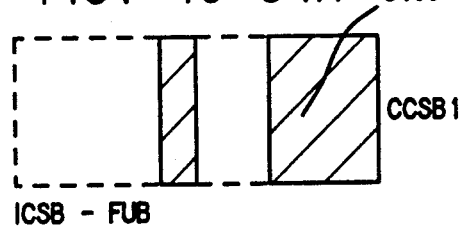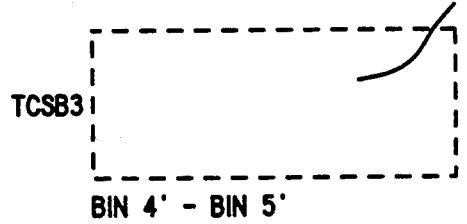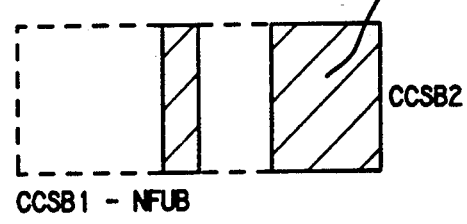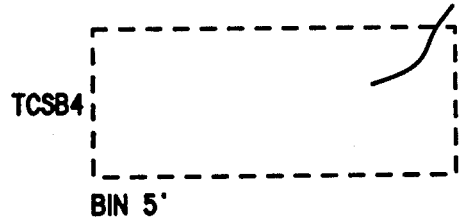

FIG. 19-37L
BIN 2 — C107
CCSB2 FROM PREVIOUS LAYER
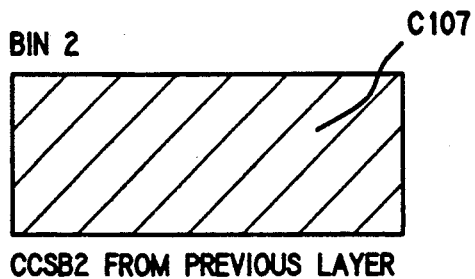
FIG. 19-37R
BIN 3 — C112
BIN 2 FROM PREVIOUS LAYER
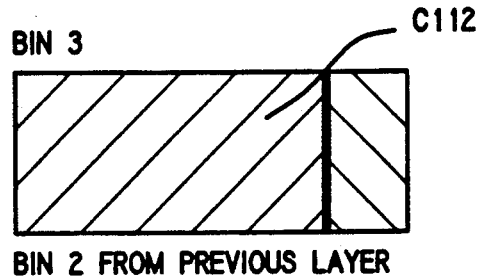
FIG. 19-38L — C108
ABOVE + NFDB + FDB
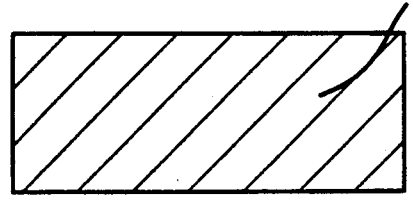
FIG. 19-38R — C113
ABOVE + NFDB + FDB
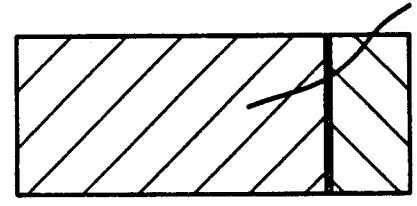
FIG. 19-39L — C109
ABOVE − NFUB − FUB
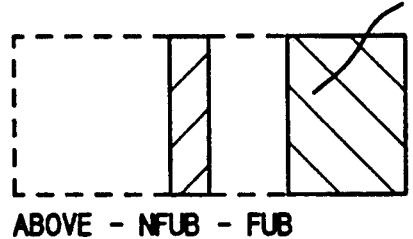
FIG. 19-39R — C114
ABOVE − NFUB − FUB
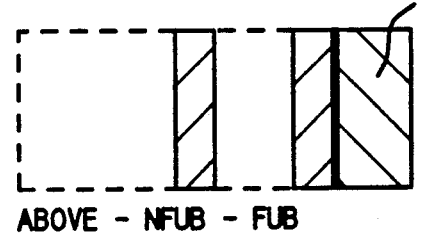
FIG. 19-40L — C110
BOUNDARIES TESTED
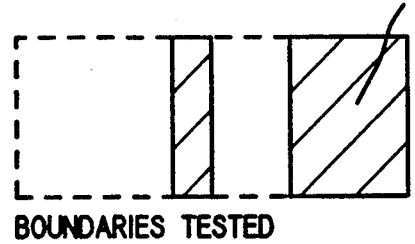
FIG. 19-40R — C115
BOUNDARIES TESTED
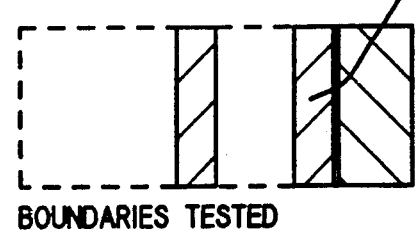
FIG. 19-41L — C111
PLV
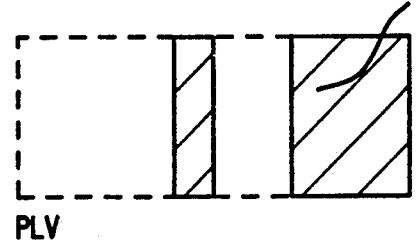
FIG. 19-41R — C116
PLV
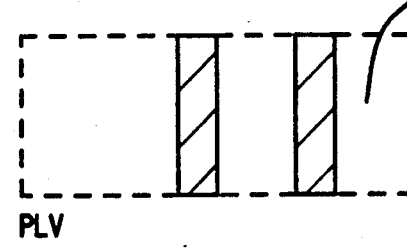

BIN 4  C117
BIN 3 FROM PREVIOUS LAYER

BIN 5  C122
BIN 4 FROM PREVIOUS LAYER

C118
ABOVE + NFDB + FDB

C123
ABOVE + NFDB + FDB

C119
ABOVE − NFUB − FUB

C124
ABOVE − NFUB − FUB

C120
BOUNDARIES TESTED

C125
BOUNDARIES TESTED

C121
PLV

C126
PLV

PLV (BIN 4)

PLV (BIN 5) = TCSB4

ABOVE - BIN 5' = TCSB3

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

FIG. 19-58L
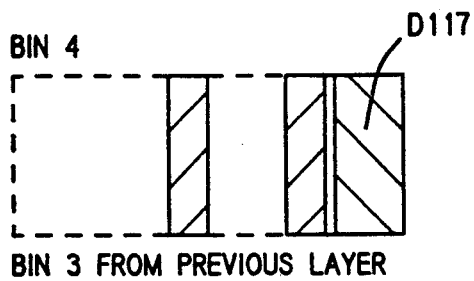
BIN 4　　　　D117
BIN 3 FROM PREVIOUS LAYER
FIG. 19-58R
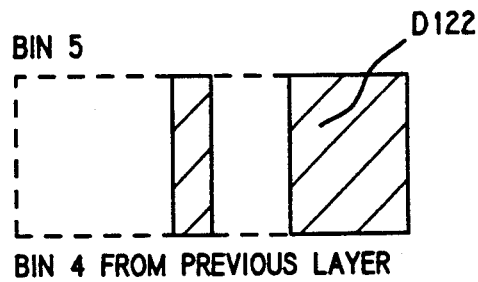
BIN 5　　　　D122
BIN 4 FROM PREVIOUS LAYER
FIG. 19-59L　D118
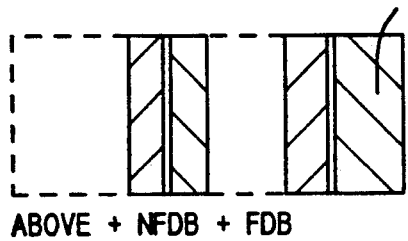
ABOVE + NFDB + FDB
FIG. 19-59R　D123
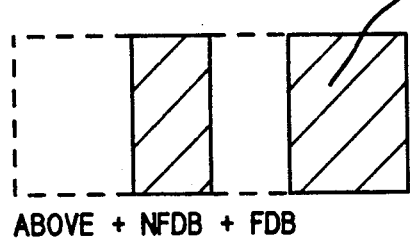
ABOVE + NFDB + FDB
FIG. 19-60L　D119
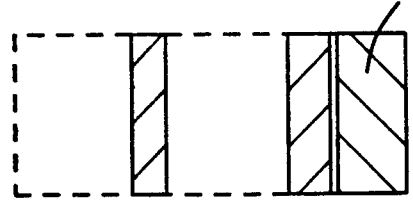
ABOVE − NFUB − FUB
FIG. 19-60R　D124
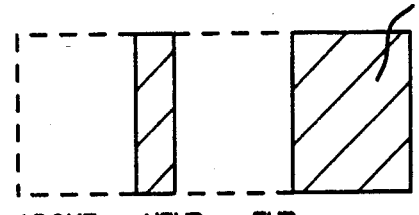
ABOVE − NFUB − FUB
FIG. 19-61L　D120
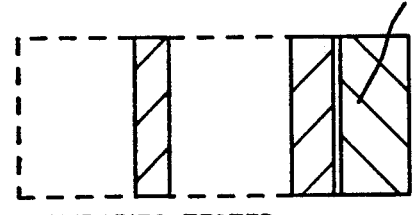
BOUNDARIES TESTED
FIG. 19-61R　D125
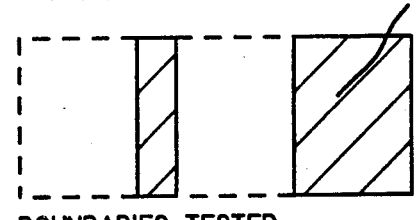
BOUNDARIES TESTED
FIG. 19-62L　D121
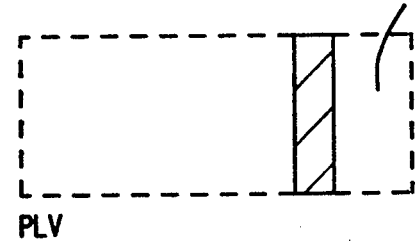
PLV
FIG. 19-62R　D126
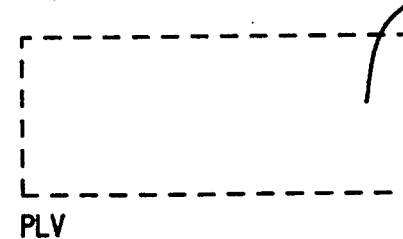
PLV

PLV (BIN 4)

PLV (BIN 5) = TCSB4

ABOVE - BIN 5' = TCSB3

TCSB1
FUB
E100

BIN 1
E104
ICSB
LB + NFDB

E101
TCSB2
NFUB

E105
CCSB1
ICSB - FUB

E102
TCSB3
BIN 4' - BIN 5'

E106
CCSB2
CCSB1 - NFUB

E103
TCSB4
BIN 5'

BIN 2

E107
CCSB2 FROM PREVIOUS LAYER

BIN 3

E112
BIN 2 FROM PREVIOUS LAYER

E108
ABOVE + NFDB + FDB

E113
ABOVE + NFDB + FDB

E109
ABOVE − NFUB − FUB

E114
ABOVE − NFUB − FUB

E110
BOUNDARIES TESTED

E115
BOUNDARIES TESTED

E111
PLV

E116
PLV

BIN 4

BIN 3 FROM PREVIOUS LAYER

BIN 5

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE - NFUB - FUB

ABOVE - NFUB - FUB

BOUNDARIES TESTED

BOUNDARIES TESTED

PLV

PLV

BIN 4

BIN 3 FROM PREVIOUS LAYER

BIN 5

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

FIG. 19-117L
BIN 2 H107
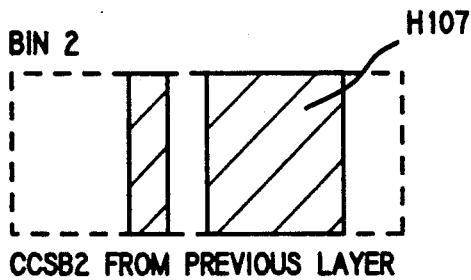
CCSB2 FROM PREVIOUS LAYER
FIG. 19-117R
BIN 3 H112
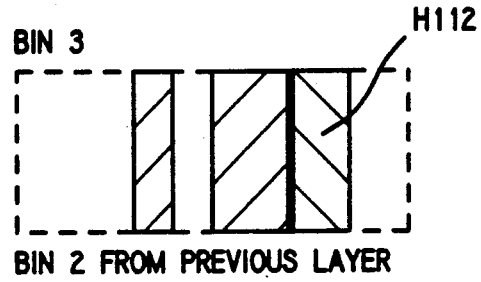
BIN 2 FROM PREVIOUS LAYER
FIG. 19-118L H108
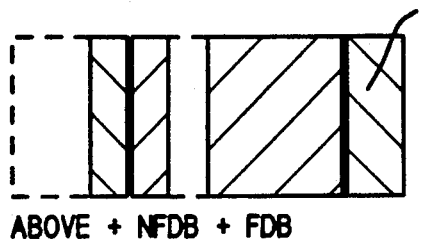
ABOVE + NFDB + FDB
FIG. 19-118R H113
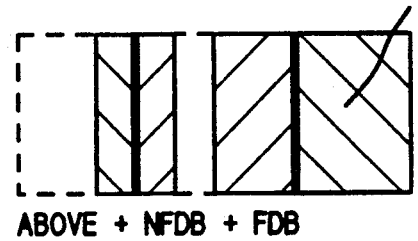
ABOVE + NFDB + FDB
FIG. 19-119L H109
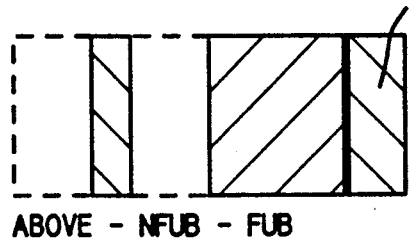
ABOVE − NFUB − FUB
FIG. 19-119R H114
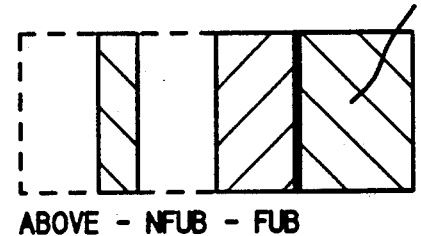
ABOVE − NFUB − FUB
FIG. 19-120L H110
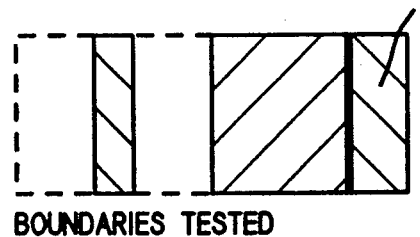
BOUNDARIES TESTED
FIG. 19-120R H115
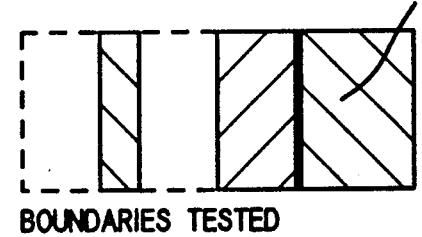
BOUNDARIES TESTED
FIG. 19-121L H111
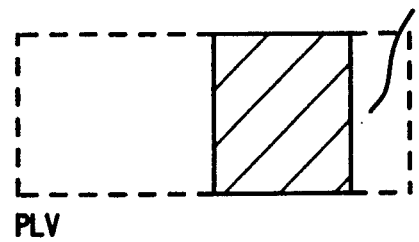
PLV
FIG. 19-121R H116
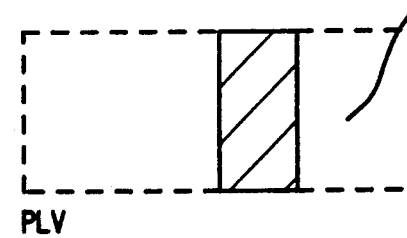
PLV

FIG. 19-122L
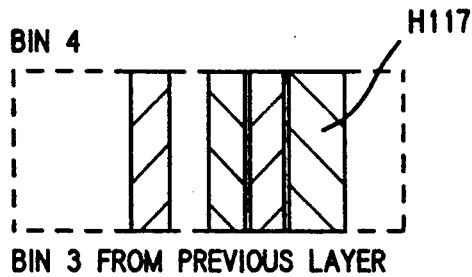
BIN 4 ... H117
BIN 3 FROM PREVIOUS LAYER
FIG. 19-122R
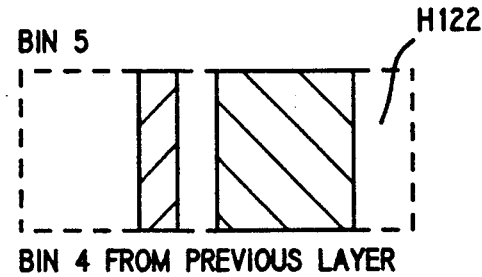
BIN 5 ... H122
BIN 4 FROM PREVIOUS LAYER
FIG. 19-123L  H118
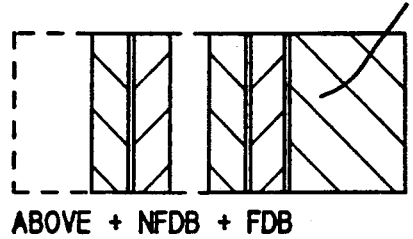
ABOVE + NFDB + FDB
FIG. 19-123R  H123
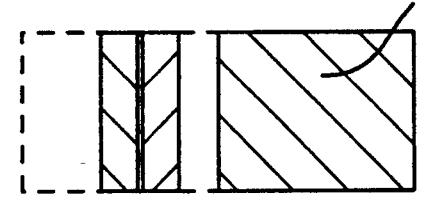
ABOVE + NFDB + FDB
FIG. 19-124L  H119
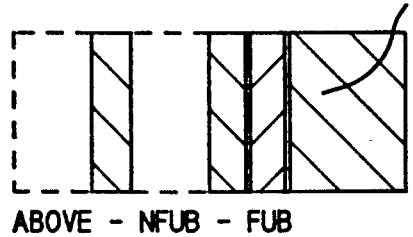
ABOVE − NFUB − FUB
FIG. 19-124R  H124
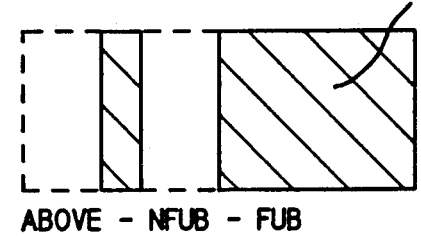
ABOVE − NFUB − FUB
FIG. 19-125L  H120
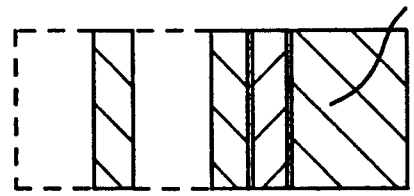
BOUNDARIES TESTED
FIG. 19-125R  H125
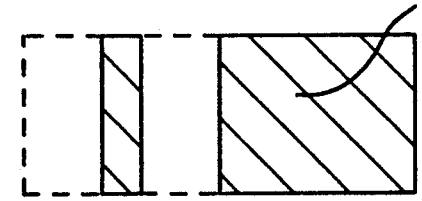
BOUNDARIES TESTED
FIG. 19-126L  H121
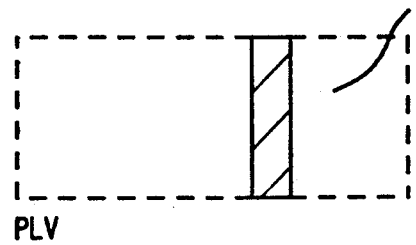
PLV
FIG. 19-126R  H126
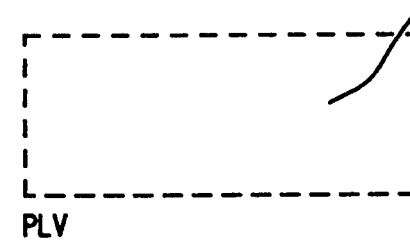
PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4
BIN 3 FROM PREVIOUS LAYER

BIN 5
BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4'

PLV (BIN 4)

BIN 5'

PLV (BIN 5) = TCSB4

ABOVE - BIN 5' = TCSB3

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

FIG. 19-154L
BIN 4
BIN 3 FROM PREVIOUS LAYER
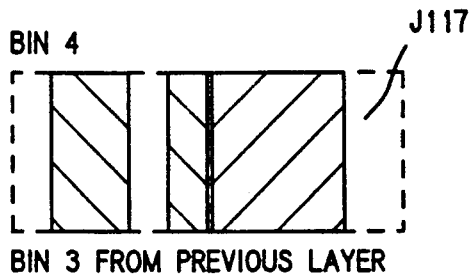
J117
FIG. 19-154R
BIN 5
BIN 4 FROM PREVIOUS LAYER
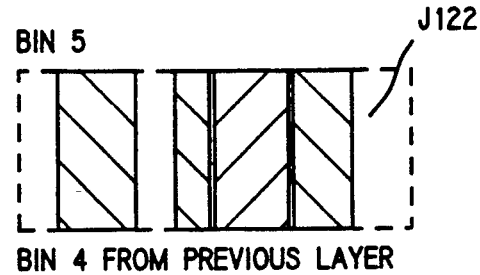
J122
FIG. 19-155L J118
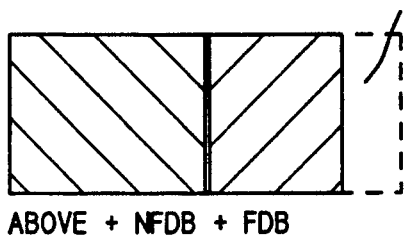
ABOVE + NFDB + FDB
FIG. 19-155R J123
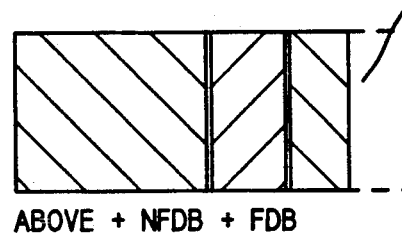
ABOVE + NFDB + FDB
FIG. 19-156L J119
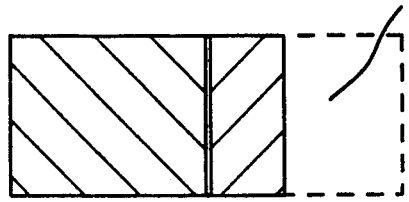
ABOVE − NFUB − FUB
FIG. 19-156R J124
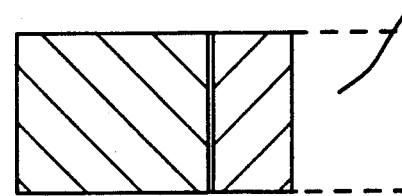
ABOVE − NFUB − FUB
FIG. 19-157L J120
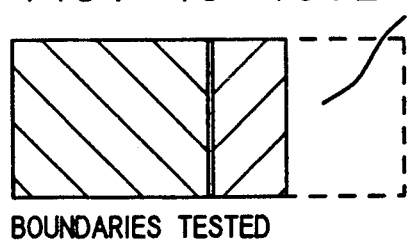
BOUNDARIES TESTED
FIG. 19-157R J125
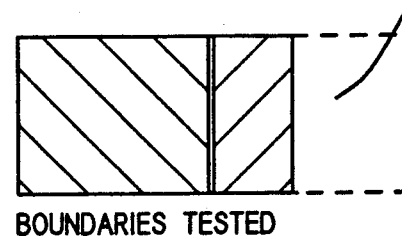
BOUNDARIES TESTED
FIG. 19-158L J121
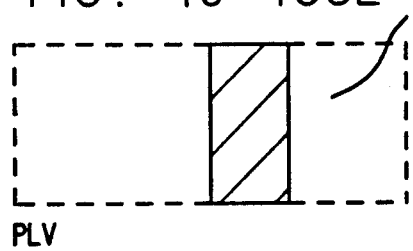
PLV
FIG. 19-158R J126
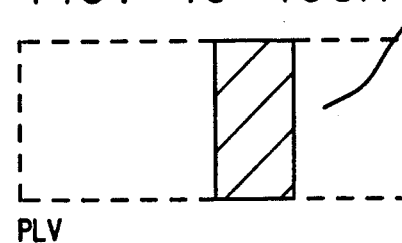
PLV FIG. 19-159L
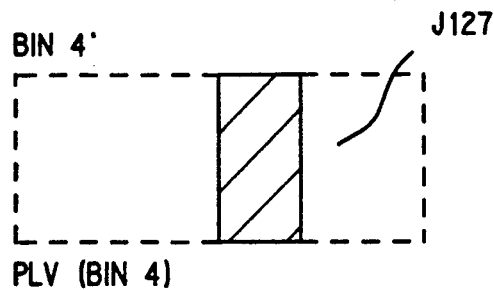
BIN 4'      J127
PLV (BIN 4)
FIG. 19-159R
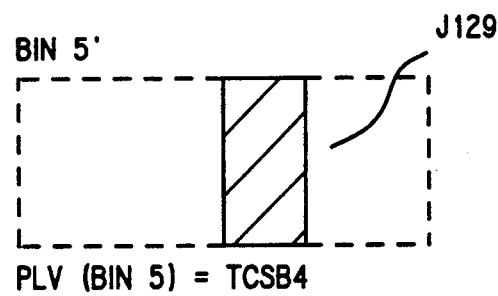
BIN 5'      J129
PLV (BIN 5) = TCSB4
FIG. 19-160L  J128
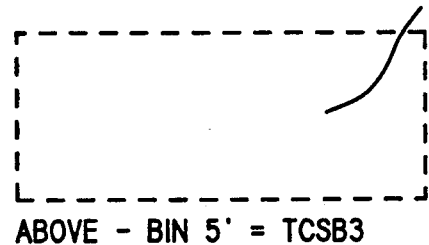
ABOVE - BIN 5' = TCSB3

BIN 2

CCSB2 FROM PREVIOUS LAYER

BIN 3

BIN 2 FROM PREVIOUS LAYER

ABOVE + NFDB + FDB

ABOVE + NFDB + FDB

ABOVE - NFUB - FUB

ABOVE - NFUB - FUB

BOUNDARIES TESTED

BOUNDARIES TESTED

PLV

PLV

FIG. 19-170L
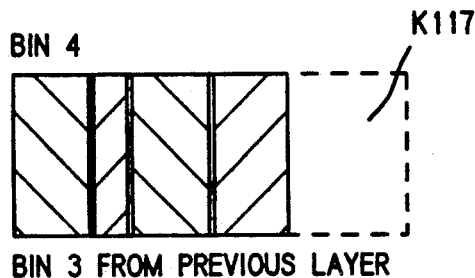
BIN 4
K117
BIN 3 FROM PREVIOUS LAYER
FIG. 19-170R
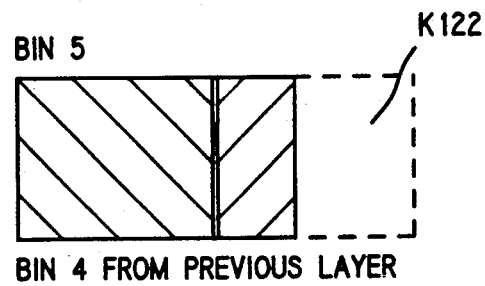
BIN 5
K122
BIN 4 FROM PREVIOUS LAYER
FIG. 19-171L K118
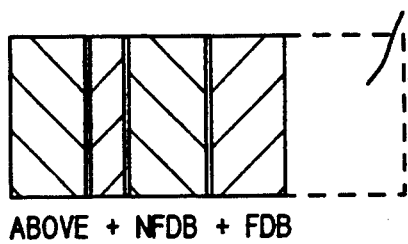
ABOVE + NFDB + FDB
FIG. 19-171R K123
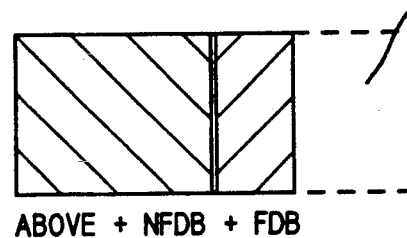
ABOVE + NFDB + FDB
FIG. 19-172L K119
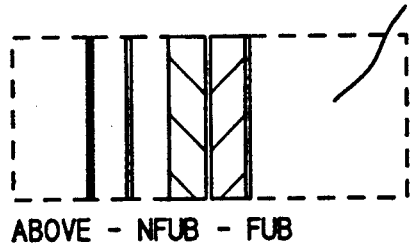
ABOVE - NFUB - FUB
FIG. 19-172R K124
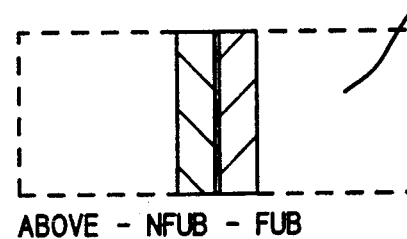
ABOVE - NFUB - FUB
FIG. 19-173L K120
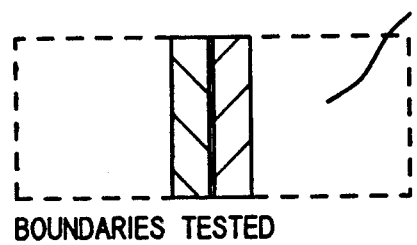
BOUNDARIES TESTED
FIG. 19-173R K125
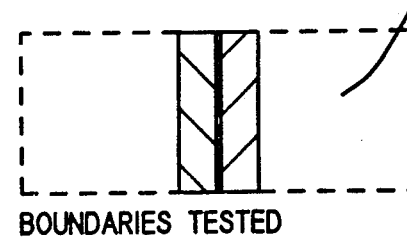
BOUNDARIES TESTED
FIG. 19-174L K121
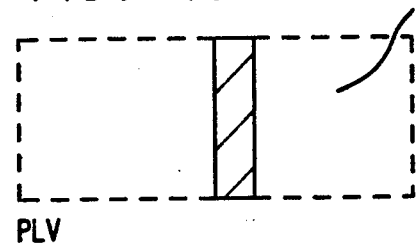
PLV
FIG. 19-174R K126
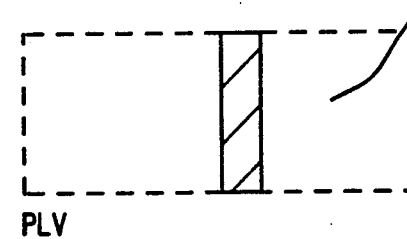
PLV

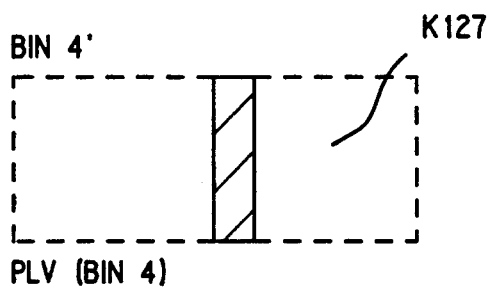
FIG. 19-175L
BIN 4'
PLV (BIN 4)
K127
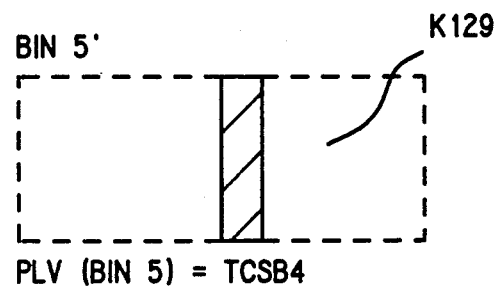
FIG. 19-175R
BIN 5'
PLV (BIN 5) = TCSB4
K129
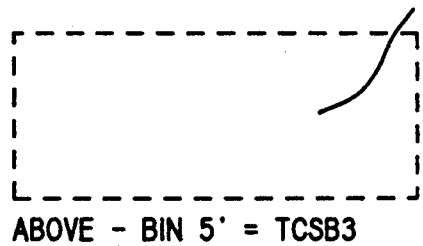
FIG. 19-176L K128
ABOVE - BIN 5' = TCSB3

FIG. 19-181L
BIN 2
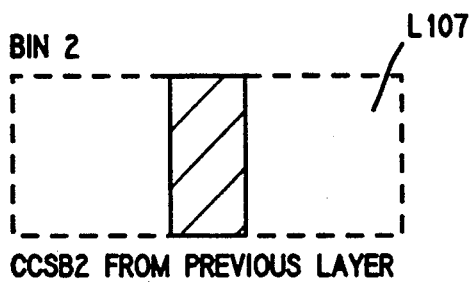
L107
CCSB2 FROM PREVIOUS LAYER
FIG. 19-181R
BIN 3
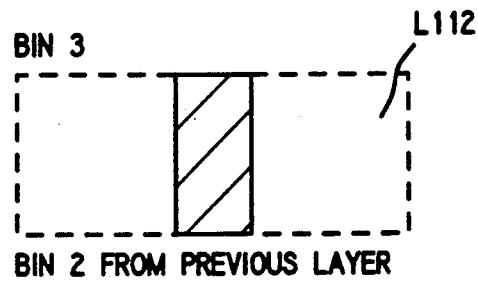
L112
BIN 2 FROM PREVIOUS LAYER
FIG. 19-182L L108
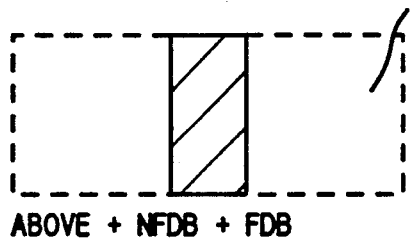
ABOVE + NFDB + FDB
FIG. 19-182R L113
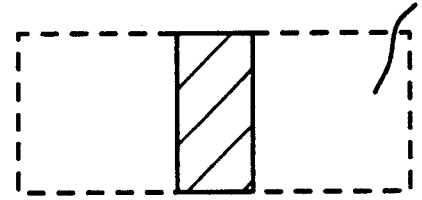
FIG. 19-183L L109
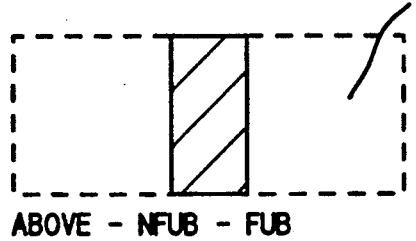
ABOVE - NFUB - FUB
FIG. 19-183R L114
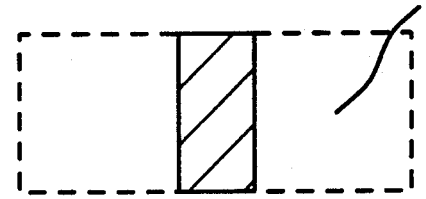
FIG. 19-184L L110
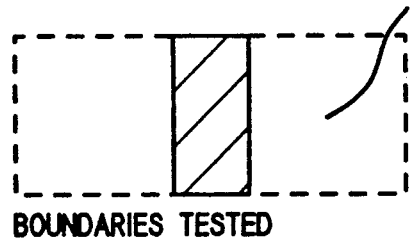
BOUNDARIES TESTED
FIG. 19-184R L115
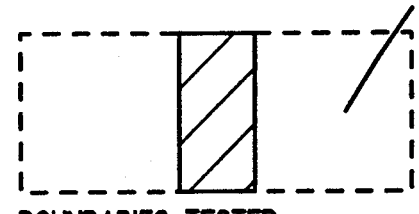
BOUNDARIES TESTED
FIG. 19-185L L111
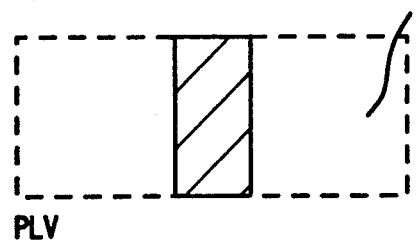
PLV
FIG. 19-185R L116
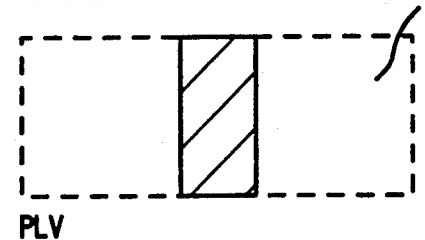
PLV

BIN 4
BIN 3 FROM PREVIOUS LAYER

BIN 5
BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

FIG. 19-197L
BIN 2     M107
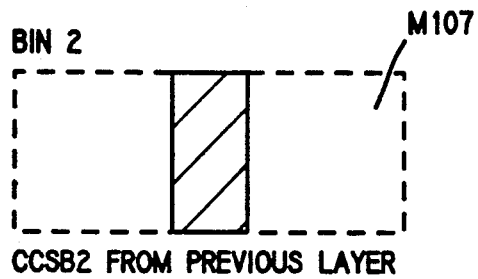
CCSB2 FROM PREVIOUS LAYER
FIG. 19-197R
BIN 3     M112
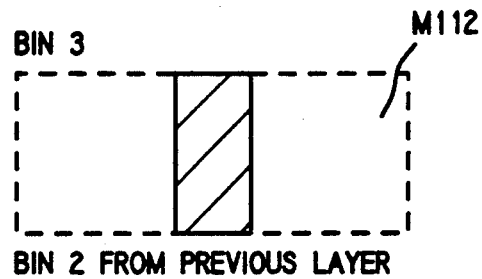
BIN 2 FROM PREVIOUS LAYER
FIG. 19-198L  M108
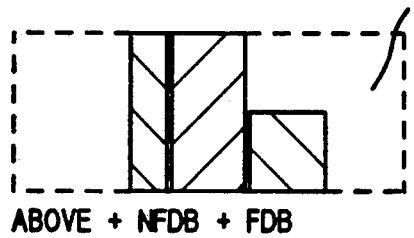
ABOVE + NFDB + FDB
FIG. 19-198R  M113
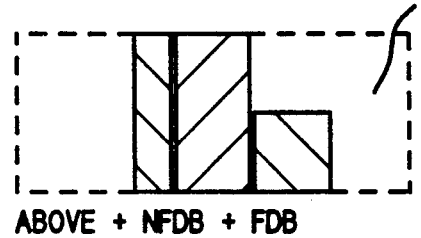
ABOVE + NFDB + FDB
FIG. 19-199L  M109
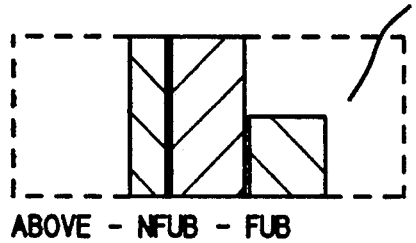
ABOVE - NFUB - FUB
FIG. 19-199R  M114
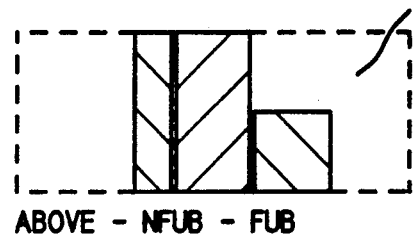
ABOVE - NFUB - FUB
FIG. 19-200L  M110
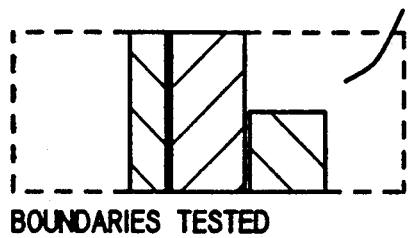
BOUNDARIES TESTED
FIG. 19-200R  M115
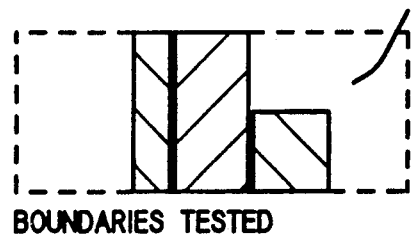
BOUNDARIES TESTED
FIG. 19-201L  M111
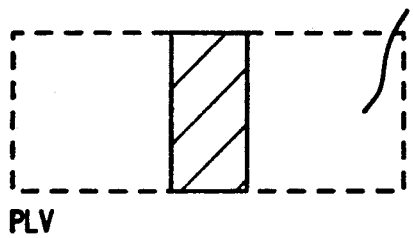
PLV
FIG. 19-201R  M116
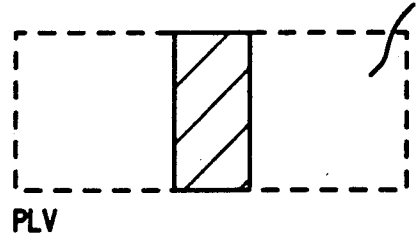
PLV

BIN 4

BIN 3 FROM PREVIOUS LAYER

BIN 5

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

CCSB2 FROM PREVIOUS LAYER

BIN 2 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

FIG. 19-218L
BIN 4
BIN 3 FROM PREVIOUS LAYER
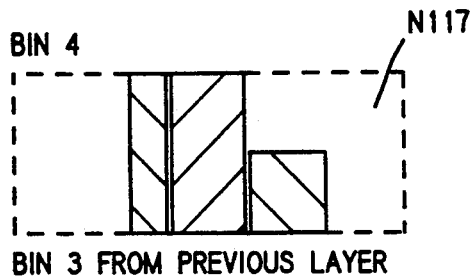
FIG. 19-218R
BIN 5
BIN 4 FROM PREVIOUS LAYER
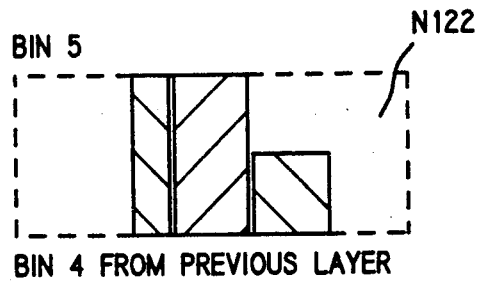
FIG. 19-219L  N118
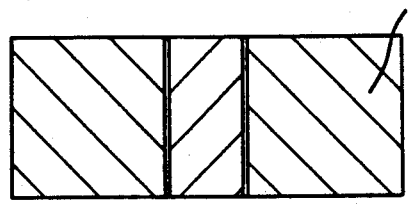
ABOVE + NFDB + FDB
FIG. 19-219R  N123
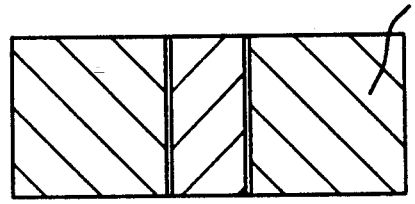
ABOVE + NFDB + FDB
FIG. 19-220L  N119
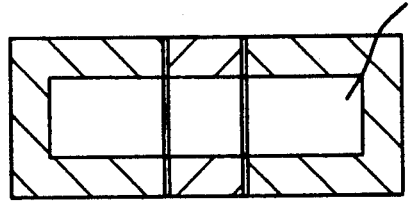
ABOVE − NFUB − FUB
FIG. 19-220R  N124
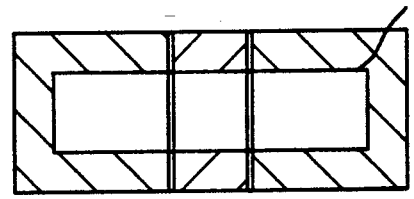
ABOVE − NFUB − FUB
FIG. 19-221L  N120
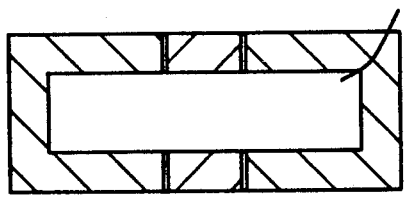
BOUNDARIES TESTED
FIG. 19-221R  N125
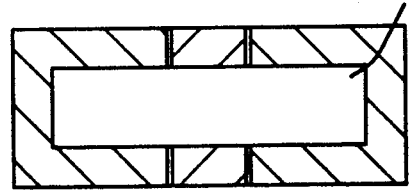
BOUNDARIES TESTED
FIG. 19-222L  N121
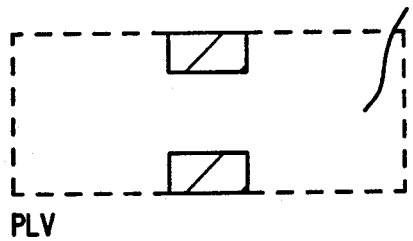
PLV
FIG. 19-222R  N126
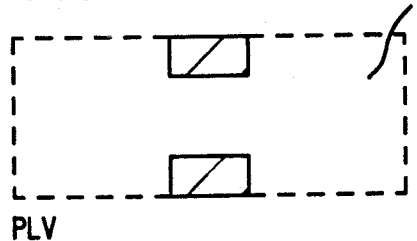
PLV

BIN 4'  
PLV (BIN 4)

BIN 5'  
PLV (BIN 5) = TCSB4

ABOVE - BIN 5' = TCSB3

BIN 2
CCSB2 FROM PREVIOUS LAYER

BIN 3
BIN 2 FROM PREVIOUS LAYER

ABOVE + NFDB + FDB

ABOVE - NFUB - FUB

BOUNDARIES TESTED

BOUNDARIES TESTED

PLV

PLV

BIN 4

0117

BIN 3 FROM PREVIOUS LAYER

BIN 5

0122

BIN 4 FROM PREVIOUS LAYER

ABOVE + NFDB + FDB

ABOVE + NFDB + FDB

ABOVE − NFUB − FUB

ABOVE − NFUB − FUB

BOUNDARIES TESTED

BOUNDARIES TESTED

PLV

PLV

BIN 4'

PLV (BIN 4)

BIN 5'

PLV (BIN 5) = TCSB4

ABOVE - BIN 5' = TCSB3

SIMULTANEOUS MULTIPLE LAYER CURING IN STEREOLITHOGRAPHY

BACKGROUND OF THE INVENTION

The field of the invention is stereolithography, and more particularly improved stereolithography systems for manufacturing parts or objects more rapidly, reliably, accurately and economically.

It is common practice in the production of plastic parts or objects to first design the part and then produce a prototype of the part. This requires considerable time, effort and expense. For example, tooling or molds may be required, even to produce just the prototype. The design is then reviewed and often times the laborious and expensive process is again and again repeated until the design has been optimized. After design optimization, the next step is production. Most production plastic parts are injection molded. Since the design time and tooling costs are very high, plastic parts are often only practical in high volume production. While other processes are available for the production of plastic parts, including direct machine work, vacuum-forming and direct forming, such methods are typically only cost effective for short run production, and the parts produced are usually inferior in quality to molded parts.

Techniques have been developed in the past for making three-dimensional objects within a fluid medium. These techniques involve selectively curing the medium, e.g., a resin, with a beam of radiation. U.S. Pat. Nos. 4,041,476; 4,078,229; 4,238,840 and 4,288,861 describe some of these techniques. All of these techniques or systems rely on the buildup of synergistic energization, or curing energy, at selected points deep within the volume of the fluid medium, to the exclusion of all other points in the fluid volume. These systems, however, encounter a number of problems with resolution and exposure control. The loss of radiation intensity and image forming resolution of the focused spots of the beam, as they are directed deeper into the fluid medium, create complex beam control situations. Absorption, diffusion, dispersion and diffraction all contribute to the difficulties of working deep within the fluid medium on an economical and reliable basis.

In recent years, "stereolithography" systems, such as those described in U.S. Pat. No. 4,575,330, which patent is incorporated herein by reference as if set forth herein in full, have come into use. Stereolithography is a method for automatically building simple or complex parts (e.g., plastic parts) by successively "printing" cross-sections or layers of a solidified fluid-like building material on top of each other, with all of the layers joined together to form a whole part. The building material may be, for example, a photopolymer which is solidifiable upon exposure to UV radiation or the like. Powder materials, which form a solidified mass when sintered by conducted or radiated heat from a heated element or source of IR radiation or the like, and powders which are solidifiable by the addition of a reactive chemical such as a binder, may also be utilized. This method of fabrication is extremely powerful for quickly reducing design ideas to physical form and for making prototypes.

One type of useful fluid medium, photocurable polymers (photopolymers) change from liquid to solid when exposed to light. Their photospeed under ultraviolet light (UV) is fast enough to make them practical building materials. The material that is not polymerized when a part is made is still usable and remains in the vat as successive parts are made. In one embodiment an ultraviolet laser generates a small intense spot of UV. This spot is moved across the liquid surface with a galvanometer mirror X-Y scanner. The scanner is driven by computer generated vectors. After each successive surface is exposed by the laser, an elevator lowers the object further into the vat and allows another layer of fresh liquid to cover the surface of the object for formation of the next layer. Precise complex patterns can be rapidly produced with this technique.

The laser, scanner, photopolymer vat and elevator, along with a controlling computer and possibly a separate computer for creating appropriate cross-sectional data from initially supplied three-dimensional data, combine together to form a stereolithography apparatus, referred to as an "SLA". An SLA is programmed to automatically make a part by drawing its various cross-sections, one layer at a time, and building the part up layer-by-layer.

Stereolithography does not use tooling, molds, dies, etc. Since it depends on using a computer to generate cross-sectional layers or patterns, an SLA can be readily linked (i.e., a data link) to computer aided design as a computer aided manufacturing (CAD/CAM) apparatus.

Many photopolymers have a "minimum solidifiable thickness," i.e., a minimum thickness below which they cannot be sufficiently cured to form unsupported regions of transformed, cohesive material. For example, with presently preferred fluid photopolymers, if an attempt is made to try to form a feature of an object having a thickness less than the minimum solidifiable depth (MSD) or thickness, that feature will either simply fail to sufficiently solidify to become part of the object, or it will slump (i.e., fail to hold its shape) when the object or individual layer is moved relative to the vat of fluid photopolymer. The minimum solidifiable thickness of a building medium (e.g. photopolymer) is not only a characteristic of the building medium or material itself but it also depends on the synergistic stimulation source chosen (e.g. the solidifying radiation such as ultraviolet light) and the environmental conditions surrounding the material. For example, oxygen absorbed in a photopolymer can act as a reaction inhibitor. Therefore, as used herein, "MSD" refers to the minimum solidification depth obtainable with a given material/solidification environment combination.

Stereolithography makes objects layer by layer. Since the MSD is the minimum solidification depth for forming unsupported regions of layers (i.e., down-facing features of the object), these regions must be given a cure depth of at least the MSD regardless of the thickness between individual layers or cross-sections from which the object is being formed. Therefore, due to the layer by layer formation process, even if the layers being used are thinner than the MSD, the accuracy of the stereolithographically reproduced object is limited by the MSD of the material being used.

Accordingly, it is an object of the invention to overcome this limitation by providing a method and apparatus of practicing high resolution stereolithography when using a fluid-like building material that is inherently incapable of making unsupported thicknesses of solidified material as thin as the desired accuracy when solidified by the chosen synergistic stimulation.

RELATED APPLICATIONS

Additional details of stereolithography are also available in the following co-pending U.S. patents and patent applications, all of which are hereby fully incorporated by reference herein as though set forth in full (excluding incorporations-by-reference therein).

| APPLI- CATION SERIAL NO. | FILING DATE | INVEN- TOR(S) | STATUS |
|---|---|---|---|
| 07/182,830 | 4/18/88 | Hull et al. | U.S. Pat. No. 5,059,359 |
| 07/183,016 | 4/18/88 | Modrek | U.S. Pat. No. 4,996,010 |
| 07/182,801 | 4/18/88 | Hull et al. | U.S. Pat. No. 4,999,143 |
| 07/183,015 | 4/18/88 | Smalley | U.S. Pat. No. 5,015,424 |
| 07/268,429 | 11/8/88 | Modrek et al. | U.S. Pat. No. 5,076,974 |
| 07/268,816 | 11/8/88 | Spence | U.S. Pat. No. 5,058,988 |
| 07/268,837 | 11/8/88 | Spence et al. | U.S. Pat. No. 5,123,734 |
| 07/268,907 | 11/8/88 | Spence et al. | U.S. Pat. No. 5,059,021 |
| 07/331,644 | 3/31/89 | Hull et al. | Allowed |
| 07/339,246 | 4/7/89 | Hull et al. | U.S. Pat. No. 5,104,592 |
| 07/415,134 | 9/29/89 | Jacobs et al. | Abandoned |
| 07/429,911 | 10/27/89 | Spence et al. | Allowed |
| 07/429,301 | 10/30/89 | Lewis et al. | Pending |
| 07/428,492 | 10/30/89 | Vorgitch et al. | Abandoned |
| 07/429,435 | 10/30/89 | Smalley et al. | U.S. Pat. No. 5,130,014 |
| 07/515,479 | 4/27/90 | Almquist et al. | Allowed |
| 07/545,517 | 6/28/90 | Cohen | U.S. Pat. No. 5,096,530 |

Additional details of stereolithography are also available in two related applications filed concurrently herewith and incorporated by reference herein.

The first of these concurrently-filed applications is U.S. patent application Ser. No. 07/606,191 entitled "Boolean Layer Comparison Slice", filed by Snead et al. This application describes the use of Boolean operations in determining which portions of each layer continue from the previous layer through the present layer and through the next successive layer and which portions are up-facing or down-facing or both. Therefore, this application describes methods and apparatus for comparing initial data associated with each layer, and comparing such data between layers to form resulting data that will be used in the process of physically reproducing the object. Additionally, this application describes the use of such operations to yield appropriately sized objects (e.g. undersized or oversized). Utility of the concepts of this referenced application, to the instant invention, will become apparent by following the teaching of the instant invention as described hereinafter.

U.S. patent application Ser. No. 605,979 describes methods for forming high resolution objects by filling the surface discontinuities inherent in three-dimensional objects formed from stereolithography with thin fill layers.

SUMMARY OF THE INVENTION

The invention allows materials which are not considered capable of producing high resolution objects by stereolithographic methods to be used to create many of these high resolution objects through improved stereolithographic techniques. In terms of photopolymers, these heretofore non-high resolution photopolymers typically have absorption and solidification properties which make them incapable of being converted to a cohesive solid plastic of thickness less than some amount (e.g. 1 mm). In the normal practice of stereolithography (using one of these materials) all vertical features of an object occur at positions that are nominally integral multiples of a layer thickness which is greater than or equal to the MSD.

In the practice of the present invention, the smallest single solid vertical feature is still equivalent to the MSD. However, vertical features of the object are no longer necessarily reproduced in steps that are integral multiples of a layer thickness that is greater than or equal to the MSD. Hence, vertical features can be formed from smaller steps (layer thicknesses) than the MSD as long as the feature's minimum thickness is greater than the MSD.

The typical practice of stereolithography involves the transformation (curing), to a depth substantially equal to or greater than the layer thickness, of all areas of each cross-section prior to coating the partially formed object with a layer of untransformed or unsolidified material in preparation for formation of a next layer of the object. This typical practice may or may not involve the utilization of somewhat different depths of cure, wherein the depth of cure depends on whether the area being cured is used for adhesion to the previously formed layer or is being cured as a down-facing feature of the object. In the practice of the present invention deviations are made from the typical approach, wherein these deviations involve leaving untransformed material on at least one portion of one cross-section, at least until after that cross-section has been coated over with untransformed material in preparation for formation of an additional layer of the object, and wherein the portion(s) will be solidified by transformation of material after the formation of the coating.

Layer to layer comparisons are made to determine the depth to which the material can be solidified to insure adequate adhesion to previously formed layers, and to insure adequate strength (modulus of solidifiable material) while simultaneously insuring that material is not solidified to a depth that causes penetration into a region that should remain unsolidified. Solidification depth is achieved by appropriate specification and control of exposure of the surface of the material to synergistic stimulation.

These comparisons form the basis of selective curing which enable individual portions of each cross-section to be transformed in association with the most appropriate layer and vertical level during object formation. By the selective curing aspect of the invention, a balance is maintained between necessary structural integrity, desired resolution, and the resulting accuracy.

When using photopolymer material, the minimum solidification depth (MSD) is related to the wavelength of radiation used. The MSD is directly related to the penetration depth of the material. Use of various penetration depths in the stereolithography process is described in U.S. patent application Ser. No. 429,911. The methods of this referenced application can be combined with the teachings of the present invention.

Many objects that cannot be built accurately with standard stereolithography while using one of these materials of relatively high MSD, can be built accurately with the techniques of this invention. However, even with the techniques of the present invention some objects i.e., those having solid vertical features thinner than the MSD may suffer from accuracy problems. However, these can be handled in various ways as described herein.

The present method leads to more accurate creation of objects than is possible by use of typical stereolithographic techniques for a given building material with a given MSD and it also provides a more rigid "green" part or object. Reduction in distortion may also be achieved due to increased green strength along with staggered solidification of the material. Not all material to be solidified in a given area of a cross-section is necessarily solidified on that cross-section. It may be solidified through and simultaneously with a higher cross-section or layer, i.e., with the solidifying radiation penetrating downward through higher layers into the appropriate region.

The present method may also be implemented solely as a distortion reduction technique.

Another feature of the present invention is the use of cross-sectional slices thinner than the MSD. These thin cross-sections in combination with the present solidifying or curing techniques will yield higher resolution parts than those obtainable using cross-sectional slices equal to the MSD. The minimum feature thickness will still be the MSD. Any errors due to this minimum feature thickness will present a problem in only a small percentage of the objects that can be built using stereolithography.

The invention also contemplates a method for making the surface of an object built with a particular layer thickness (for the bulk of the object) appear as if it were constructed from finer layers. In addition, the instant method relates to not only making the surface appear more continuous (i.e., finer layers) but also building the bulk of the object with thick layers at the same time while maintaining the overall accuracy associated with finer layers. This method is based on creating cross-sections of vertical spacing equal to the desired resolution and comparing these cross-sections two or more at a time. This may be used to determine which portions of a cross-section require building at fine layer increments and cure depths (e.g. 5 mils); which portions can be built using greater cure depths; and which portions can be skipped altogether for building at even coarser layer increments (e.g. 10, 15, or 20 mils). These methods assume a material that has the capability of being solidified to unsupported thicknesses at least as thin as the fine layer increments (e.g. 5 mils). Several embodiments to these novel methods are described herein.

Typically, in stereolithography, objects are built on webs or supporting structures. With the present method, the selection and placement of support structures should be carefully considered. Because of the possibility of staggering the formation of various regions of an initial cross-section to different layers, support placement is critical. Supports should be designed and placed to catch the regions that will be locally cured in association with the lowest layers.

BRIEF DESCRIPTION OF THE DRAWINGS

FIGS. 7-1 through 7-28 show horizontal views of layers 1-28 used to build the object of FIG. 2.

FIGS. 8-1 through 8-28 show horizontal views of layers 1-28 used to build the object of FIG. 5. Phantom lines in the Figures indicate region(s) at which no curing occurs on the layer of the region(s). Shaded lines indicate curing.

FIGS. 9-1 through 9-28 show horizontal views of layers 1-28 used to build the object of FIG. 6.

FIG. 10 is a side view of a second object that can be built using stereolithography.

FIG. 11 is a side view of the object of FIG. 10 showing the slices and reproduction of the object by stereolithography using a high resolution material (MSD < = - Layer thickness).

FIG. 12 is a side view of the object of FIG. 10 but now showing the portions that can be built (and the slice planes) with high resolution while using a material that has an MSD 4 times greater than the layer thickness. Also shown are the corner tip portions that require special handling.

FIGS. 14-1 through 14-21 are schematic illustrations of cross-sectional information (compressed along the Y axis) obtained by the application of "Slice Style 1" to the object depicted in FIG. 10 to produce the object of FIG. 11.

FIG. 15 is a perspective view of a more complex three dimensional object, which is intended to illustrate the detailed computational advantages of the first preferred embodiment as opposed to illustrating the usefulness of the present invention for forming high-resolution objects.

FIG. 16 is a perspective view of the object shown in FIG. 15 as built with standard stereolithographic techniques and with 10 mil layers and a material with an MSD equal to or less than 10 mils.

FIGS. 17-1 through 17-16 show cross-sectional information (compressed along the X-axis) obtained by the application of "Slice Style 1" to the object depicted in FIG. 15 to produce the object of FIG. 16.

FIG. 18 is a perspective view of the object shown in FIG. 15 as created utilizing the first preferred embodiment.

FIGS. 19-1L through 19-240R show detailed cross-sectional information obtained from the application of the first preferred embodiment to create object shown in FIG. 18.

DETAILED DESCRIPTION OF THE PREFERRED EMBODIMENTS

A. THE SIMPLE CASE

Figure 1:
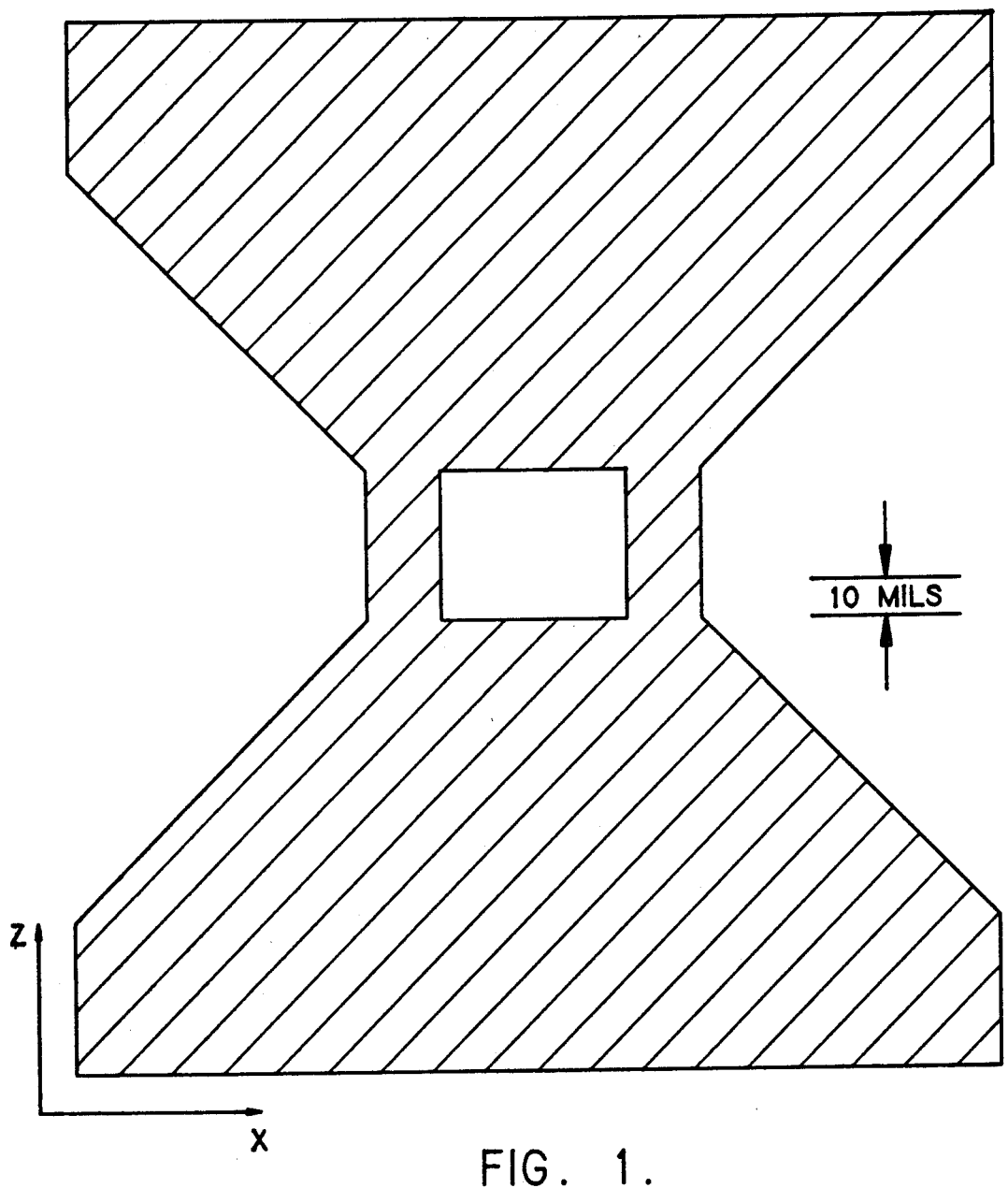
FIG. 1 is a schematic side view of an object or part that can be built using stereolithography.

Data corresponding to an object to be built is sliced with a layer thickness less than or corresponding to the desired vertical resolution. Preferably, but not necessarily, the MSD is an integral multiple of this layer thickness.

In the normal practice of stereolithography the next step would be to build the object based on the created slices with each layer or slice being cured to a depth corresponding to the layer thickness. However, the next step in the implementation of the present invention is based on the fact that we cannot cure thicknesses of material as thin as the slices (at least unsupported thicknesses). Groups of these slices are compared to determine on which layers various portions of each cross-section will be built. For this comparison the slices are grouped consecutively with each group containing a sufficient number of slices to form a thickness equivalent to the MSD. If the MSD is 40 mils and the layer thickness is 10 mils, each group will contain 4 cross-sections. In the first preferred embodiment of the invention, group 1 contains cross-sections 1, 2, 3, and 4, group 2 contains cross-sections 2, 3, 4, and 5, and group "N" contains cross-sections N, N+1, N+2, N+3.

Turning to the drawings, FIG. 1 shows a side view of an hourglass shaped object that can be built using stereolithography. For simplicity, FIG. 1 shows only one horizontal dimension "X" along with the vertical dimension "Z". The other horizontal dimension extends into the page 1 inch. In total, this drawing represents a rectangular hourglass.

Figure 2:
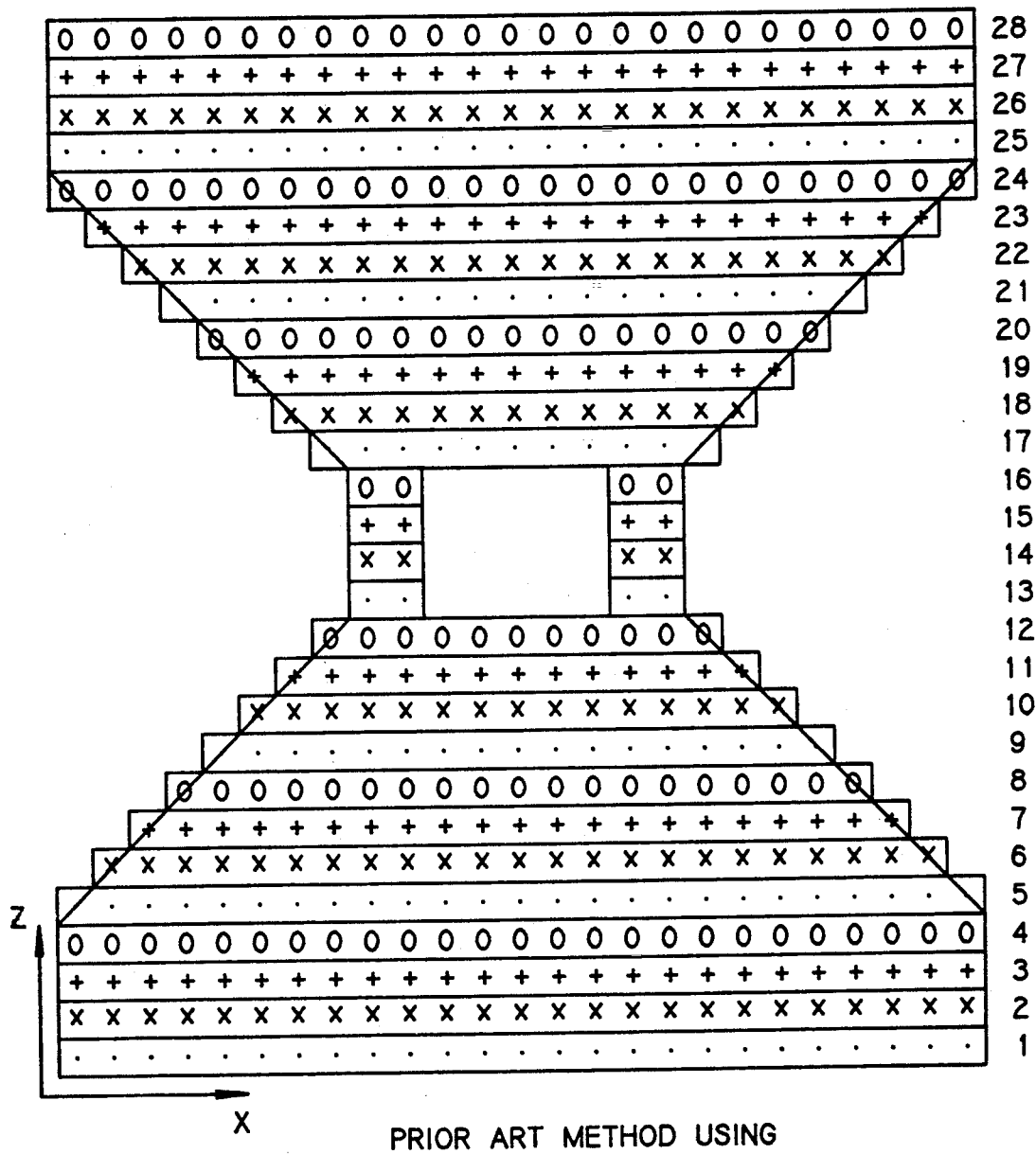
FIG. 2 is a side view of the object of FIG. 1 sliced using 10 mil cross-sections and constructed using a material that can form 10 mil thicknesses.

FIG. 2 is a side view of the hourglass or object of FIG. 1 but this view shows the object as reproduced by stereolithography using 10 mil thick layers or cross-sections and a material whose MSD is less than or equal to 10 mils. The layers are designated by one of 4 symbols ".", "x", "+", or "o". The use of these symbols is only to emphasize the distinction between layers. The numbers to the right side of FIG. 2 designate the various layers. There are 28 layers derived from 28 cross-sections of data which are derived from 29 slicing planes. This method of obtaining cross-sectional data is described in the previously referenced 331,644 U.S. patent application.

Figure 3:
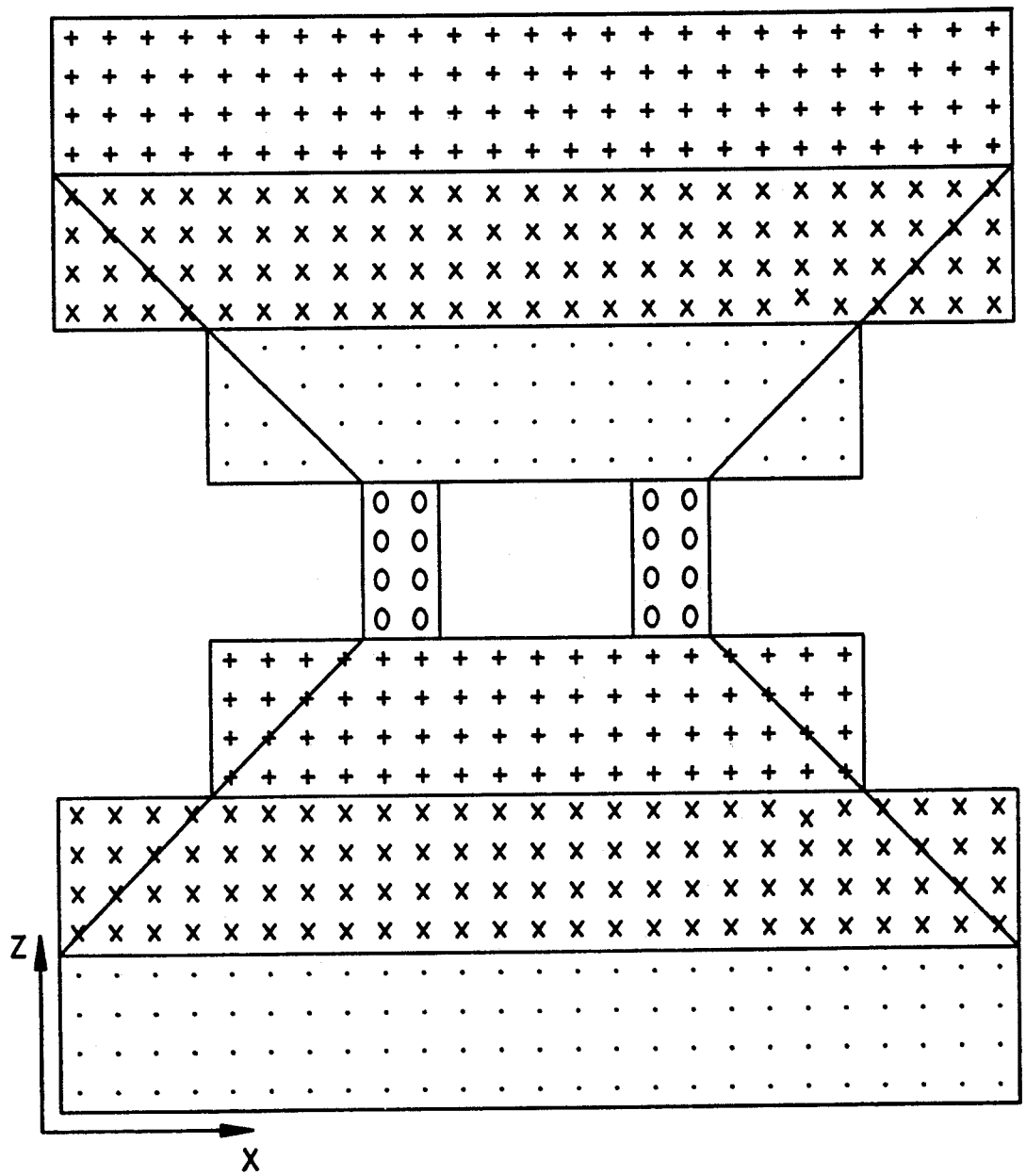
FIG. 3 is a side view of the object of FIG. 1 but this time sliced using 40 mil (1 mm) cross-sections along with a material cured to a 40 mil depth.

FIG. 3 is similar to FIG. 2 except that instead of 10 mil separation between cross-sections (i.e., 10 mil layer thickness) there is a 40 mil separation. When using a material with an MSD of 40 mils, in the prior art one would have to use 40 mil cross-sections or greater. Therefore this figure represents the best resolution possible with such a material using prior art techniques.

Figure 4:
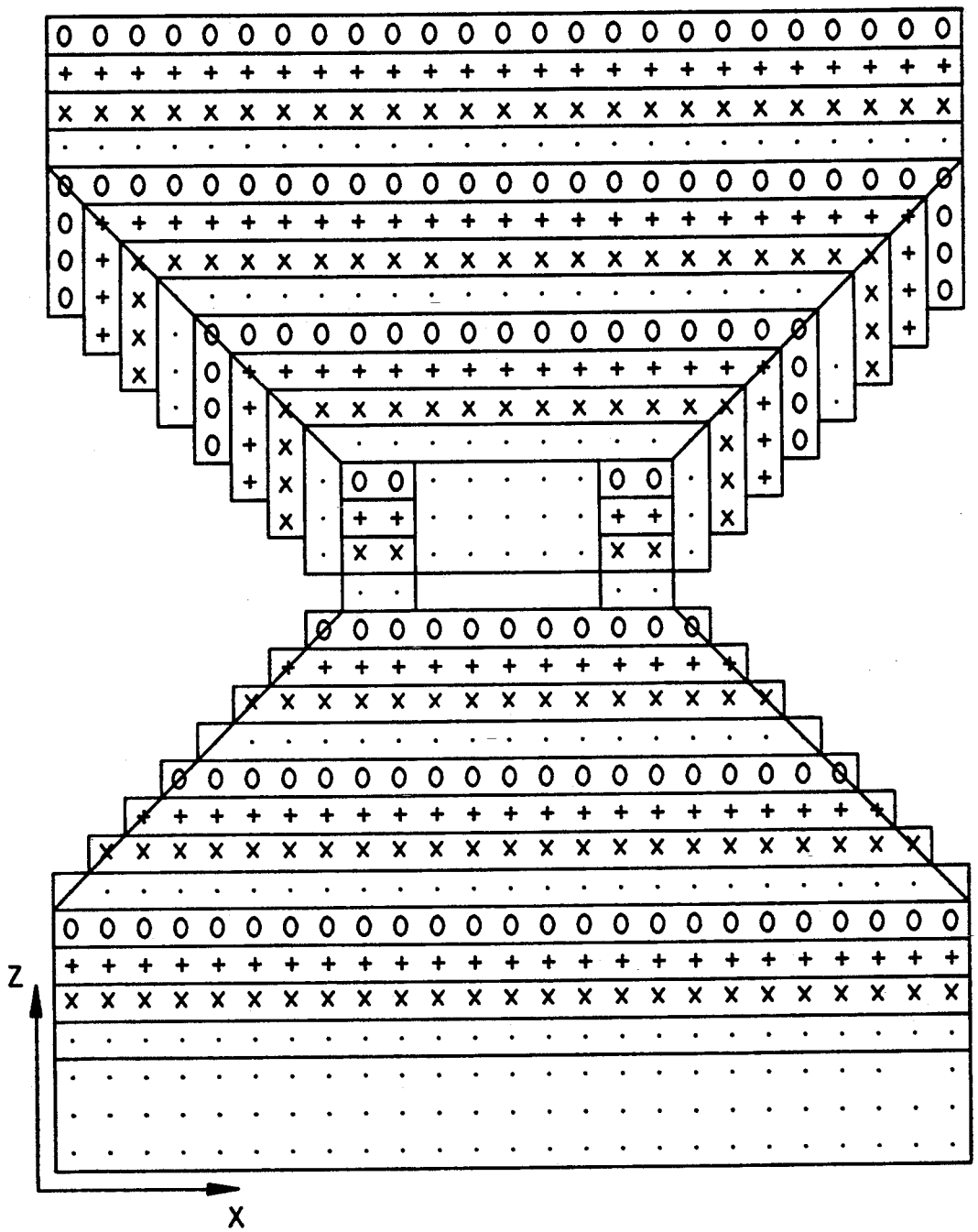
FIG. 4 is a side view of the object of FIG. 1 sliced using 10 mil cross-sections but constructed using a material that cannot form unsupported layers less than 40 mils in thickness (i.e., a 40 mil MSD material) using a typical stereolithography approach.

FIG. 4 represents an example of an alternative typical stereolithographic technique intended for achieving high resolution accuracy from a lower resolution material. FIG. 4 shows cross-sections along with a material having a 40 mil MSD. In the hope of obtaining better resolution using a 40 mil MSD material, one might try to slice the object using finer cross-sections but still solidifying it to a 40 mil cure depth. The result of doing this is shown in the FIG. 4 which illustrates that the steps between layers have been made smaller but that the vertical location of features is grossly inaccurate.

Figure 5:
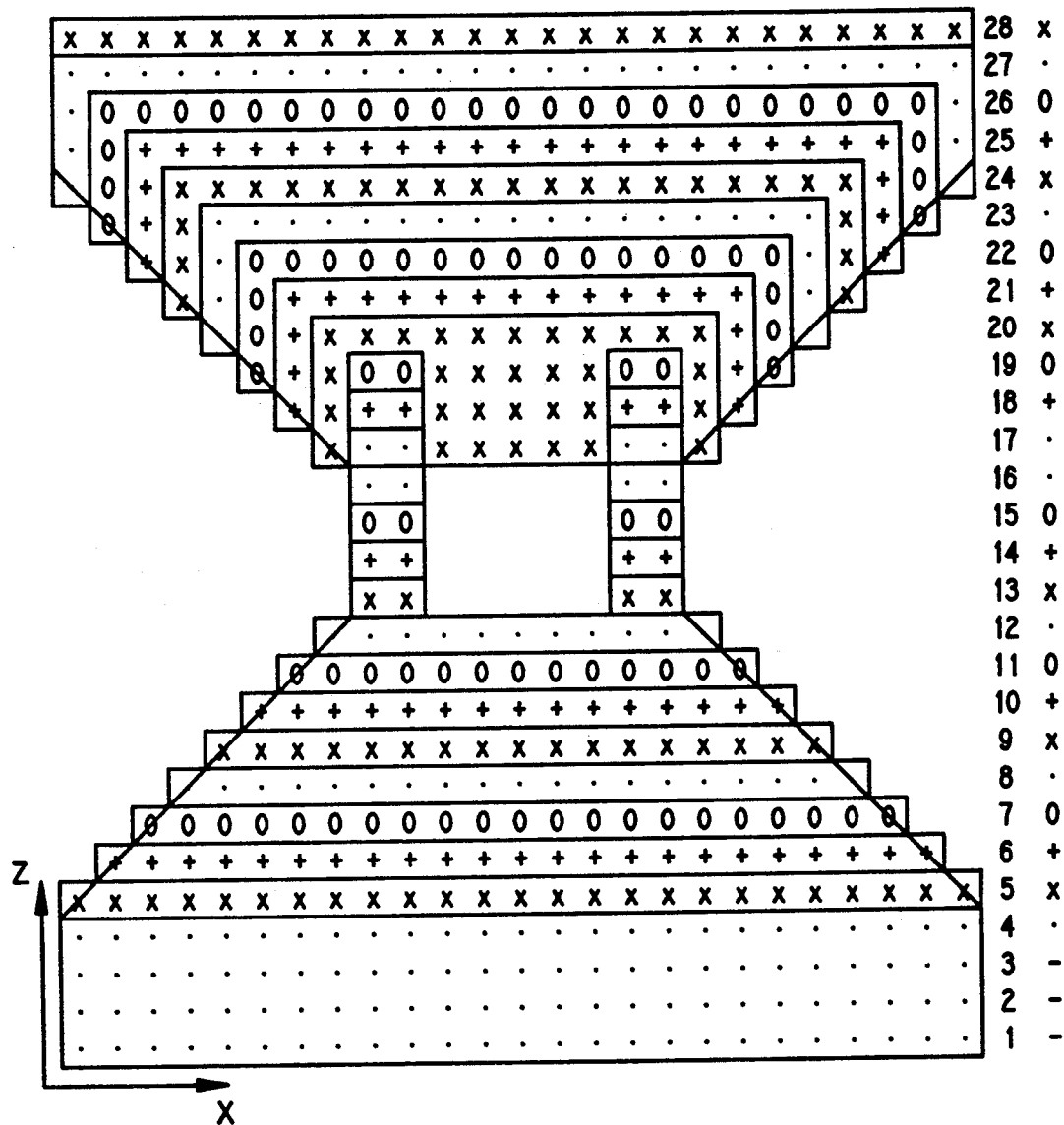
FIG. 5 is a side view of the object of FIG. 1 sliced using 10 mil cross-sections but constructed using a material that cannot form unsupported layers less than 40 mils (MSD) in thickness using a first embodiment of this invention.

FIG. 5 represents the object of FIG. 2 again but now built using the techniques of the present invention along with 10 mil layers or cross-sections and a material of 40 mil MSD. Comparing FIG. 5 to FIG. 2, we see that we have produced an object while using a low resolution stereolithographic material which has the same degree of accuracy as when a high resolution material was used. The layers are again numbered 1 to 28 and the dashes, "-", at the right side of layers 1 to 3 indicate that no material is cured directly in association with these layers.

This result of obtaining the same degree of accuracy is not possible in the prior art. It should be noted that all objects cannot be built with this same degree of accuracy while using low resolution (LR) materials. The key to being able to obtain the same or better resolution than what is obtainable with high resolution (HR) materials using typical stereolithography is that the object cannot have vertical features that are thinner than the MSD of the lower resolution material. These features are "too thin". If an object has such vertical features then there will be a corresponding loss of reproduction accuracy. However, this loss of reproduction accuracy occurs only in the regions of these "too thin" features. Additionally, careful planning can reduce the adverse affect that these deviations have on the part. Techniques for handling such cases are described hereinafter. Included in these techniques are careful selection of the slice axis; building along more than one axis as disclosed in U.S. Pat. No. 4,575,330; and post processing by sanding or filling as may be generally required using standard stereolithography anyway.

Figures 1, 7:
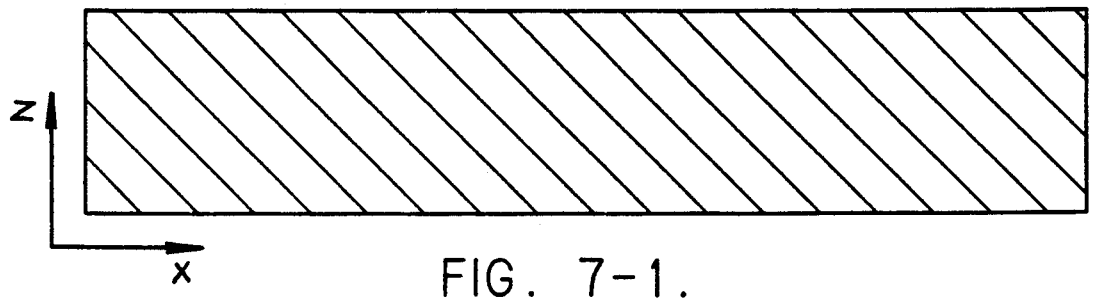
Figures 2, 7:
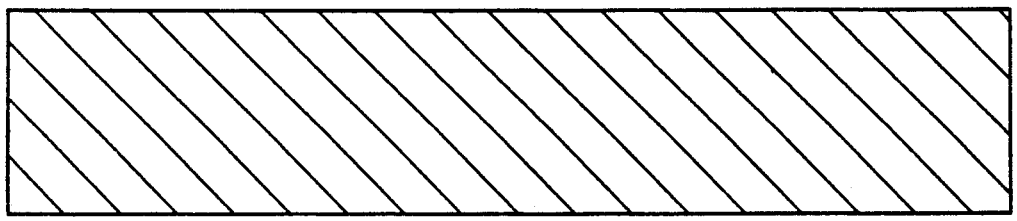
Figures 3, 7:
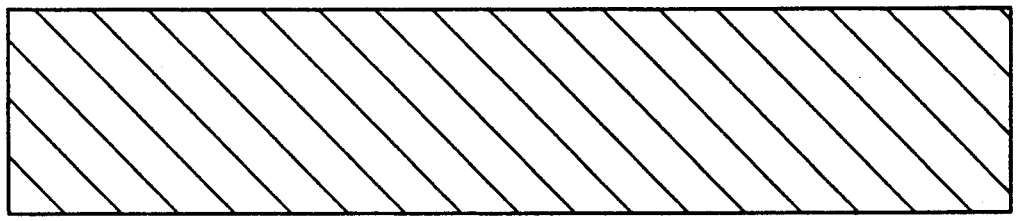
Figures 4, 7:
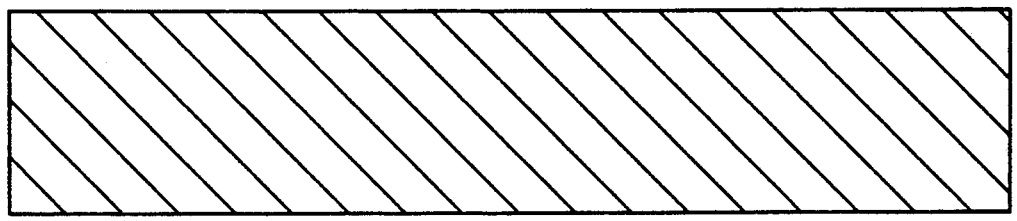
Figures 5, 7:
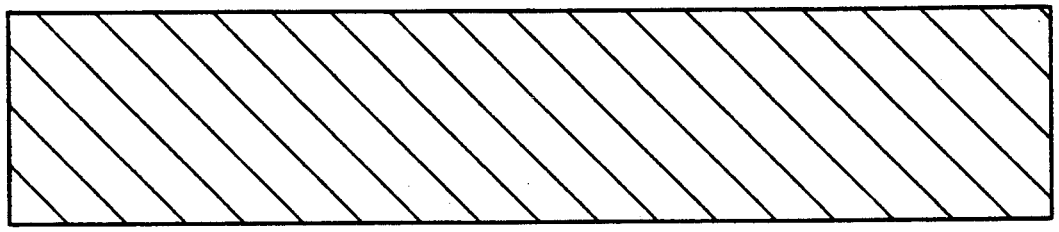
Figures 6, 7:
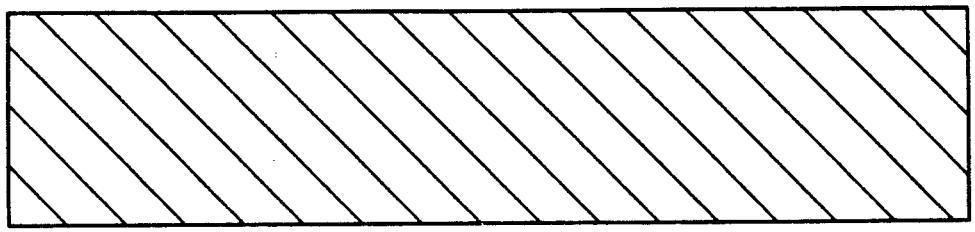
Figure 7:
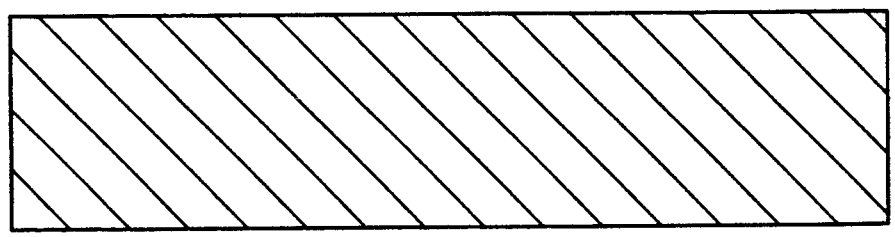
Figures 7, 8:
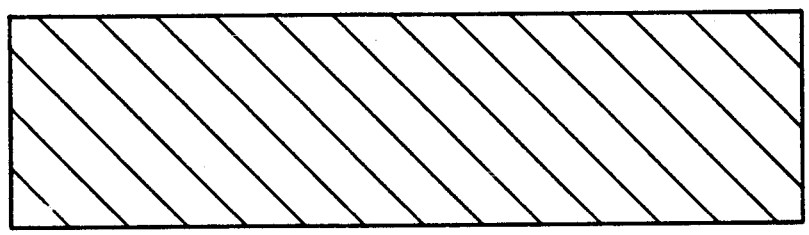

To illustrate the conceptual details of accomplishing the reproduction depicted in FIG. 5, it is useful to compare the material cured in association with each layer in producing the objects shown in FIGS. 2 and 5. FIGS. 7 and 8 show these cross-sections and corresponding areas of cure for each of the 28 possible layers. Specifically, FIG. 7 shows the curing regions for each layer of the object of FIG. 2, and FIG. 8 shows the curing regions for each layer of the object of FIG. 5. In the following we refer to curing layer thickness depths of material. In actuality, we may cure somewhat more than this thickness where appropriate to get good adhesion between layers to enable formation of a cohesive three-dimensional object. As with standard stereolithography up-facing and down-facing features when cured must be skinned to prevent leakage if the objects are being built with crosshatch (as described in U.S. patent application Ser. No. 07/331,644).

Keeping in mind the less than or equal to 10 mil MSD for FIG. 2, and the 40 mil MSD of FIG. 5, from FIG. 7 we see for cross-section 1 that a 10 mil layer of material is cured which forms the first layer of the object shown in FIG. 2. However from FIG. 8 we see that no material is cured in association with the first cross-section of the object of FIG. 5 since the minimum cure would have caused the formation of a layer that would have been 30 mils overcured. The second and third cross-sections shown in FIGS. 7 and 8 depict similar situations.

The reverse slashes or cross hatch, "\", in FIG. 7 represent regions which are cured to approximately 1 layer thickness in association with a given layer (plus any necessary overcure). In FIG. 8, on the other hand, the forward slashes or cross hatch, "/", represent regions that are cured to a depth approximately equal to the MSD while the reverse slashes, "\", represent regions which aren't necessarily cured to a depth approximately equal to the MSD.

The fourth cross-section begins to reveal a key aspect of the instant invention. In FIG. 7 the fourth cross-section shows the same cure as does the previous 3 layers. The fourth cross-section of FIG. 8 depicts the curing of material to form the first layer of the object depicted in FIG. 5. The material cured in association with this cross-section penetrates down through the previous 3 layers to form a 40 mil thickness of material. This is identical to what we have formed up to this point for the object of FIG. 2. In essence the first 4 cross-sections of FIG. 8 were compared and a decision was made as to the inappropriateness of curing a 40 mil thickness of material in association with the first 3 cross-sections. A corresponding decision was made regarding the appropriateness of curing material in association with the fourth cross-section. We note that any time a region is first cured (therefore not supported by previously cured material) it must be skinned if the object is built with open spaced crosshatch, or else the down-facing features will leak and drain. Additionally, we note that when building a part utilizing the present invention we need only recoat in association with those layers with which curing will be associated.

The fifth cross-section of FIG. 7 cures down an additional 10 mils completing the No. 5 layer of the object of FIG. 2. The fifth cross-section of FIG. 8 is also cured but the question arises as to the depth of cure. The amount of untransformed material between the last cured cross-section (layer) and the material surface is 10 mils. This entire 10 mil gap (according to this embodiment) is to be filled in by solidifying the intervening material in association with the fifth cross-section. The MSD for the building material is 40 mils and represents the minimum unsupported solidifiable depth. However, when a region is completely supported, the "supported minimum solidification depth" (SMSD) is generally less than the MSD for a particular material. This minimum could conceivably drop from 40 to 10 mils or less. Therefore, the cure depth for this fifth cross-section can be anything greater than the greater of the SMSD or the 10 mil cross-section thickness (plus an overcure amount). The maximum cure depth associated with this fifth cross-section is a depth that does not cause the bottom surface of the junction between solidified material and unsolidified material to grow down and thereby cause a significant change in accuracy of the lower surface or down-facing feature of the object.

Generally there is an associated change in beam cure width with a change in cure depth. One approach to handling this change in beam cure width is to allow a different beam width compensation factor for boundary types that are cured to different depths, as discussed in U.S. patent application Ser. No. 07/331,644 and further discussed in concurrently filed U.S. patent application Ser. No. 07/606,191.

For the sixth through thirteenth cross-sections, each successive cross-section is smaller than and sits completely on or over the previous cross-section. The up-facing regions of each of these cross-sections can be cured in a different way from the non-up-facing regions if desired (e.g. up-facing regions skinned while non-up-facing regions only hatched). The explanation applied to the fifth cross-section above therefore also applies to these cross-sections.

The fourteenth through sixteenth cross-sections similarly completely overlap the preceding cross-sections so that no further explanation of these sections is necessary.

Cross-section 17 partially overlaps 16 but there are some regions which form down-facing features. FIG. 7 shows that the entire cross-section is properly cured to a 10 mil depth. The down-facing regions of the cross-section of FIG. 7 may be given different cure parameters than the non-down-facing regions, e.g. down-facing regions skinned and cured to a depth of 10 mils, non-down-facing regions only crosshatched and cured to a depth of 10 mils plus an overcure amount for adhesion.

FIG. 8 shows that only a portion of the layer is cured with the remaining portions uncured due to the inability to cure depths thinner than 40 mils. Hatched areas of FIG. 8 represent cured portions. Phantom lines designate uncured portions of the layer.

Cross-section 18 has ends which are unsupported by the previous cross-section. FIG. 7 shows the whole cross-section being cured to a depth of 10 mils. Referring to FIG. 8, cross-section 18 has a first region that is supported by what was previously cured in association with cross-section 17, a second region that overlaps the portion of 17 that was not cured, as well as a third set of regions that do not overlap any part of cross-section 17. As FIG. 8 shows, only the supported regions are cured in association with this layer or cross-section.

The regions that overlap the portion of 17 that was not previously cured are now 20 mils thick. If we cure these regions at this time, in association with this layer, we would overcure them by 20 mils. Therefore, we do not cure these regions in association with this layer. The regions that do not overlap any portion of 17 should only have a 10 mil cure depth associated with them. We therefore also do not cure them with this cross-section.

Cross-section 19 again has ends which are unsupported by the previous cross-section. FIG. 7 shows the whole cross-section being cured to a depth of 10 mils. Referring to FIG. 8, cross-section 19 has regions that are supported by material that was cured in association with cross-section 18, another set of regions that overlap the portion of 18 that was not cured (actually these regions consist of two parts: one that overlaps uncured areas on both 17 and 18, and the other which only overlaps regions that were not cured in association with cross-section 18), as well as a third set of regions that do not overlap 18 at all.

As FIG. 8 shows, only the supported regions are cured in association with cross-section 19. The region that overlaps the portion of 18 that was not previously cured is now 20 or 30 mils thick depending on whether they also overlap uncured material associated with cross-section 17. If we cure these regions at this time we would overcure them by 10 or 20 mils. Therefore, we do not cure these regions in association with this cross-section. If we cured the regions that do not overlap 18 at all then these regions would be overcured by 30 mils. Therefore, again, we do not cure these regions in association with this cross-section.

Cross-section 20 has ends which are unsupported by the previous cross-section. Again as expected, FIG. 7 shows the whole cross-section being cured to a depth of 10 mils. However, FIG. 8 shows something different about the curing of cross-section 20 as opposed to the curing of the previous 2 cross-sections. Cross-section 20 can be divided into 5 distinct sections:

1) the portion of the cross-section that does not overlap the previous cross-section (required thickness of cure=10 mils), 2) the portion of the cross-section that only overlaps the previous cross-section (required thickness of cure=20 mils), 3) the portion of the cross section that overlaps the previous 2 cross-sections (required thickness of cure=30 mils), 4) the portion of the cross-section that overlaps the previous 3 cross-sections (required thickness of cure=40 mils), and 5) the portion of the cross-section that overlaps material cured on the previous layer, i.e., the portion that overlaps the previous 4 or more cross-sections.

From this dissection of the cross-section, it can be seen that we can cure the fourth set of regions to a depth of 40 mils. This will cause the lower surface of solidified material to properly extend downward to the bottom of cross-section 17. As on previous cross-sections, we can also cure the fifth region any appropriate amount since it is supported. It should be noted that in the actual curing process we would generally cure region 5 before region 4 and that region 4 must be skinned if the object is being built with open faced crosshatch. This is generally done when using a liquid medium to advantageously cure regions that are supported by previously cured material, before curing regions that are not supported by previously cured material. This is an advantageous method of curing because it allows each cured region to adhere to previously cured material whether through horizontal or vertical adhesion.

Cross-sections 21 through 24 are very much like cross-section 20 in that each of these cross-sections contain regions requiring 10, 20, 30, and 40 mil cures, along with deeper overlapping regions requiring any appropriate cure depth. Only the regions requiring the 40 mil cure and the supported regions are cured in association with each one of these layers. As expected, each of the cross-sections associated with FIG. 7 are cured in turn to a thickness of 10 mils plus any necessary overcure. Again, with regard to FIG. 8, regions requiring a 40 mil cure also require skinning if building with crosshatch.

Cross-sections 25 through 27 are again similar to cross-sections 21 through 24 in that they possess regions that can be cured to the proper depth (40 mils), regions that are supported, and regions that cannot be cured (without unacceptable introduction of error) due to the MSD. Again, the cross-sections of FIG. 7 are cured to a 10 mil depth. As usual for FIG. 8, regions of 40 mil depth must be skinned if building with crosshatch. Supported regions can be cured in any appropriate manner. The regions requiring less than a 40 mil cure are not cured in association with this cross-section but instead are cured in association with higher layers or cross-sections when the necessary MSD cure depth can be utilized without the introduction of errors.

Finally, cross-section 28 fully overlaps cross-sections 27, 26, and 25 and is therefore given an appropriate cure to form a cohesive cross-section of solidified material.

The foregoing comparison thus far has demonstrated the typical approach to stereolithography versus a particular embodiment for curing material using the present invention. This comparison, i.e. comparing FIGS. 2 and 5, shows that the present method, even using a low resolution material, can generally closely match the high reproduction accuracy previously obtainable only by using a high resolution material.

Figure 6:
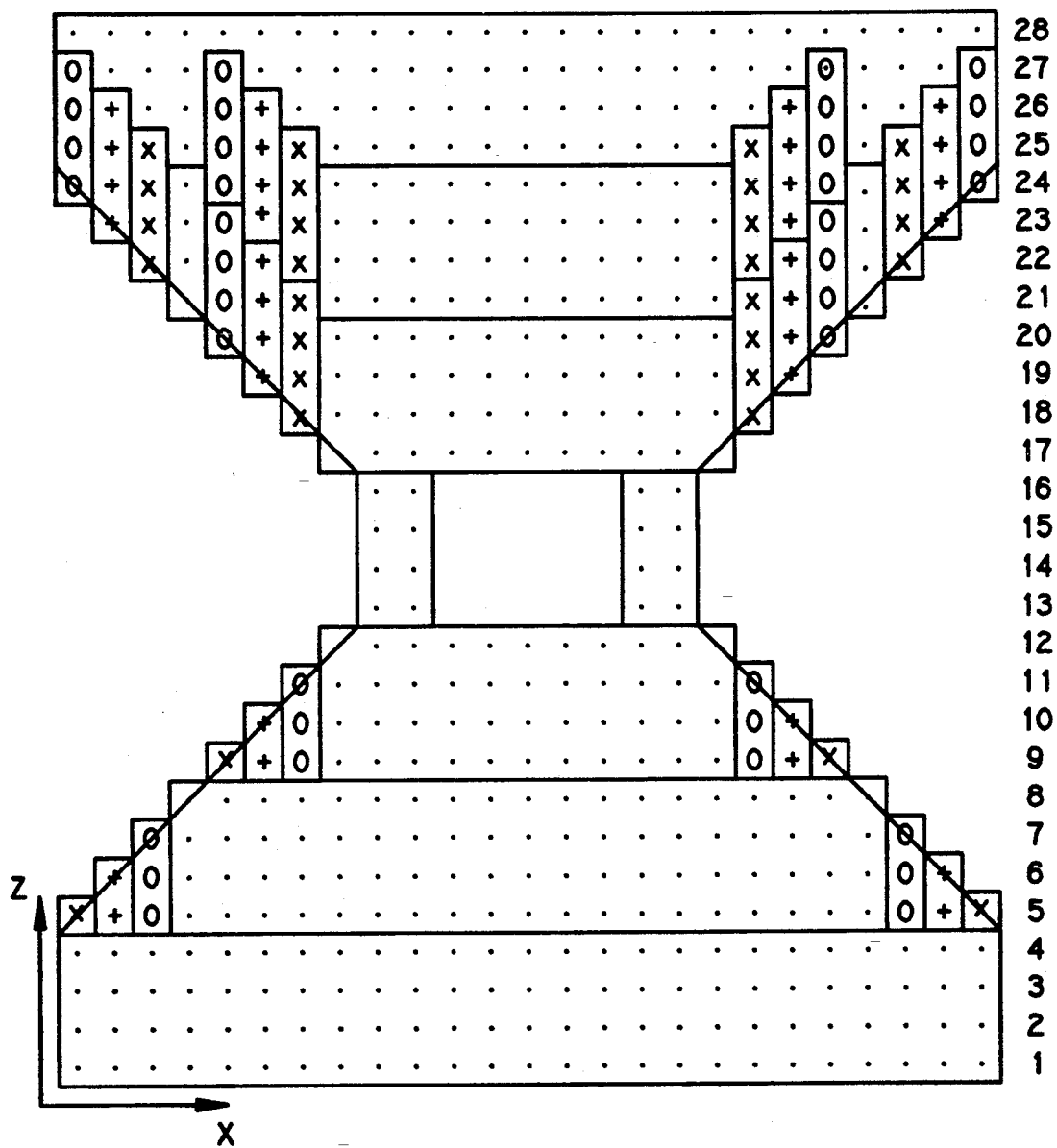
FIG. 6 is a side view of the object of FIG. 1 sliced using 10 mil cross-sections but constructed using a material that cannot form unsupported layers less than 40 mils in thickness using a second embodiment of the invention.
Figures 7, 8, 9:
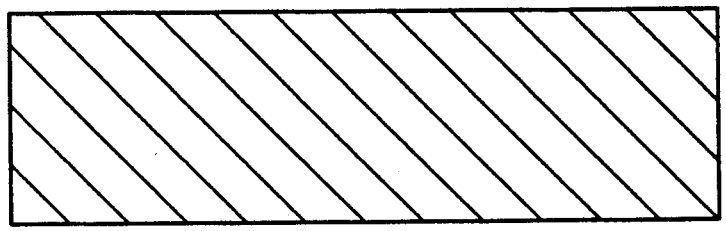

FIGS. 6 and 9 illustrate other embodiments. Comparing FIGS. 5 and 6 illustrates that different cure patterns are used to cure material in association with each cross-section. FIG. 9 depicts the various cross-sections of the object of FIG. 6 and what will be cured in association with each layer. FIG. 9 can be compared to FIG. 8 (which illustrates the cross-sections of the object of FIG. 5) to reveal the differences between these two embodiments. The forward and reverse slashes in FIG. 9 have the same meaning as they do for FIG. 8.

The Complex Case

Embodiments of the present invention embody a combination of two criteria. The first of these is based on the method of curing that will be used to emphasize maximum strength or other "internal curing order" related approaches. By "internal curing order" we refer to a variety of options utilized in the curing of an object that do not affect the external dimensions of the object. Two examples of this first criteria are depicted in FIGS. 5 and 6.

The second criteria is based on the approach that will be followed to obtain a desired final object shape when the object has features smaller (i.e., thinner in the vertical dimension) than the MSD. Examples of this second criteria are shown in FIG. 13a through 13e. This second criteria involves the selection of one of a variety of alternatives for obtaining the most appropriate reproduction of external features when it is impossible to create them as accurately as desired because of the MSD of the material.

The simple case, studied above, had a particular characteristic that made it possible to use a low resolution material along with a high resolution layer thickness to obtain reproductions that are equivalent to those obtainable from the use of a high resolution material and layer thickness. This characteristic is that the object has no vertical solid feature thinner than the MSD. This allowed slicing and curing of features such that inaccuracies in building would not be greater than the chosen layer thickness. It should be noted that most regions of most objects fit into this category. Therefore, a viable embodiment based on objects having no vertical features thinner than the MSD can be developed.

When a particular object to be reproduced has solid vertical features thinner than the MSD, the object can be reoriented for building by redefining the vertical axis of the object, thereby hopefully removing the thinner than MSD features. If the object cannot be reoriented there will be a loss of accuracy in creating these thin features.

This loss of accuracy can be manifested in two ways:
1) Thin features (i.e., features thinner than the MSD designated herein as "<MSD" features) will be made too thick; or
2) Thin features will not be cured and therefore will be completely removed. For clarity and brevity in the following description, thin features are always assumed to be cured. However, in other embodiments user options can be made available so that volume selections can be made so individual <MSD features can be cured to the MSD or not cured at all. This will not solve accuracy related problems as a whole but can certainly be used to deemphasize them by bringing out the more important features, namely solid volumes or hollow volumes. Additionally, if only a few regions of a part or object are over cured or under cured due to MSD limitations, minor post processing can generally be done to sand off or fill regions as needed.

Figures 7, 8, 9, 10:
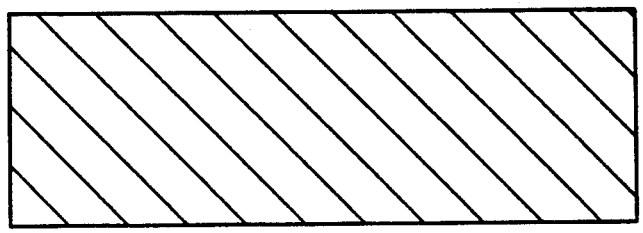

FIG. 10 depicts a side view of another object that can be reproduced using stereolithography. This object has features a, b, c, and d which form thin vertical features. In building the object using typical conventional stereolithographic techniques, on a layer by layer basis, these features will naturally be removed or be formed to a thickness greater than or equal to the minimum vertical resolution (layer thickness) that the part is being reproduced with. The series of numbers to the left of the object represent the slicing planes which intersect the object.

Figures 7, 8, 9, 10, 11:
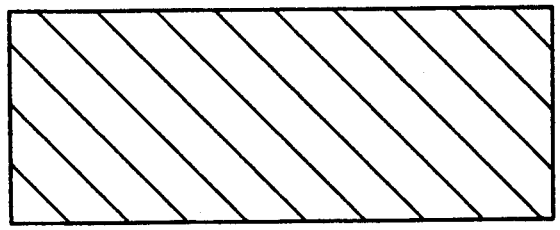

FIG. 11 depicts the prior art method of reproduction of the object of FIG. 10 using a high resolution layer thickness (e.g. 10 mils) and a high resolution material (MSD < = 10 mils).

The series of numbers closest to the object represent cross-section numbers corresponding to the slicing plane numbers of FIG. 10, while the series of numbers further to the right represent the layer numbers.

Figures 7, 8, 9, 10, 11, 12:
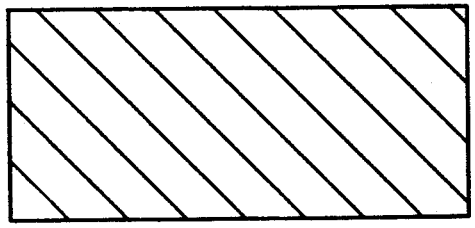
Figures 7, 8, 9, 10, 11, 12, 13:
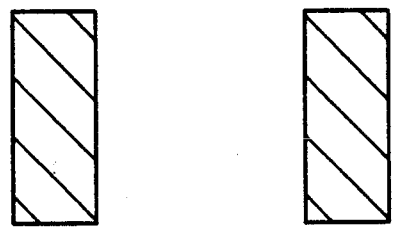
Figures 7, 8, 9, 10, 11, 12, 13, 14:
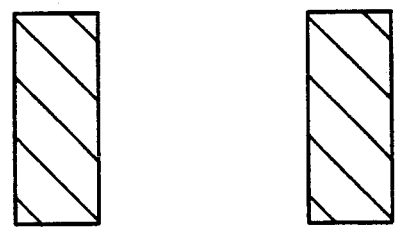

FIG. 14 represents the cross-sectional data obtained from and associated with each slicing plane by the application of slice style 1 to the object of FIG. 10 to produce the object of FIG. 11. It is noted that the FUB associated with slicing planes 9 and 21 are moved to planes 8 and 20, respectively, to produce the final FUB's associated with layers 8 and 20.

FIG. 12 depicts the same object as reproduced using the present invention in combination with a high resolution layer thickness and a low resolution material (MSD=4 times the layer thickness, e.g. 40 mils). This figure depicts an embodiment where the second criteria discussed above was chosen such that all object features thinner than the MSD were not formed. The series of numbers to the left of the object represent the slicing plane numbers.

Figure 13A:
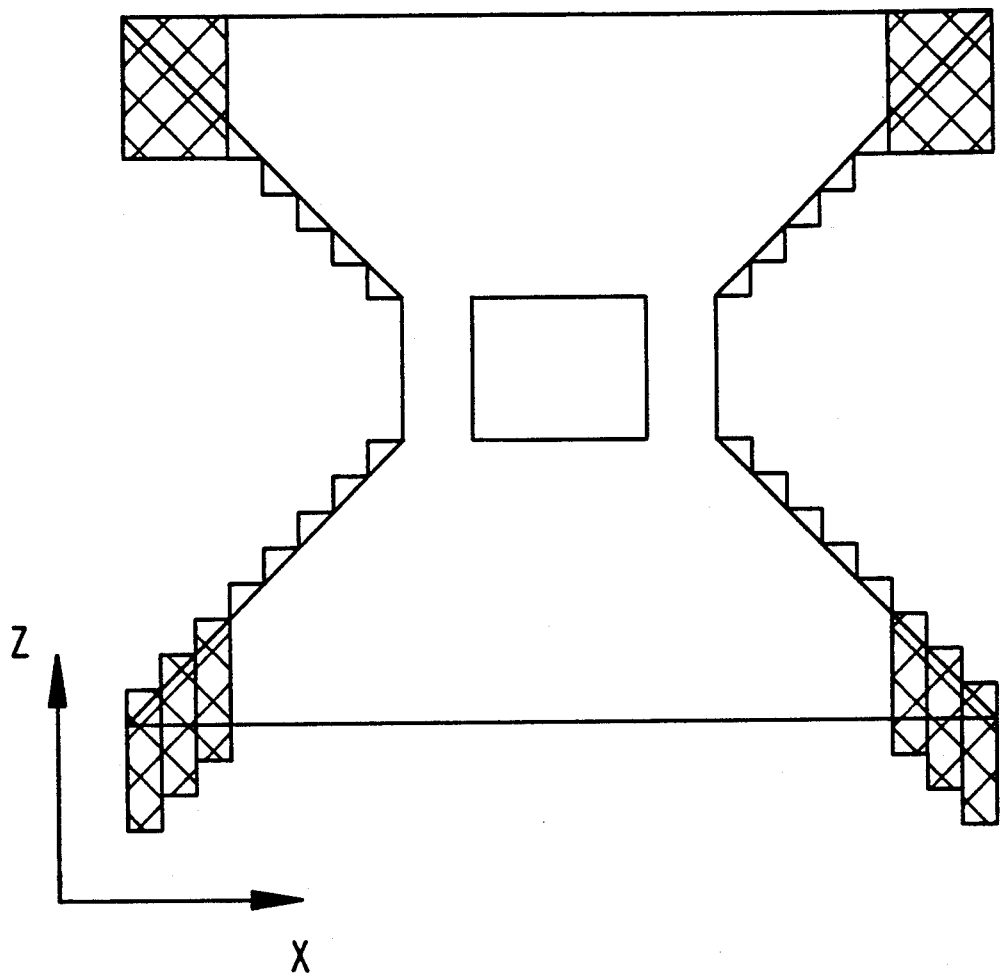
FIGS. 13a-e show the object of FIG. 10 emphasizing several of the various ways that the sections (corner portions) thinner than the MSD can be handled to minimize inaccuracies or to maximize aesthetic appeal.

FIG. 13 depicts examples of several other embodiments where the other selections of criteria 2 are made. FIG. 13a depicts the reproduction of the object where priority is given to up-facing features. In other words, if a region is thinner than the MSD (i.e. too thin), material in the region will be cured in such away as to place the up-facing features in the positions where they would occur if a higher resolution material were being used. Correspondingly, the down-facing features will necessarily be cured to a depth below the level on which they would be formed when building with a higher resolution material. This embodiment is referred to as "up-facing priority".

Figure 13B:
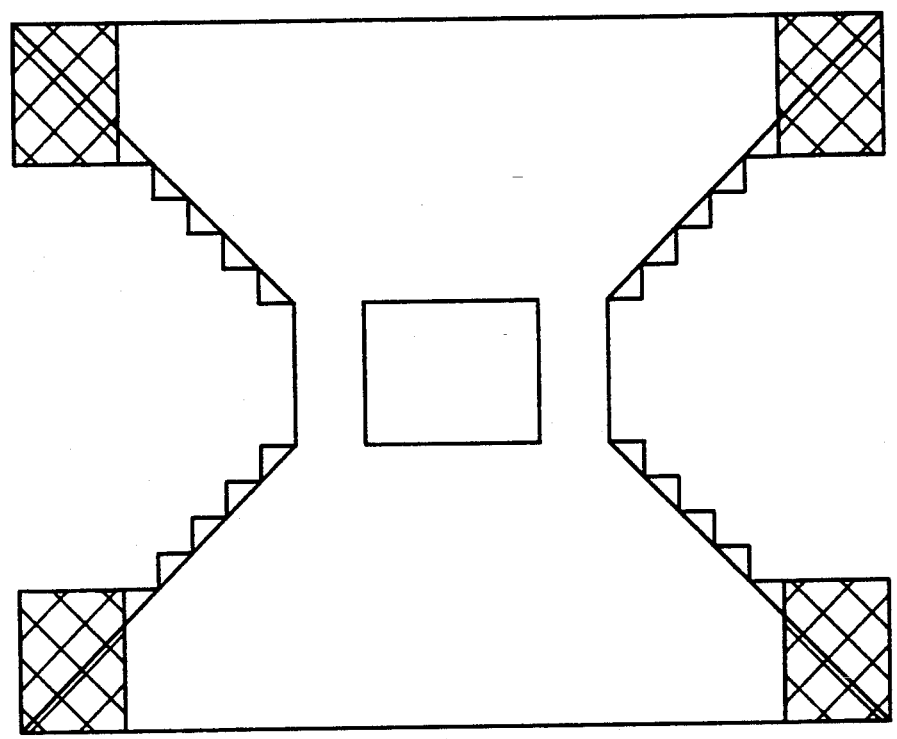

FIG. 13b depicts an embodiment where flat features are given priority thereby increasing aesethic appeal of the object in some circumstances. The down-facing flat features and up-facing flat features are cured so that they are formed at the same position they would be formed at if a higher resolution material were being used. If regions exist that are both up- and down-facing so that both up- and down-facing flat features cannot be simultaneously cured to the desired level, the placement of down-facing flat features will dominate. The non-flat, sloped, features are pushed up or down. Therefore, they are formed above or below the level they would be formed at if the object were built using a higher resolution material. If two non-flat features oppose each other in a region that is thinner than the MSD, the features can be shifted proportionally according to the slopes of their upper and lower surfaces. Alternatively, the upper or lower surface may be placed at the position it would be formed at if a higher resolution material were being used. FIG. 13b accordingly illustrates a "flat priority/down-facing dominate" embodiment.

Figure 13C:
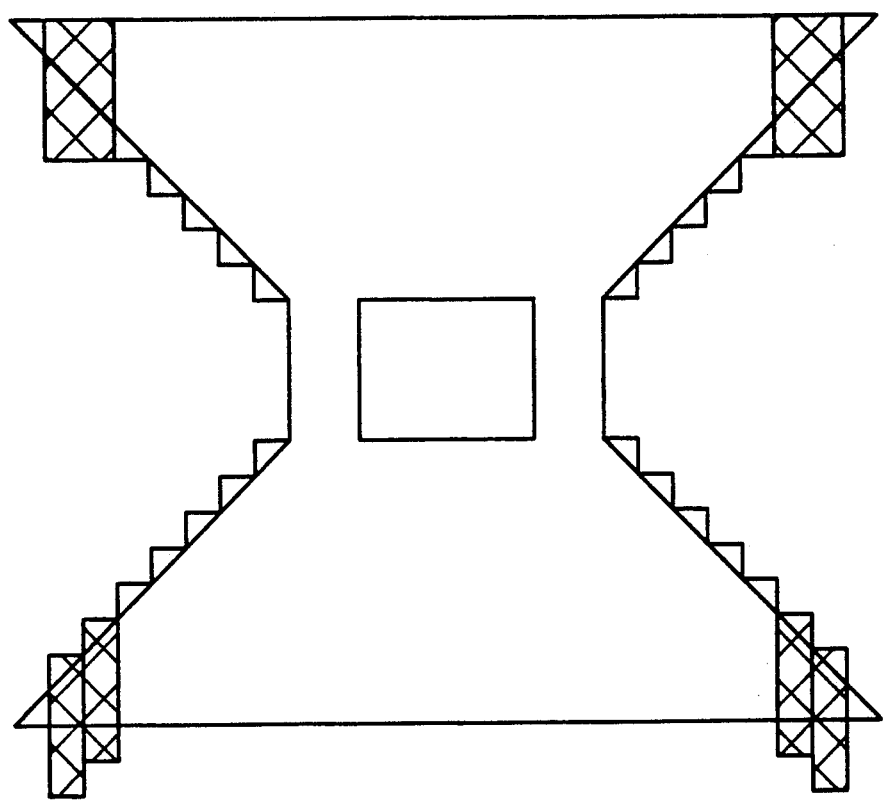

FIG. 13c depicts an embodiment where features thinner than $\frac{1}{2}$ of the MSD are not formed along with priority being given to up-facing features.

Figure 13D:
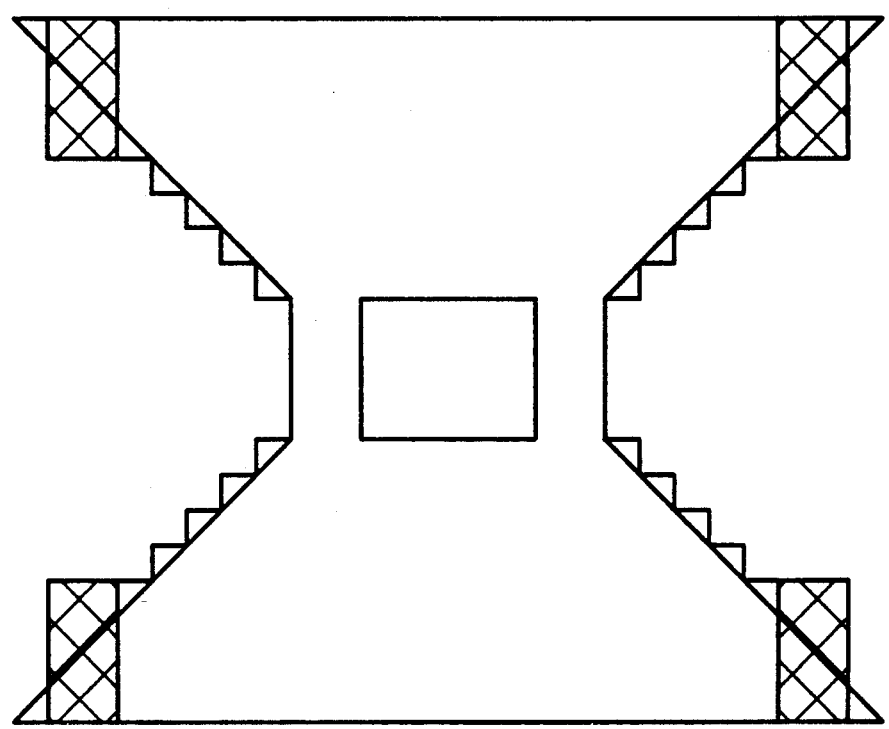

FIG. 13d depicts an embodiment where features thinner than $\frac{1}{2}$ of the MSD are not formed along with priority being given to flat features.

Of course, the "$\frac{1}{2}$" parameter in the embodiments of FIGS. 13c and d can be varied to any other fraction or percentage of the MSD.

Figure 13E:
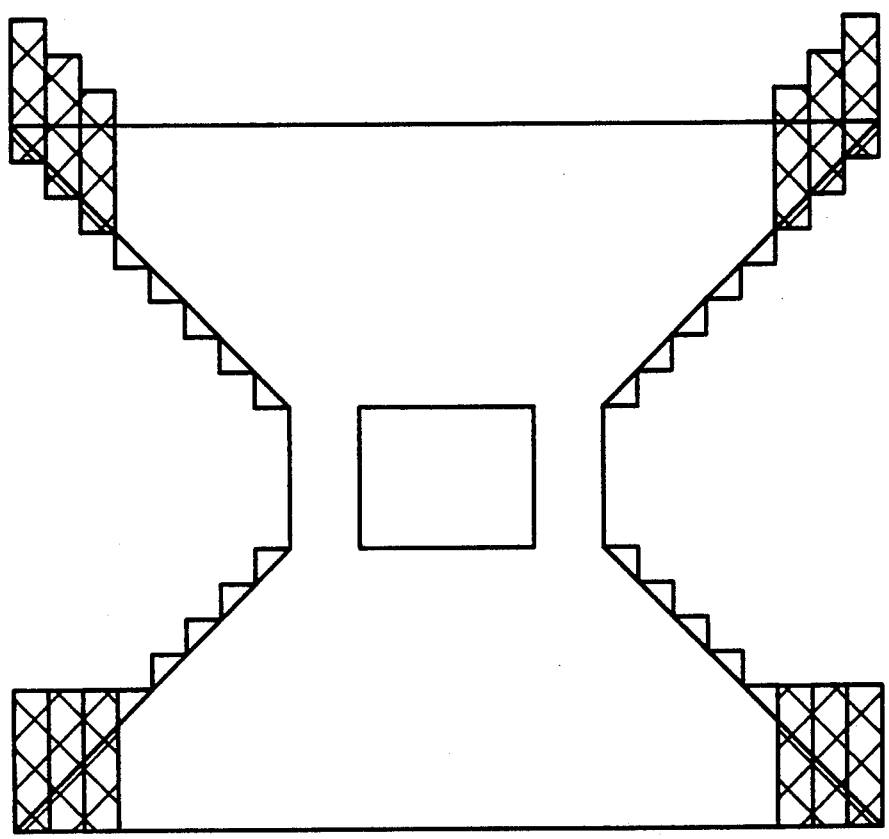
Figures 1, 14:
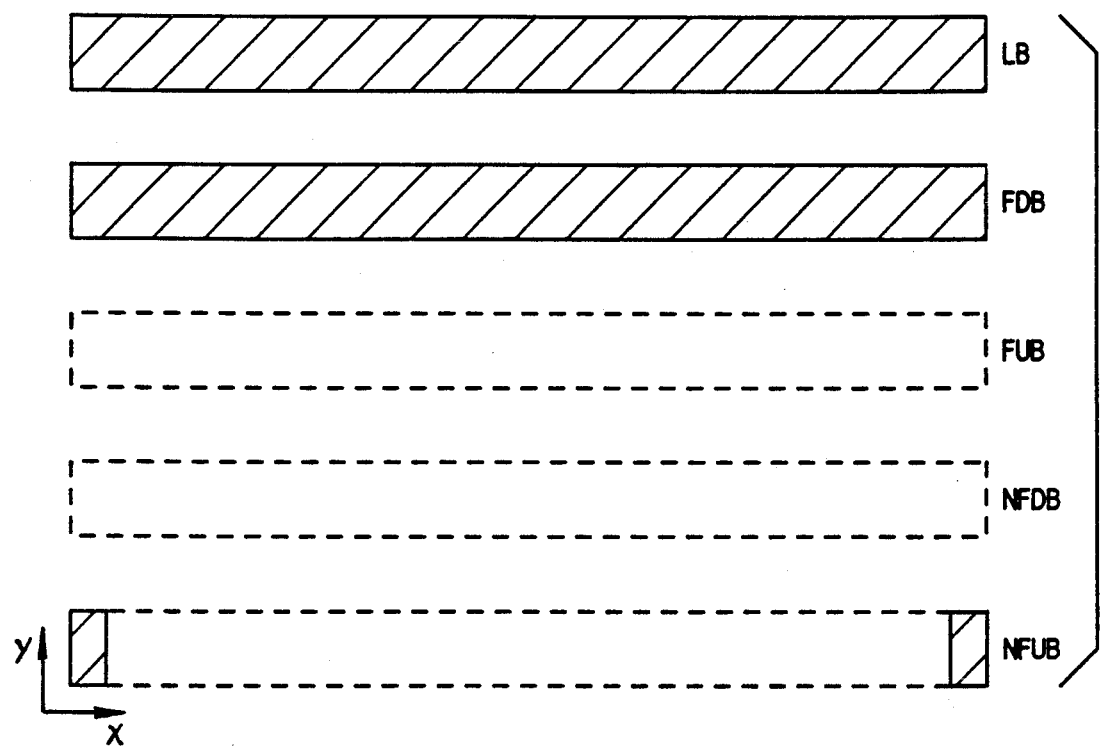
Figures 2, 14:
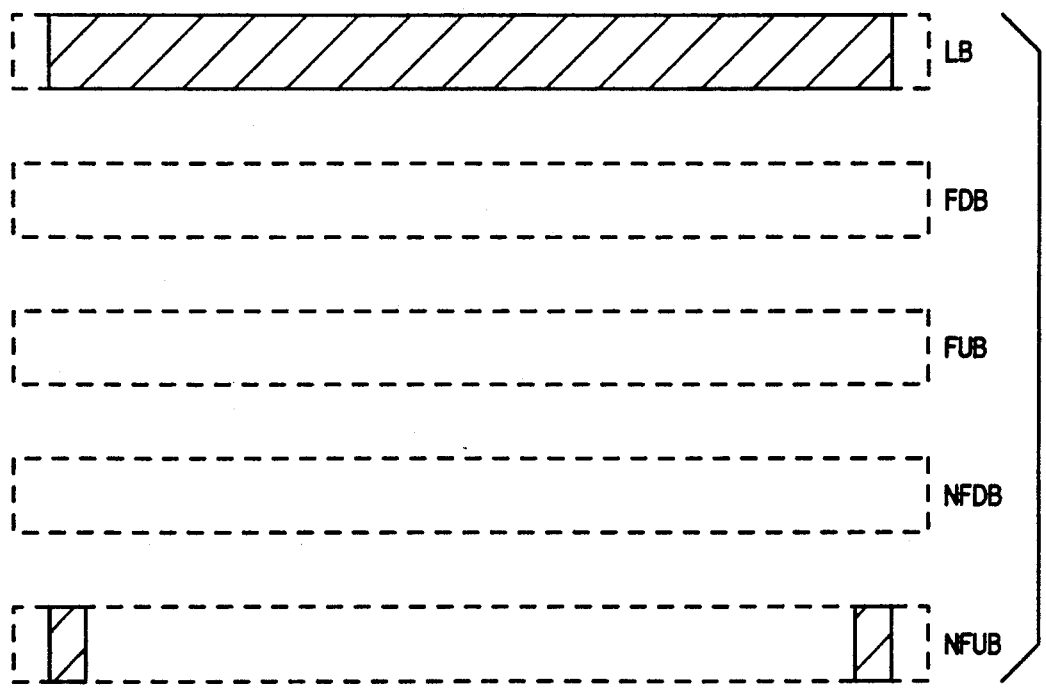
Figures 3, 14:
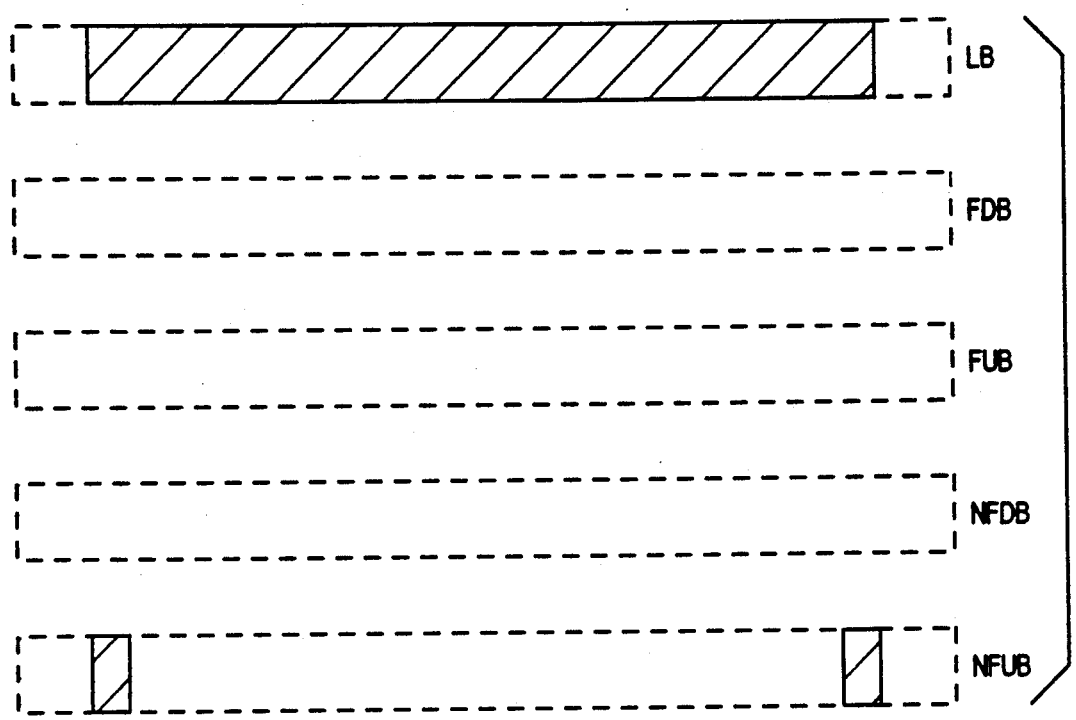
Figures 4, 14:
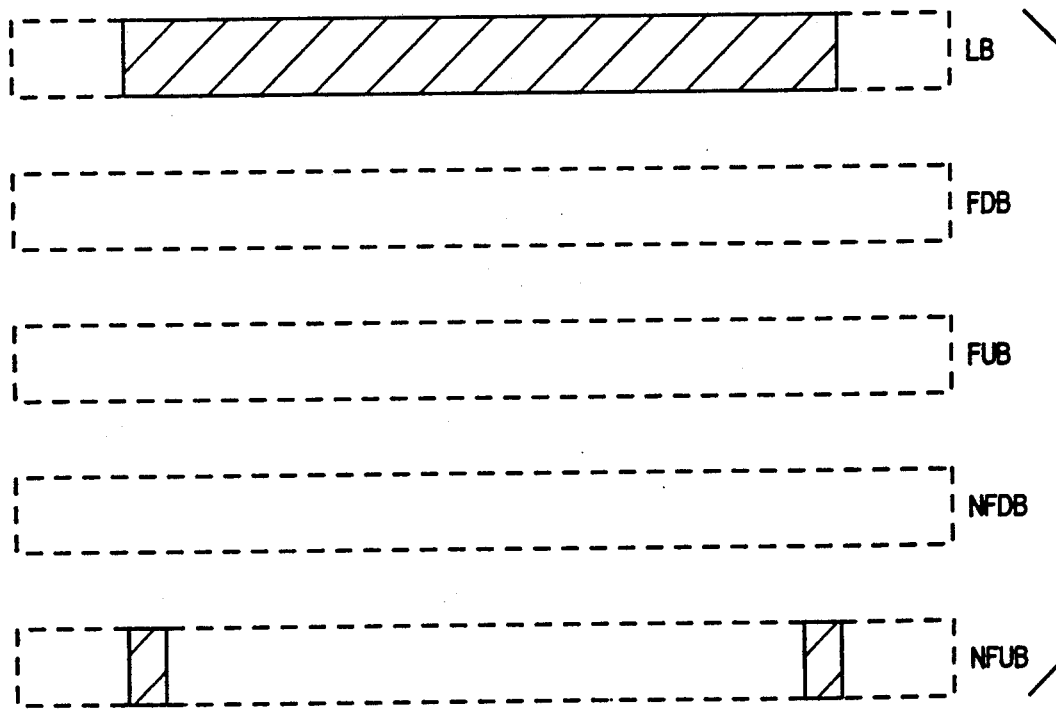
Figures 5, 14:
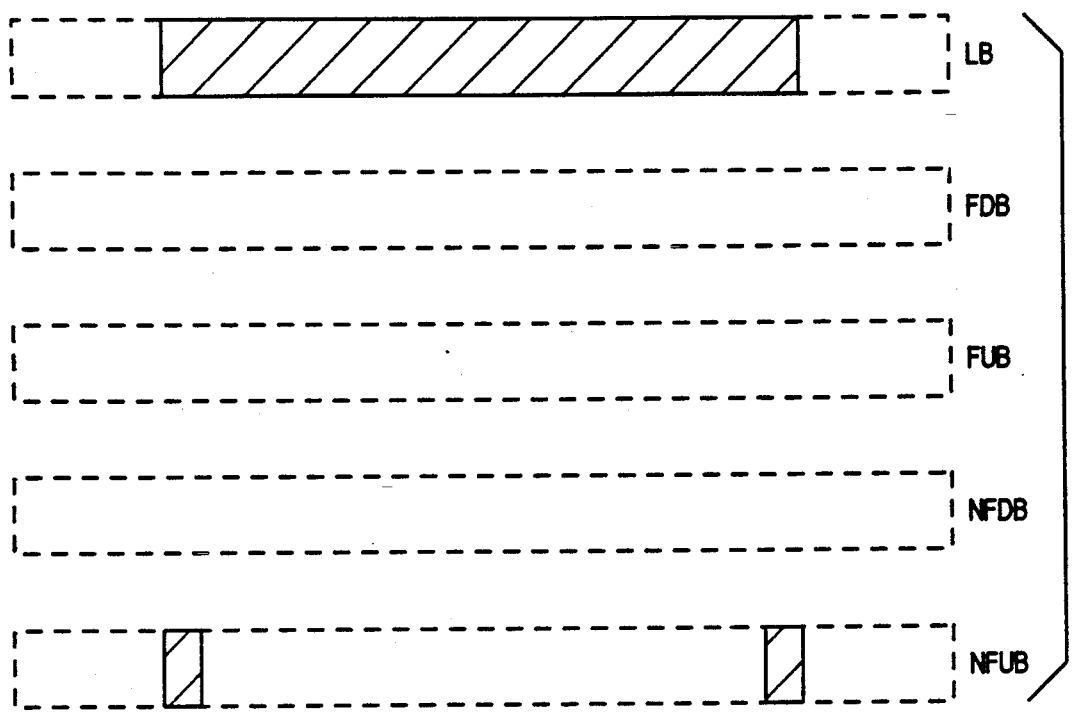
Figures 6, 14:
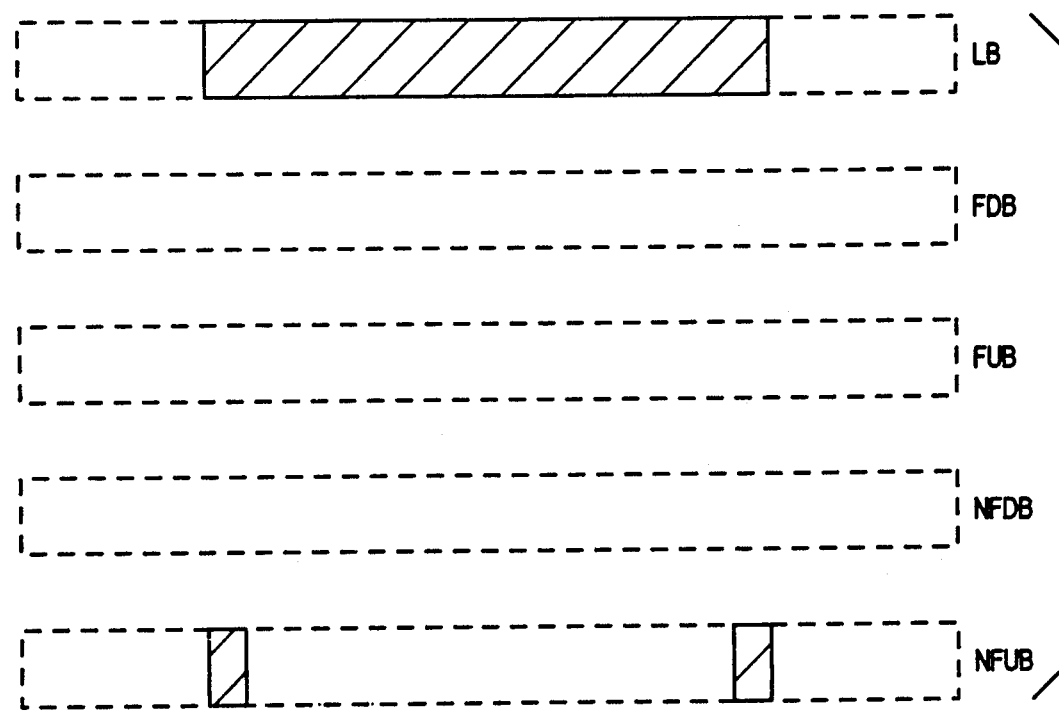
Figures 7, 14:
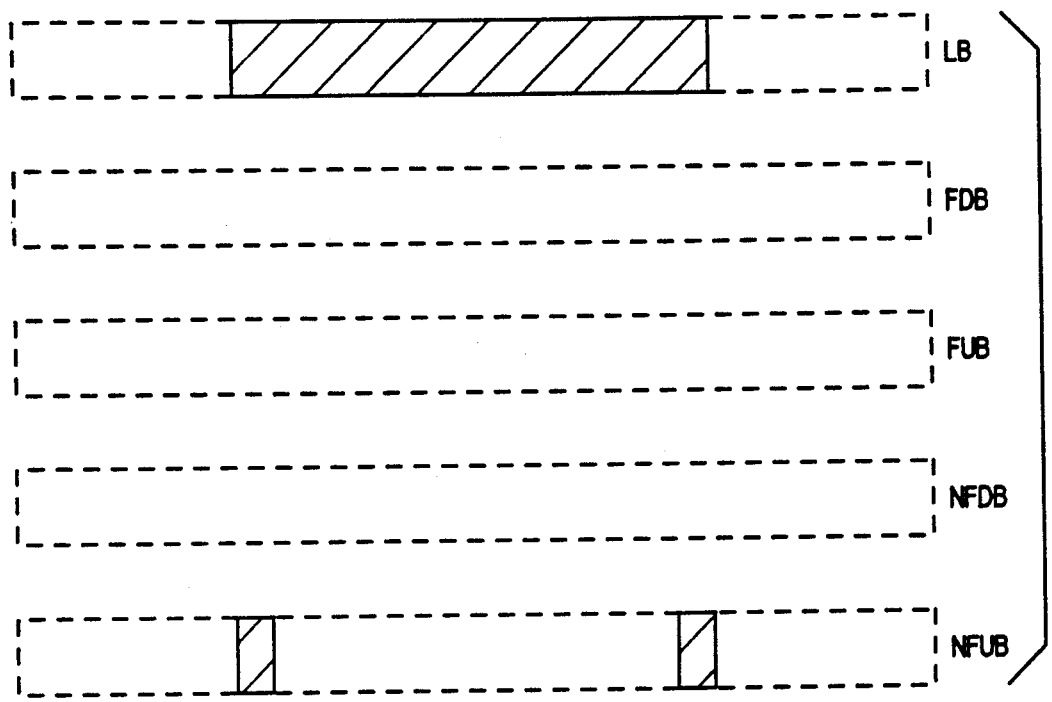
Figures 8, 14:
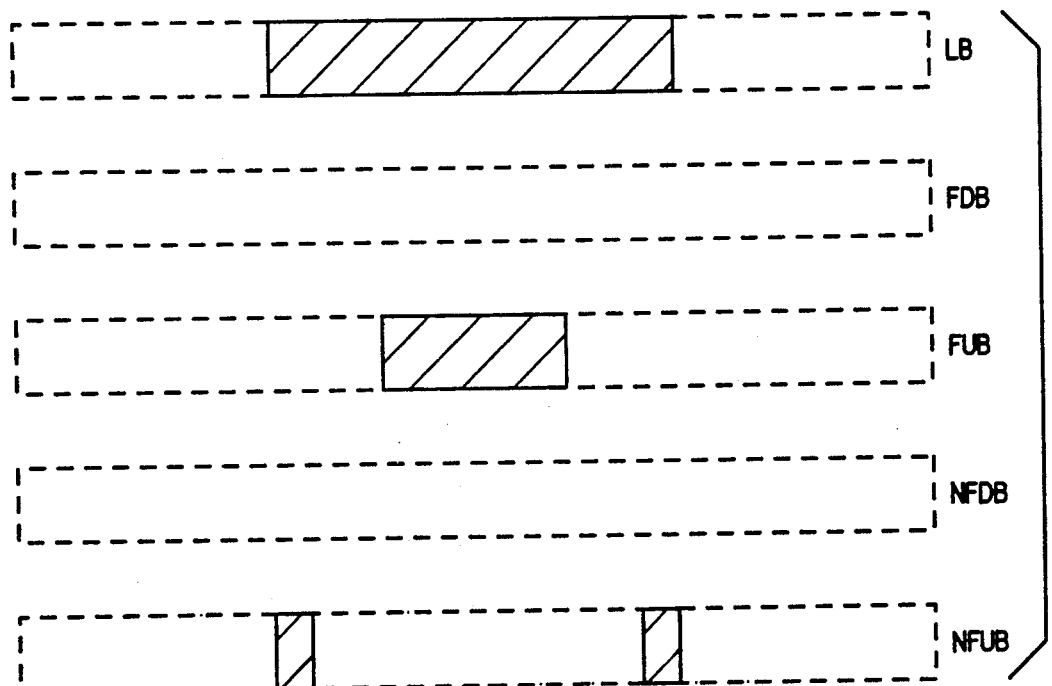
Figures 9, 14:
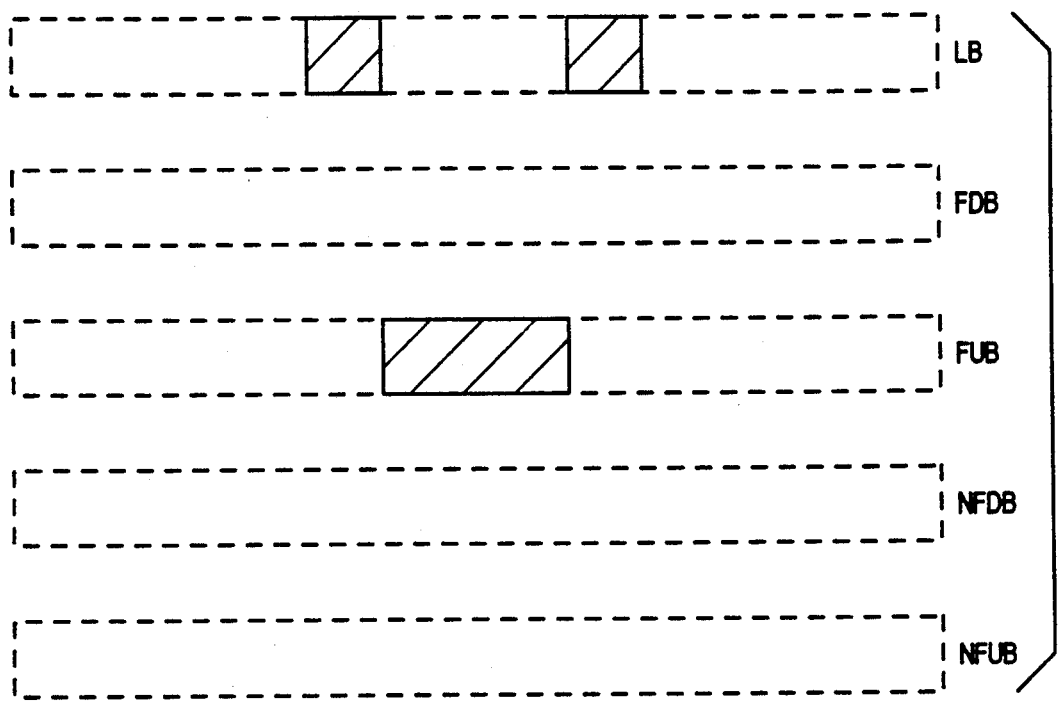
Figures 10, 14:
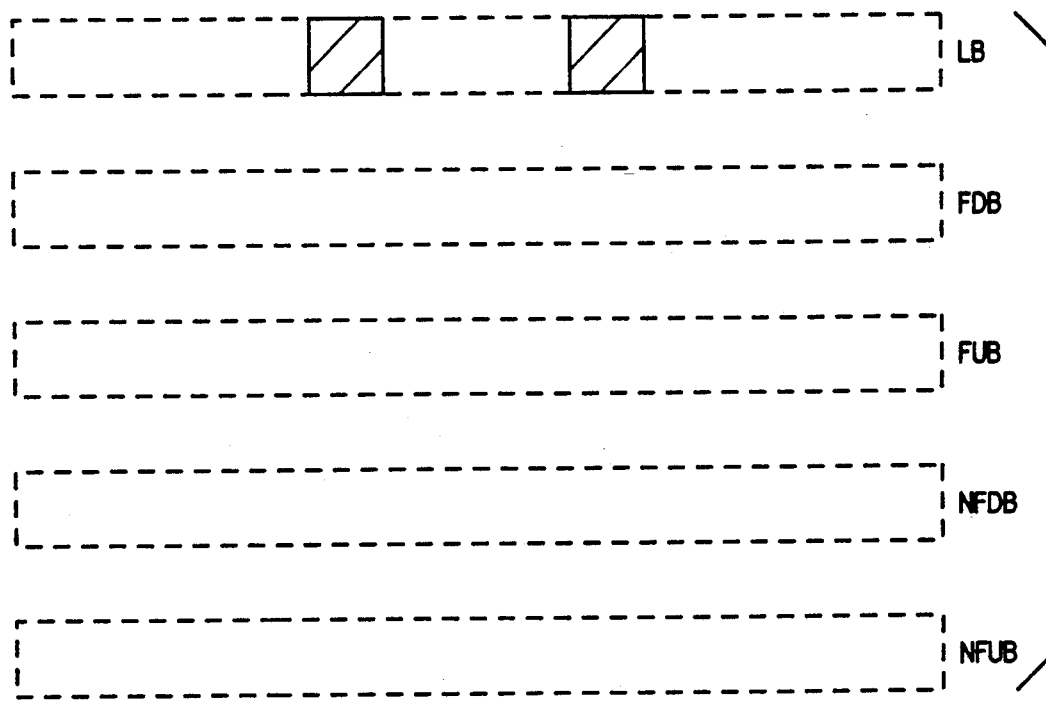
Figures 11, 14:
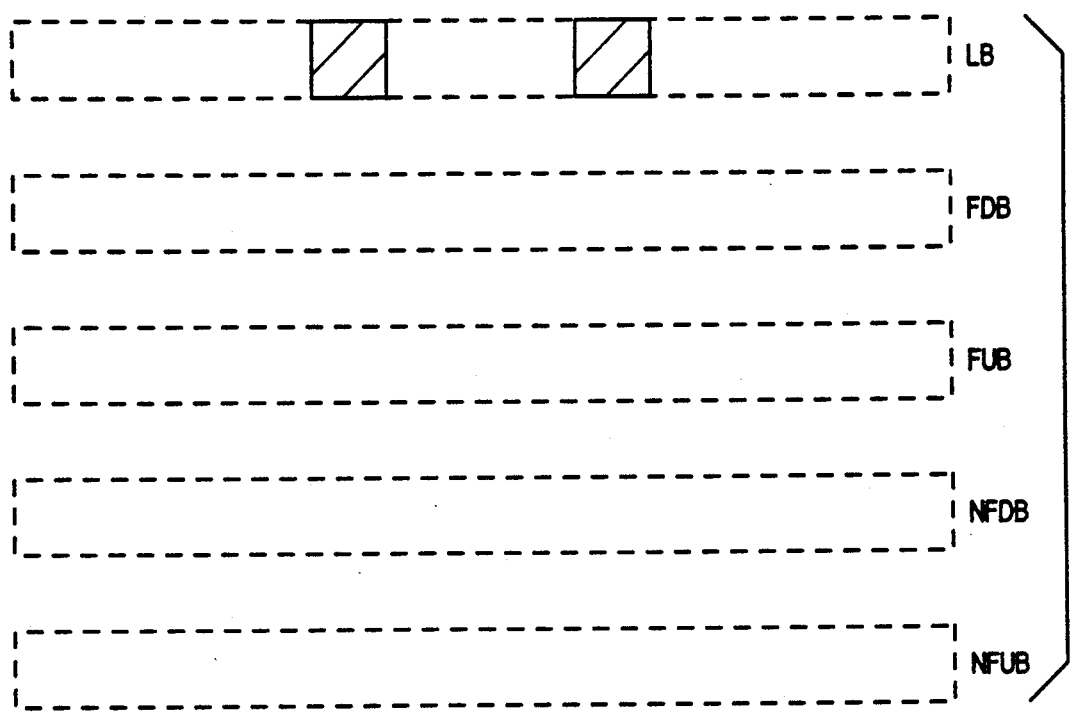
Figures 12, 14:
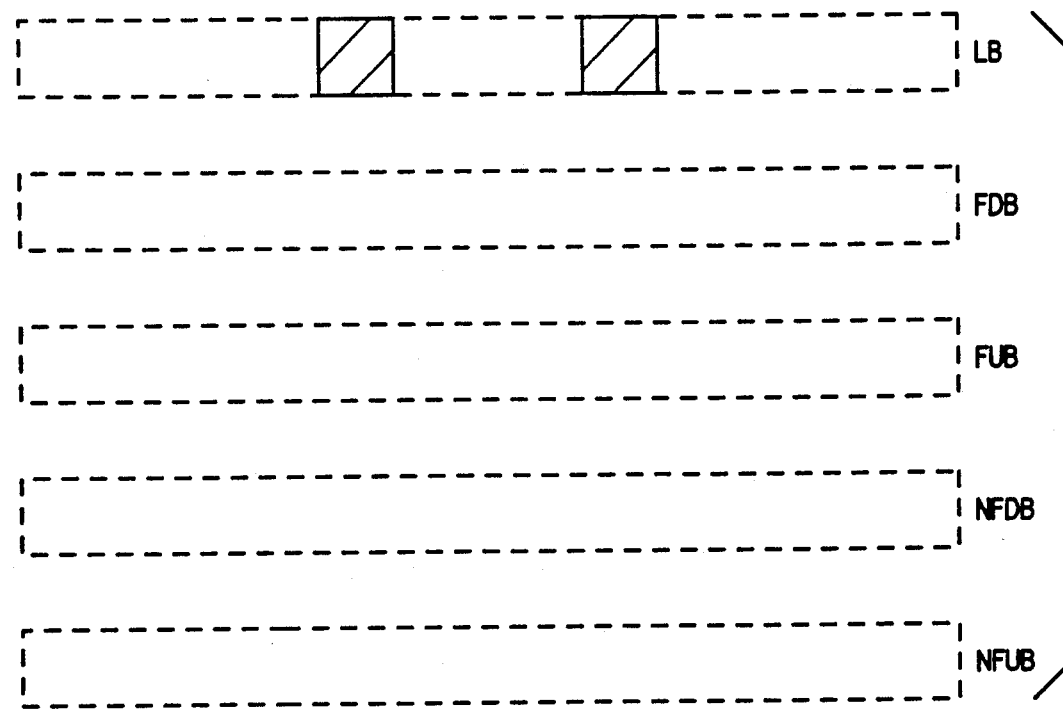
Figures 13, 14:
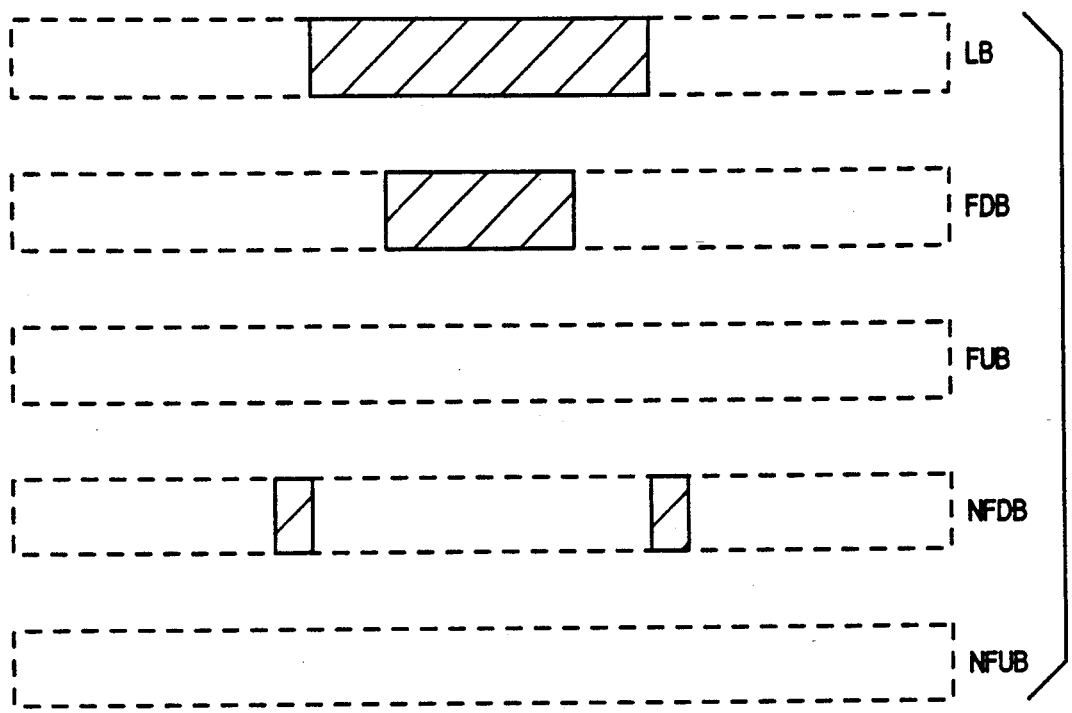
Figure 14:
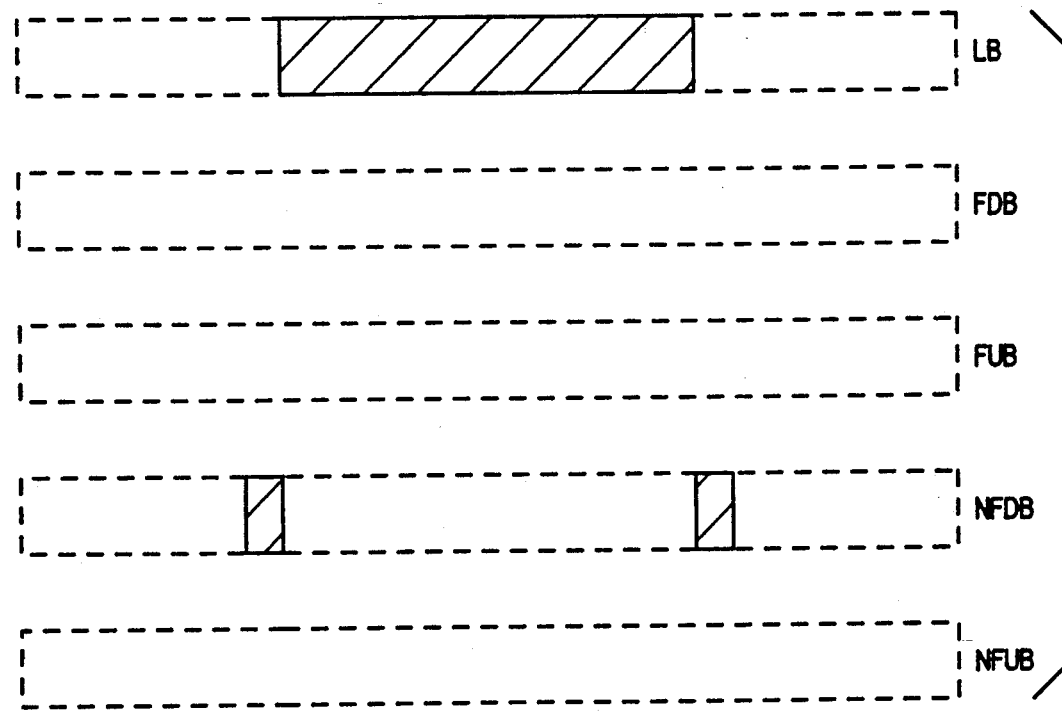
Figures 14, 15:
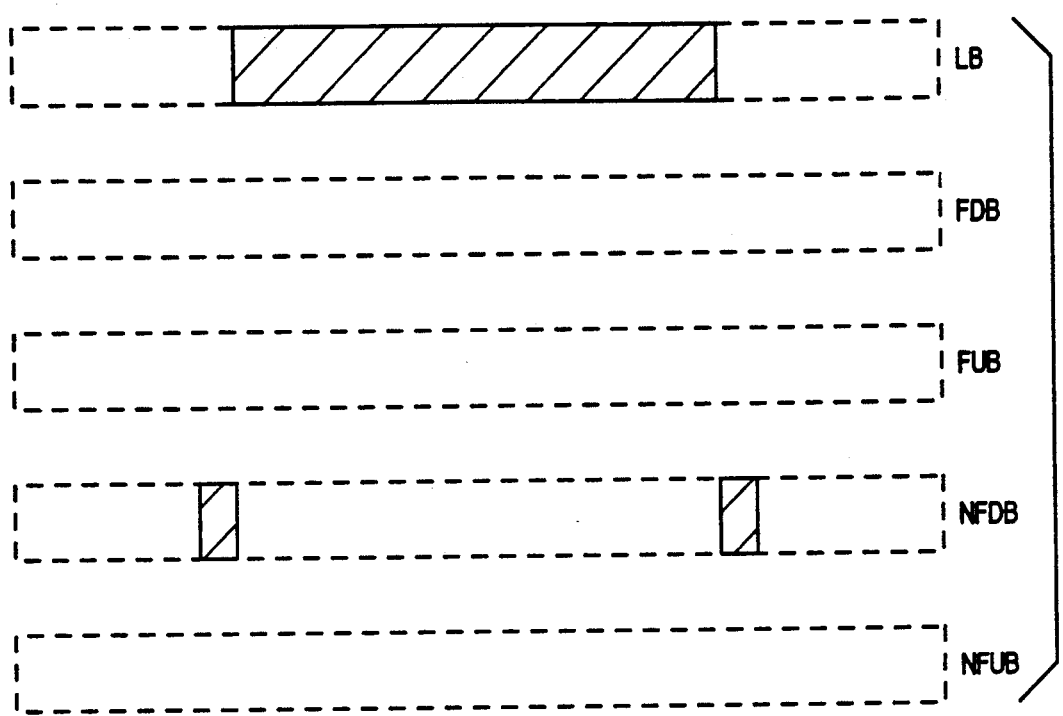
Figures 14, 15, 16:
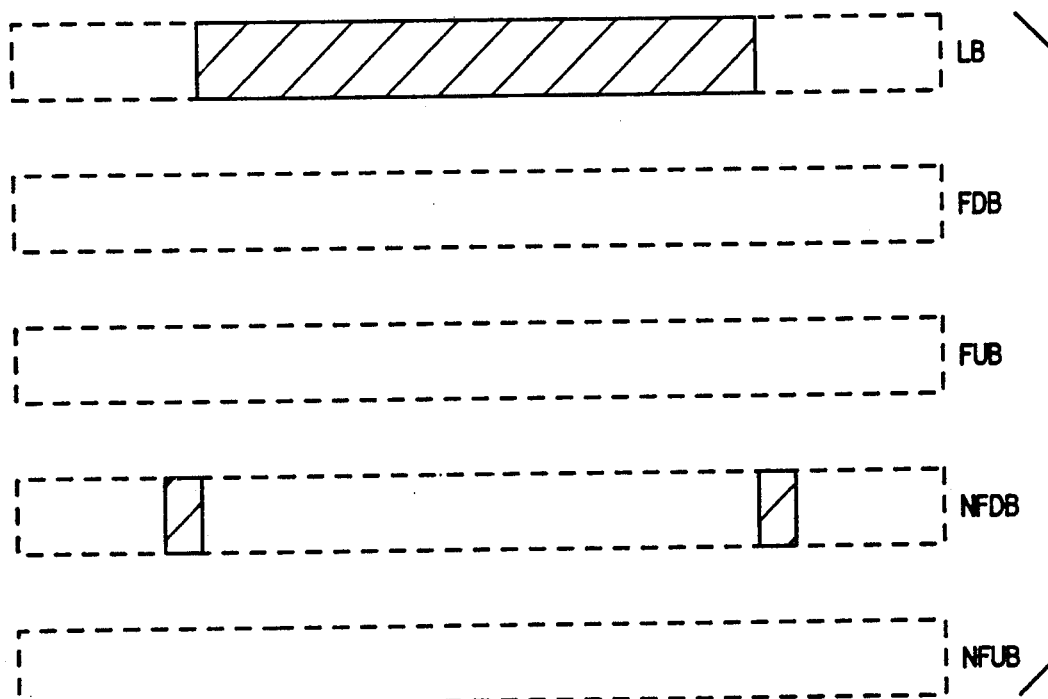
Figures 14, 15, 16, 17:
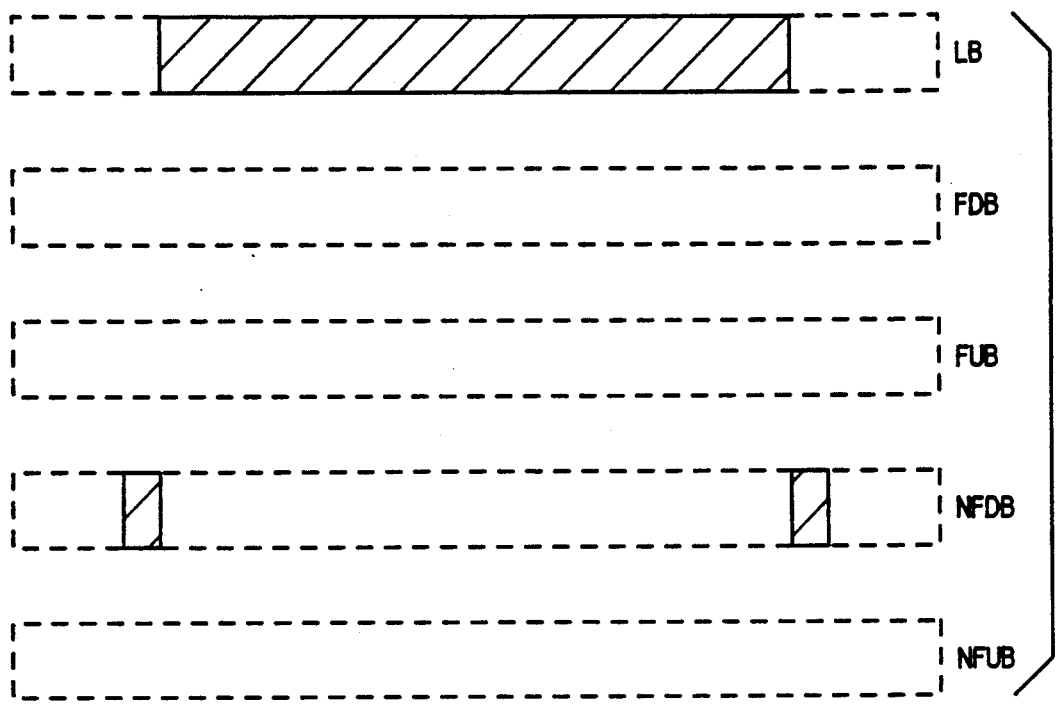
Figures 14, 15, 16, 17, 18:
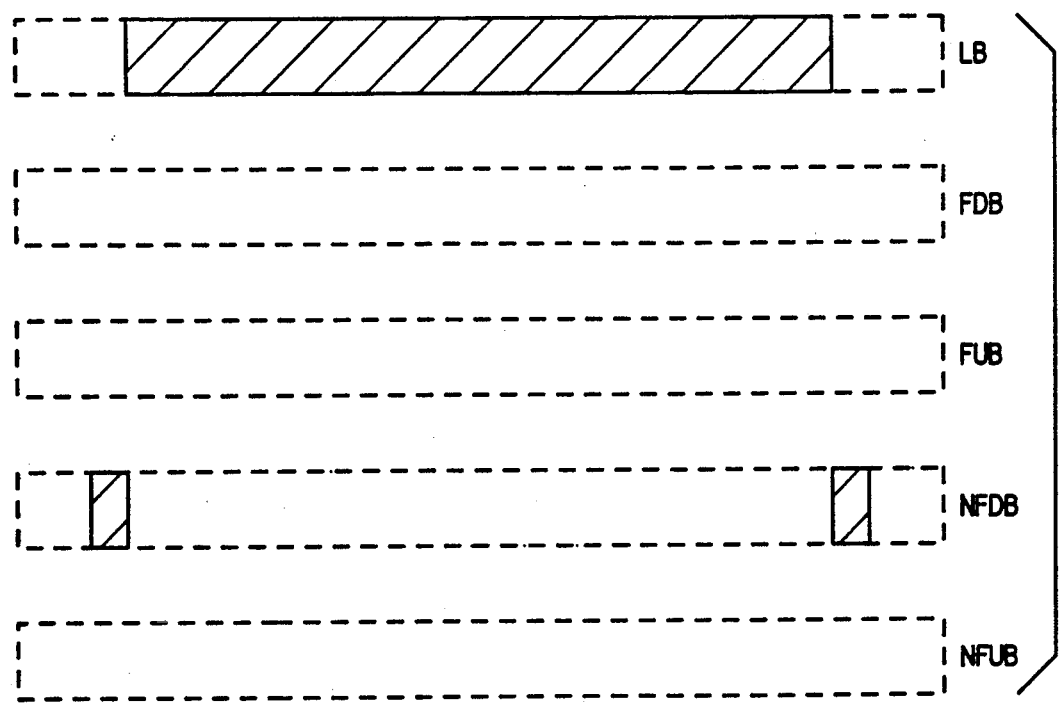
Figures 14, 15, 16, 17, 18, 19:
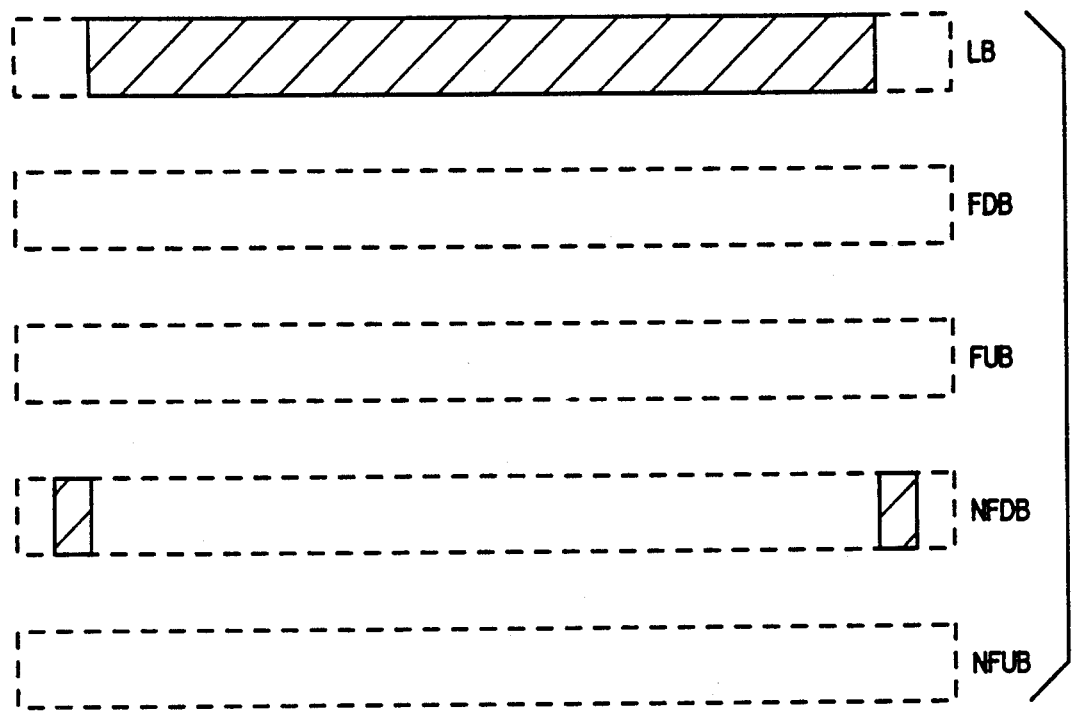
Figures 14, 15, 16, 17, 18, 19, 20:
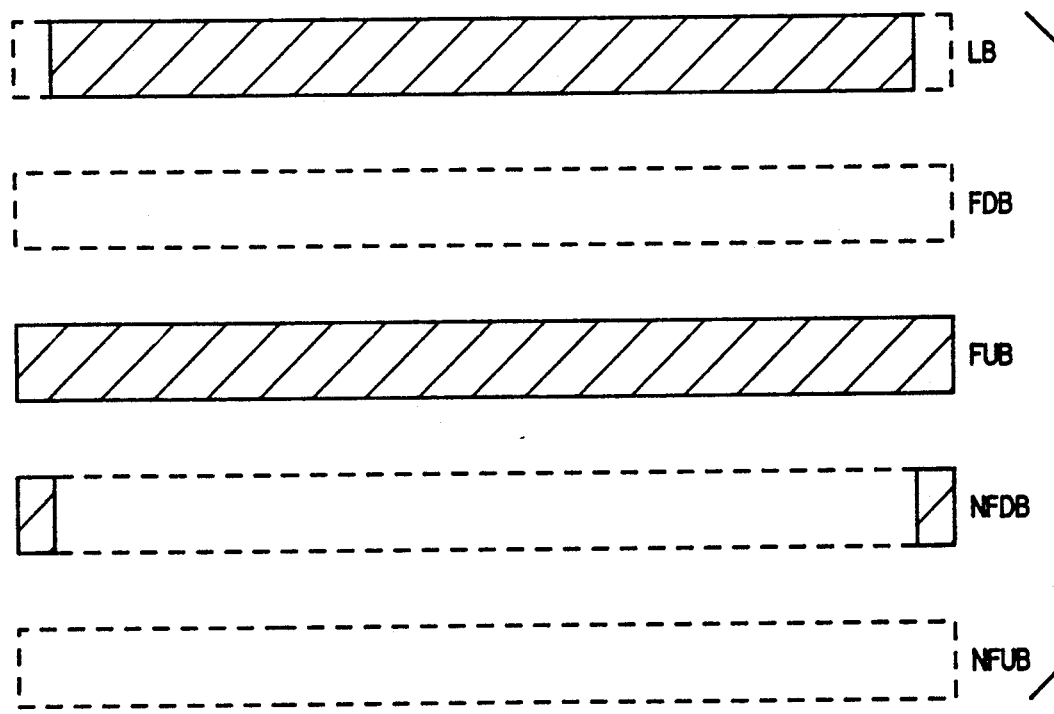
Figures 14, 15, 16, 17, 18, 19, 20, 21:
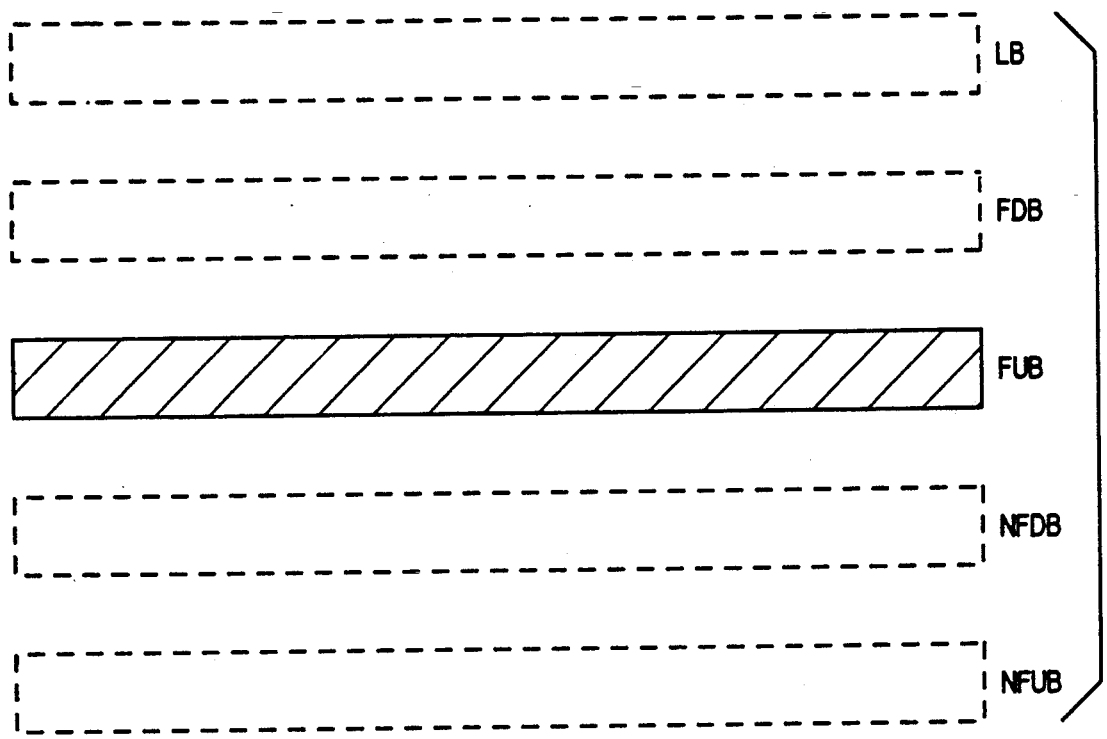
Figure 15:
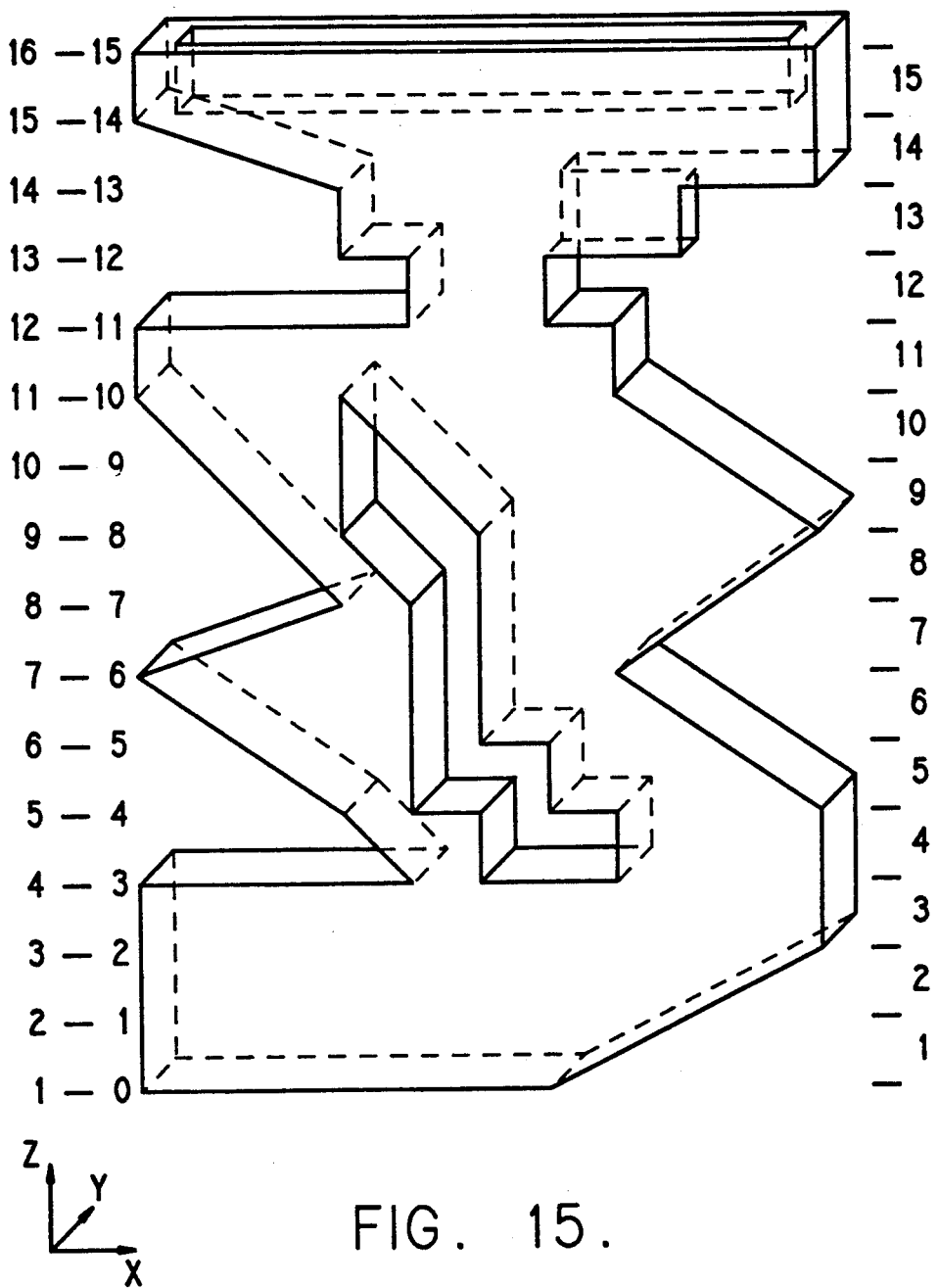
Figure 16:
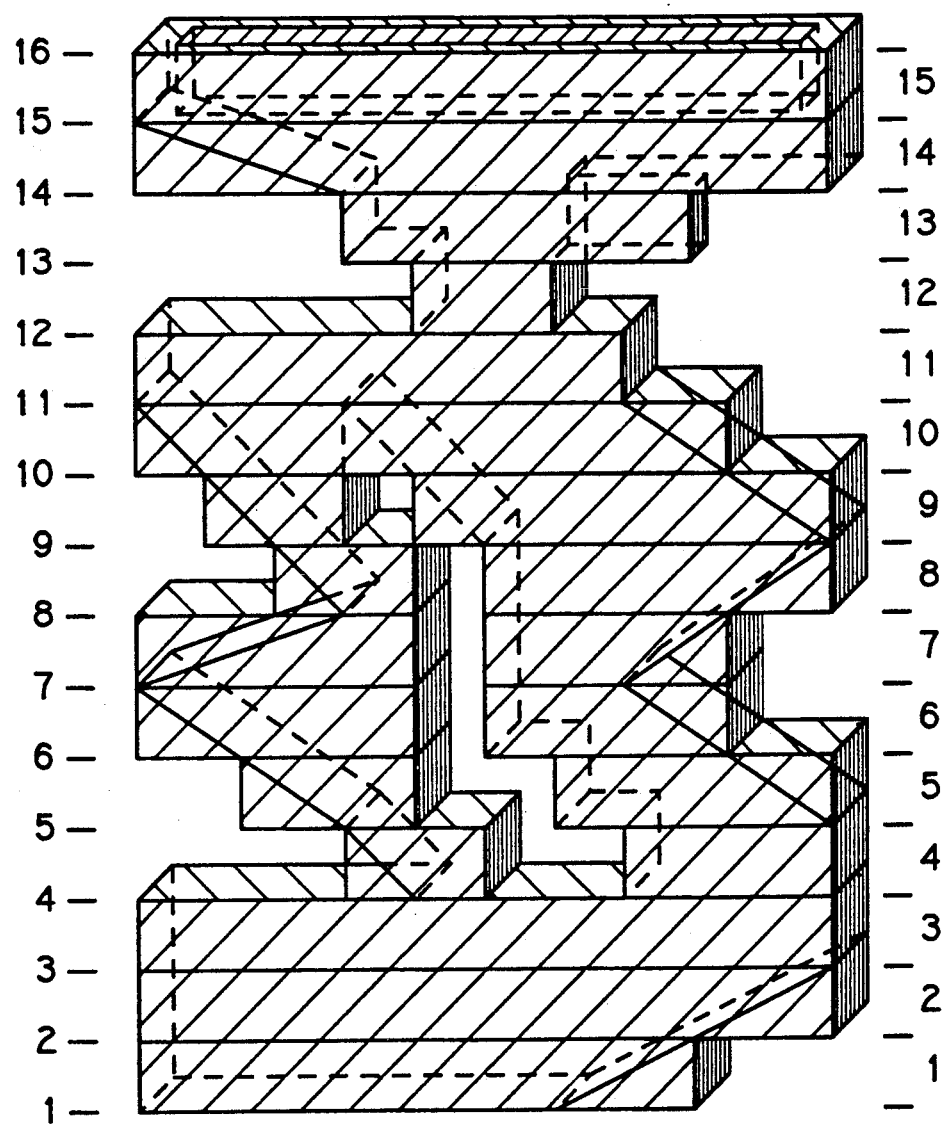
Figure 17L:
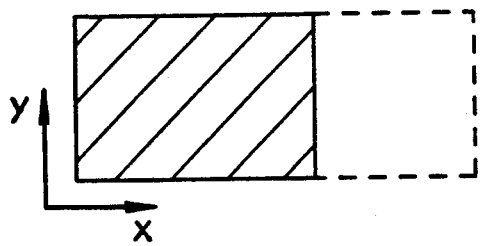
Figure 17L:
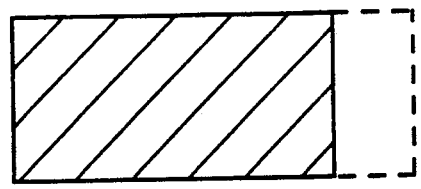
Figure 17L:
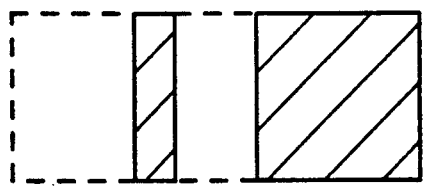
Figure 17L:
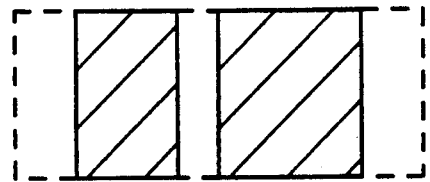
Figure 18:
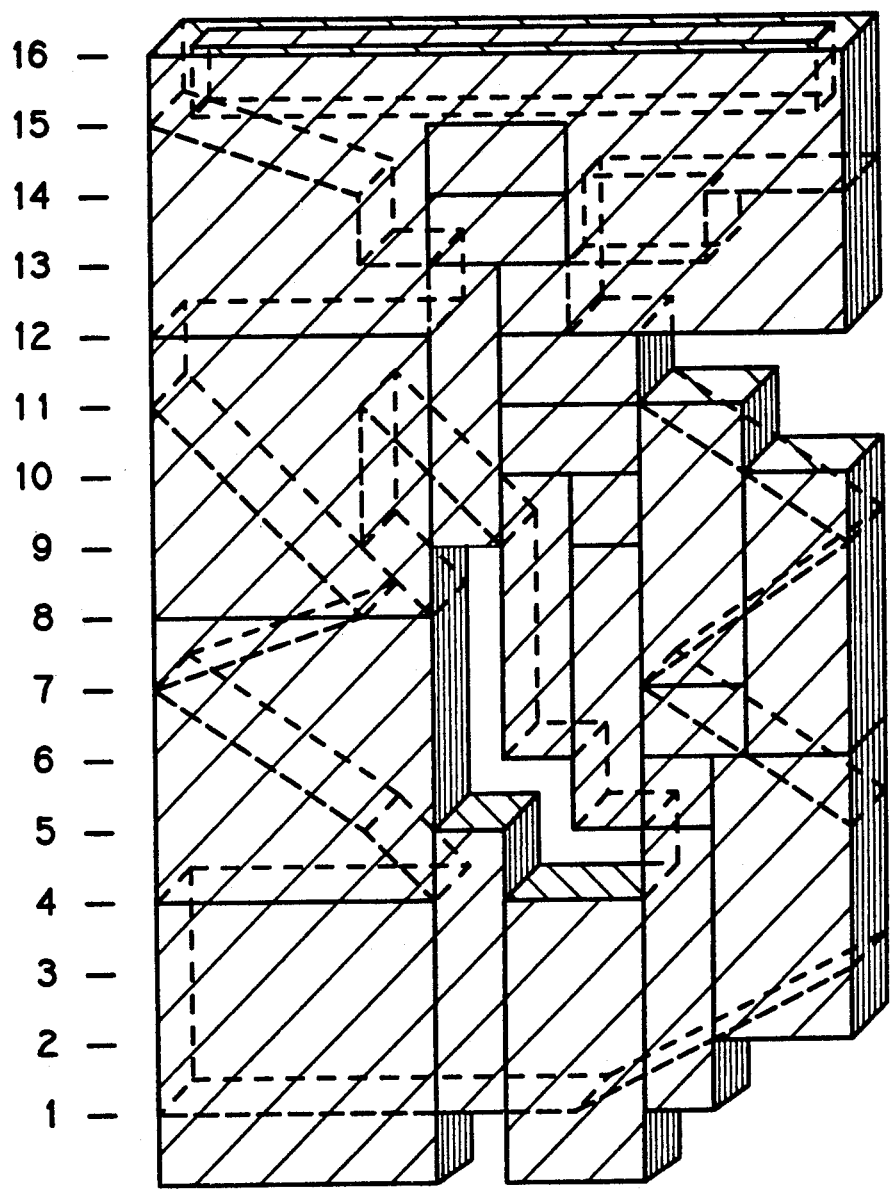
Figures 1L, 19:
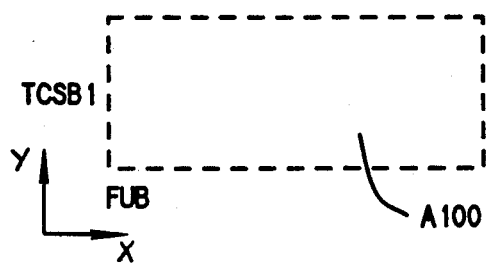
Figures 1R, 19:
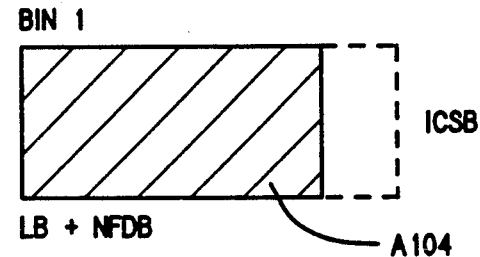
Figures 2L, 19:
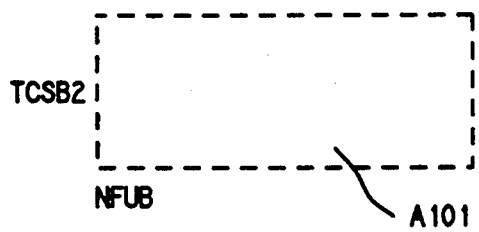
Figures 2R, 19:
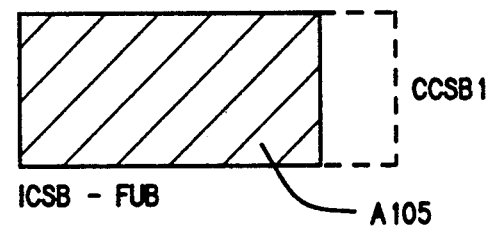
Figures 3L, 19:
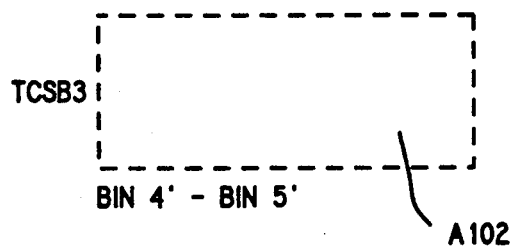
Figures 3R, 19:
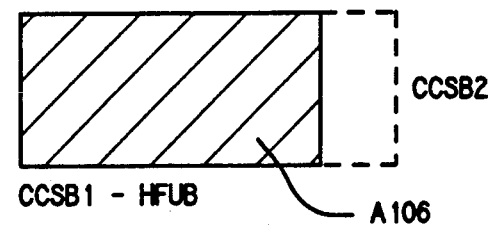
Figures 4L, 19:
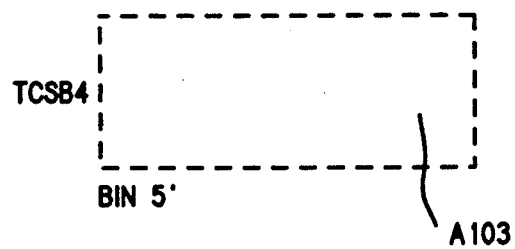
Figures 5L, 19:
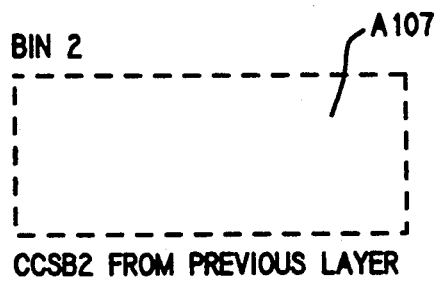
Figures 5R, 19:
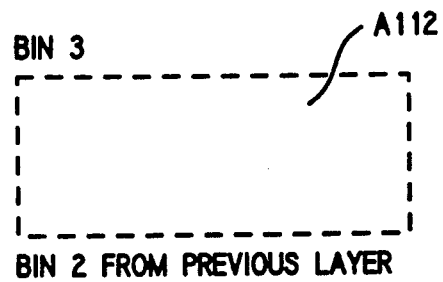
Figures 6L, 19:
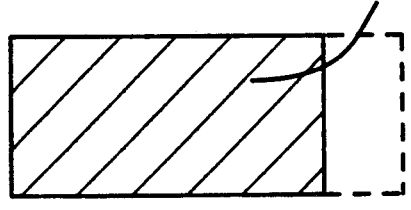
Figures 6R, 19:
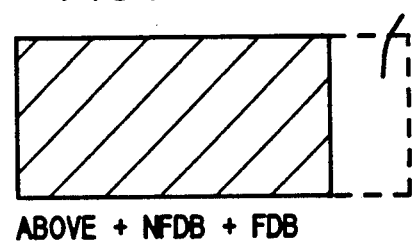
Figures 7L, 19:
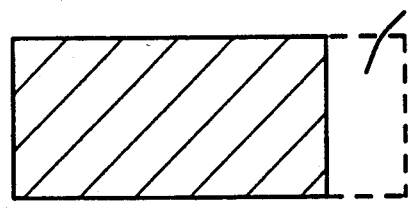
Figures 7R, 19:
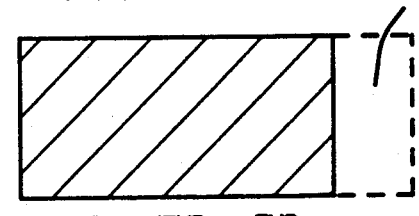
Figures 8L, 19:
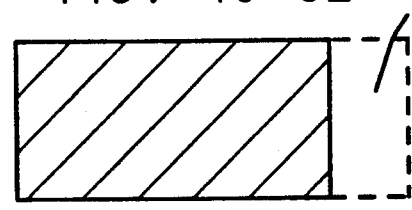
Figures 8R, 19:
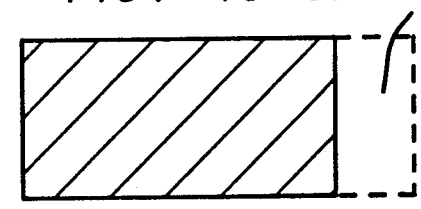
Figures 9L, 19:
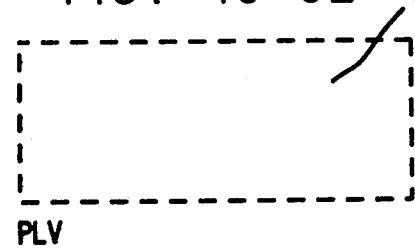
Figures 9R, 19:
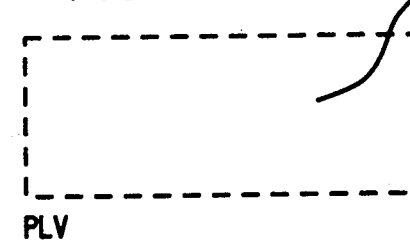
Figures 15L, 19:
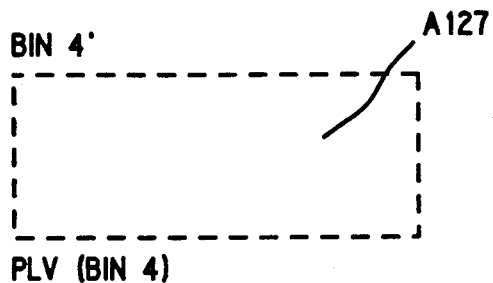
Figures 15R, 19:
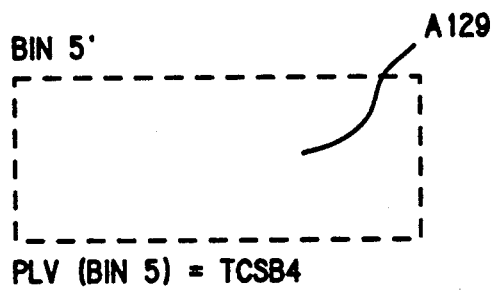
Figures 16L, 19:
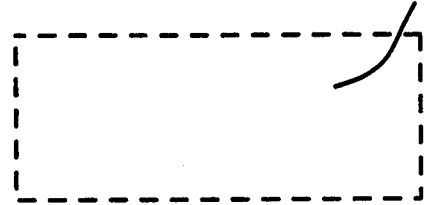
Figures 17L, 19:
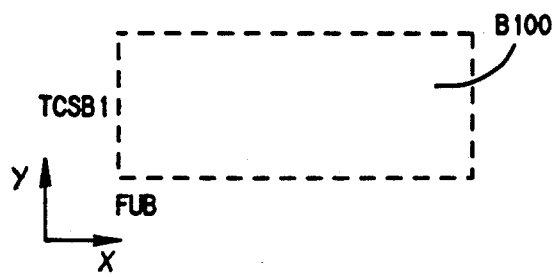
Figures 17R, 19:
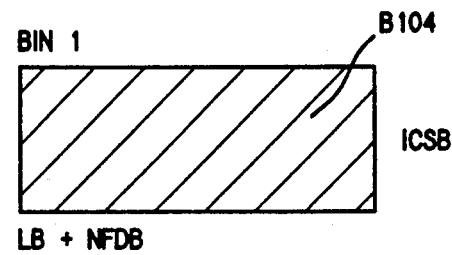
Figures 18L, 19:
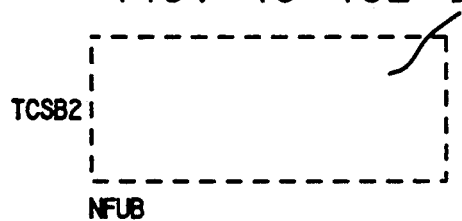
Figures 18R, 19:
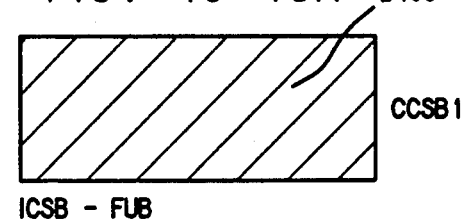
Figures 19, 19L:
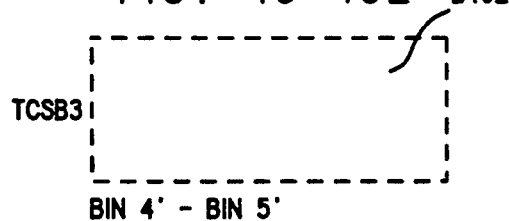
Figures 19, 19R:
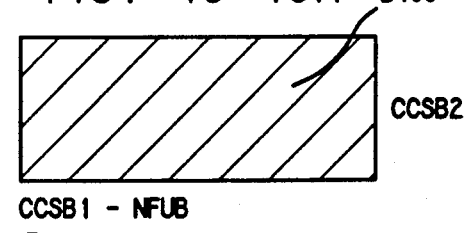
Figures 19, 20, 20L:
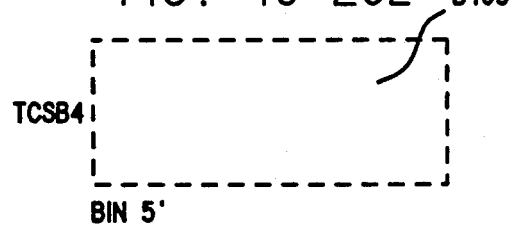
Figures 19, 20, 21, 21L:
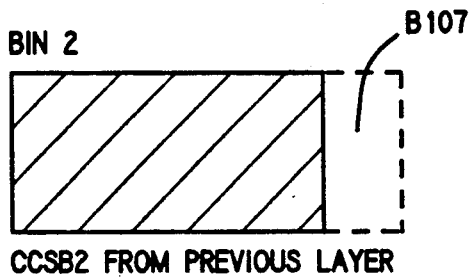
Figures 19, 20, 21, 21R:
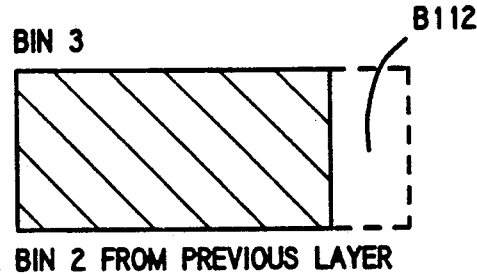
Figures 19, 20, 21, 22, 22L:
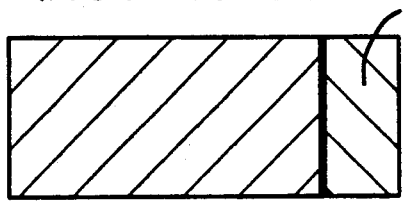
Figures 19, 20, 21, 22, 22R:
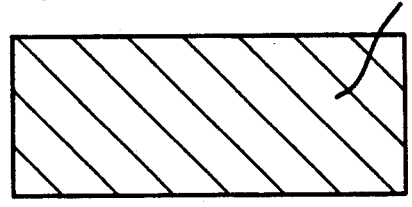
Figures 19, 20, 21, 22, 23, 23L:
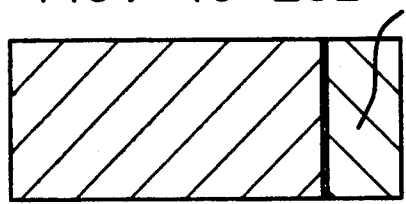
Figures 19, 20, 21, 22, 23, 23R:
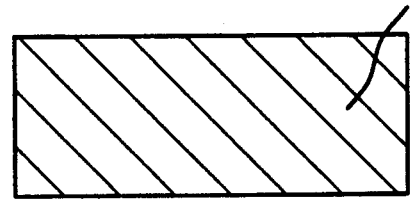
Figures 19, 20, 21, 22, 23, 24, 24L:
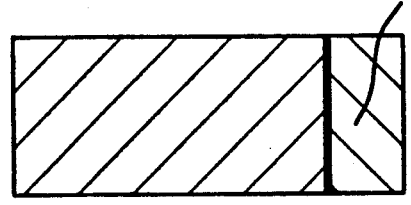
Figures 19, 20, 21, 22, 23, 24, 24R:
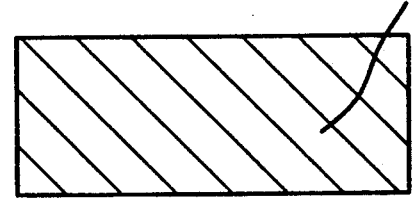
Figures 19, 20, 21, 22, 23, 24, 25, 25L:
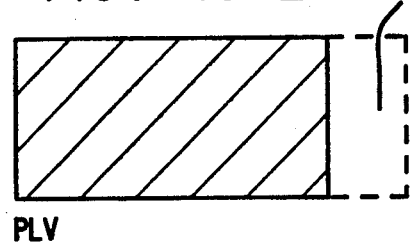
Figures 19, 20, 21, 22, 23, 24, 25, 25R:
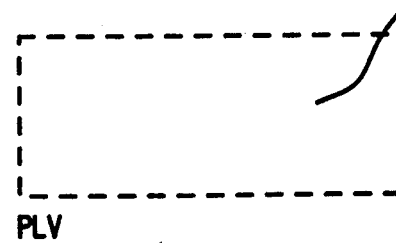
Figures 19, 20, 21, 22, 23, 24, 25, 26, 26L:
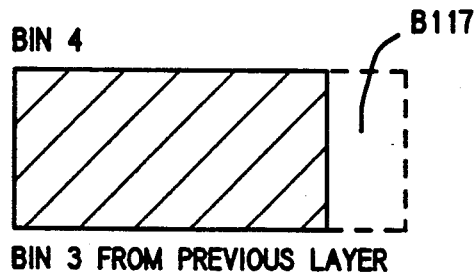
Figures 26R, 119:
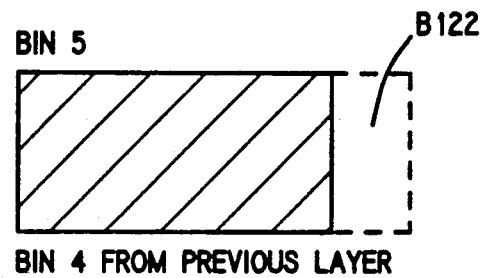
Figures 19, 20, 21, 22, 23, 24, 25, 26, 27, 27L:
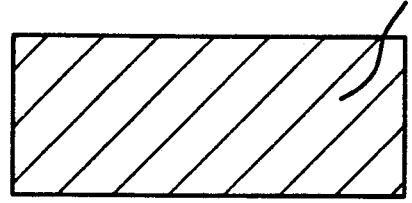
Figures 19, 20, 21, 22, 23, 24, 25, 26, 27, 27R:
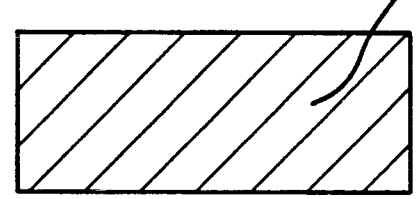
Figures 19, 20, 21, 22, 23, 24, 25, 26, 27, 28, 28L:
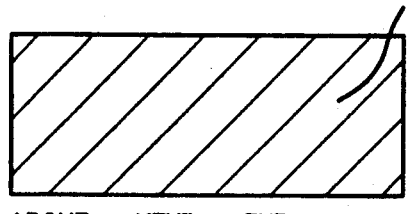
Figures 19, 20, 21, 22, 23, 24, 25, 26, 27, 28, 28R:
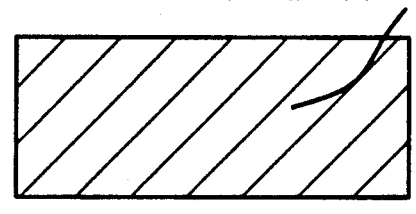
Figures 19, 20, 21, 22, 23, 24, 25, 26, 27, 28, 29, 29L:
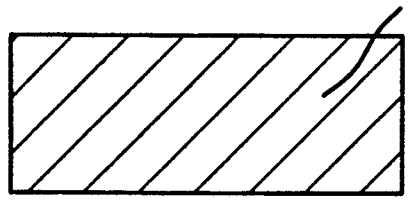
Figures 19, 20, 21, 22, 23, 24, 25, 26, 27, 28, 29, 29R:
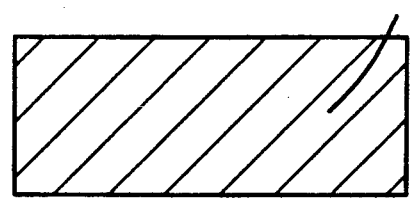
Figures 19, 20, 21, 22, 23, 24, 25, 26, 27, 28, 29, 30, 30L:
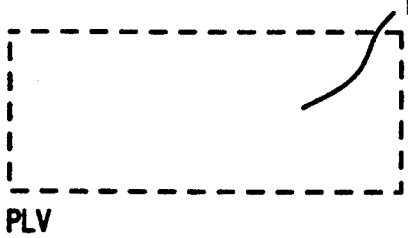
Figures 19, 20, 21, 22, 23, 24, 25, 26, 27, 28, 29, 30, 30R:
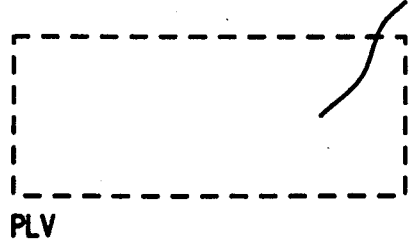
Figures 19, 20, 21, 22, 23, 24, 25, 26, 27, 28, 29, 30, 31, 31L:
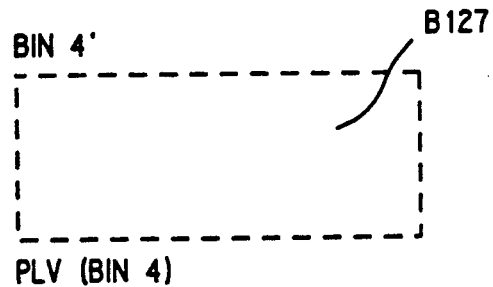
Figures 19, 20, 21, 22, 23, 24, 25, 26, 27, 28, 29, 30, 31, 31R:
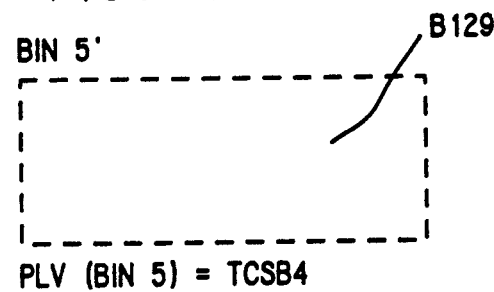
Figures 19, 20, 21, 22, 23, 24, 25, 26, 27, 28, 29, 30, 31, 32, 32L:
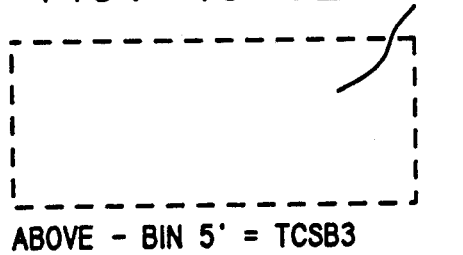
Figures 19, 20, 21, 22, 23, 24, 25, 26, 27, 28, 29, 30, 31, 32, 33, 34, 35, 36, 37, 38, 39, 40, 41, 42, 42L:
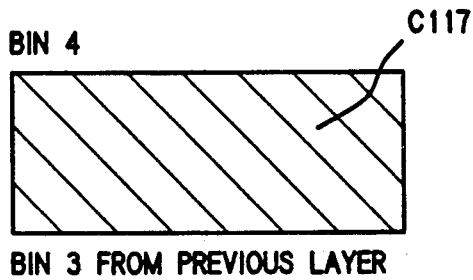
Figures 19, 20, 21, 22, 23, 24, 25, 26, 27, 28, 29, 30, 31, 32, 33, 34, 35, 36, 37, 38, 39, 40, 41, 42, 42R:
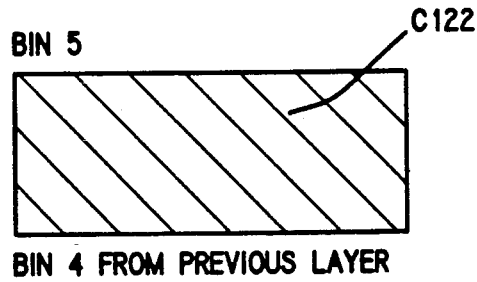
Figures 19, 20, 21, 22, 23, 24, 25, 26, 27, 28, 29, 30, 31, 32, 33, 34, 35, 36, 37, 38, 39, 40, 41, 42, 43, 43L:
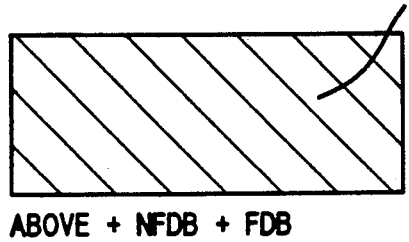
Figures 19, 20, 21, 22, 23, 24, 25, 26, 27, 28, 29, 30, 31, 32, 33, 34, 35, 36, 37, 38, 39, 40, 41, 42, 43, 43R:
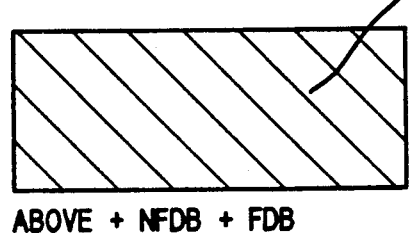
Figures 19, 20, 21, 22, 23, 24, 25, 26, 27, 28, 29, 30, 31, 32, 33, 34, 35, 36, 37, 38, 39, 40, 41, 42, 43, 44, 44L:
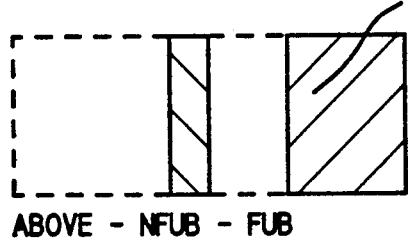
Figures 19, 20, 21, 22, 23, 24, 25, 26, 27, 28, 29, 30, 31, 32, 33, 34, 35, 36, 37, 38, 39, 40, 41, 42, 43, 44, 44R:
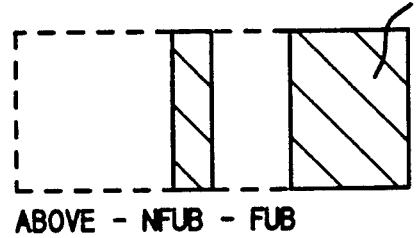
Figures 19, 20, 21, 22, 23, 24, 25, 26, 27, 28, 29, 30, 31, 32, 33, 34, 35, 36, 37, 38, 39, 40, 41, 42, 43, 44, 45, 45L:
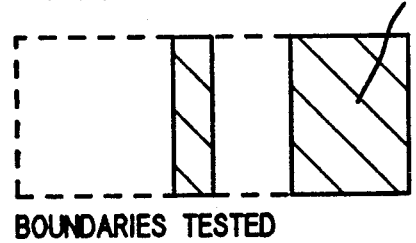
Figures 19, 20, 21, 22, 23, 24, 25, 26, 27, 28, 29, 30, 31, 32, 33, 34, 35, 36, 37, 38, 39, 40, 41, 42, 43, 44, 45, 45R:
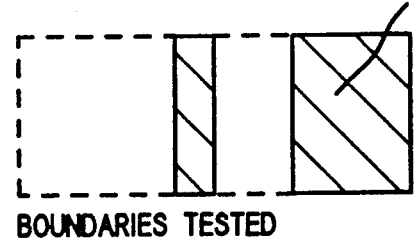
Figures 19, 20, 21, 22, 23, 24, 25, 26, 27, 28, 29, 30, 31, 32, 33, 34, 35, 36, 37, 38, 39, 40, 41, 42, 43, 44, 45, 46, 46L:
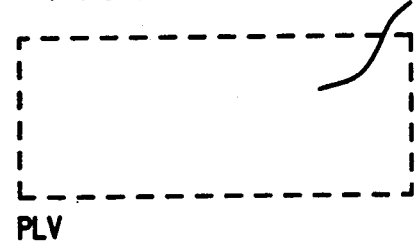
Figures 19, 20, 21, 22, 23, 24, 25, 26, 27, 28, 29, 30, 31, 32, 33, 34, 35, 36, 37, 38, 39, 40, 41, 42, 43, 44, 45, 46, 46R:
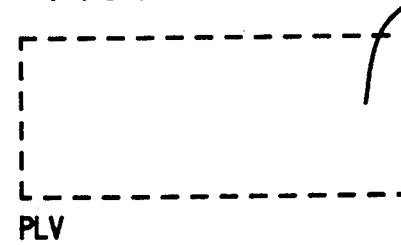
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 47L:
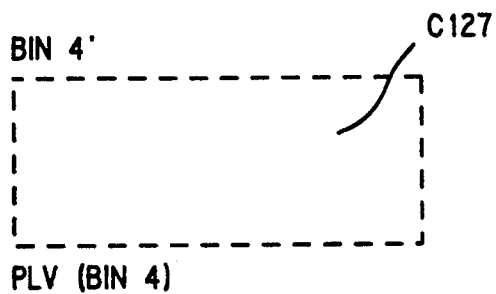
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 47R:
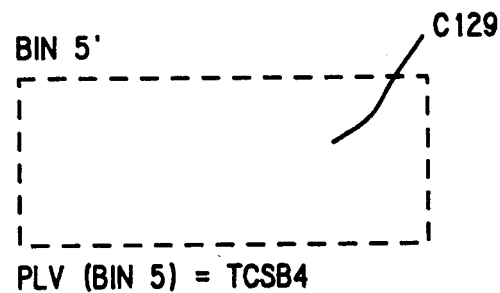
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48L:
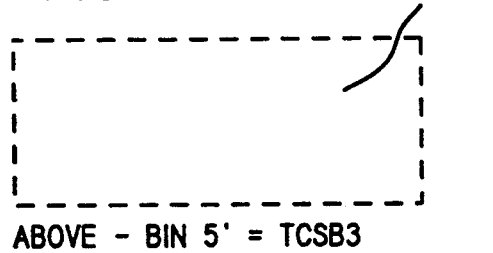
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 49L:
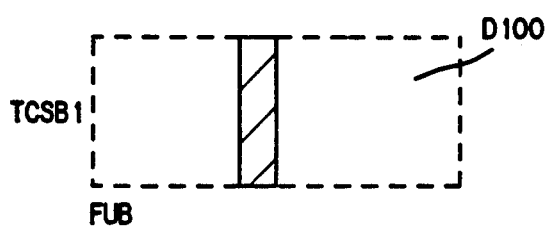
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 49R:
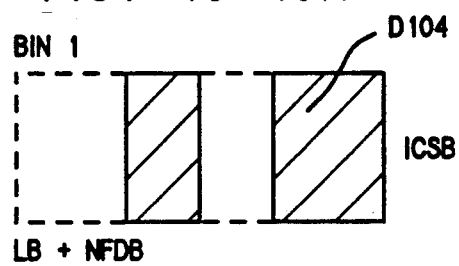
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50L:
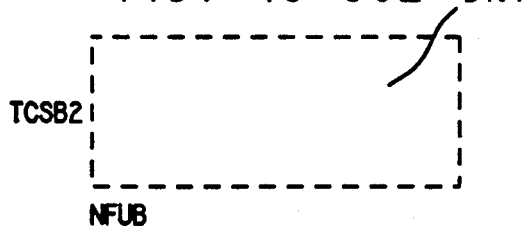
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 50R:
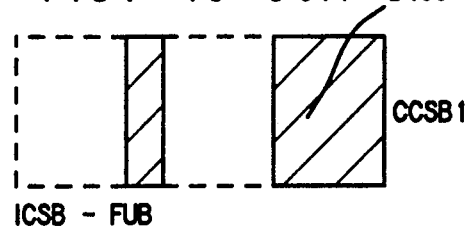
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 51L:
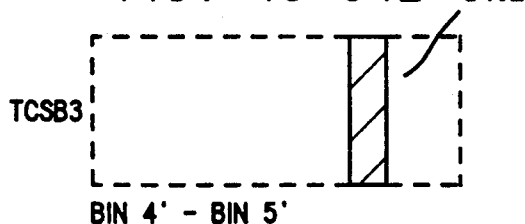
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 51R:
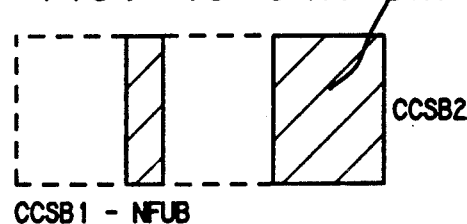
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 52L:
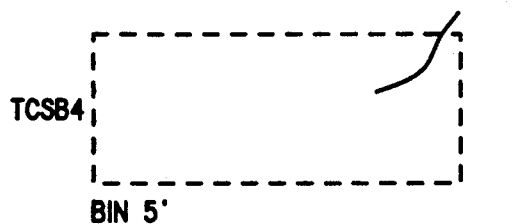
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53L:
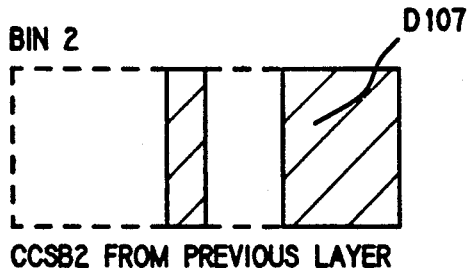
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53R:
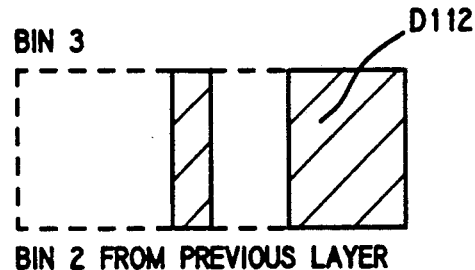
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 54L:
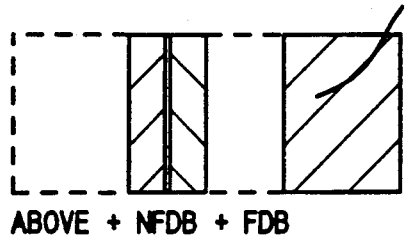
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 54R:
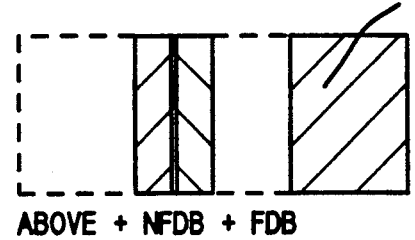
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 55L:
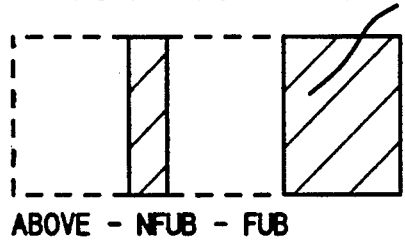
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 55R:
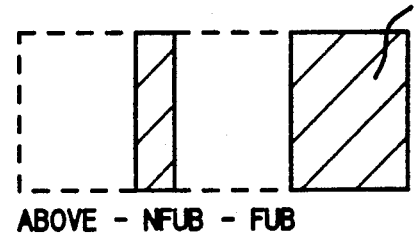
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 56L:
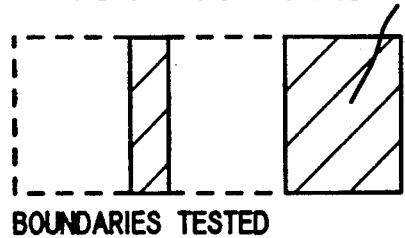
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 56R:
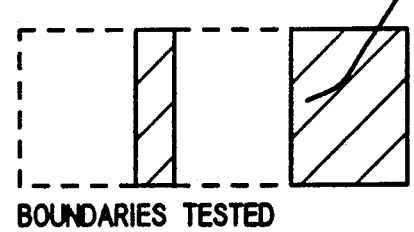
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 57L:
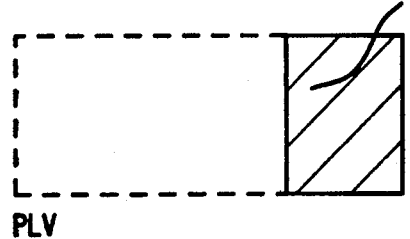
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 57R:
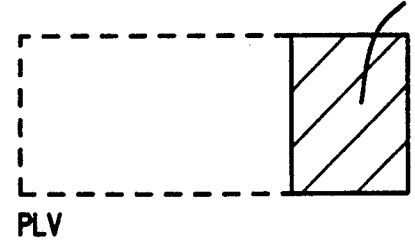
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 63L:
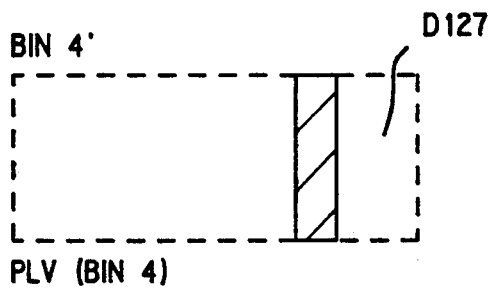
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 63R:
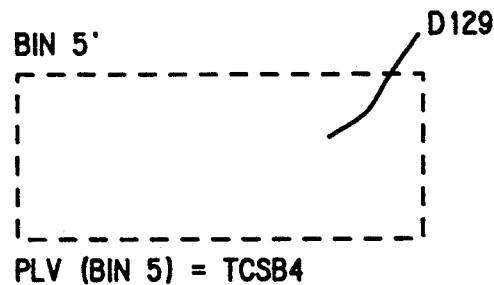
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64L:
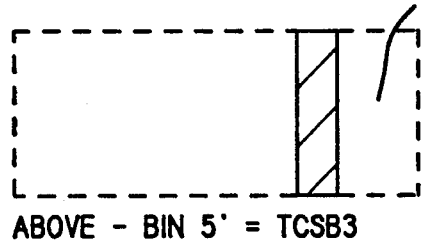
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 65L:
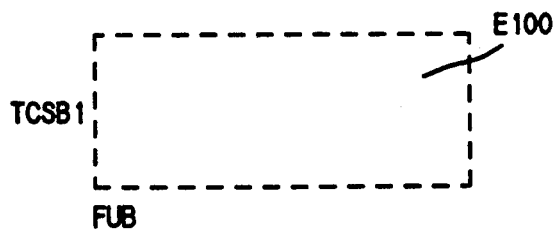
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 65R:
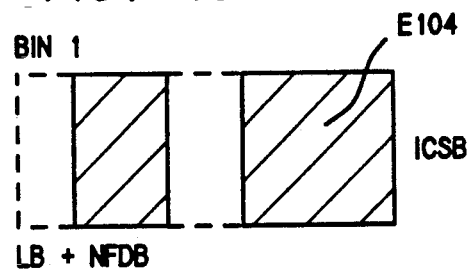
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 66L:
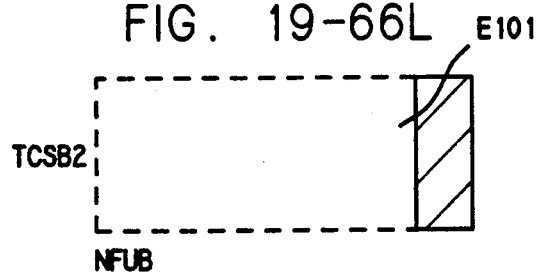
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 66R:
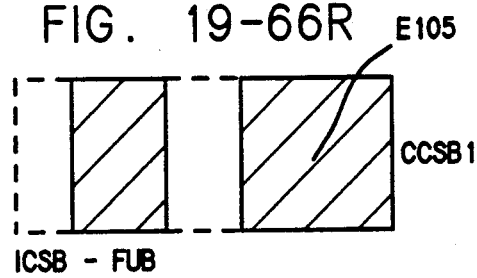
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 67L:
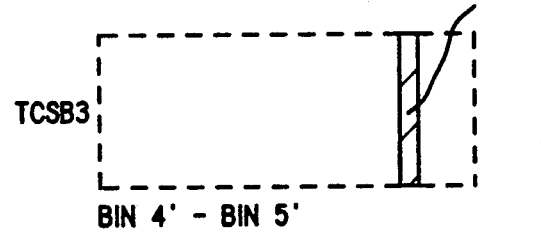
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 67R:
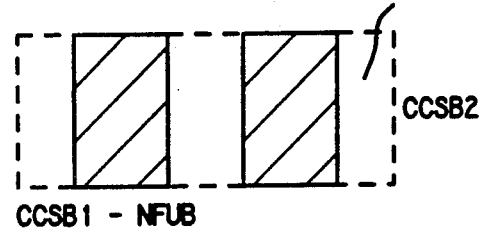
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 68L:
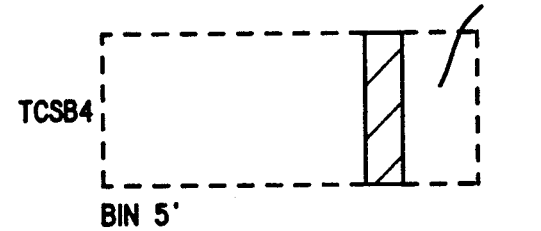
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 69L:
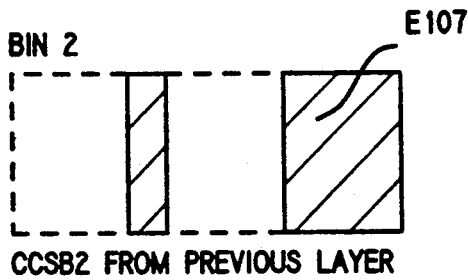
Figures 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 69R:
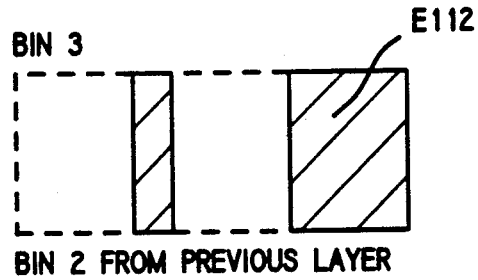
Figures 19, 70L:
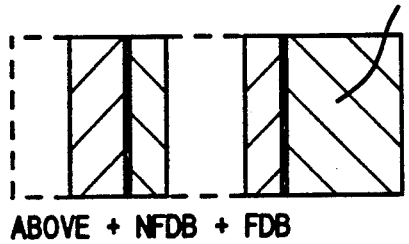
Figures 19, 70R:
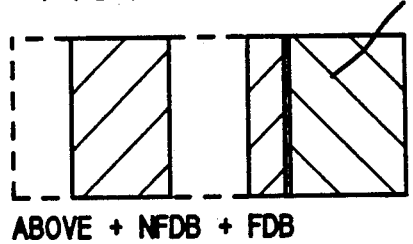
Figures 19, 71L:
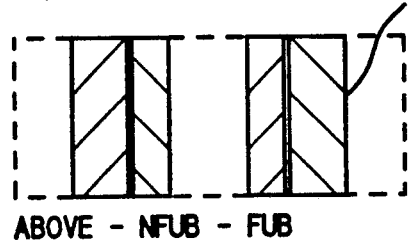
Figures 19, 71R:
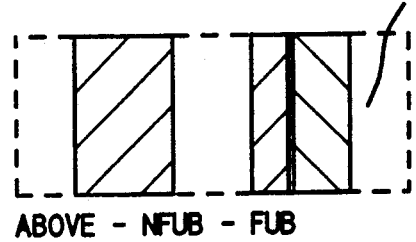
Figures 19, 72L:
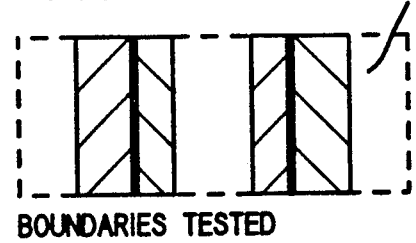
Figures 19, 72R:
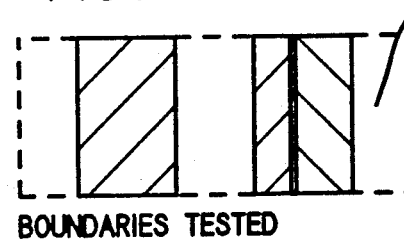
Figures 19, 73L:
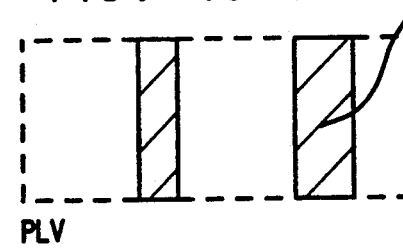
Figures 19, 73R:
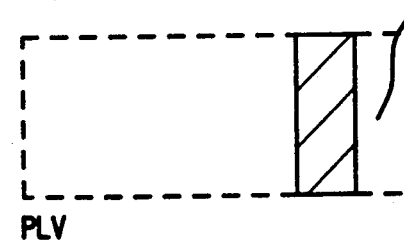
Figures 19, 74L:
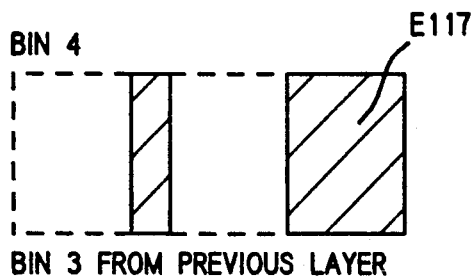
Figures 19, 74R:
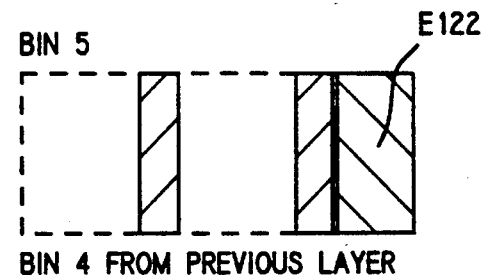
Figures 19, 75L:
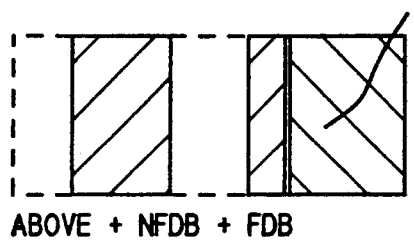
Figures 19, 75R:
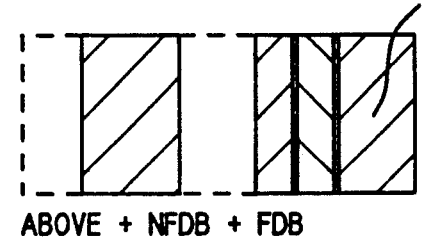
Figures 19, 76L:
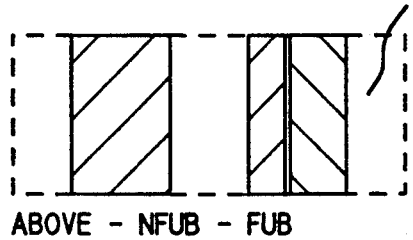
Figures 19, 76R:
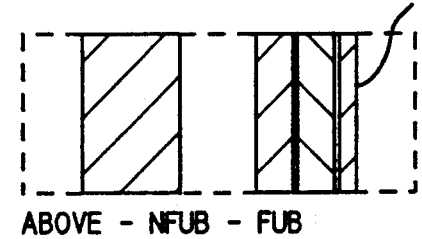
Figures 19, 77L:
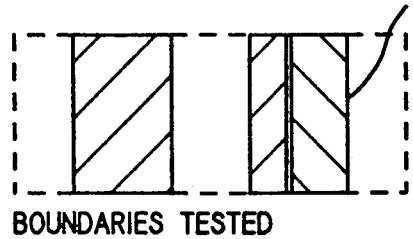
Figures 19, 77R:
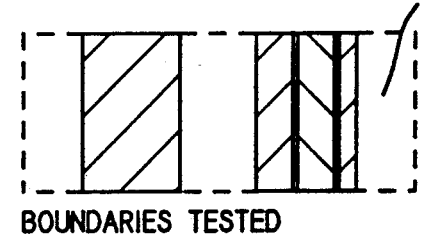
Figures 19, 78L:
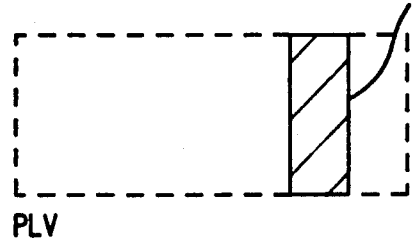
Figures 19, 78R:
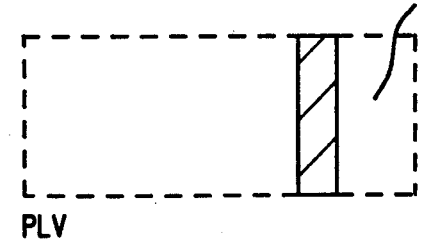
Figures 19, 79L:
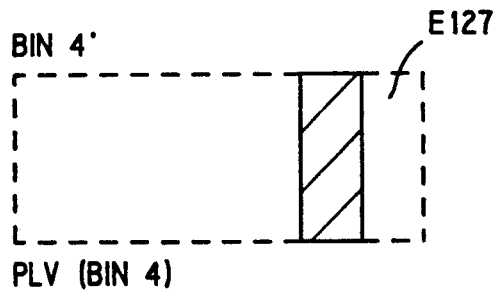
Figures 19, 79R:
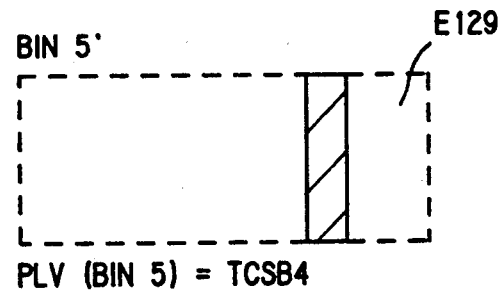
Figures 19, 80L:
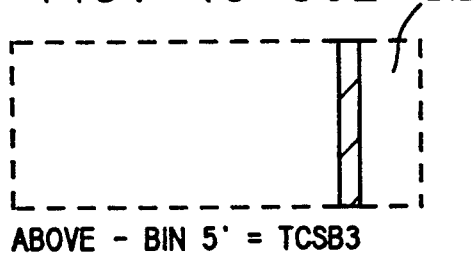
Figures 19, 81L:
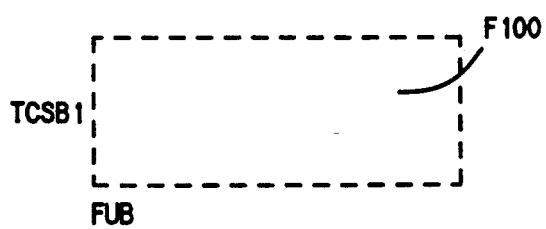
Figures 19, 81R:
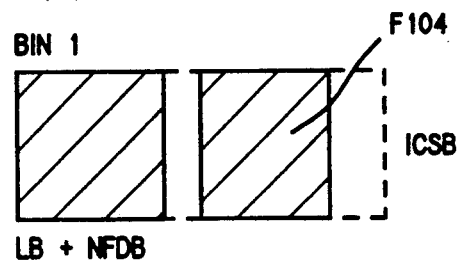
Figures 19, 82L:
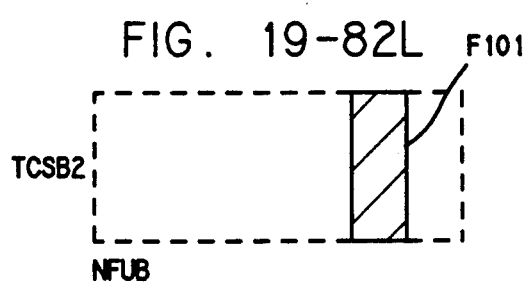
Figures 19, 82R:
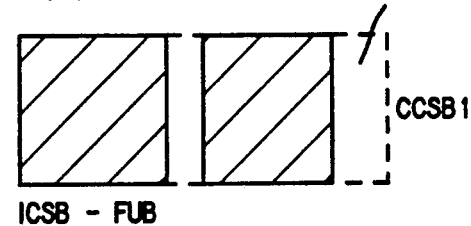
Figures 19, 83L:
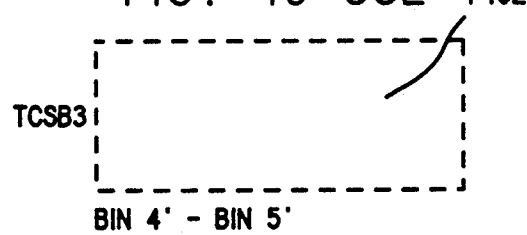
Figures 19, 83R:
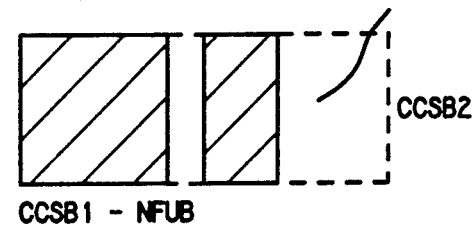
Figures 19, 84L:
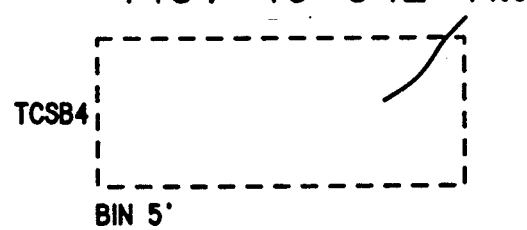
Figures 19, 85L:
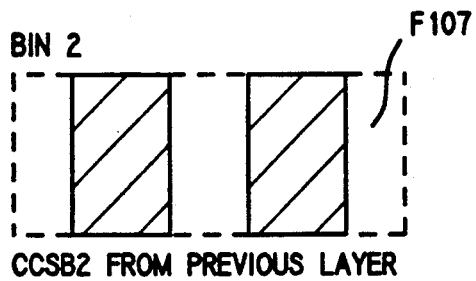
Figures 19, 85R:
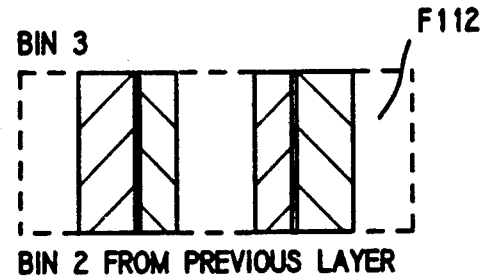
Figures 19, 86L:
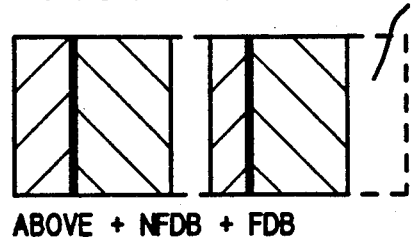
Figures 19, 86R:
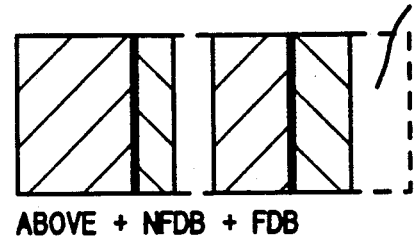
Figures 19, 87L:
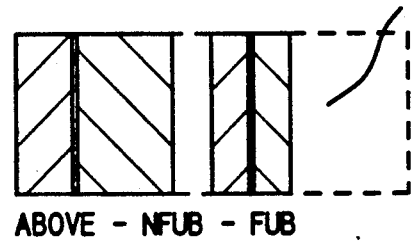
Figures 19, 87R:
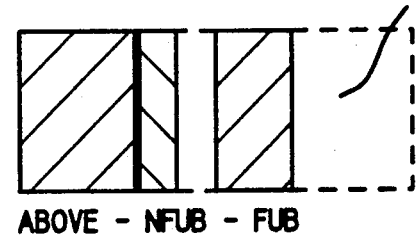
Figures 19, 88L:
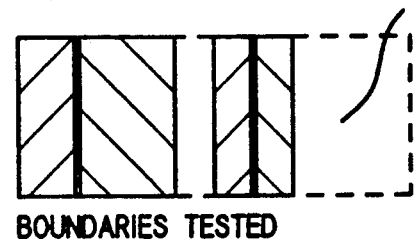
Figures 19, 88R:
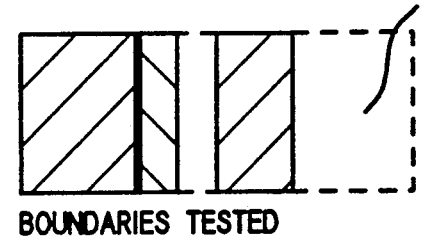
Figures 19, 89L:
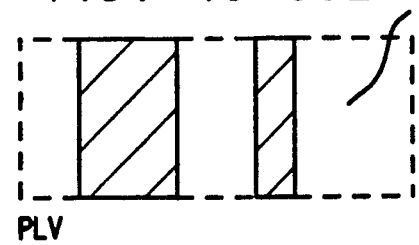
Figures 19, 89R:
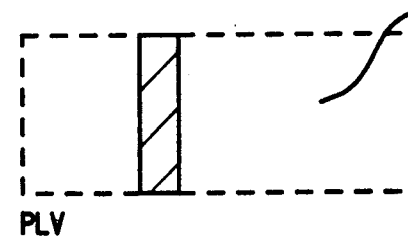
Figures 19, 90L:
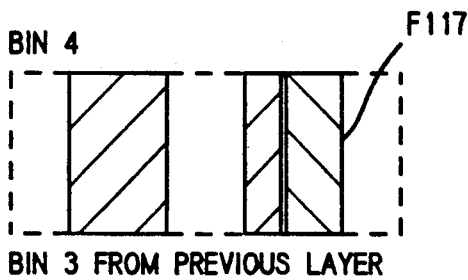
Figures 19, 90R:
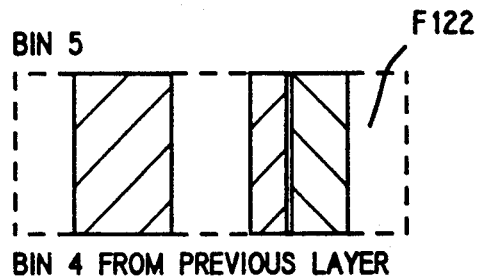
Figures 19, 91L:
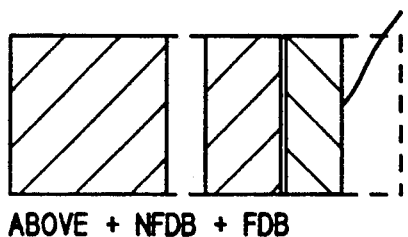
Figures 19, 91R:
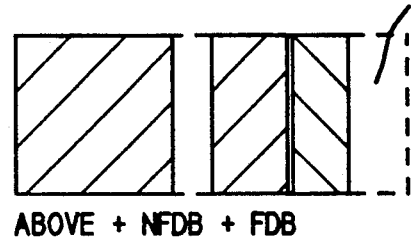
Figures 19, 92L:
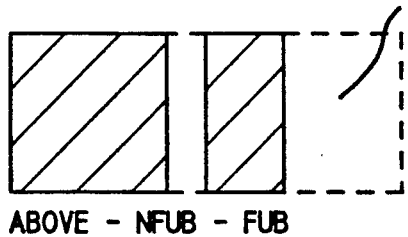
Figures 19, 92R:
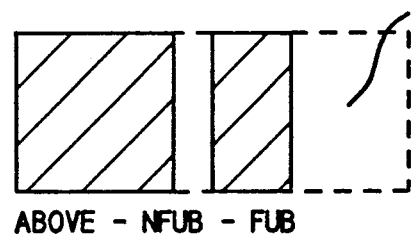
Figures 19, 93L:
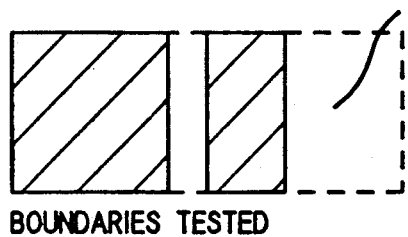
Figures 19, 93R:
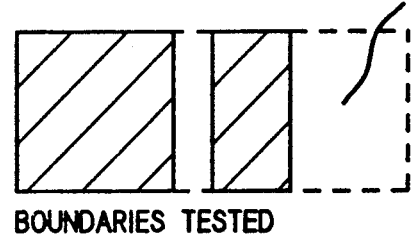
Figures 19, 94L:
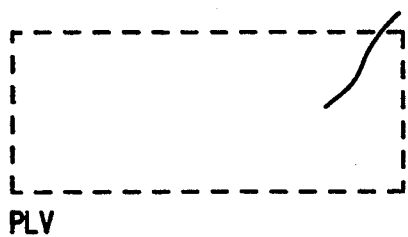
Figures 19, 94R:
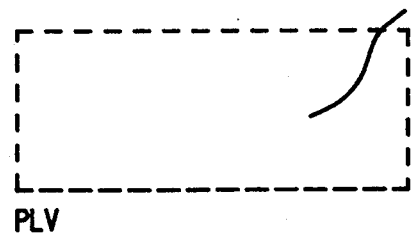
Figures 19, 95L:
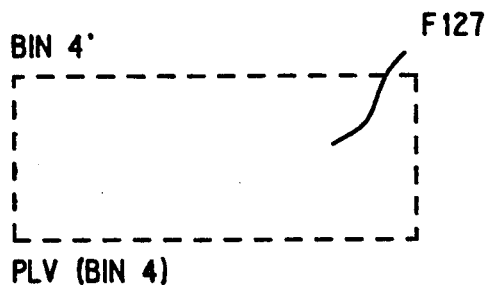
Figures 19, 95R:
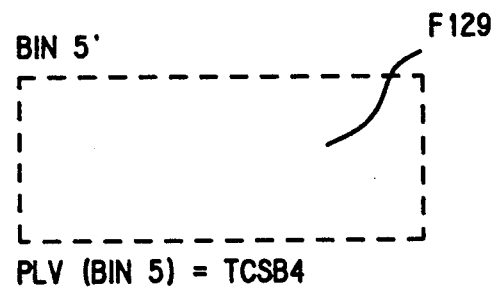
Figures 19, 96L:
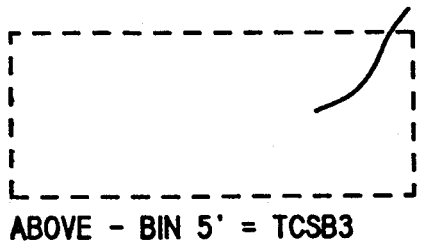
Figures 19, 97L:
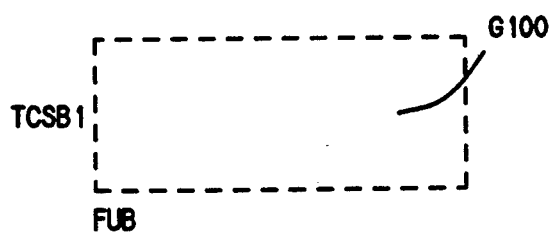
Figures 19, 97R:
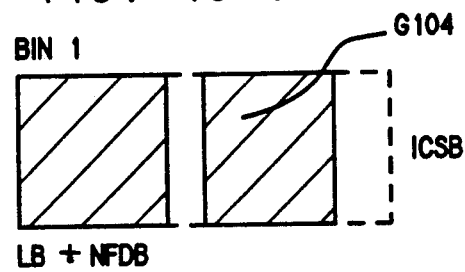
Figures 19, 98L:
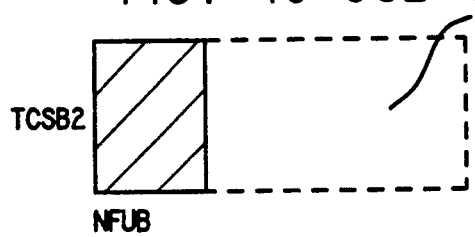
Figures 19, 98R:
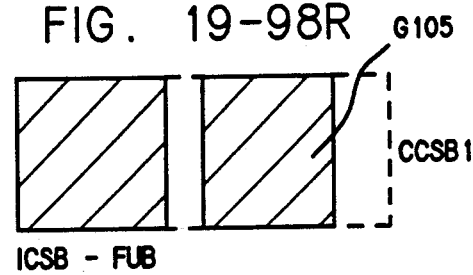
Figures 19, 99L:
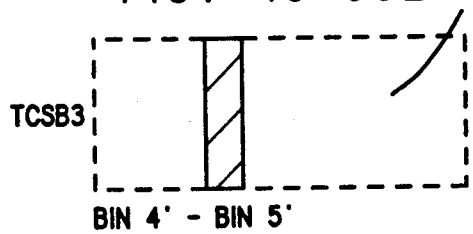
Figures 19, 99R:
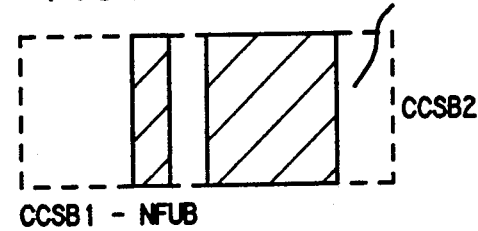
Figures 19, 100L:
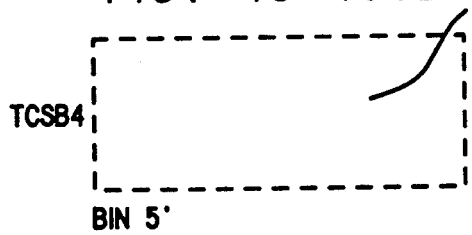
Figures 19, 101L:
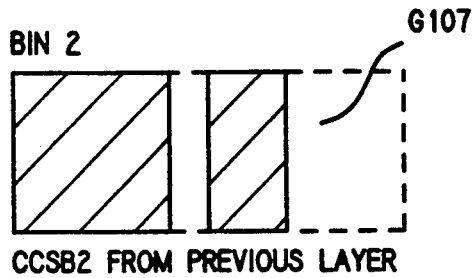
Figures 19, 101R:
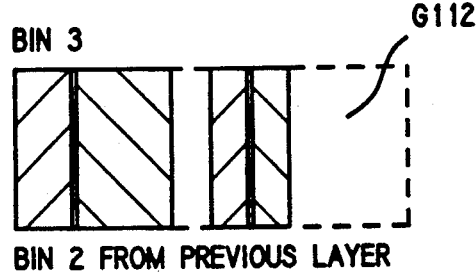
Figures 19, 102L:
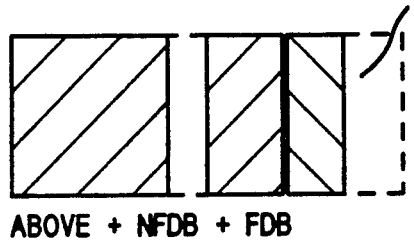
Figures 19, 102R:
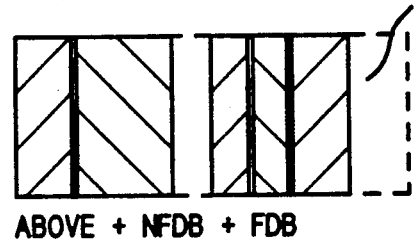
Figures 19, 103L:
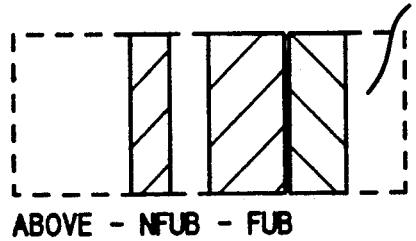
Figures 19, 103R:
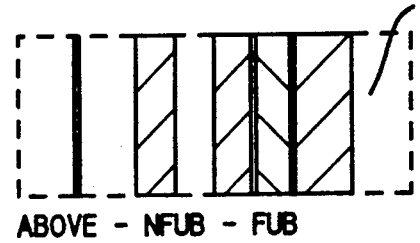
Figures 19, 104L:
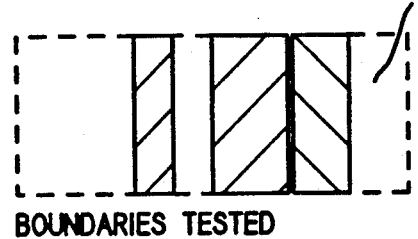
Figures 19, 104R:
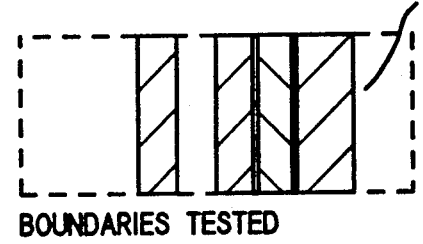
Figures 19, 105L:
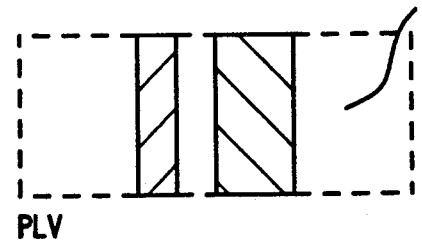
Figures 19, 105R:
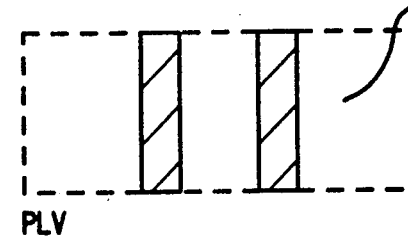
Figures 19, 106L:
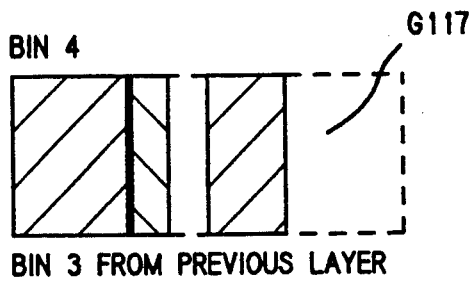
Figures 19, 106R:
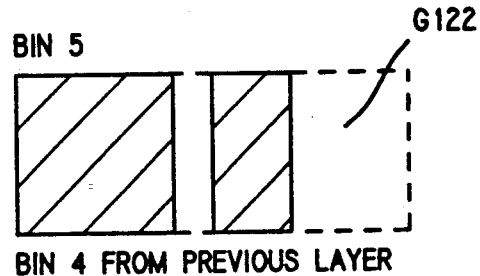
Figures 19, 107L:
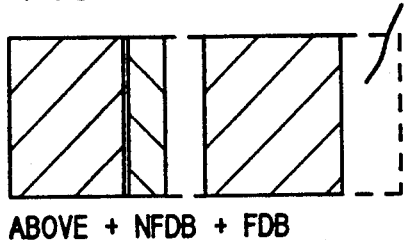
Figures 19, 107R:
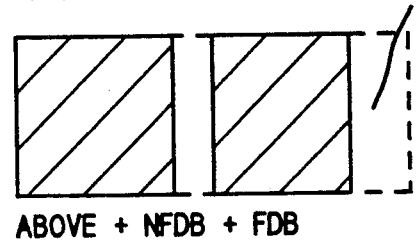
Figures 19, 108L:
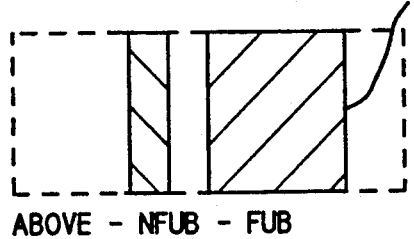
Figures 19, 108R:
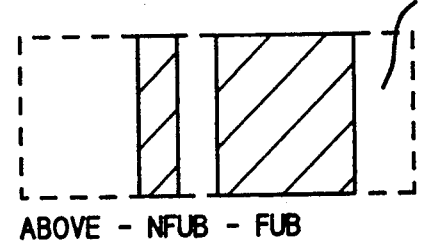
Figures 19, 109L:
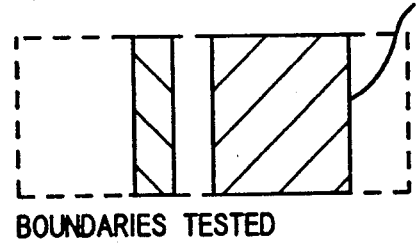
Figures 19, 109R:
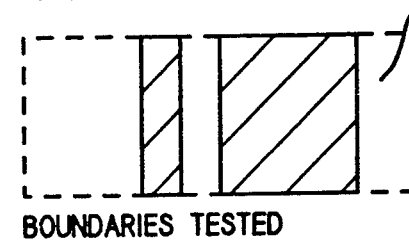
Figures 19, 110L:
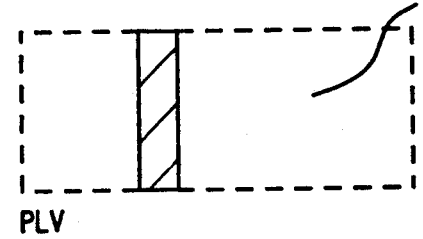
Figures 19, 110R:
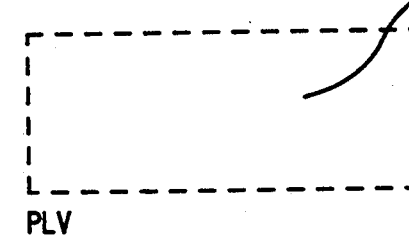
Figures 19, 111L:
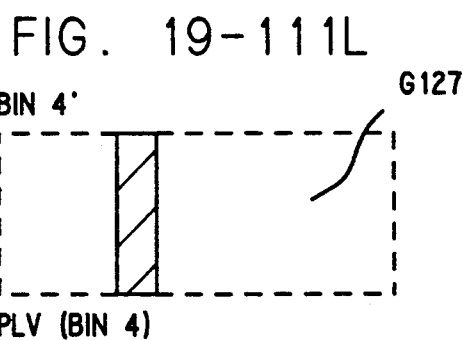
Figures 19, 111R:
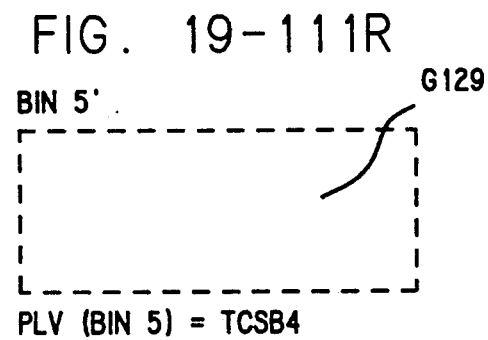
Figures 19, 112L:
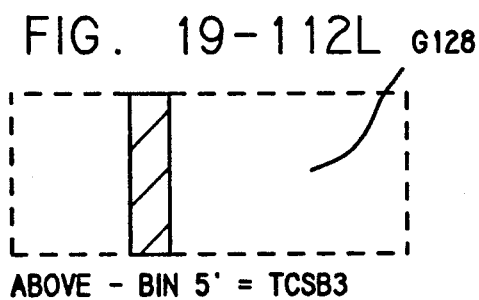
Figures 19, 113L:
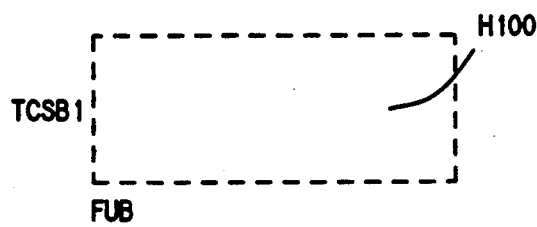
Figures 19, 113R:
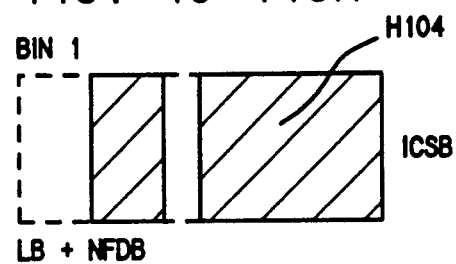
Figures 19, 114L:
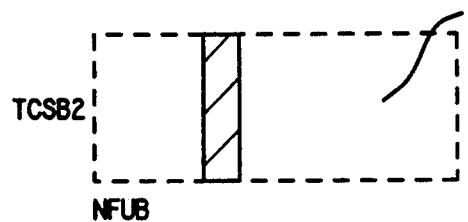
Figures 19, 114R:
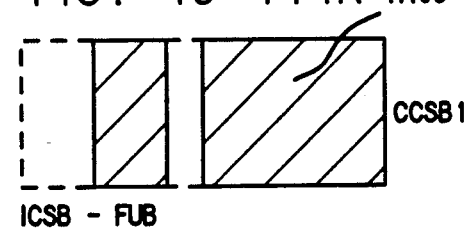
Figures 19, 115L:
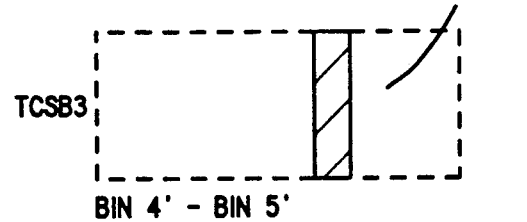
Figures 19, 115R:
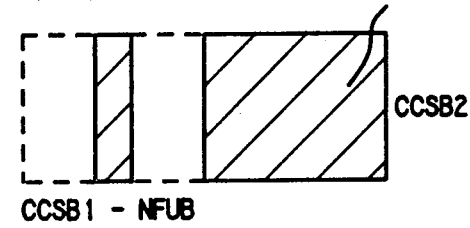
Figures 19, 116L:
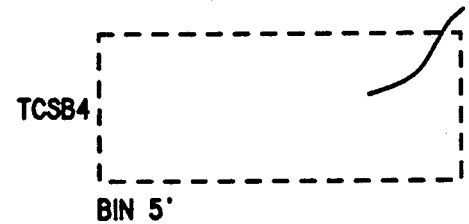
Figures 19, 127L:
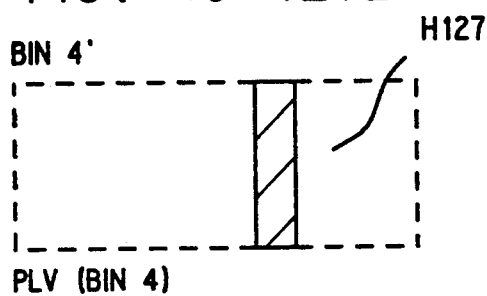
Figures 19, 127R:
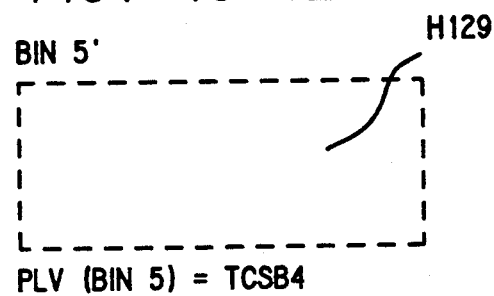
Figures 19, 128L:
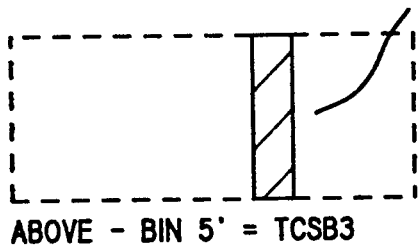
Figures 19, 129L:
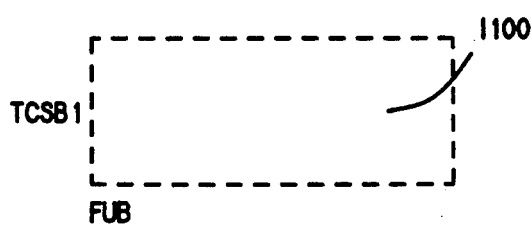
Figures 19, 129R:
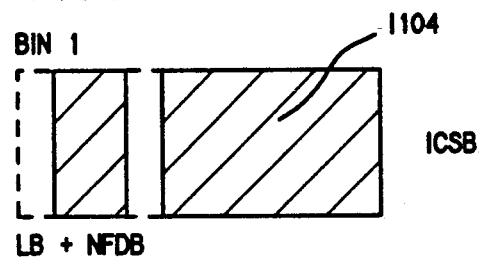
Figures 19, 130L:
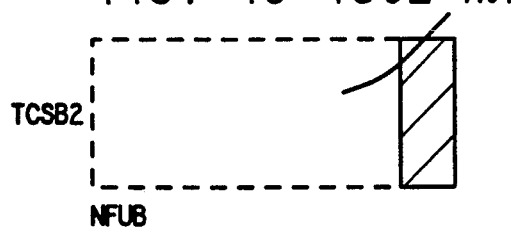
Figures 19, 130R:
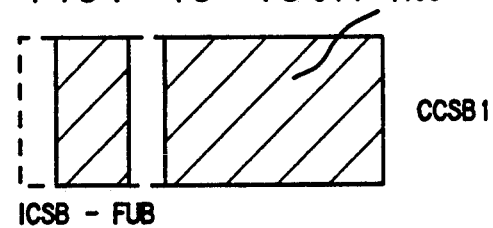
Figures 19, 131L:
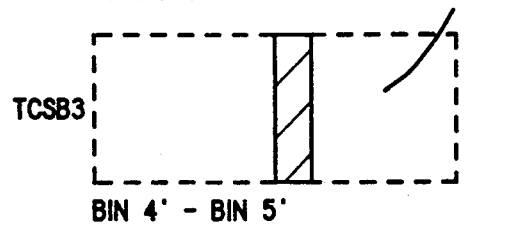
Figures 19, 131R:
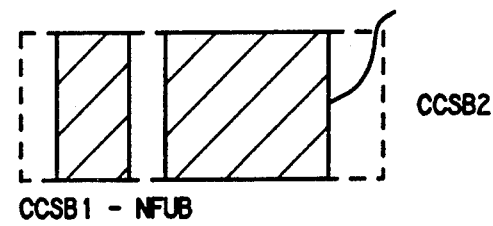
Figures 19, 132L:
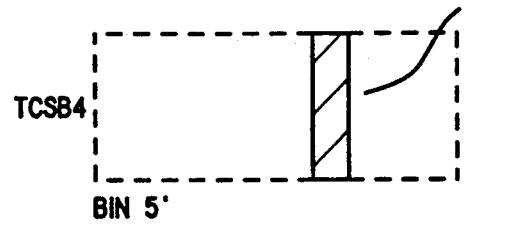
Figures 19, 133L:
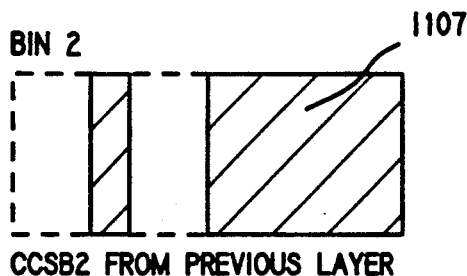
Figures 19, 133R:
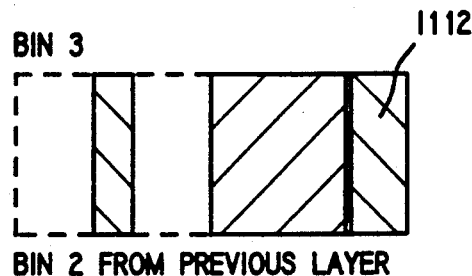
Figures 19, 134L:
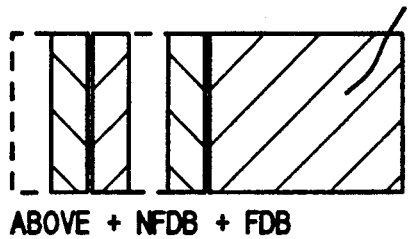
Figures 19, 134R:
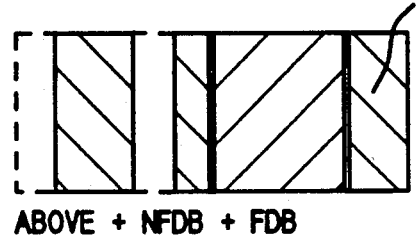
Figures 19, 135L:
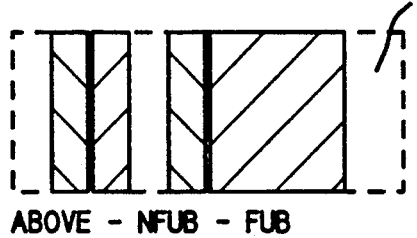
Figures 19, 135R:
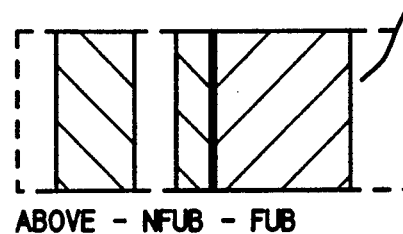
Figures 19, 136L:
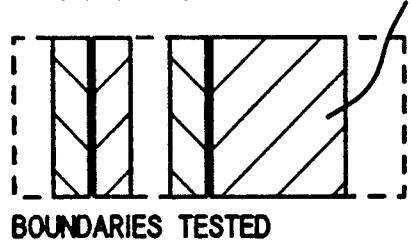
Figures 19, 136R:
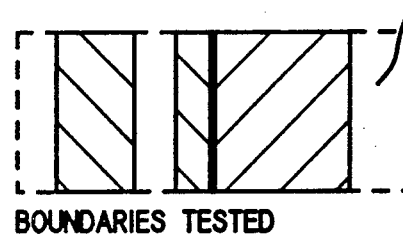
Figures 19, 137L:
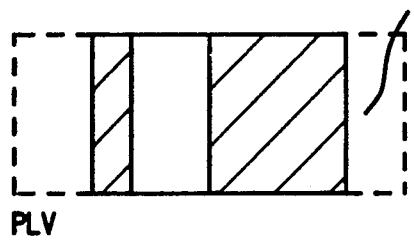
Figures 19, 137R:
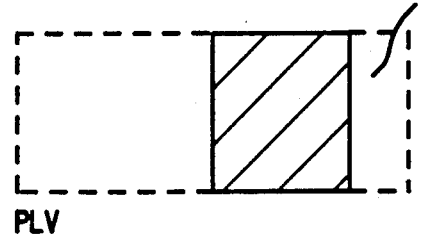
Figures 19, 138L:
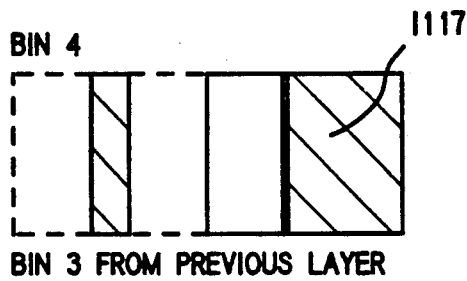
Figures 19, 138R:
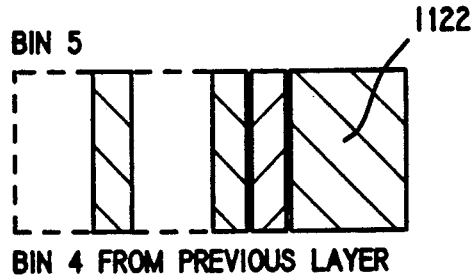
Figures 19, 139L:
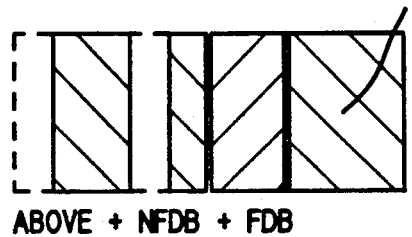
Figures 19, 139R:
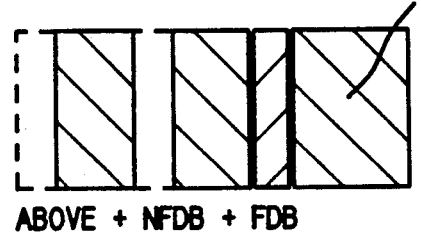
Figures 19, 140L:
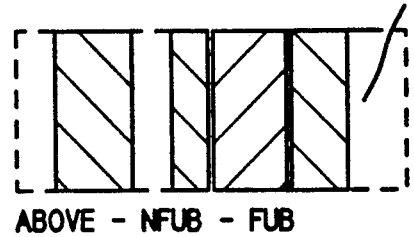
Figures 19, 140R:
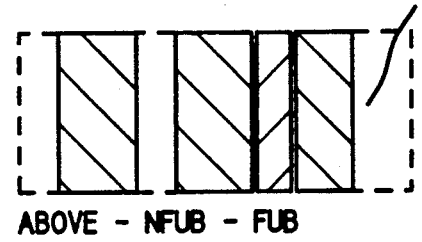
Figures 19, 141L:
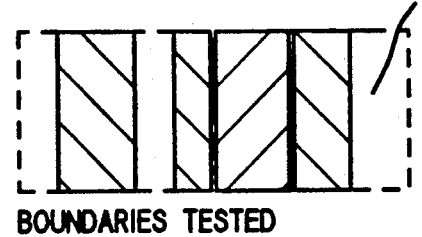
Figures 19, 141R:
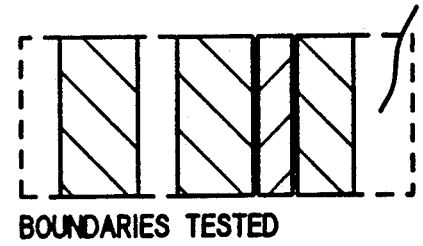
Figures 19, 142L:
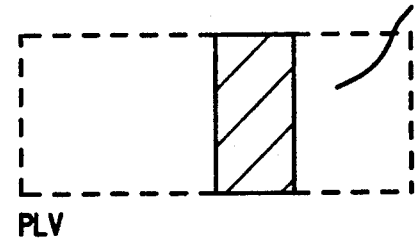
Figures 19, 142R:
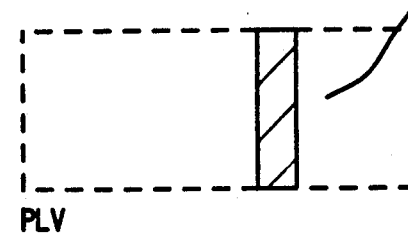
Figures 19, 143L:
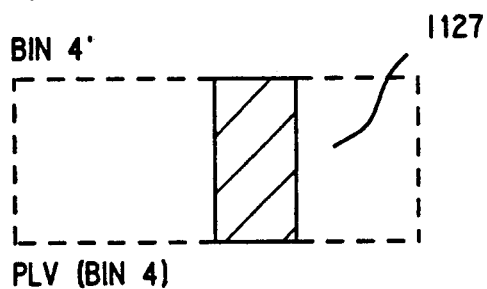
Figures 19, 143R:
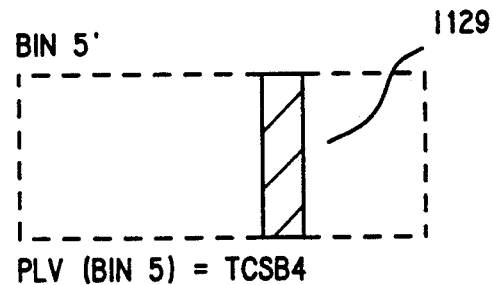
Figures 19, 144L:
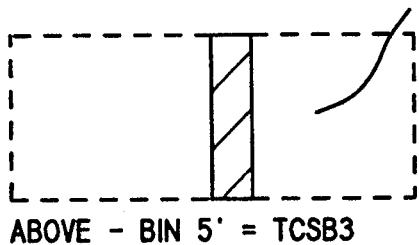
Figures 19, 145L:
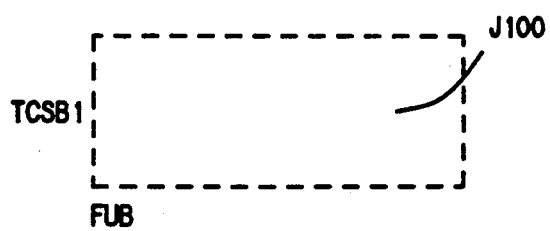
Figures 19, 145R:
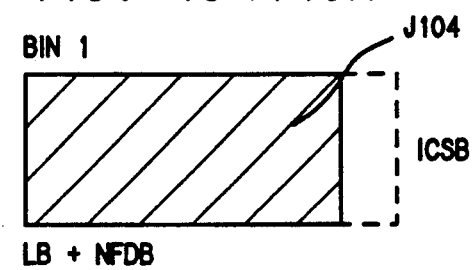
Figures 19, 146L:
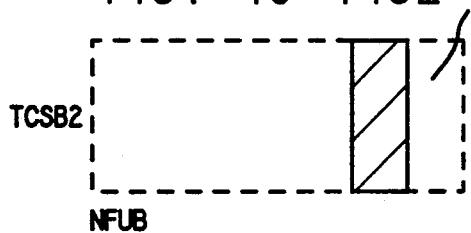
Figures 19, 146R:
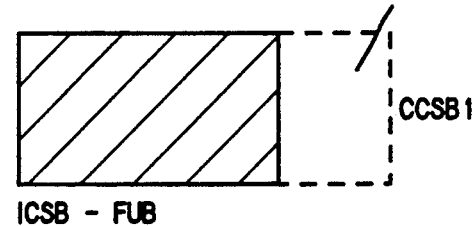
Figures 19, 147L:
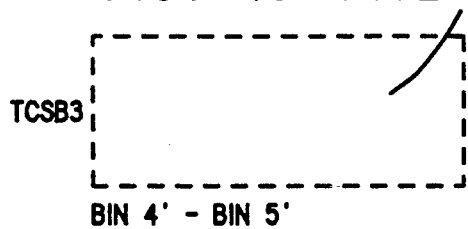
Figures 19, 147R:
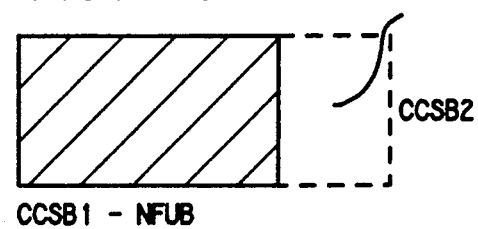
Figures 19, 148L:
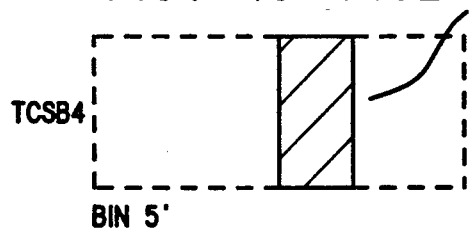
Figures 19, 149L:
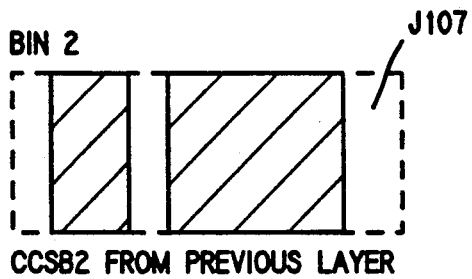
Figures 19, 149R:
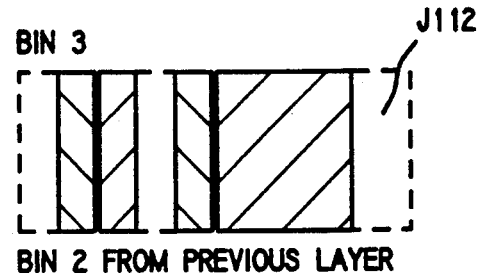
Figures 19, 150L:
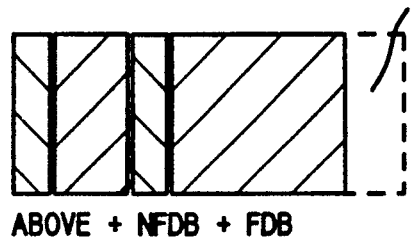
Figures 19, 150R:
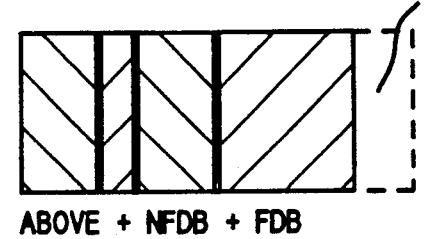
Figures 19, 151L:
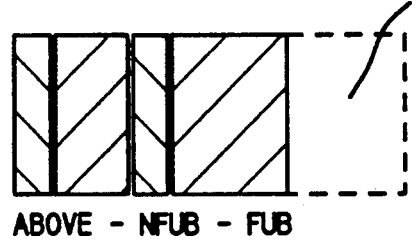
Figures 19, 151R:
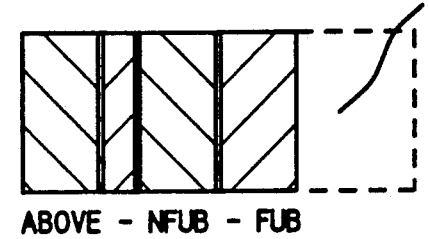
Figures 19, 152L:
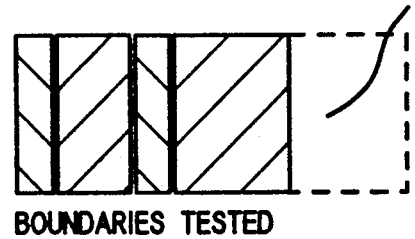
Figures 19, 152R:
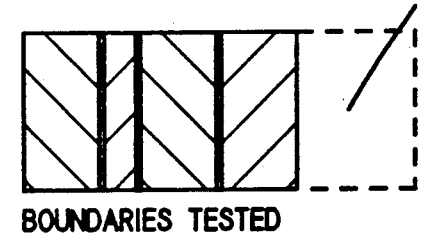
Figures 19, 153L:
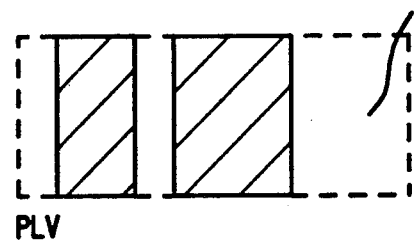
Figures 19, 153R:
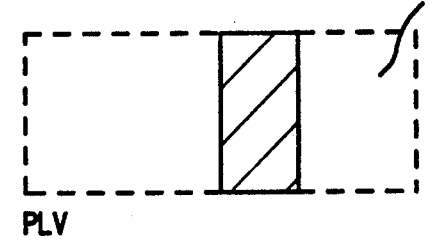
Figures 19, 161L:
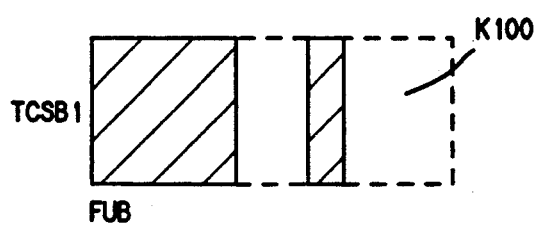
Figures 19, 161R:
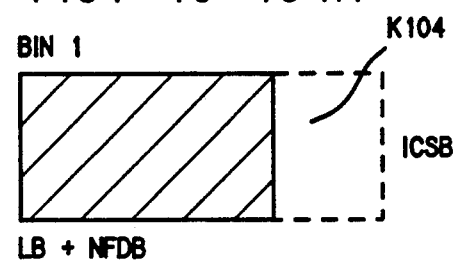
Figures 19, 162L:
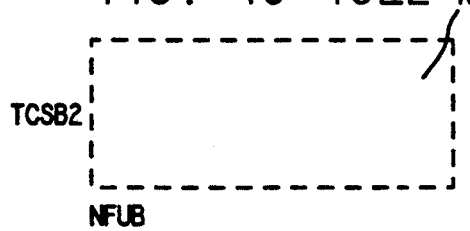
Figures 19, 162R:
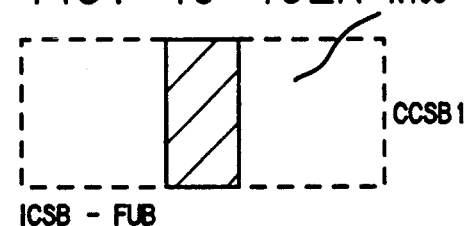
Figures 19, 163L:
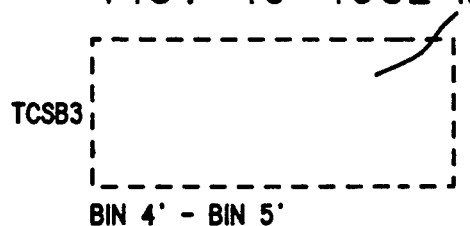
Figures 19, 163R:
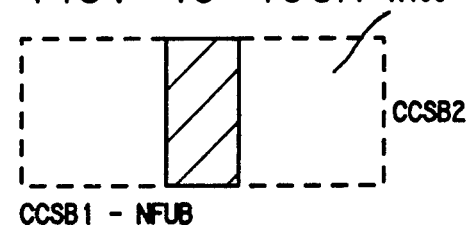
Figures 19, 164L:
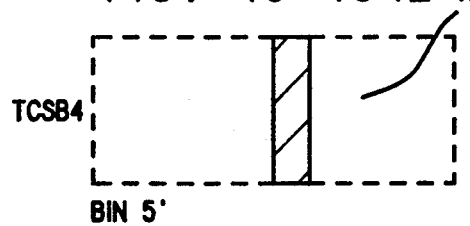
Figures 19, 165L:
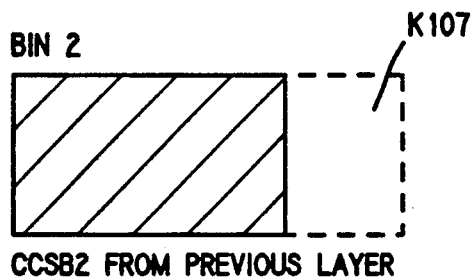
Figures 19, 165R:
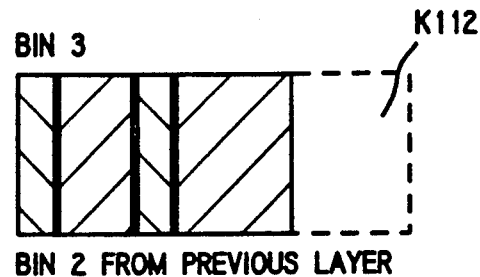
Figures 19, 166L:
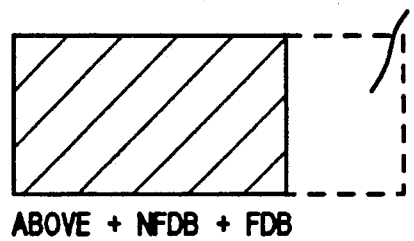
Figures 19, 166R:
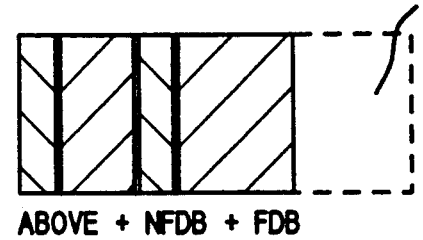
Figures 19, 167L:
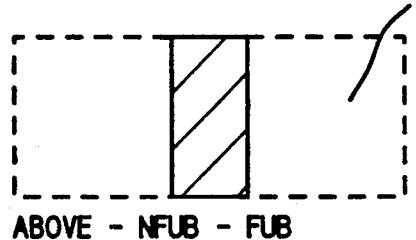
Figures 19, 167R:
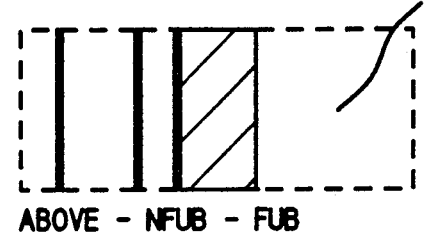
Figures 19, 168L:
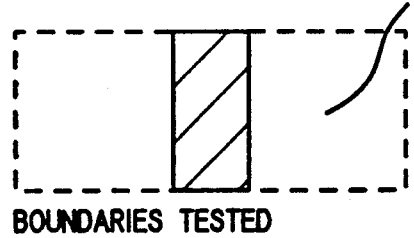
Figures 19, 168R:
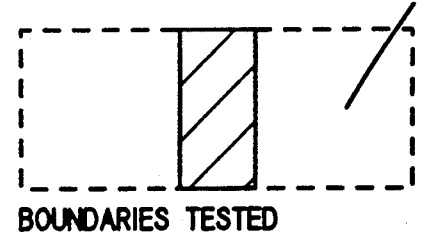
Figures 19, 169L:
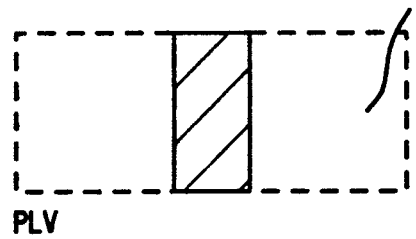
Figures 19, 169R:
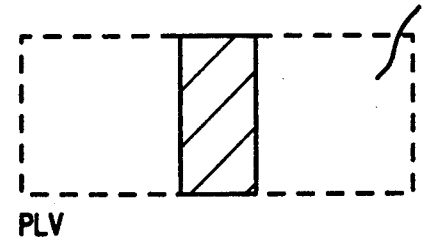
Figures 19, 177L:
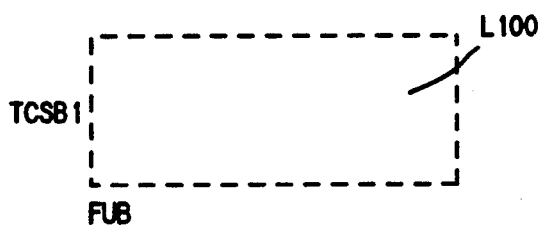
Figures 19, 177R:
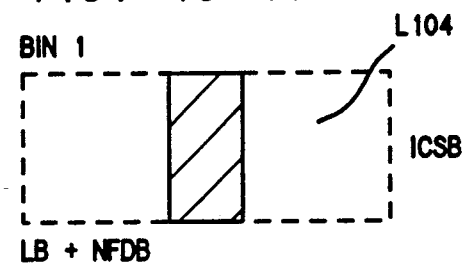
Figures 19, 178L:
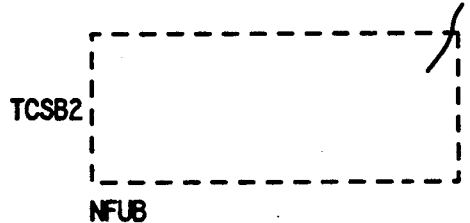
Figures 19, 178R:
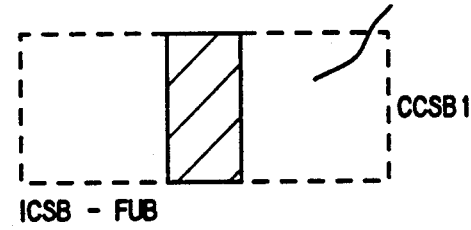
Figures 19, 179L:
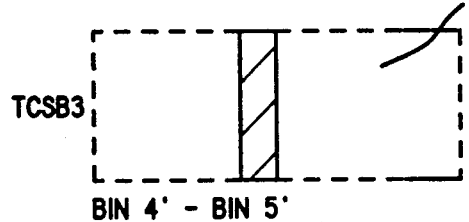
Figures 19, 179R:
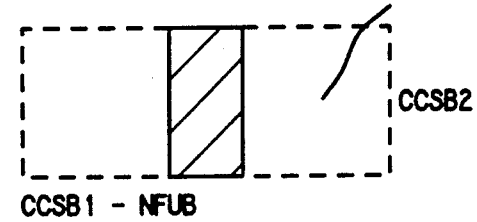
Figures 19, 180L:
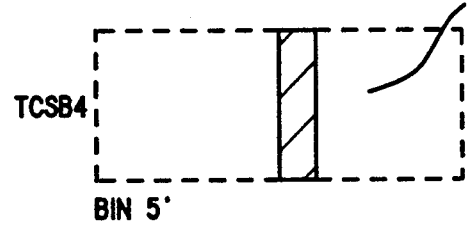
Figures 19, 186L:
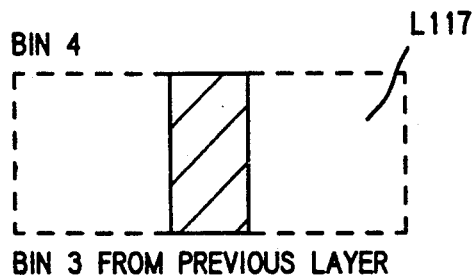
Figures 19, 186R:
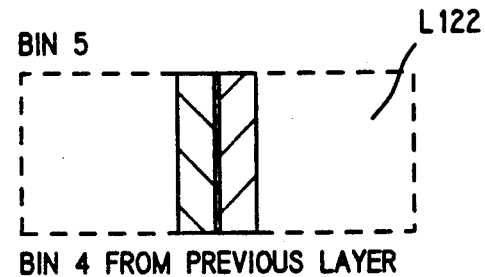
Figures 19, 187L:
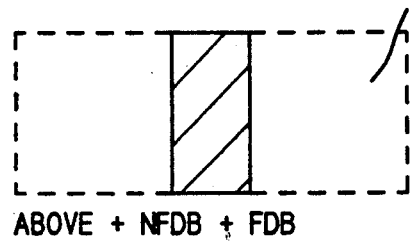
Figures 19, 187R:
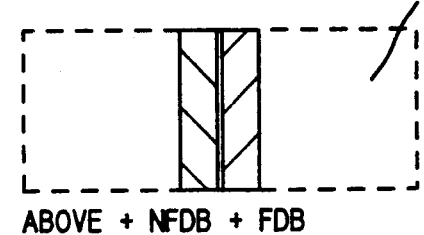
Figures 19, 188L:
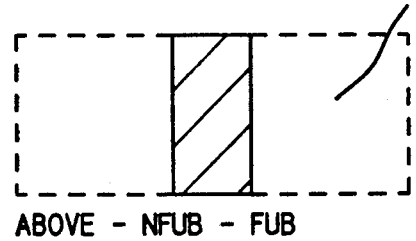
Figures 19, 188R:
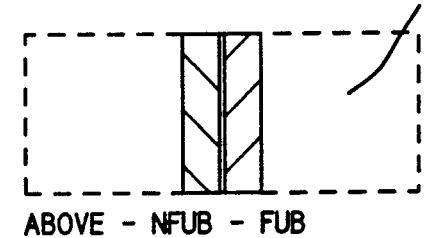
Figures 19, 189L:
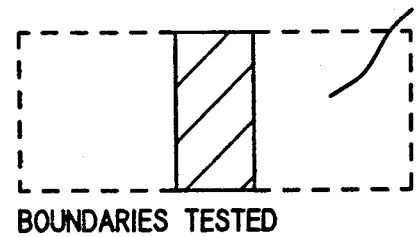
Figures 19, 189R:
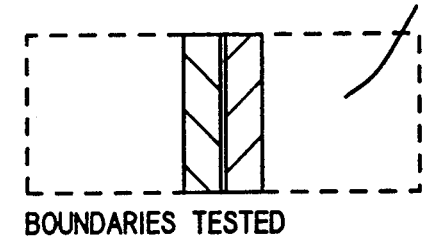
Figures 19, 190L:
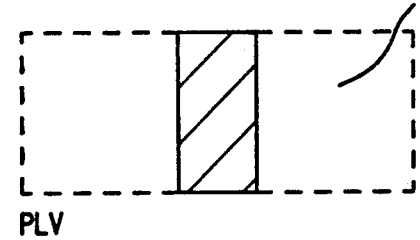
Figures 19, 190R:
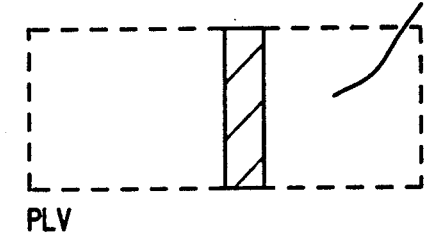
Figures 19, 191L:
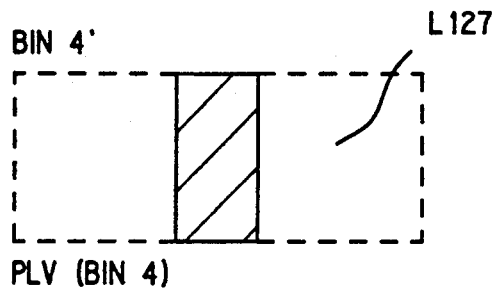
Figures 19, 191R:
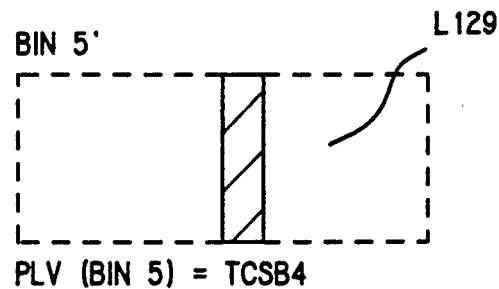
Figures 19, 192L:
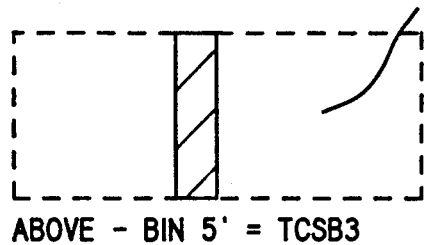
Figures 19, 193L:
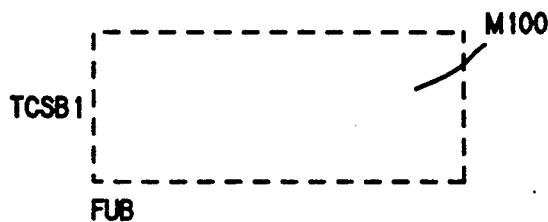
Figures 19, 193R:
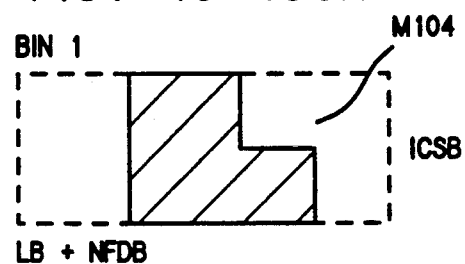
Figures 19, 194L:
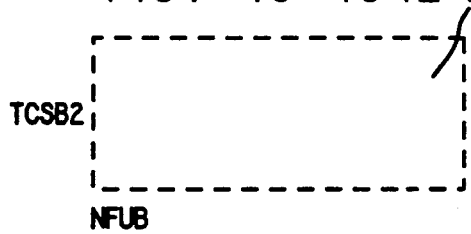
Figures 19, 194R:
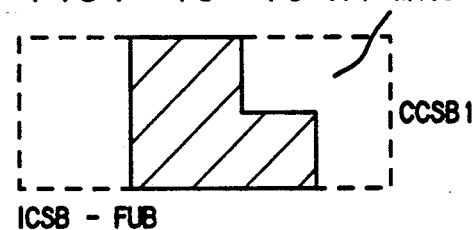
Figures 19, 195L:
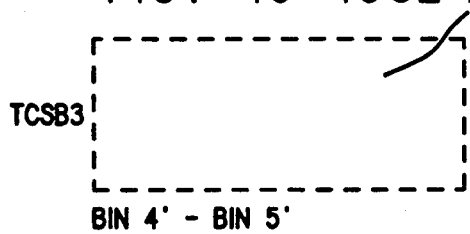
Figures 19, 195R:
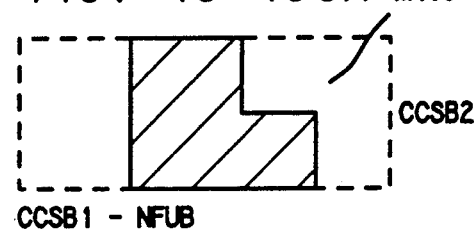
Figures 19, 196L:
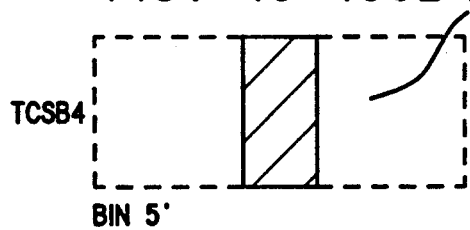
Figures 19, 202L:
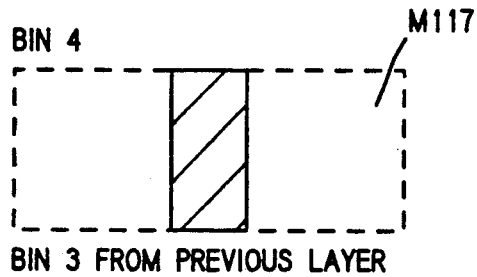
Figures 19, 202R:
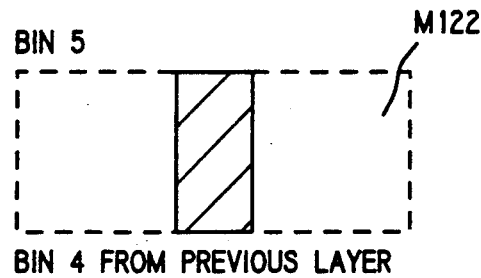
Figures 19, 203L:
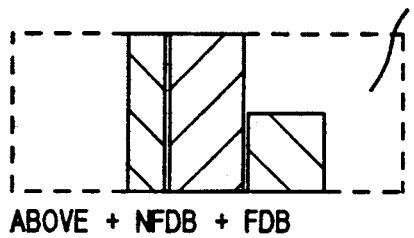
Figures 19, 203R:
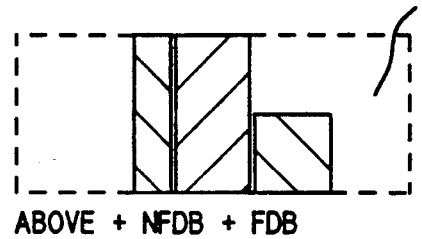
Figures 19, 204L:
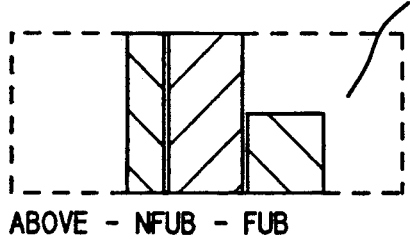
Figures 19, 204R:
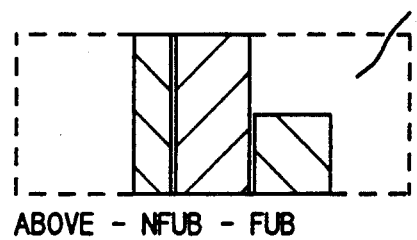
Figures 19, 205L:
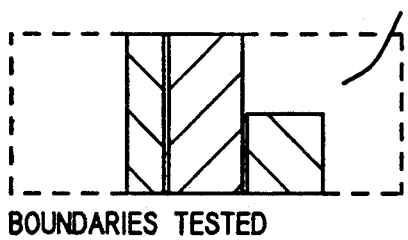
Figures 19, 205R:
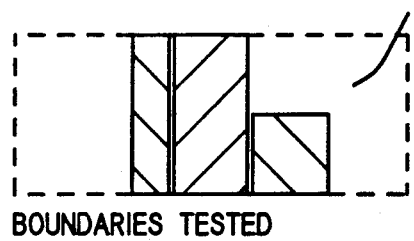
Figures 19, 206L:
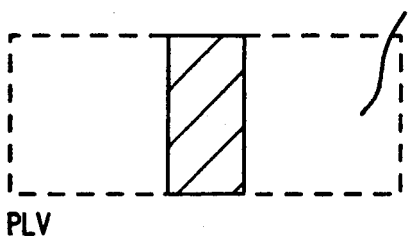
Figures 19, 206R:
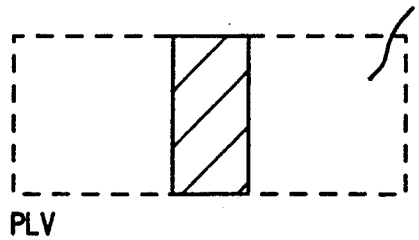
Figures 19, 207L:
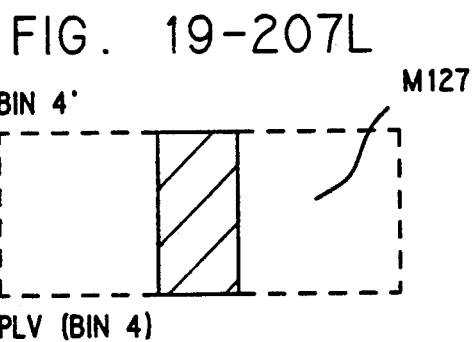
Figures 19, 207R:
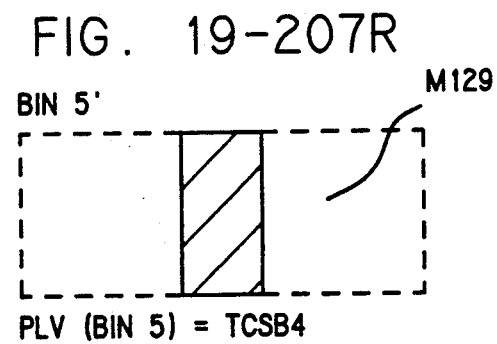
Figures 19, 208L:
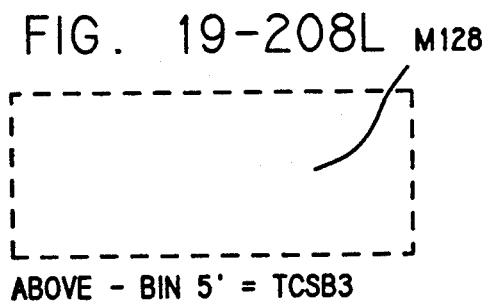
Figures 19, 209L:
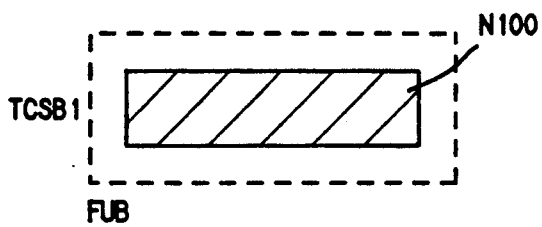
Figures 19, 209R:
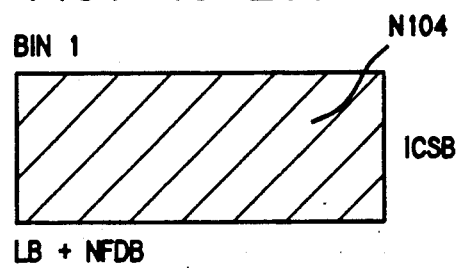
Figures 19, 210L:
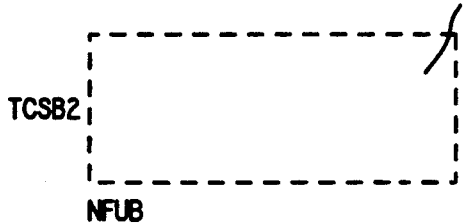
Figures 19, 210R:
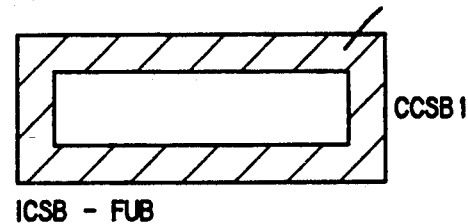
Figures 19, 211L:
Figures 19, 211R:
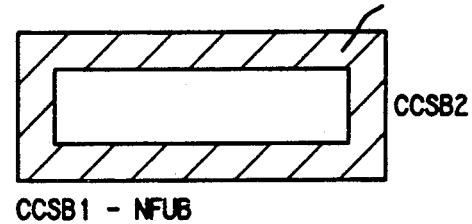
Figures 19, 212L:
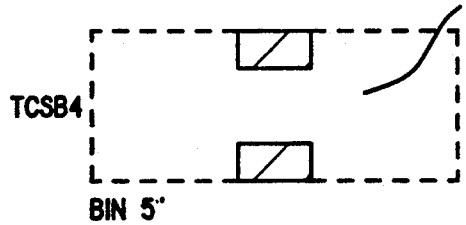
Figures 19, 213L:
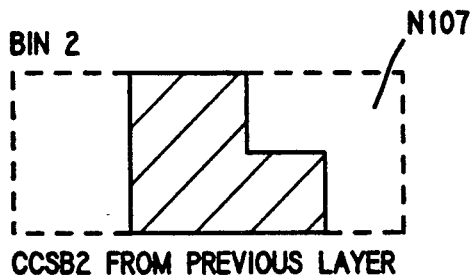
Figures 19, 213R:
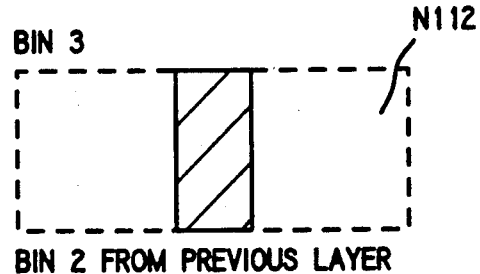
Figures 19, 214L:
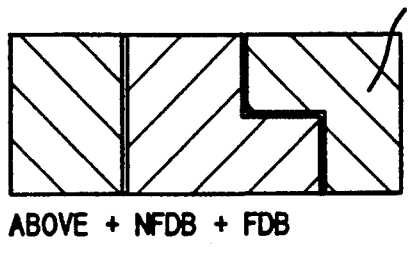
Figures 19, 214R:
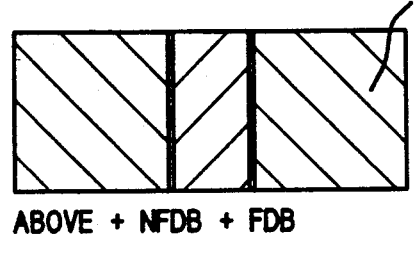
Figures 19, 215L:
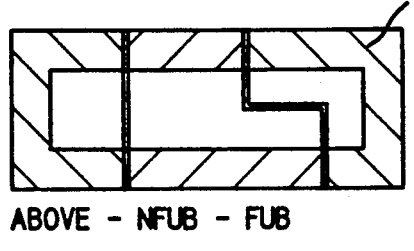
Figures 19, 215R:
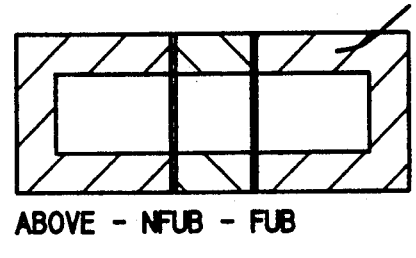
Figures 19, 216L:
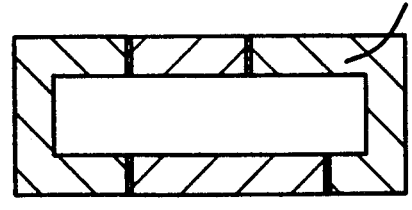
Figures 19, 216R:
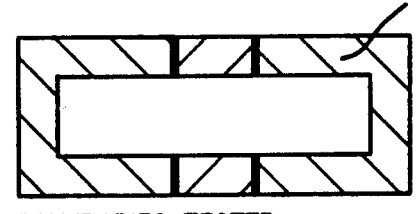
Figures 19, 217L:
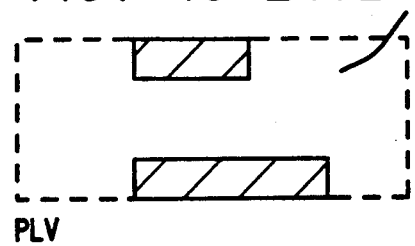
Figures 19, 217R:
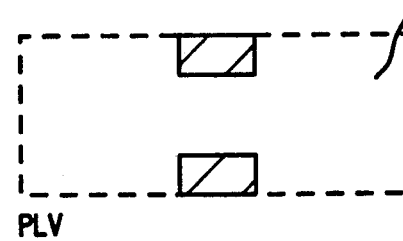
Figures 19, 223L:
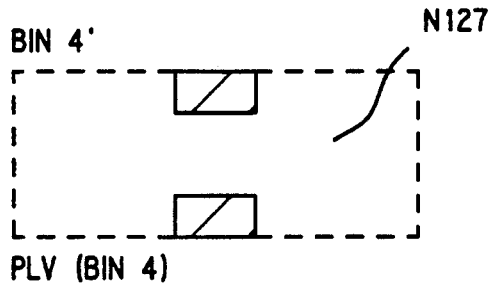
Figures 19, 223R:
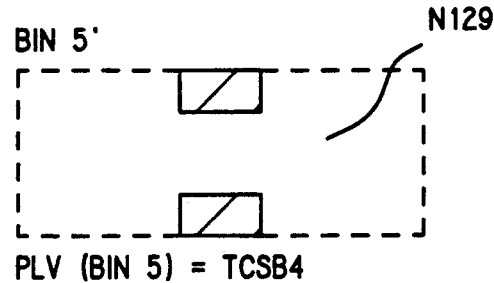
Figures 19, 224L:
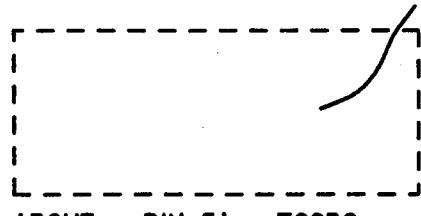
Figures 19, 225L:
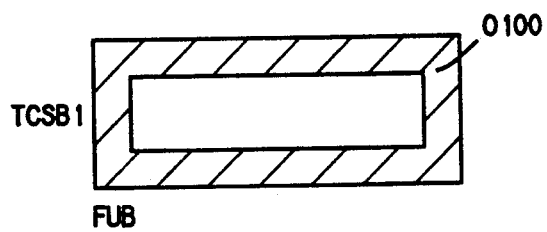
Figures 19, 225R:
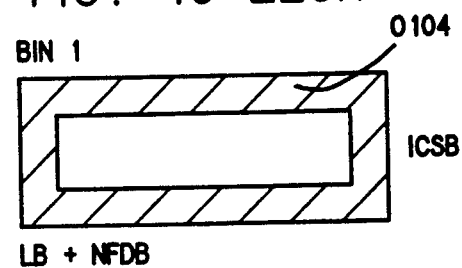
Figures 19, 226L:
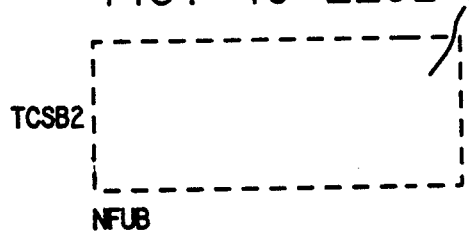
Figures 19, 226R:
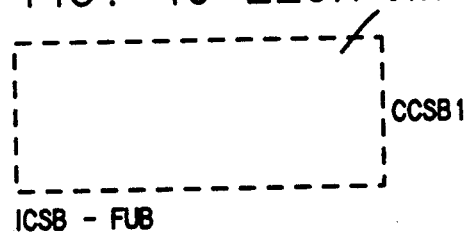
Figures 19, 227L:
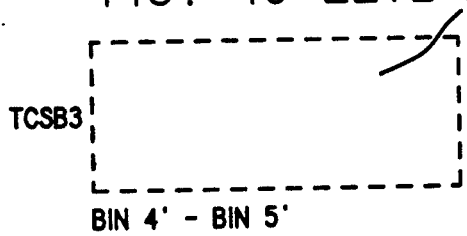
Figures 19, 227R:
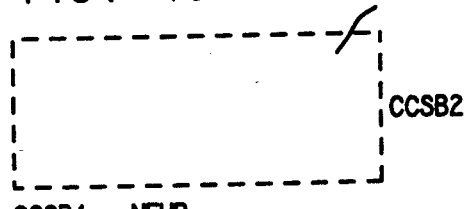
Figures 19, 228L:
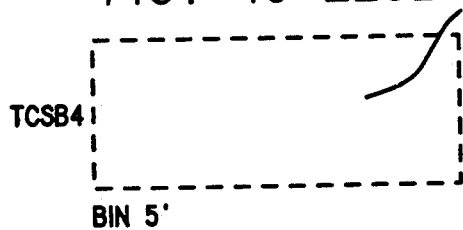
Figures 19, 229L:
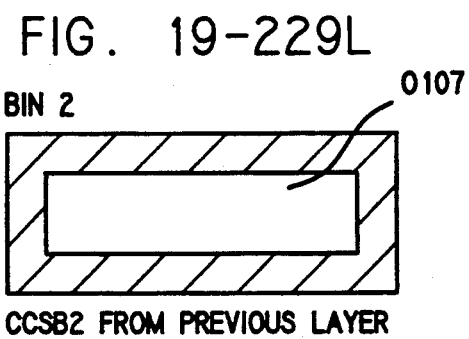
Figures 19, 229R:
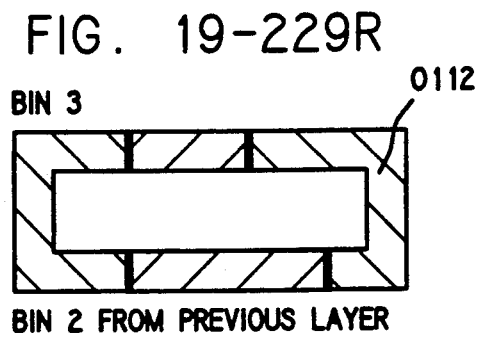
Figures 19, 230L:
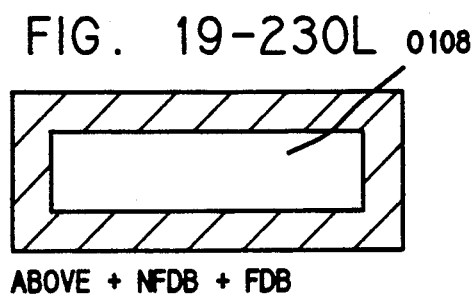
Figures 19, 230R:
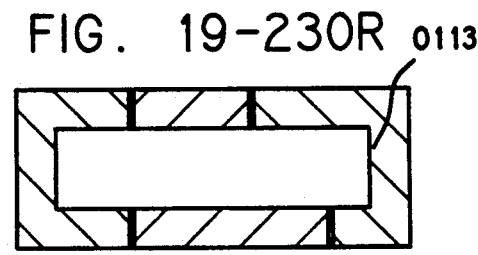
Figures 19, 231L:
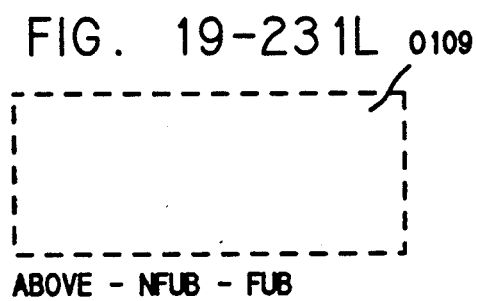
Figures 19, 231R:
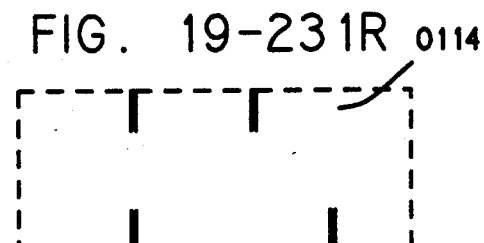
Figures 19, 232L:
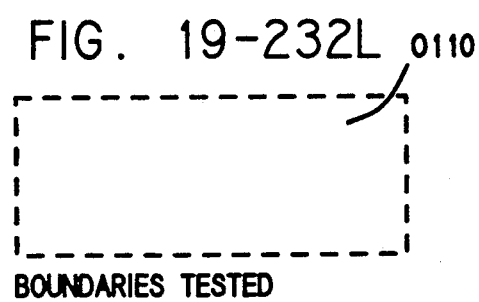
Figures 19, 232R:
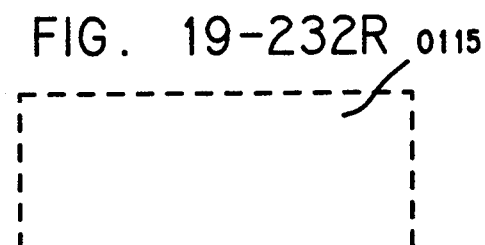
Figures 19, 233L:
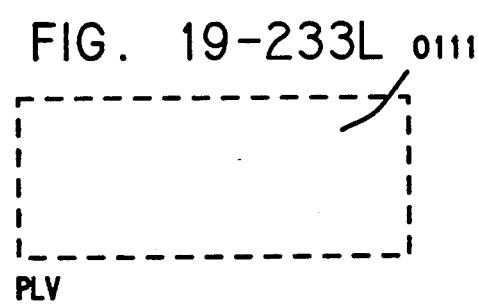
Figures 19, 233R:
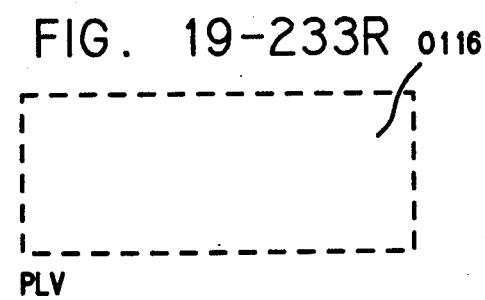
Figures 19, 234L:
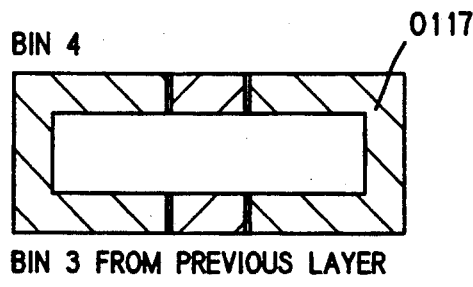
Figures 19, 234R:
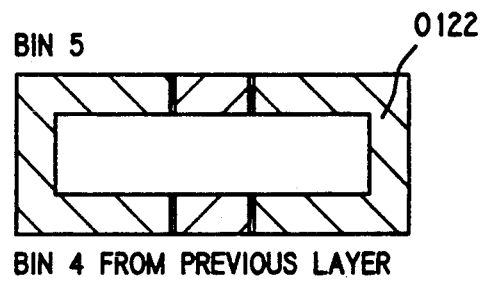
Figures 19, 235L:
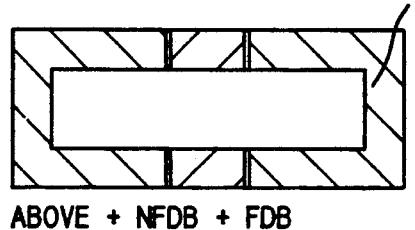
Figures 19, 235R:
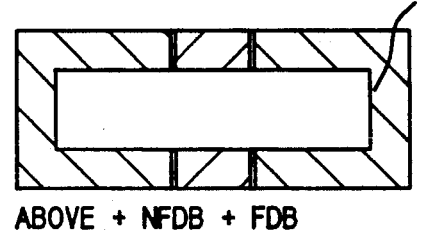
Figures 19, 236L:
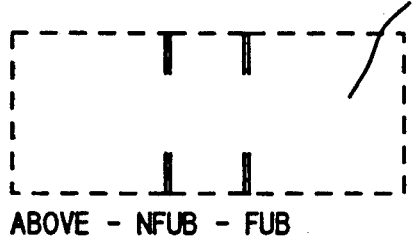
Figures 19, 236R:
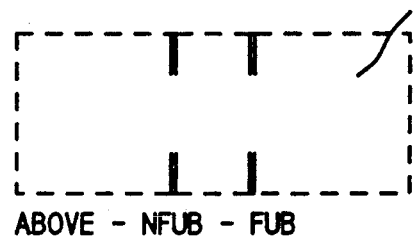
Figures 19, 237L:
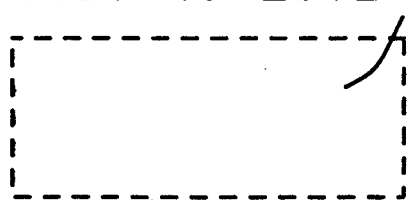
Figures 19, 237R:
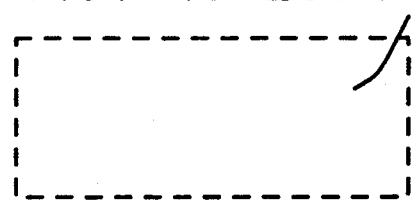
Figures 19, 238L:
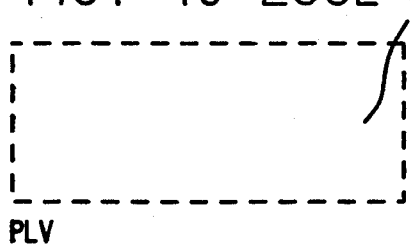
Figures 19, 238R:
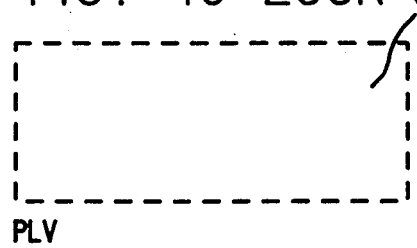
Figures 19, 239L:
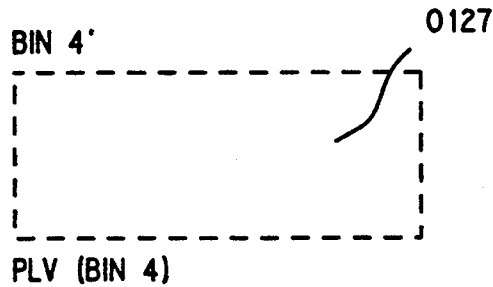
Figures 19, 239R:
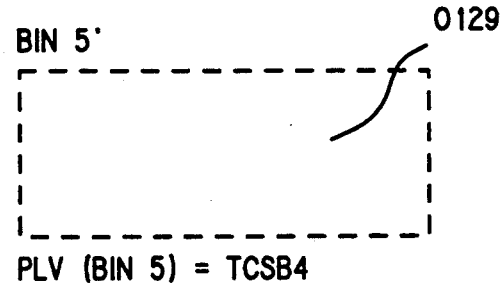
Figures 19, 240L:

FIG. 13e depicts an embodiment where down-facing features are given priority. The down-facing features are cured so that they are formed at the same position they would be formed at if a higher resolution material were being used. In contrast to the embodiment of FIG. 13a, the up-facing features of FIG. 13e are pushed up above the positions they would actually be formed at if a higher resolution material were being used.

FIRST PREFERRED EMBODIMENT

The following description sets forth a first preferred embodiment for obtaining the necessary information associated with each layer. This embodiment is based on the terminology and processing techniques of the Slice program as described in U.S. patent application Ser. No. 07/331,644 as previously referred to and incorporated by reference.

This first preferred embodiment is based on the criteria that curing of features will occur in such away as to give priority to up-facing features (i.e., the second criteria discussed above). Therefore this embodiment is similar to the approach described in terms of FIG. 13a (up-facing priority). This criteria requires that boundary (and fill) information will be output on each cross-section as it is needed for proper placement and cure of up-facing features. If a region of a cross-section does not contain up-facing features, the region may or may not be solidified in association with the current layer. The layer on which the curing of a non-up-facing feature will occur depends on the MSD, the depth that solid extends below the region, and on strength and buildability criteria discussed above (first criteria). Up-facing features will be cured at their proper locations even if this causes the down-facing features to be cured too deep. The object will come out with the proper dimensions except where vertical features become thinner than the MSD and in that case the down-facing features will be inaccurate due to the extra cure.

The first preferred embodiment is implemented by the following processing procedure, which based on the above criteria will yield the highest resolution reproduction possible. This procedure will yield the appropriate cross-sectional information whether or not the object being sliced has vertical features less than the MSD in thickness. The abbreviations and terminology in the following description are explained in detail in U.S. patent application Ser. No. 07/331,644. Other procedures are possible and the following is meant to only represent a single embodiment. A much simpler approach can be used if it is known that the object being sliced has a minimum vertical thickness of solidified material greater than or equal to the MSD.

To implement the building method of the present embodiment (shown in FIG. 13a) we need to cure certain areas on each layer. On each layer we need to cure the following:

1) All areas of FUB (i.e., flat up-facing boundary), including placing of down-facing skin in appropriate regions.

2) All areas of NFUB (i.e., near-flat up-facing boundary), including placing of down-facing skin in appropriate regions.

3) All areas that are N layers thick including the placement of down-facing skin on these layers, where N equals the minimum solidification depth divided by the layer thickness (N=MSD/ZS) For example if the MSD is 40 mils and ZS is 10 mils then N equals 4. We will refer continuously to various examples where N is set to four.

4) All areas that are greater then N layers in thickness.

According to Slice Style 1 (U.S. Pat. No. 5,059,359), the vectors of a cross-section that are actually considered to be involved in the creation of structure for each layer are the LBs (i.e., layer boundaries) and the NFDBs (i.e., near-flat down-facing boundaries). The other block types do not form structure but only indicate where skinning needs to occur. We can combine the area of the LBs with that of the NFDBs to form the Initial Cross section Boundaries (ICSBs). By doing this we will lose information about which areas of a cross-section need a down-facing skin. However, this is not a problem since anytime we cure an area that has a desired thickness less than or equal to the MSD, this method assumes it needs a down-facing skin (actual thickness formed will equal the MSD). It is further noted that the previously discussed figures, as well as those to be discussed hereinafter, depict Style 1 type reproduction, that is, they depict reproductions that may be somewhat oversized in the X and Y dimensions.

RULES FOR A FIRST IMPLEMENTATION OF THE ABOVE DESCRIBED EMBODIMENT

1) Slice the object and obtain FDB (derived from flat down-facing triangles), NFDB (derived from all non-vertical and non-flat down-facing triangles), FUB (derived from flat up-facing triangles), and NFUB (derived from all nonvertical and nonflat up-facing triangles). LB can also be obtained.

a. All triangle vertices are rounded to slicing planes.

b. LB's are obtained from right at the slicing plane using only triangles that proceed above the slicing plane.

c. FUB's are obtained as normal for Slice Style 1. They are obtained at the cross-section above the present cross-section and are associated with the present cross-section.

d. NFUB's are obtained as normal for Style 1 (MSA=90), but now we keep a little more information about each vector. The orientation of the segment normals are implicit in having the beginning and end point information for the segments. The vectors also originate from one of three places: [1] intersection of a triangle with the cross-section plane of the present cross-section, [2] intersection of the triangle with the cross-section plane for the next layer, or [3] they are derived from connecting the end points of the vectors originating from 1) and 2) above. We keep this additional origination information for each vector.

e. FDB's are obtained as normal for Slice Style 1.

f. NFDB's are obtained as normal for Slice Style 1 (MSA=90), but here more information is kept about each vector. The orientation of the segment normals are implicit in having the beginning and end point information. The vectors originate from one of three places: 1) intersection of a triangle with the cross-section plane for the present layer; 2) intersection of the triangle with the cross-section plane for the next layer; and 3) from connecting the end points of the vectors originating from 1) and 2). This additional origination information is kept for each vector.

The LB can be obtained from appropriate combinations of the flat and near flat boundaries from the present layer in combination with those from all previous layers.

2) The following information is derived about each individual vector,
a) beginning point,
b) end point,
c) normal,
d) type of triangle derived from, and
e) whether derived from intersections between a triangle and a slicing plane or from interpolation.

3) Next, the Initial Cross-section Boundaries (ISCBs) for the present layer are defined as the LB plus the NFDB for the present layer. Alternatively we can define the ISCBs for the present layer as the boundaries which enclose the area contained within the FDBs and NFDBs of the present layer combined with those from all the previous layers less the FUB and the NFUB from all previous layers. When it is stated that LB+NFDB=ISCB, it actually means that the areas surrounded by the LBs should be joined with the areas surrounded by the NFDBs to form a new net area that is surrounded by ISCBs. Duplicate vectors are removed. A copy of the original NFDB vectors is placed into a holding bin that is labeled Working Cross-section Boundaries Type 1 (WCSB1). A copy of the FDB is also placed into a holding bin called the Working Cross-section Boundaries Type 2 (WCSB2).

4) Carryover Cross-Section Boundaries Type 1 (CCSB1s) for the present layer are now defined as the ISCBs less the FUBs, i.e., we define a new set of boundaries that surround the area inclosed by ISCBs less the area enclosed by the FUBs. Since the FUBs are actually created from the layer above, they may overlay the ISCBs but the vectors may not match head to tail. Therefore to remove duplicate vectors we may have to break some vectors into smaller pieces so that duplicate segment portions can be removed. The remaining FUB segments need to have their normals reversed and then they are made part of the CCSB1s. We place a copy of the FUBs into a bin called the Temporary Cross-section Boundaries Type 1 (TCSB1).

For a well behaved part, the FUBs surround areas which are actually subsets of the areas enclosed by the ISCBs. A well behaved part (object) is one which does not have degenerate vertical regions, that is there are no regions that simultaneously are both flat up-facing and flat down-facing regions If an object contains such regions it is not well behaved and additional steps must be taken to insure the functionality of this procedure. These steps include determining the regions of overlapping flat skins. This determination is followed by removal of these intersecting regions as undesirable for building or by the separation of the skins to form a true layer of structure. This second option is followed by the continuation of this procedure, where the separated FDB is included on the present layer and the separated FUB is moved down from the layer above. A second copy of the FUB is placed in a holding bin designated as the Working Cross-Section Boundaries Type 3 (WCSB3).

5) Next, Carryover Cross-section Boundaries Type 2 (CCSB2s) for the present layer are defined as the CCSB1s less the NFUBs, i.e., a new set of boundaries that surround the area enclosed by the CCSB1s less the area enclosed by the NFUBs of the present layer is defined. Since the NFUBs are created from the present cross-section in combination with the next cross-section, some boundaries will naturally match those of the CCSB1s and therefore duplicates can be removed easily. However, some segments of the NFUB will not be created from triangle intersections with the present slice plane, but instead some will be created from intersections with the next slice plane and some will be created from interpolation. This means that again we may have to break some vectors into pieces so that we can insure the removal of duplicate portions of segments. We also make a copy of the NFUBs and place them in a holding bin labeled as Temporary Cross-section Boundaries Type 2 (TCSB2s). We also place a second copy of the NFUBs in another holding bin that called Working Cross-section Boundaries Type 4 (WCSB4s). We place these CCSB2s into Bin 1 for holding for additional operations.

6) Initially the boundary information in bin 2 comes from the boundary information in bin 1 which was there at the end of processing information for the previous layer (CCSB2 from cross-section N−1). We take the information from WCSB1 and WCSB2 and add it to the CCSB2 already in bin 2 (from the previous cross-section). We do not remove duplicates between the CCSB2 and either the WCSB1 or the WCSB2 or remove designations as to how the boundaries originated. However, we do insure overlapping segments between boundary types are made to match (by dividing vectors into smaller pieces if necessary). We remove duplicates between the CCSB1 and the CCSB2. Duplicates between the CCSB1s and the CCSB2s are those vectors that have opposite head and tail designations (same points but opposite pointing normals). At this point, we have in bin 2 four possible types of boundary 1) Loops from CCSB1 alone, 2) Loops from WCSB1 alone, loops: 3) Loops from WCSB2 alone, and 4) Loops that are partially from the WCSB1 and WCSB2. We are now assured that the boundaries in Bin 2 include all possible areas that are surrounded by the boundaries in WCSB3 and WCSB4.

Next we take the present contents of Bin 2 and compare them to the contents of WCSB3 and WCSB4. First, we remove duplicate portions of vectors between the WCSB3 and WCSB4. These duplicates have opposite pointing normals as described before. Next, we remove duplicates between the remaining WCSB3, WCSB4 and the contents of Bin 2. Duplicates in this step are those vectors whose normals point in the same direction, or in other words for vectors to be considered duplicates they must point in the same direction. Next the remaining WCSB3 and WCSB4 vectors are broken down into smaller segments where they cross the boundaries that were already present in Bin 2. All vectors were previously broken down where necessary to remove duplicate vectors. The only place where the WCSB3 and WCSB4 vectors can cross the other boundary vectors are where these boundary vectors are actually double vectors pointing in both directions. These double vectors consist of 2 vectors, one from the WCSB1 or WCSB2 and one from the CCSB2. Next we reverse the normals and the directions of the vectors remaining from the WCSB3 and WCSB4 categories. We then determine which CCSB2 vectors and down-facing vectors overlap. These vectors that overlap must be handled carefully since they can lead to some erroneous loop formations. Next we want to form loops from our boundary vectors. Loops are formed by picking one of the remaining non-overlapping CCSB2, WCSB1, WCSB2 vectors or one of the remaining WCSB3 or WCSB4 vectors. The picked vector is chosen as the first vector of a first loop to be formed. The vector whose tail is at the head of the first vector becomes the second vector of the loop. This process of matching vectors head to tail is continued until a complete closed loop is formed (one vector of a duplicate pair can participate in the formation of the loop). In this process of forming a complete loop, if at the head of one vector are the tails of two or more vectors, the proper vector to choose in forming the loop is the one which causes the sharpest angle of solid to be formed (this is equivalent to choosing the vector which would tend to form the smallest area for the loop). However, in choosing the vector that forms the sharpest angle, any duplicate vector (opposite pointing normal) to the initial vector is excluded from consideration. After the formation of a first complete loop, a check is made to see if any non-duplicate vectors remain (what was once a duplicate vector but which lost its twin is no longer considered a duplicate). If any non-duplicates remain, another loop is formed. This process of loop formation continues until all non-duplicates have been incorporated into complete loops. After loop formation is done properly, we end up with following categories: 1) Loops formed only by CCSB2, 2) Loops formed by WCSB1 and WCSB2, 3) Loops formed by CCSB2 and WCSB3 or/and WCSB4, 4) Loops formed by WCSB1 or/and WCSB2 and WCSB3 or/and WCSB4, 5) Loops formed by WCSB3 or/and WCSB4, and 6) CCSB2 and WCSB1 or/and WCSB2 that overlap and do not form loops. The loops and vectors in each of the previous categories are handled as follows:

Type 1) loops are given the designation as Primary Loops and Vectors (PLV);

Type 2) loops are given the designation as Secondary Loops and Vectors (SLV);

Type 3) loops are given the designation as PLV;

Type 4) loops are given the designation as SLV;

Type 5) loops are given the designation as PLV or SLV depending on whether they are completely within a PLV or an SLV; and Type 6) vectors are removed from further consideration.

It is relatively easy to determine whether a given type 5 loop is within a PLV or an SLV. We can take any line that runs through the loop and start tracing along this line at the origin (assuming the part to be completely located in the X+, Y+ quadrant). We note what type of loop we have entered immediately before encountering the type 5 loop.

The purpose of Bin 2 is to function as a holding Bin so that we can have the information available to determine when cross-sections of the object we are working with have reached a thickness of N layers or greater.

7) The initial information in bin 3 is the information that was in bin 2 after all the processing was complete from the computations done in association with the previous cross-section. Initially this bin consists of 2 types of loops: PLV and SLV loops. We add to these initial loops the contents of WCSB1 and WCSB2 from the present layer. We remove duplicates between the SLV, WCSB1, and WCSB2 to form larger down-facing loops. Next, we compare the contents of bin 3 to the WCSB3 and WCSB4 with the purpose of removing up-facing areas (from this cross-section) from further consideration. This is done identically to how it was approached in Bin 2. Net loop formation is identical to that in bin 2 also. The resulting loops are categorized again as PLV and SLV.

8) Higher order Bins, up to order N+1, are identical to Bins 2 and 3 except that each higher bin will contain some information from 1 layer deeper into the object. The operations are the same and we end up with categories of PLV and SLV again.

9) We now look at Bin N' in terms of our example where N=4. We know that Bin 4 contains information about our object from 3 layers below the current cross-section. After we do all of our processing on bin 4 for the current layer we are left with boundaries of the PLV and SLV types. We make a copy of the Bin 4 PLV boundaries into Bin N'. We will use these PLV boundaries later in combination with other boundaries to determine TCSB3 and TCSB4 boundaries.

10) The contents of Bin N+1 are created in much the same way as the previous bins. A copy of the PLV in Bin N+1 is placed in Bin N+1'. In terms of our example, Bin N+1=Bin 5 and Bin N+1'=Bin 5'.

11) The areas represented by Bin N' include at least the areas of Bin N+1'. We now take the areas covered by bin N' less the areas covered by Bin N+1' and place them in a category called Temporary Cross-section Boundaries Type 3 (TCSB3s). These TCSB3s represent areas that need to be cured to a depth equal to the MSD and that therefore also need Down-Facing Skin.

12) We take the boundaries from Bin N+1' and place them in a category called Temporary Cross-section Boundaries Type 4 (TCSB4). These boundaries represent the areas that have already been cured on the previous layers and therefore can be given an appropriate cure to attach them to the previous layer. This may be an exposure similar to that given to cure to a depth equal to the MSD or it may not.

13) The TCSB1, 2, 3, 4 boundaries are the boundaries that indicate the areas that are to be cured in association with each cross-section.

TCSB1 and TCSB2 are combined to form a boundary and fill area that will be skinned and cured to the MSD. Due to the particular procedures chosen in this embodiment, we know that these regions form up-facing areas of the part but it is not possible to tell whether the lower surfaces of these regions form down-facing portions of the part. Therefore, according to this particular embodiment both the non-down-facing regions as well as possible down-facing regions must be given the same cure depth, and therefore to insure adequate adhesion, they might need to be overcured. This may induce a small error in the location of the down-facing features. However, it is noted that these regions must be cured to a depth equal to the MSD. If these regions are not down-facing, then an MSD cure depth should be adequate for adhesion since there will be solidified material one layer thickness below them. If a material obeying Beers' Law is used, this MSD cure depth should not significantly result in a lowering of down-facing features. With modified processing it is possible to know which portion of these areas are down-facing and therefore it is possible to only overcure the regions that actually have something below them to attach to.

The TCSB3s surround regions that are definitely both up-facing and down-facing and so are cured to the MSD. There is nothing below these regions so they need not be given any overcure.

The TCSB4s surround regions that are not up-facing or down-facing. These regions have solidified material one layer thickness below them and therefore need only be given a cure that will yield sufficient structural integrity to insure completion of the part.

14) This procedure is followed for each layer in turn.

Several other methods for practicing this invention are possible. In the above, we defined areas such that simple vector operations can be done to determine applicability of curing these areas on a given layer. We could have instead used operations such as comparing the areas on a pixel by pixel basis creating a net region of pixels indicating the interior of solid regions of a cross-section and those indicating net hollow regions and then creating boundaries at the border of regions where pixels are in one state versus the other. Another approach is to use the techniques in our copending application titled "Boolean Layer Comparison Slice", U.S. patent application Ser. No. 07/606,191 filed concurrently herewith. The disclosure of this copending application is incorporated by reference as if fully set forth herein. In this layer comparison application a method for determining net boundaries is based on the comparison of boundaries from different layers. The technique described in this cited application may be applied directly to the present invention.

Figures 7, 8, 9, 10, 11, 12, 13, 14, 15:
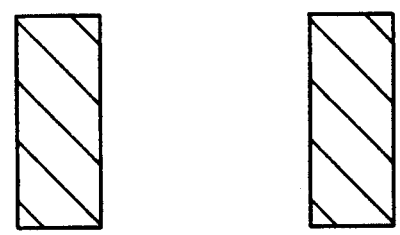
Figures 7, 8, 9, 10, 11, 12, 13, 14, 15, 16:
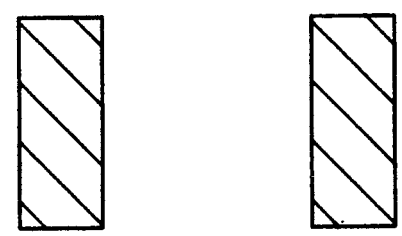
Figures 7, 8, 9, 10, 11, 12, 13, 14, 15, 16, 17:
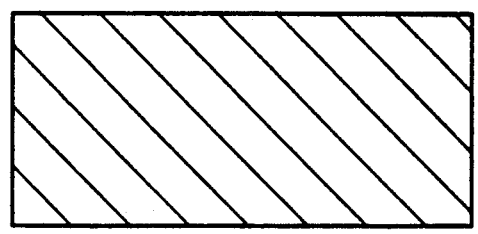
Figures 7, 8, 9, 10, 11, 12, 13, 14, 15, 16, 17, 18:
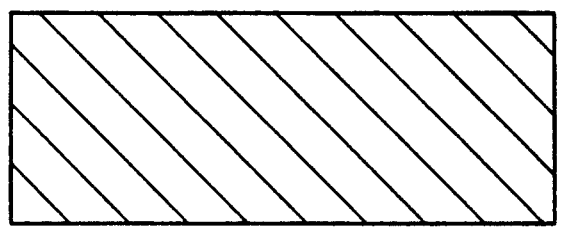
Figures 7, 8, 9, 10, 11, 12, 13, 14, 15, 16, 17, 18, 19:
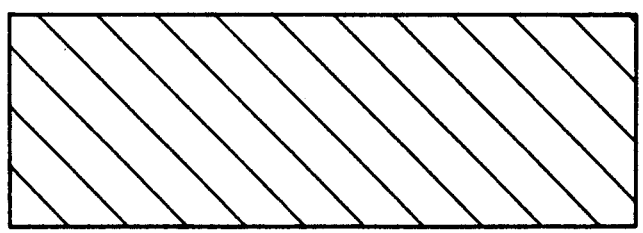
Figures 7, 8, 9, 10, 11, 12, 13, 14, 15, 16, 17, 18, 19, 20:
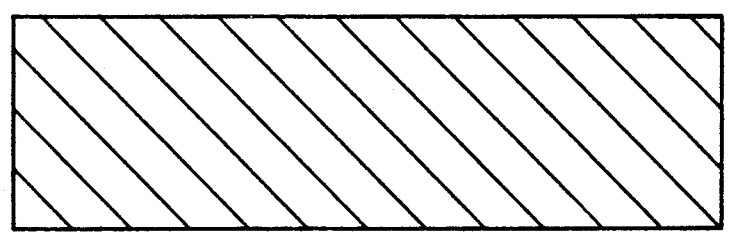
Figures 7, 8, 9, 10, 11, 12, 13, 14, 15, 16, 17, 18, 19, 20, 21:
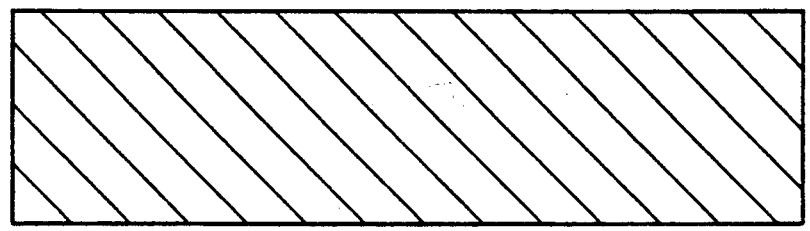
Figures 7, 8, 9, 10, 11, 12, 13, 14, 15, 16, 17, 18, 19, 20, 21, 22:
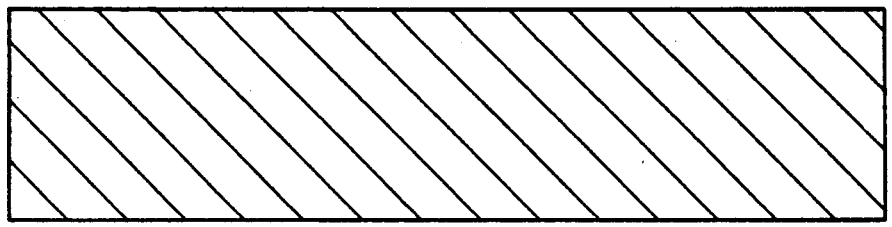
Figures 7, 8, 9, 10, 11, 12, 13, 14, 15, 16, 17, 18, 19, 20, 21, 22, 23:
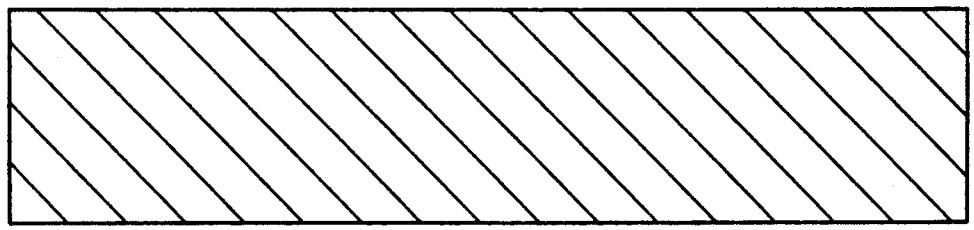
Figures 7, 8, 9, 10, 11, 12, 13, 14, 15, 16, 17, 18, 19, 20, 21, 22, 23, 24:
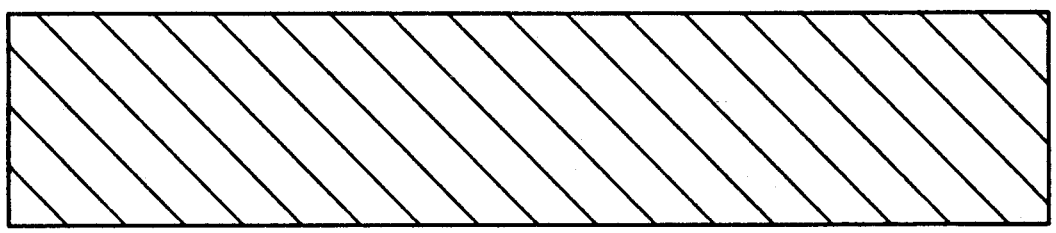
Figures 7, 8, 9, 10, 11, 12, 13, 14, 15, 16, 17, 18, 19, 20, 21, 22, 23, 24, 25:
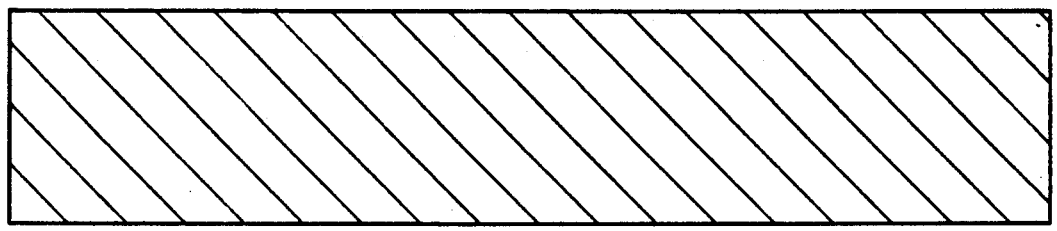
Figures 7, 8, 9, 10, 11, 12, 13, 14, 15, 16, 17, 18, 19, 20, 21, 22, 23, 24, 25, 26:
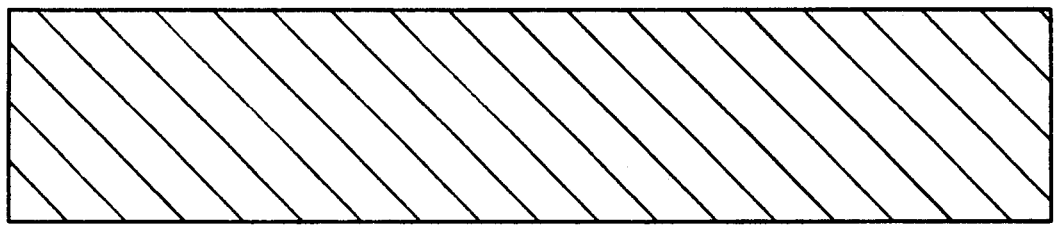
Figures 7, 8, 9, 10, 11, 12, 13, 14, 15, 16, 17, 18, 19, 20, 21, 22, 23, 24, 25, 26, 27:
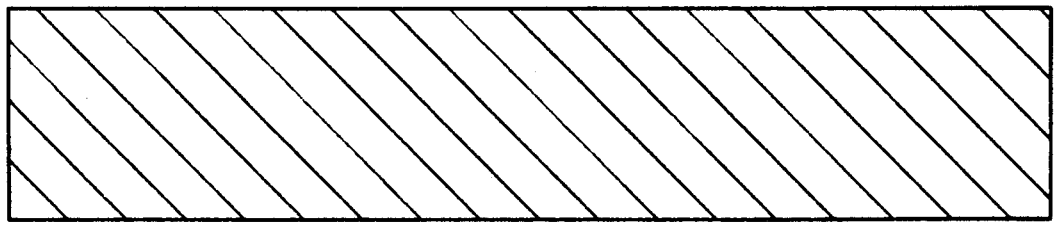
Figures 7, 8, 9, 10, 11, 12, 13, 14, 15, 16, 17, 18, 19, 20, 21, 22, 23, 24, 25, 26, 27, 28:
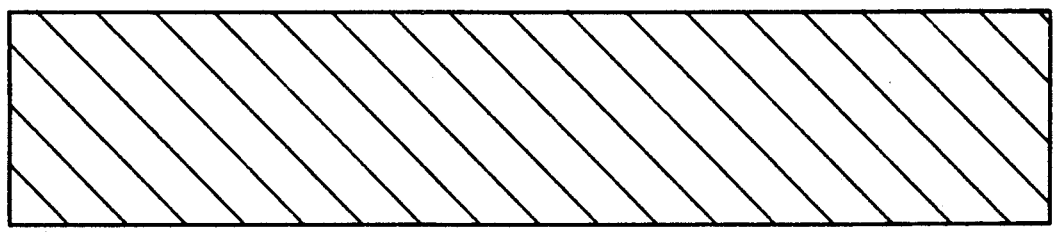
Figures 5, 8:
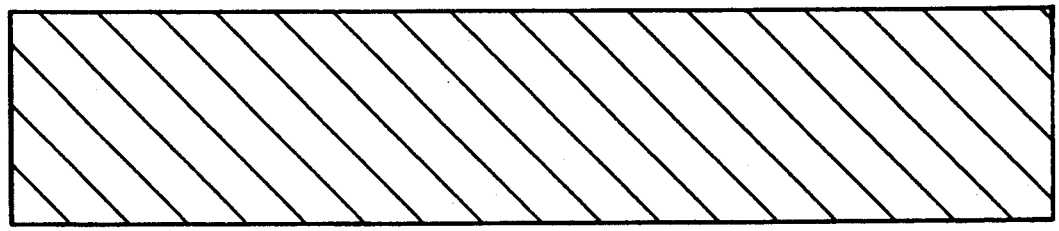
Figures 6, 8:
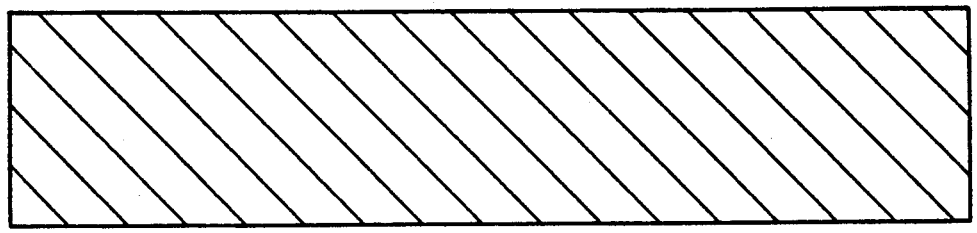
Figures 7, 8:
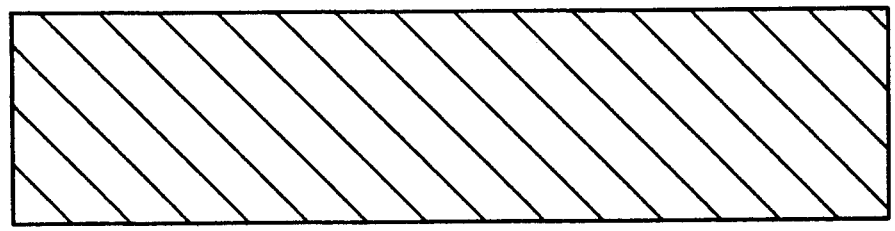
Figure 8:
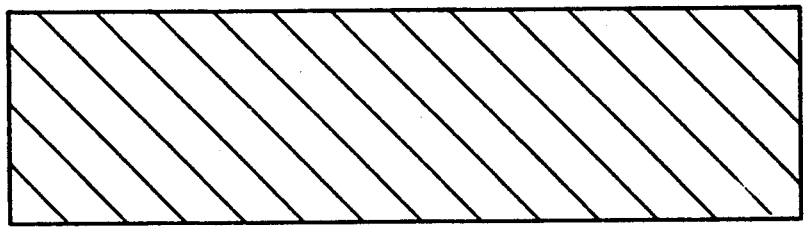
Figures 8, 9:
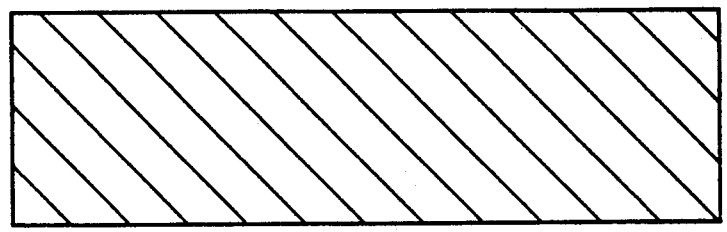
Figures 8, 9, 10:
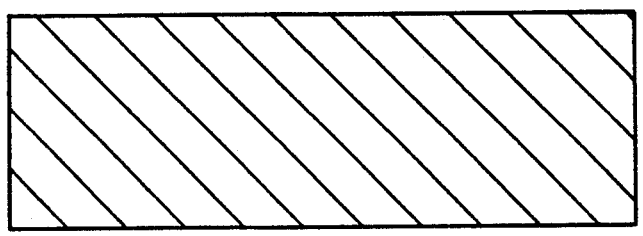
Figures 8, 9, 10, 11:
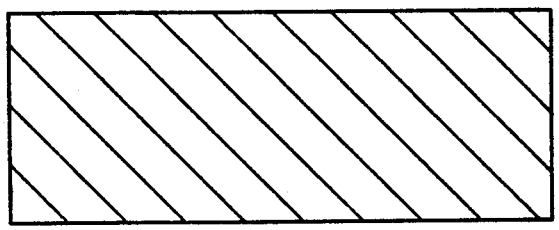
Figures 8, 9, 10, 11, 12:
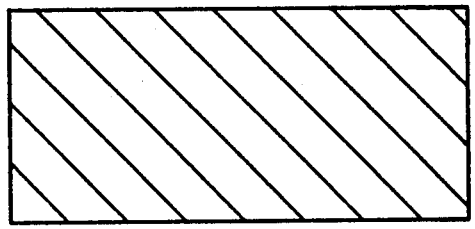
Figures 8, 9, 10, 11, 12, 13:
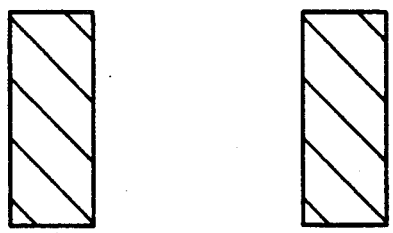
Figures 8, 9, 10, 11, 12, 13, 14:
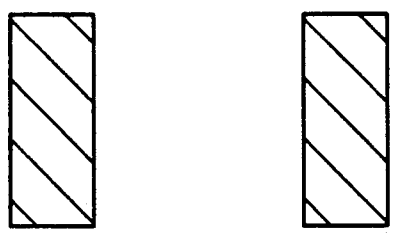
Figures 8, 9, 10, 11, 12, 13, 14, 15:
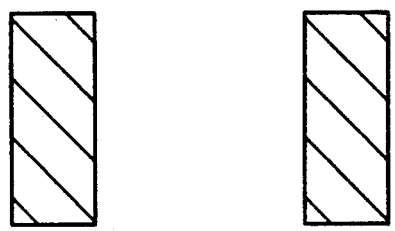
Figures 8, 9, 10, 11, 12, 13, 14, 15, 16:
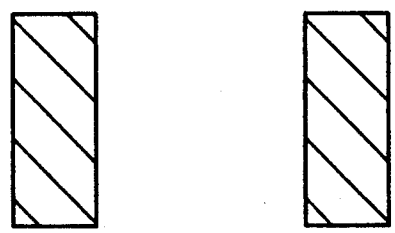
Figures 8, 9, 10, 11, 12, 13, 14, 15, 16, 17:
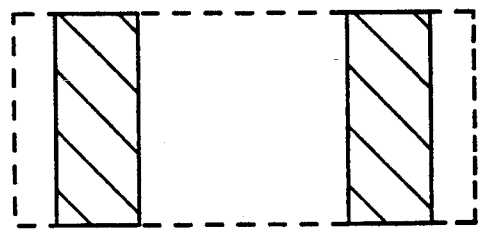
Figures 8, 9, 10, 11, 12, 13, 14, 15, 16, 17, 18:
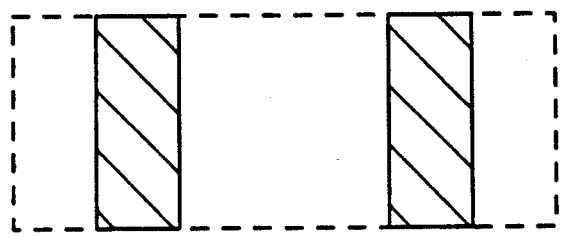
Figures 8, 9, 10, 11, 12, 13, 14, 15, 16, 17, 18, 19:
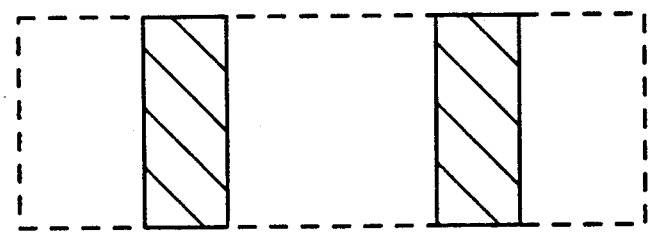
Figures 8, 9, 10, 11, 12, 13, 14, 15, 16, 17, 18, 19, 20:
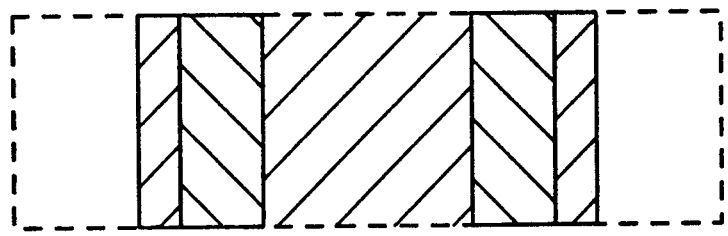
Figures 8, 9, 10, 11, 12, 13, 14, 15, 16, 17, 18, 19, 20, 21:
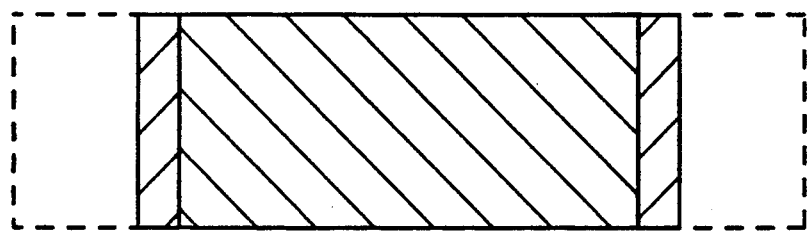
Figures 8, 9, 10, 11, 12, 13, 14, 15, 16, 17, 18, 19, 20, 21, 22:
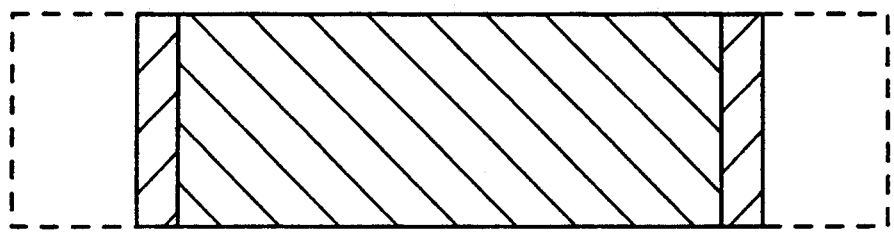
Figures 8, 9, 10, 11, 12, 13, 14, 15, 16, 17, 18, 19, 20, 21, 22, 23:
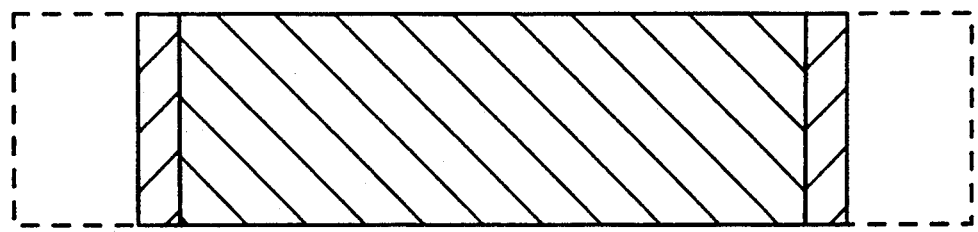
Figures 8, 9, 10, 11, 12, 13, 14, 15, 16, 17, 18, 19, 20, 21, 22, 23, 24:
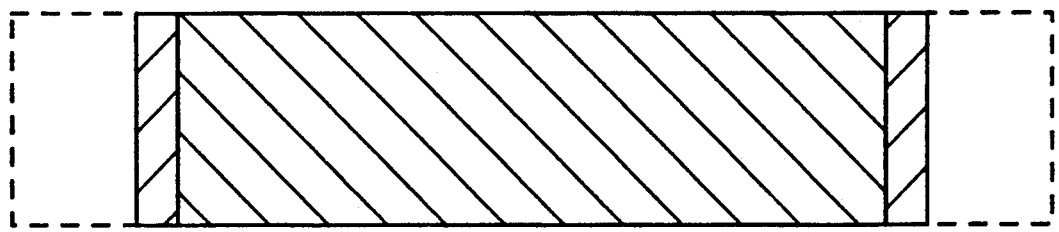
Figures 8, 9, 10, 11, 12, 13, 14, 15, 16, 17, 18, 19, 20, 21, 22, 23, 24, 25:
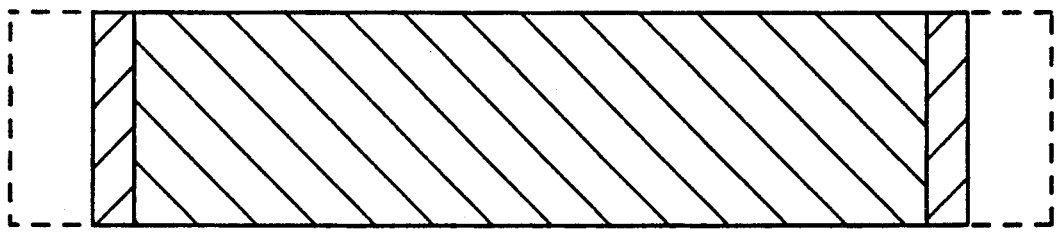
Figures 8, 9, 10, 11, 12, 13, 14, 15, 16, 17, 18, 19, 20, 21, 22, 23, 24, 25, 26:
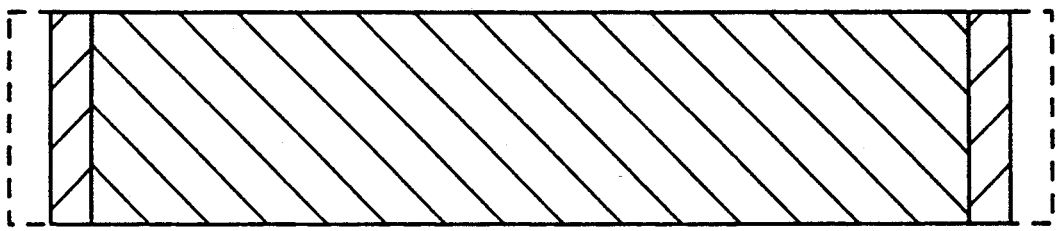
Figures 8, 9, 10, 11, 12, 13, 14, 15, 16, 17, 18, 19, 20, 21, 22, 23, 24, 25, 26, 27:
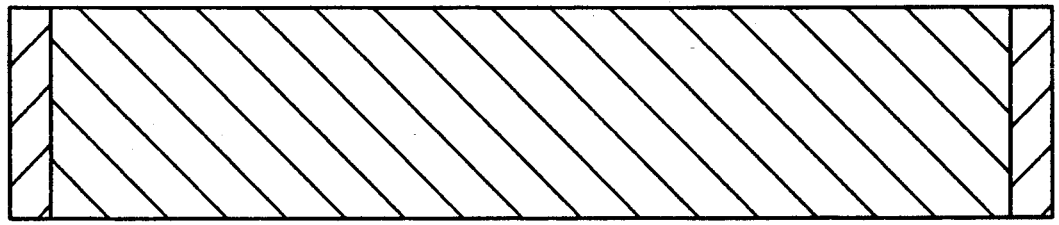
Figures 8, 9, 10, 11, 12, 13, 14, 15, 16, 17, 18, 19, 20, 21, 22, 23, 24, 25, 26, 27, 28:
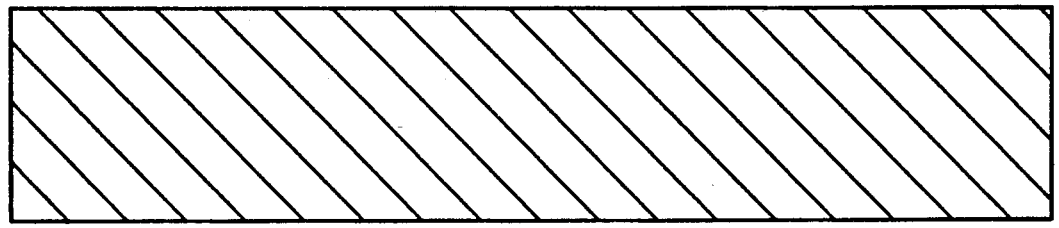
Figures 5, 9:
Figures 6, 9:
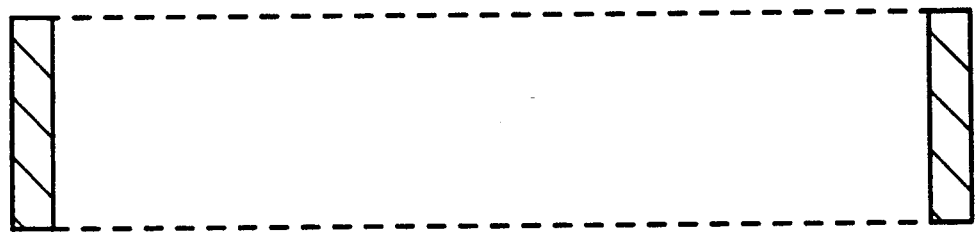
Figures 7, 9:
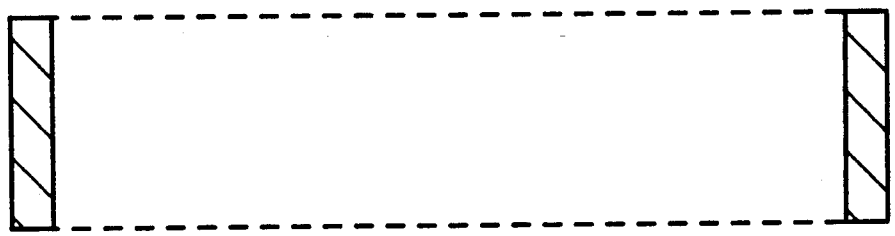
Figures 8, 9:
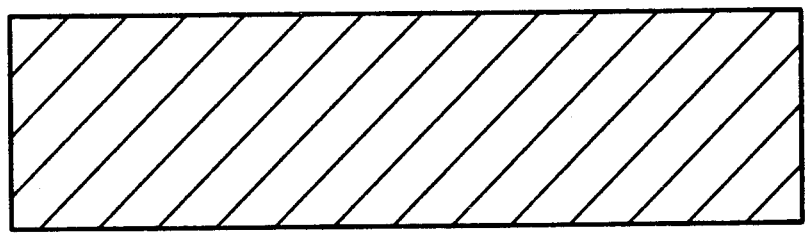
Figure 9:
Figures 9, 10:
Figures 9, 10, 11:
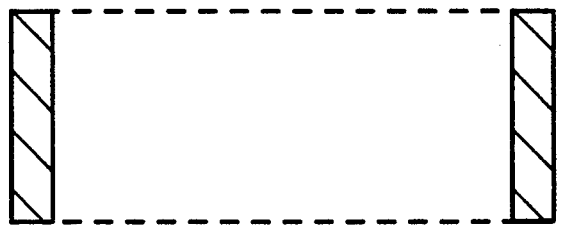
Figures 9, 10, 11, 12:
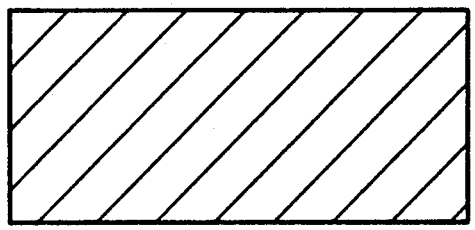
Figures 9, 10, 11, 12, 13:
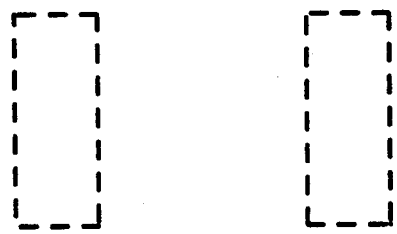
Figures 9, 10, 11, 12, 13, 14:
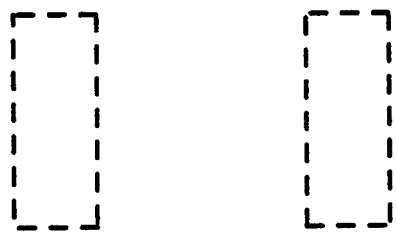
Figures 9, 10, 11, 12, 13, 14, 15:
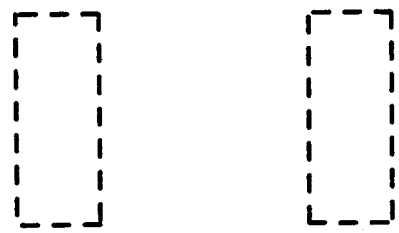
Figures 9, 10, 11, 12, 13, 14, 15, 16:
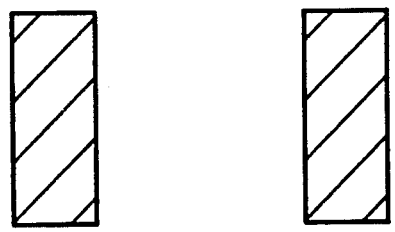
Figures 9, 10, 11, 12, 13, 14, 15, 16, 17:
Figures 9, 10, 11, 12, 13, 14, 15, 16, 17, 18:
Figures 9, 10, 11, 12, 13, 14, 15, 16, 17, 18, 19:
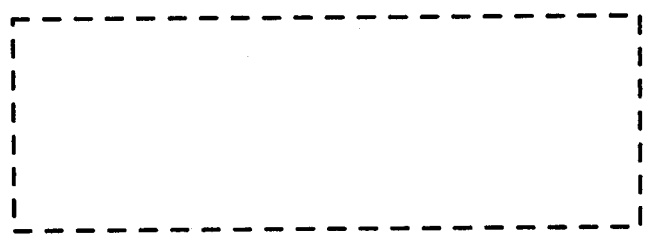
Figures 9, 10, 11, 12, 13, 14, 15, 16, 17, 18, 19, 20:
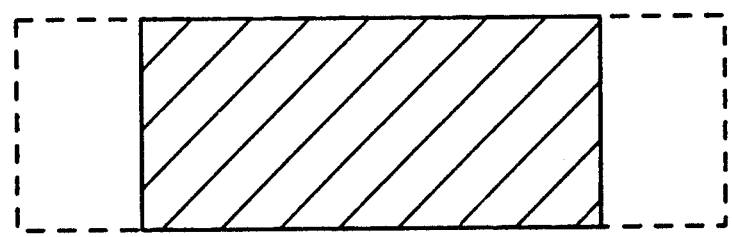
Figures 9, 10, 11, 12, 13, 14, 15, 16, 17, 18, 19, 20, 21:
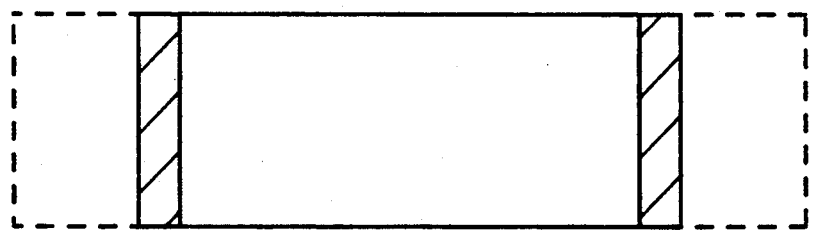
Figures 9, 10, 11, 12, 13, 14, 15, 16, 17, 18, 19, 20, 21, 22:
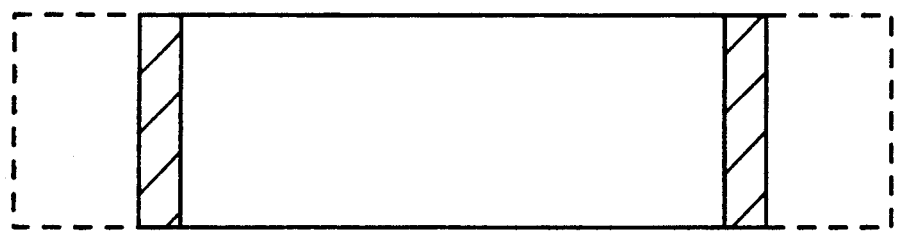
Figures 9, 10, 11, 12, 13, 14, 15, 16, 17, 18, 19, 20, 21, 22, 23:
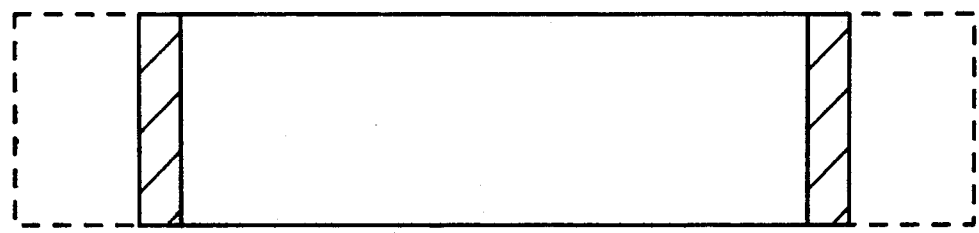
Figures 9, 10, 11, 12, 13, 14, 15, 16, 17, 18, 19, 20, 21, 22, 23, 24:
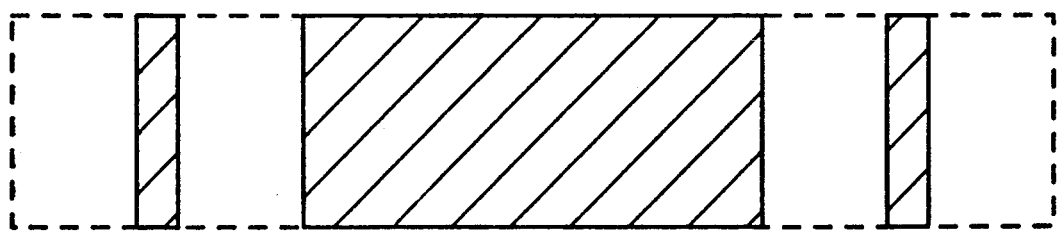
Figures 9, 10, 11, 12, 13, 14, 15, 16, 17, 18, 19, 20, 21, 22, 23, 24, 25:
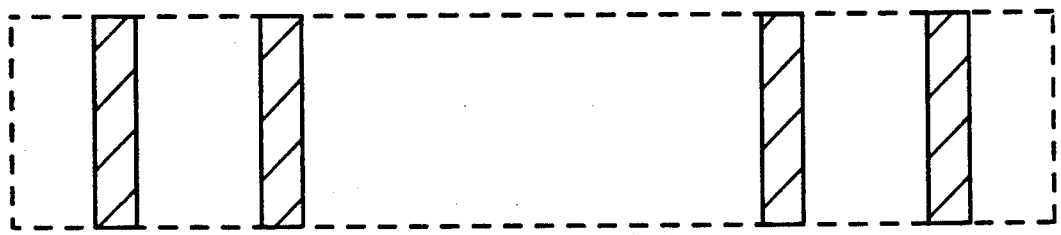
Figures 9, 10, 11, 12, 13, 14, 15, 16, 17, 18, 19, 20, 21, 22, 23, 24, 25, 26:
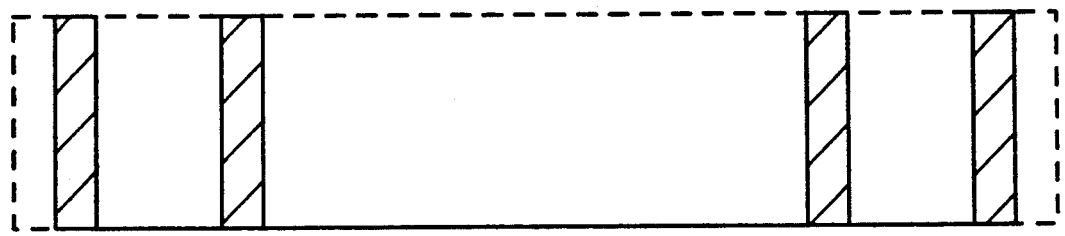
Figures 9, 10, 11, 12, 13, 14, 15, 16, 17, 18, 19, 20, 21, 22, 23, 24, 25, 26, 27:
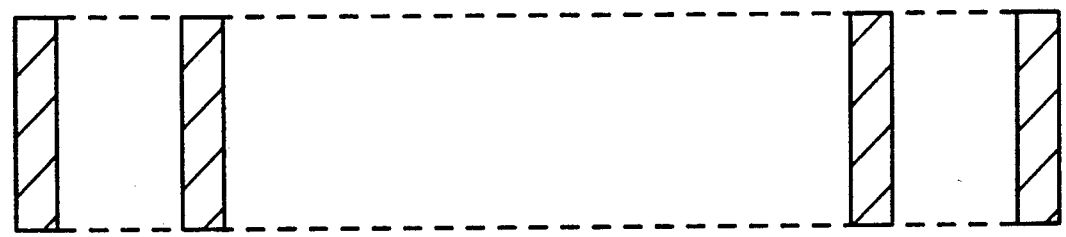
Figures 9, 10, 11, 12, 13, 14, 15, 16, 17, 18, 19, 20, 21, 22, 23, 24, 25, 26, 27, 28:
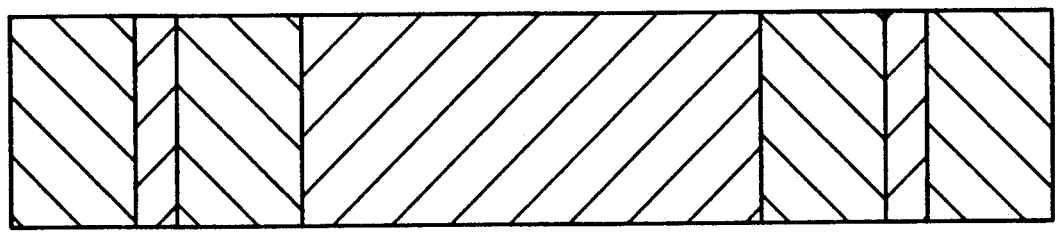
Figure 10:
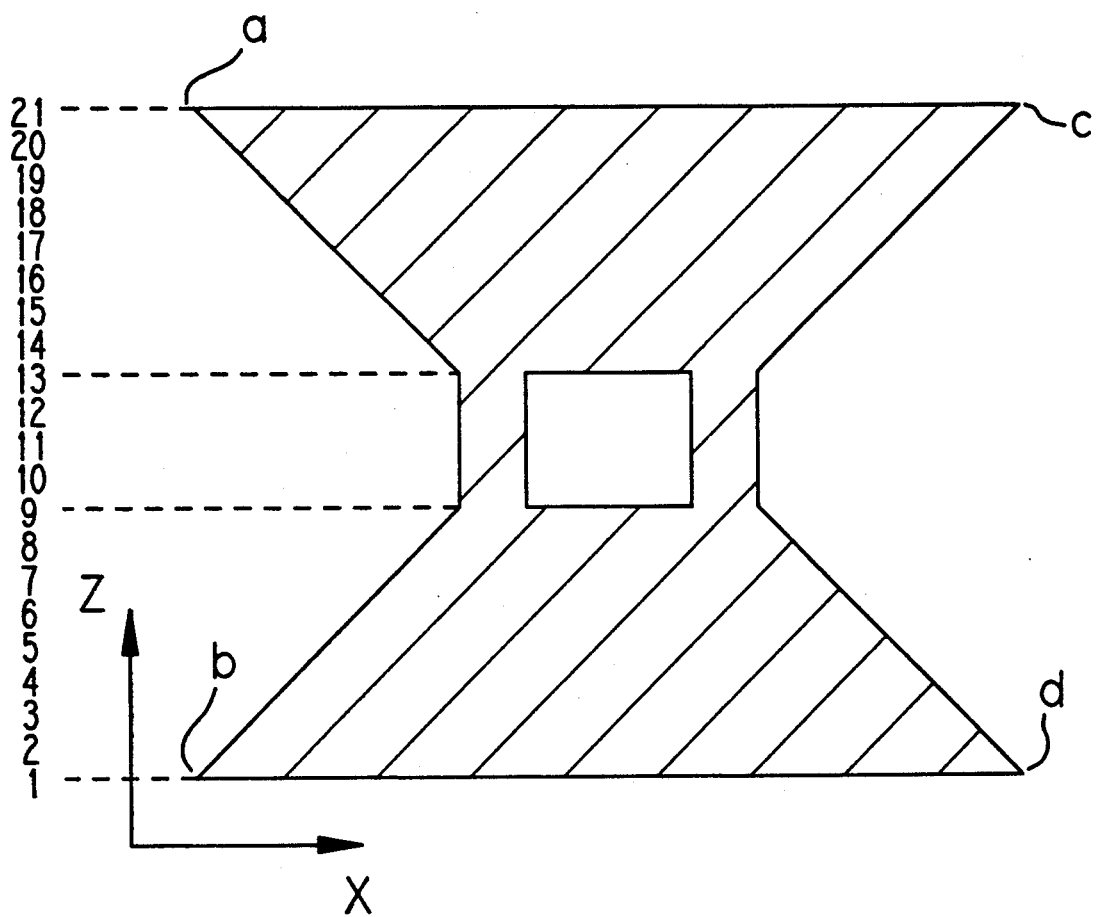
Figure 11:
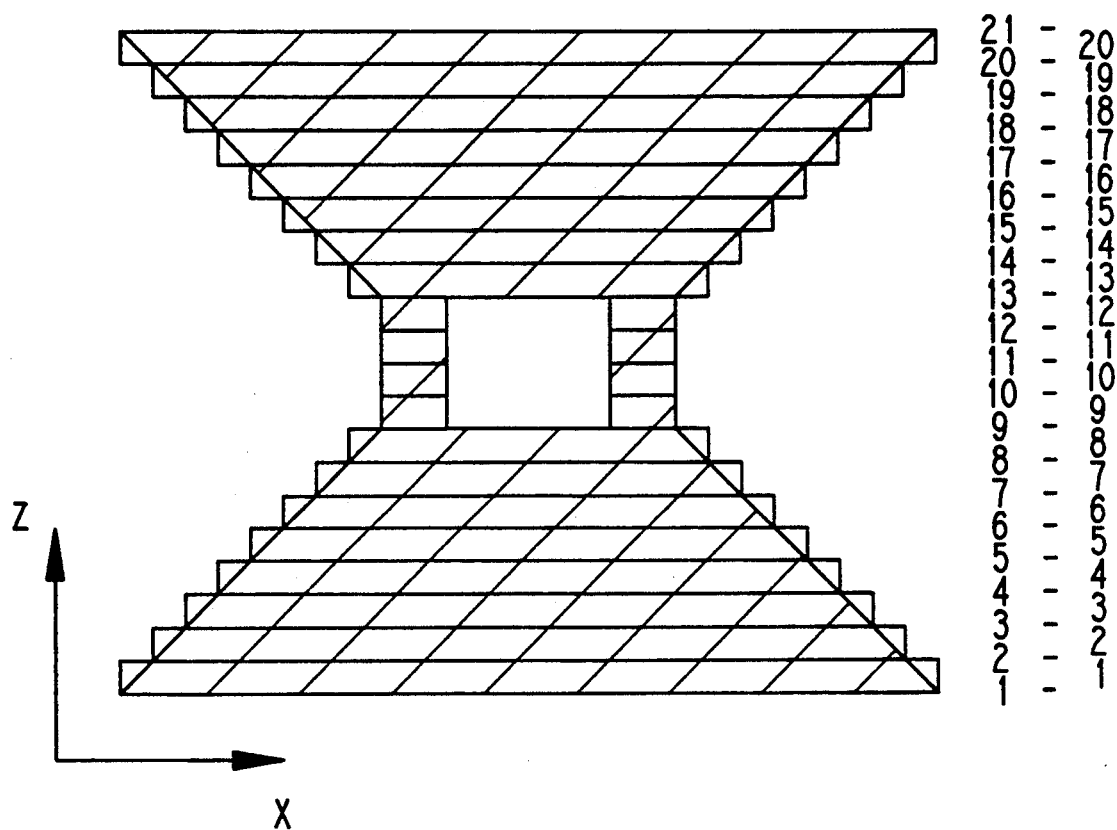
Figure 12:
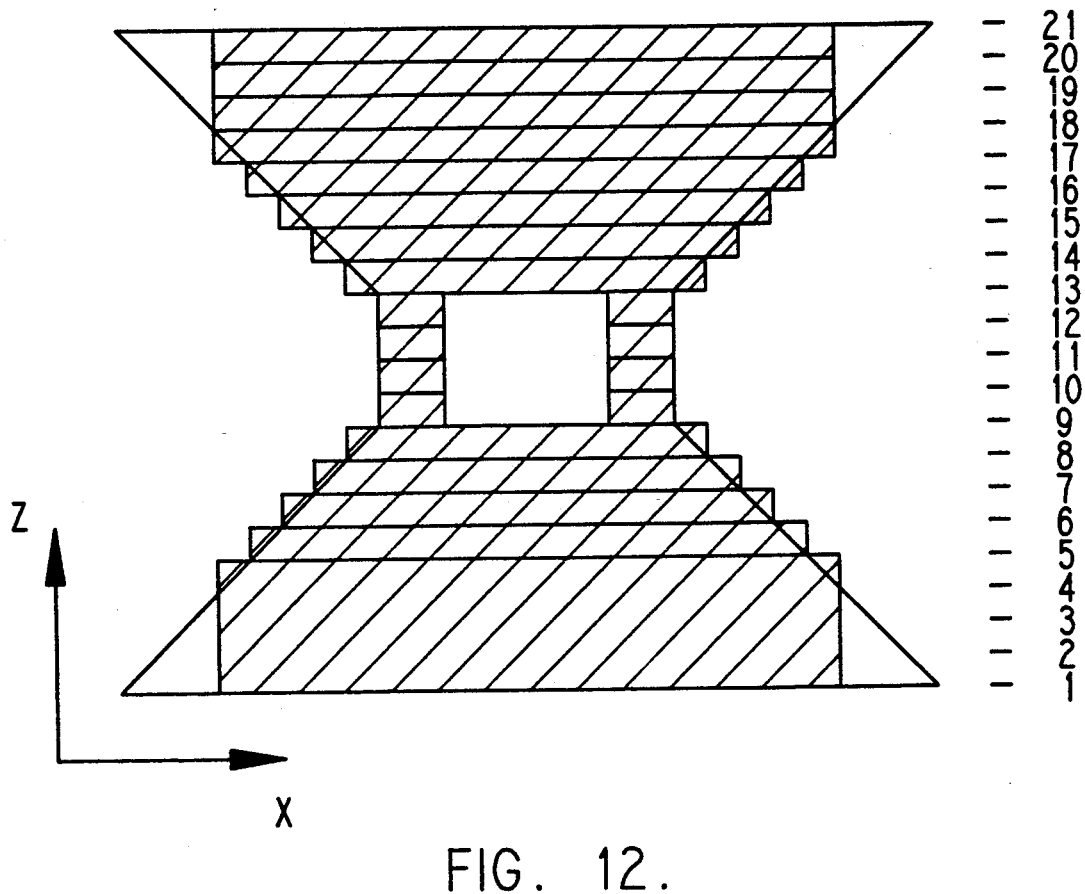

FIG. 19 depicts the cross-sections that are obtained by application of the first preferred embodiment of the present invention to the CAD designed object of FIG. 15, wherein the MSD is considered to be equivalent to 4 layer thicknesses.

FIG. 15 depicts a CAD designed object that contains a variety of vertical features that are thinner than the MSD. This particular object was chosen so that some of the finer points of the first preferred embodiment can be made clear by studying the how boundaries can be created even in these very complex situations. Immediately adjacent to the left side of FIG. 15, numerals 0 to 15 indicate the positions of the cross-sections of this example at successive vertical "Z" levels through the object, that are produced by the Slice Style 1 program in the typical stereolithographic reproduction of the object. The numerals 1-16 further to the left of FIG. 15 indicate actual slicing planes. The offset between these two sets of numbers occurs because the Slice Style 1 program builds the object with all cross-section data shifted downward relative to the actual part position by one layer. The numerals to the right of the figure indicate successive layers that are used to reproduce the object based on the slicing planes depicted to the left of the object. The lines indicating the slicing planes depict the vertical level of the slicing planes as referenced from the front plane of the object. The space between successive slicing planes corresponds to the layer thickness. Also shown in this figure in the lower left hand corner is a coordinate axis symbol, indicating the orientation of the object relative to 'X', 'Y', and 'Z' coordinate axes.

FIG. 16 depicts the object of FIG. 15 as it would be stereolithographically reproduced using a material that has an MSD less than or equal to the layer thickness depicted in FIG. 15, wherein the object is reproduced using the layers depicted in FIG. 15.

FIG. 17 depicts the various boundary types and associated areas as applied to the 16 slicing planes of the object of FIG. 15, wherein these boundaries and areas form the basis of the reproduction depicted in FIG. 16. These boundaries are generated by a Slice program similar to that described in previously referenced U.S. patent application Ser. No. 07/331,644. These 16 slicing planes create cross-sectional data that is associated with the 15 layers that form the reproduced object. The cross-sectional data for each slicing plane can have up to 5 boundary types. These boundaries include Layer Boundaries (LB); Flat Down-Facing Boundaries (FDB); Near-Flat Down-Facing Boundaries (NFDB); Near-Flat Up-Facing Boundaries (NFUB); and Flat-Up Facing Boundaries (FUB). These boundary types are described in detail in the above referenced co-pending U.S. Patent Application. In the numbering system of FIG. 17, the letters correspond to the boundary types and the "-No." corresponds to the slicing Plane number.

FIG. 18 depicts the object that is formed by the application of the first preferred embodiment to the object of FIG. 15, wherein the same layer thickness is used as depicted in FIG. 15, but the MSD of the material is 4 times the layer thickness of FIG. 15. As can be seen from the object of FIG. 18, with such an extremely complex and difficult object even with utilization of the techniques of the present invention, the created object does not form a very good reproduction of the original object. However, even with the flaws of this reproduction, it is considerably better than what would have been produced by the prior art using the same material. It should also be noted that this object (FIG. 15) doesn't represent a typical part. A typical part would not be so diabolical, whereas this part was conceptionally for the purpose of testing the algorithms of the first preferred embodiment.

FIG. 19 depicts an example of how the first preferred embodiment of the present invention is utilized to determine the required cross-sectional boundaries based on the cross-sectional boundaries (FIG. 17) produced by using a typical approach to stereolithography embodied in the present commercially available Slice program. FIG. 19 depicts a plurality of boundaries in both initial and intermediate stages of processing as well as completely processed boundaries for each cross-section. In this example the MSD is assumed to be 4 layer thicknesses.

The portions of FIG. 19 that describe cross-section 1 have descriptors that begin with the letter "A". The figure descriptors for the other cross-sections 2 through 16 begin with the letters "B" through "O" respectively. Similar elements for each cross-section are indicated with similar numbers.

FIG. 19 depicts the cross-sections used to reproduce the designed object of FIG. 15 per the teaching of the rules of the first implementation of the first preferred embodiment described previously. These cross-sections combine to create the object of FIG. 18. The length of the cross-sections depicted in FIG. 19 (as well as FIG. 17) are reduced by a factor of two compared to the length in FIGS. 15 or 18 (as well as FIG. 16) The width of the cross-sections of FIG. 19 are depicted as nominally four units whereas the width in FIGS. 15 and 19 are depicted as 1 diagonal unit. Some elements of FIG. 19, (e.g. 19-22L) contain what appear to be two slightly offset boundaries. These apparently slightly offset boundaries are actually overlapping boundaries which are shown as slightly offset for illustration purposes only.

Referring to the first cross-section, elements A100, A101, A102, and A103 refer to boundary types and therefore hatch or fill or the like that are to be cured in association with the first layer of the object according to the teachings of this embodiment of the invention. In this first preferred embodiment the object as reproduced is shifted downward by a layer so the first layer of the object corresponds to the first cross-section of the object. This idea of down shifting the object is discussed in more detail in U.S. patent application Ser. No. 07/331,644. Methods of compensating for this down shift are discussed in the previously referenced "Boolean Layer Comparison Slice" application.

As seen from FIG. 19 all of these elements depict only empty outlines and therefore indicate that nothing is to be cure in association with the first cross-section of this example.

Element A100 contains any flat up-facing boundaries from a traditional stereolithographic building style which are associated with this cross-section. Boundaries found within this element require curing such that a smooth upper surface is formed. Since this first preferred embodiment did not call for the separate categorization of down-facing regions from that of flat up-facing regions, on a general layer of the object we do not know whether any areas called for in this element are down-facing as well as up-facing or whether they are used for adhesion between layers. Therefore these regions must be treated appropriately to yield the desired smoothness of any down-facing portions as well as being given appropriate cure parameters to result in cohesive formation of the layers and to assure adequate adhesion between layers. Additionally the first preferred embodiment does not distinguish between the up-facing features which require a cure-depth equal to or less than the MSD. This is related to not distinguishing between down-facing and adhesive regions. All unsupported regions must be cured to a depth approximately equal to the MSD whereas supported regions may require less cure but since these two regions are not distinguished, the required cured is substantially equal to the MSD. It is of course possible in a variation of this embodiment to distinguish between these regions and treat each differently.

Element A101 is similar to element A100 except it contains any near-flat up-facing boundaries and therefore indicates any regions that need to be cured as near-flat up-facing regions. The regions depicted in this group may also have some down-facing portions and therefore must be treated appropriately. Prior to curing, the A100 and the A101 elements may be combined to yield a net area to be cured as an up-facing feature.

Element A102 contains boundaries that surround regions that are N layers thick and are not up-facing. These regions are strictly down-facing regions with a thickness equal to the MSD and therefore should be cured to approximately the MSD in thickness. These regions are not used for adhesion therefore they do not require curing appropriate for adhesion. The boundaries contained in this element are identical to those in element A128.

Element A103 contains boundaries that surround areas associated with the present cross-section and that are not up-facing (according to the traditional approaches to stereolithography) and whose areas overlap areas that were cured in association with the previous cross-section according to the teaching of the present invention. Therefore the boundaries of this element surround areas that are neither up-facing nor down-facing and which have cured material located no more than one layer thickness below the present level. These regions can be cured in any appropriate manner that produces adequate adhesion with the previous cross-section including the use of cross-hatching that leaves untransformed material within the interior regions of any solid portions of the cross-section.

Elements A104, A105, and A106 depict the starting cross-sectional information associated with the present cross-section (the first cross-section) that are derived according to traditional stereolithographic techniques along with some initial operations on this cross-section.

Element A104 of FIG. 19 depicts the combined layer boundary (LB) and the near-flat down-facing boundary (NFDB) of the first cross-section of FIG. 17 (FIG. 17 depicts the boundaries of the various types of vectors for the object of FIG. 15, wherein FIG. 16 is obtained from the cross-sectional data of FIG. 17 a traditional approach to stereolithography with the layer thickness greater than or equal to the MSD).

Element A105 contains the net area enclosed by the boundaries of A104 less the area enclosed by any flat up-facing boundaries associated with the present cross-section (the first cross-section). In this example there are no flat up-facing boundaries on the first cross-section so the boundaries of A104 and A105 are identical.

Element A106 contains, the net area enclosed by the boundaries of A105 less the area enclosed by any near-flat up-facing boundaries associated with the present cross-section (the first cross-section). In this example there are no near-flat up-facing boundaries on the first cross-section so the boundaries of A105 and A106 are identical. After the above described processes are performed the contents of A106 are considered to be the contents of Bin 1.

Element A107 contains the boundary information associated with Bin 1 after processing the boundaries of the previous cross-section. Since the cross-section previous to the first cross-section contains no boundary information this element contains no information.

Element A108 is obtained by combining the boundaries of A107 with any near-flat down-facing boundaries and flat down-facing boundaries associated with the present cross-section (the first cross-section). Since there are flat and near-flat down-facing boundaries associated with the present cross-section this element does have contents. These contents are obtained by combining the areas of the FDB and NFDB of Layer No. 1 of FIG. 17 to obtain the new boundary depicted by this element.

Element A109 is obtained by subtracting any flat up-facing and any near-flat up-facing areas from the contents of A108. As can be seen from Layer No. 1 of FIG. 17, this cross-section contains no FUB or NFUB; therefore, the contents of this element are identical to the contents of A108.

Element A110 depicts the testing of the boundaries (and areas) of element A109 to determine whether each loop has primary or secondary status. Since the entire area is derived from loops formed by only the WCSB1 and WCSB2 the entire area is designated as having secondary status. After processing is complete the contents of Element A110 are considered to be the contents of Bin 2 associated with the present cross-section.

Element A111 contains any loops and associated areas of element A110 that have primary status. Since in this case no loops in A110 have primary status the contents of A111 consist of the null set.

The elements A112 to A116 are associated with Bin 3 of the present cross-section. After the processing of these elements is complete, element A115 with its distinct secondary and primary loops contain the contents of Bin 3 associated with the present cross-section.

Element A112 consists of the contents of Bin 2 associated with the previous cross-section. Since Bin 2 of the previous cross-section consisted of the null set so does this element.

Element A113 has the same relationship to A112 as A108 did with A107. A113 contains the contents of A112 plus any boundaries associated with FDB or NFDB of the present cross-section. The contents of A113 are boundaries and associated areas obtained from the NFDB and FDB depicted in association with Layer No. 1 of FIG. 17.

Element A114 has the same relationship with A113 as A109 did with A108. A114 contains the areas encompassed by the boundaries of A113 less any areas encompassed by FUB or NFUB of the present cross-section. It is noted that by the steps involved in this process we are assured that the area enclosed by A113 will contain all the area enclosed by any FUB or NFUB associated with the present cross-section (assuming no regions of zero thickness existed in the original object). This is not a requirement but it does make some of the computations simpler. No NFUB or FUB is associated with the present cross-section so A113 and A114 have identical contents.

Element A115 has the same relationship with A114 as A110 did with A109. A115 depicts the separation of the areas of A114 according to their having primary or secondary status. As with A110 all the areas of A114 have secondary status.

Element A116 has the same relationship with A115 as A111 did with A110. A116 contains any areas and boundaries that have primary status. In this example, for this cross-section none of the boundaries have primary status.

Elements A117 through A121 are associated with the contents of Bin 4 of the present cross-section. The relationships between these elements are analogous to the relationships between the corresponding elements associated with Bin 2 and Bin 3. After processing is complete element A120 contains the contents of Bin 4 of the present cross-section. Similarly elements A122 through A126 are associated with the contents of Bin 5. Again, similar relationships hold and element A125 contains the contents of Bin 5.

The elements A127 and A128 are used in further processing to obtain the contents of element A102, which contents are used to cure areas associated with the present cross-section according to the present embodiment of the instant invention. The contents of A127 are simply a duplication of the contents of element A121.

Element A128 is obtained by subtracting the areas of element A126 from the areas of element A127. The contents of A128 are then duplicated for output a TCSB3 of element A102.

The contents of A129 are simply a duplicate of the contents of element A126. The contents of A129 are then duplicated into element A103 as the TCSB4 of the present cross-section.

The elements B100 to B129 through the elements 0100 to 0129 are obtained in analogous manners to those of A100 to A129 except the contents of the initial elements associated with Bins 2 through 5 do not necessarily start with the null set but contain any boundary and area information associated with the bins of the previous cross-sections.

An object of the invention is to reproduce a part as accurately as possible using a Style 1 reproduction method. Style 1 is the designation, described in the previously referenced U.S. patent application Ser. No.

07/331,644, given to the reproduction of an object that is based on discontinuities between cross-sections resulting in the oversizing of the X and Y dimensions of the object. This method allows the reproduction of a large class of objects which can be post processed, after formation, by sanding off the appropriate discontinuities to the point that they disappear. At the point of discontinuity disappearance, the part is complete and represents a highly accurate reproduction of the object.

We consider the object to be conceptually sliced into a plurality of layers with each layer representing a structural portion of the object. In terms of the Slice program described in U.S. patent application Ser. No. 07/331,644, the structural portion of each layer comprises the area enclosed within the boundaries of the LB and NFDB. These combined boundary types are called the "Initial Cross-Section Boundaries"(ISCBs). The other boundaries define regions that need to be filled or skinned because they form up-facing or down-facing surfaces of the object but they do not form structure. That is, each initial slice cross-section (area contained within the Initial Cross-Section Boundaries) contains the necessary boundary information to form a layer of structure (if cured to one layer thickness) that will result in proper oversized X and Y dimensions. This oversizing is such that if appropriate removal of material along the edges of the part is done between the intersections of the present layer with the proceeding and succeeding layers, the layer of structure produced will match the original computer representation of the object accurately. This includes appropriate removal of discontinuities between layers as well as appropriate removal of material that was solidified so that hollow volumes were filled in.

Another desirable method of building, Slice Style 3, relates to the building of a object that is undersized in the X and Y dimensions. In the case of Style 3 the discontinuities between layers as well as regions that collapsed to zero thickness are filled in during post processing.

Additional styles of building are disclosed in the '644 application as well as the previously referenced concurrently filed "Boolean Layer Comparison Slice" U.S. patent application.

Up-Facing Priority

We now move on to describe generally the major steps involved in an up-facing embodiment, wherein we discuss in more detail some of the steps described or referred to earlier. This description assumes that the MSD of the chosen material is N times as large as the chosen layer thickness.

The preferred materials and sources of synergistic stimulation for utilization with the present invention depend on the layer thickness that will be used, the level of MSD that can be tolerated, and the accuracy of reproduction desired. A preferred material is XB 5081, manufactured by Ciba Geigy of Basel, Switzerland, which has an MSD of approximately 5 to 8 mils when used with a HeCd laser emitting 325 nm radiation. Therefore, using the prior art teachings of stereolithography, this material can be used to make high resolution parts of accuracy of 5 to 8 mils in vertical thickness (when only considering the sources of error addressed in the instant invention). This same material, in combination with the teachings of the instant invention and assuming an MSD of 8 mils, can be used to build many parts with an accuracy, for example, of 4 mils if $N=2$, or an accuracy of 2 mils if $N=4$, or even an accuracy of 1 mil if $N=8$. Another preferred material is Potting Compound 363, manufactured by Loctite Corporation, which has an MSD of approximately 30 mils when used with synergistic stimulation from a high pressure mercury lamp, or alternatively Tevista Type I material, manufactured by Tokyo Ohka Kogyo Co. Ltd., Kanagawa Prefecture, Japan, which has an MSD of approximately 45-60 mils when used with synergistic stimulation from a high pressure mercury lamp. For example, when using a material like Tevista it may be advantageous to assume an MSD of 80 mils or more to insure adequate strength under a wider range of building conditions. This assumed 80 mil MSD can still be used in a large number of objects according to the invention to yield a production accuracy of 40 mils when $N=2$, or even 20 mils when $N=4$.

Other preferred materials include powders and appropriate forms of synergistic stimulation as well as other fluid-like media. These powder materials when combined with a particular type of synergistic stimulation may or may not have an MSD, as previously described. Even if this type of MSD doesn't exist for these materials they may have another type of MSD (as do photopolymers). This second type of MSD refers to a minimum solidification depth that results in formation of thicknesses of material that are sufficiently rigid or strong to withstand stresses that result from adhering layers together that would tend to "curl" distort the individual layers of the object and therefore result in distortion of the object itself. The ability of a layer of cured material to resist curl increases with increasing cure depth (for many materials it is proportional to the cube of the cure depth). Curl phenomena and several means of addressing this type of distortion are described in several of the previously referenced U.S. patent applications. Patents and Applications of particular interest are U.S. Pat. Nos. 4,999,143; 5,015,424; 5,104,592; 5,130,064; U.S. patent application Ser. No. 07/429,911; and the concurrently filed curl balancing application.

Therefore, the formation process utilizing such materials can benefit from the deeper cure depths and thinner layers that can be utilized according to the present invention while maintaining little or no loss in placement accuracy. As such, the present invention is not only an extremely valuable method for achieving high resolution placement of features when using low resolution materials, but it is also an extremely valuable method of reducing curl distortion in objects when the desired accuracy of reproduction requires thinner layers than can normally be accommodated due to excessive curl distortion.

In an up-facing priority embodiment, up-facing features are given priority in terms of their placement and every attempt is made to cure down-facing features to the appropriate levels. In considering the steps involved in determining what should be cured in association with a cross-section I, we assume that the previous I-1 cross-sections have been formed in an appropriate manner.

First of all, the possible cure versus cure depth regions that might be encountered and that may need to be distinguished for making decisions about what areas should be cured on a given cross-section must be determined. In this description a building method similar to that depicted in FIG. 5, as opposed to that depicted in FIG. 6 is assumed. Therefore, whenever the depth of solidification is greater than the MSD there is always solidified material one layer thickness below the present level. We exclude FIG. 6 type building techniques, and the like, from further consideration in this analysis since their development will be within the ability of one of ordinary skill in the art after understanding the principles of the present disclosure. Table 1 shows a summary of the various cure depth regions.

TABLE 1

Summary Table of the various regions that can occur on a given layer when using an Up-Facing Priority Embodiment of Simultaneous Multiple Layer Curing.

| Region Designation | No. of Previous Cross-Sections (Layers) | Thickness | No. of Higher Cross-Sections (Layers) |
|---|---|---|---|
| 1 | > = N | > = N + 1 | > = 1 |
| 2 | N − 1 | N | > = 1 |
| 3 | N − 2 | N − 1 | > = 1 |
| " | " | " | " |
| " | " | " | " |
| N − 1 | 2 | 3 | > = 1 |
| N | 1 | 2 | > = 1 |
| N + 1 | 0 | 1 | > = 1 |
| 1' | N | N + 1 | 0 |
| 2' | N − 1 | N | 0 |
| 3' | N − 2 | N − 1 | 0 |
| " | " | " | " |
| " | " | " | " |
| N − 1' | 2 | 3 | 0 |
| N' | 1 | 2 | 0 |
| N + 1' | 0 | 1 | 0 |

Region 1: This region is included on at least the next cross-section and on the present cross-section and on at least all N previous cross-sections. This region has a solidification depth, below the upper surface of the Ith layer, of at least N+1 layers (MSD+1 layer). Since we assume a FIG. 5 type building method, we know there is solidified material located in this region one layer thickness below the present level. We cure the material in this region with an appropriate cure depth that does not cause print through of solidified material below the solidification level of this region. We also know that the material cured in this region is not used to form a down-facing surface of the object or an up-facing surface of the object. Therefore, an open cure structure (open crosshatch) can be applied to this region if desired. Additionally, the formation of solidified material in this region is used to achieve adhesion between the layers. If N=4, then this region is included on at least the previous 4 cross-sections.

Region 2: This region is included on at least the next cross-section and on the present cross-section and on all N−1 previous cross-sections. This region has a solidification depth, below the upper surface of the Ith layer of N layers. Since we assume a FIG. 5 type building method, this region has received no cure in association with previous cross-sections and therefore it is not cured for the purpose of adhesion to previous layers. Therefore, no overcure is necessary and it can be given a cure depth equal to the MSD. This causes the lower surface of the solidified material to be formed at the appropriate position to accurately reproduce the particular feature of the object that is being created. Since this region forms a down-facing surface of the object it is cured in such away as to form a smooth lower surface. If N=4, this region is included on the previous 3 cross-sections.

Region 3: This region is included on at least the next cross-section and on the present cross-section and on all N−2 previous cross-sections. For accurate reproduction of the object, if this region were to be cured in association with the present cross-section, this region requires a depth of cure equal to the MSD less one layer thickness (MSD−1 layer thickness). Due to the MSD, if this region is cured in association with the present cross-section, it will be cured 1 layer thickness too deep. However, since this region has at least one more layer of structure above it, we do not need to cure it in association with the present cross-section. We can postpone the curing of this region until at least the next cross-section is formed. This delay in formation will allow more accurate reproduction of the object. If this region is cured in association with the next cross-section it will be treated as a down-facing feature and maybe an up-facing feature if this region does not continue on beyond the next cross-section. If N=4, this region is included on the previous 2 cross-sections.

Region N−1: This region continues on to at least the next cross-section and it is included on the present cross-section and on the 2 previous cross-sections (as long as N> =2). This region cannot be cured in association with the present cross-section without causing an N−3 layer thickness error in the placement of the down-facing feature associated with the bottom of this region. As N becomes larger (assuming a fixed layer thickness and therefore an increasing MSD) so does the error associated with curing this region in association with the present cross-section. Since we know that there is at least one cross-section above this region, we know that we can delay the curing of this region until at least then. This postponing will allow more accurate placement of down-facing features and therefore more accurate reproduction of the object. If N=2, this region is region 1 and it therefore has similar characteristics to region 1 described above. If N=3, this region corresponds to region 2, and it therefore has similar characteristics to region 2 described above. If N=4, this region is Region 3 and it therefore has similar characteristics to region 3 described above. If N> =4, this region is included on the two previous cross-sections (layers).

Region N: This region is included on at least the next cross-section and on the present cross-section and on the previous cross-section. If N=2, this region is region 2 and therefore is similar to region 2 described above. If N=3, this region is region 3 and therefore is similar to region 3 described above. If N=4, this region is Region 4 and it includes the previous cross-section. With all cases where N>2, more accuracy in reproduction can be obtained by delaying the curing of this region until at least the next layer. This delay is possible since we know that this region continues until at least the next cross-section.

Region N+1: This region is included on at least the next cross-section and on the present cross-section. It does not include any previous cross-sections. With all cases where N> =2, more accuracy in reproduction can be obtained the curing of this region is delayed until at least the next cross-section. If N=4, this is Region 5. If this region were cured in association with the present cross-section (assuming N=4) then the bottom surface of this region would be placed 3 layers thicknesses below its desired location.

We next consider the regions labeled with a prime "'". These primed regions are similar to the unprimed regions except they contain no additional cross-sections above them. Therefore, the primed regions form up-facing areas. With a building technique that calls for the proper placement of up-facing features, these regions must all be cured on the cross-sections on which they occur.

Region 1': This region is included on the present cross-section and on at least all N previous crosssections. This region is not included on the next cross-section. This region has a solidification depth below, the upper surface of the Ith layer of at least N+1 layers (MSD+1 layer). Since we assume a FIG. 5 type building method, we know there is solidified material located in this region one layer thickness below the present level. We therefore cure the material in this region with an appropriate cure depth that does not cause print through of solidified material below the solidification level of this region. We note that the MSD is the minimum solidification depth for an unsupported region and since this is a supported region it may be possible to use a cure depth smaller than the MSD. We also know that the material cured in this region is not used to form a down-facing surface of the object but it is used to form an up-facing surface of the object. Therefore, this region must be cured to form a uniform up-facing surface. Additionally, the formation of solidified material in this region is used to achieve adhesion between the layers. If N=4, then this region is included on at least the previous four layers.

Region 2': This region is included on the present cross-section and on all N−1 previous cross-sections. This region is not included on the next cross-section. This region has a solidification depth, below its upper surface of N layers. Since we assume a FIG. 5 type building method, this region has received no cure in association with previous cross-sections and therefore it is not cured for the purpose of adhesion to previous layers. Therefore, no overcure is necessary and it can be given a cure depth equal to the MSD. This causes the lower surface of the solidified material to be formed at the appropriate position to accurately reproduce the particular feature of the object that is being created. This region forms both a down-facing surface and an up-facing surface and is therefore cured in such away as to form smooth lower and upper surfaces. If N=4, this region is included on the previous 3 cross-sections.

Region 3': This region is included on the present cross-section and on all N−2 previous cross-sections. This region is not included on the next cross-section. For accurate reproduction of the object, if this region is to be cured in association with the present cross-section, it requires a depth of cure equal to one layer thickness less than the MSD (MSD−1 layer thickness). Unfortunately, this cure depth will not form a cohesive layer of structure. Additionally, this region must be cured in association with the present cross-section. Therefore, there will be an error in positioning of the down-facing feature, below this region, of one layer thickness. This region has three attributes: 1) It is an up-facing region, 2) It is a down-facing region, and 3) When it is cured, it will be solidified 1 layer thickness too deep. If N=4, this region is included on the previous 2 cross-sections.

Region N−1': This region is included on the present cross-section and on the 2 previous cross-sections (as long as N>=2). This region is not included on the next cross-section. This region must be cured in association with the present cross-section but this will result in an error in cure depth of N−3 layers. This region forms both an up-facing and down-facing feature of the object and it must therefore be cured appropriately. If N=2, this region is region 1' and it therefore has similar characteristics to region 1' described above. If N=3, this region corresponds to region 2', and it therefore has similar characteristics to region 2' described above. If N=4, this region is Region 3' and it therefore has similar characteristics to region 3' described above.

Region N': This region is included on the present cross-section and on the previous cross-section. This region is not included on the next cross-section. Since curing of this region must occur in association with the present cross-section, there will be an error in placement of the down-facing feature, below this cross-section, of N−2 layers. This region is used to form both an up-facing and a down-facing feature of the object and therefore must be cured appropriately. If N=2, this region is region 2' and therefore is similar to region 2' described above. If N=3, this region is region 3' and therefore is similar to region 3' described above. If N=4, this region is Region 4' and results in an error in placing the down-facing feature of 2 layer thicknesses.

Region N+1': This region is included the present cross-section only. It does not include any previous cross-sections or any higher cross-sections. With all cases, where N>=1, this region must be cured in association with the present layer. It forms both an up-facing and a down-facing feature of the object and it will be cured N−1 layers too deep. If N=4, this is Region 5. In the case of N=4, when this region is cured in association with the present cross-section, the bottom surface of this region will be placed 3 layers thicknesses below its desire location.

Having described the various possible regions that can occur on a given cross-section, we proceed with the steps required to determine the net cross-sections that will be used to form each layer in the process of building an object from a plurality of initial cross-sections.

We consider the "initial cross-sections" of an object to be those obtained using standard stereolithography. Each initial cross-section can be subdivided into several regions. These regions, as described above, are distinguished by the relationships between the present cross-section and the N proceeding cross-sections along with their relationships to the next successive cross-section. In association with a given cross-section all of the primed, "'", regions are cured along with regions 1 and 2. Region 1 and 1' are used to assure adhesion between the present cross-section and the previous cross-sections. These regions have solidified material 1 layer below them. Region 1' also functions as an up-facing surface and must be cured accordingly. Region 2 forms a down-facing surface and must be cured accordingly. Region 2' to region N+1' form both up-facing and down-facing regions and must be cured accordingly. Region 3' to region N+1' are the regions that are prematurely cured, due to the geometry of the object, and are therefore the regions that represent varying degrees of error introduced into the down-facing features of the reproduction.

After determining the extent of the initial cross-section boundaries for cross-section "I" we divide it into the various regions disclosed above. We proceed to divide the next initial cross-section "I+1" into its appropriate regions. The primed regions of cross-section "I" do not contribute to any regions of cross-section "I+1". All of the unprimed regions contribute to the next cross-section. The "1" region from cross-section "I" remains a "1" region for cross-section "I+1" if cross-section "I+2" still contains the region. If "I+2" does not contain the region, the region becomes a 1' region. If "I+2" partially contains the region, it becomes partially a "1" region and partially a 1' region. The other unprimed regions of cross-section "I" carry over to cross-section "I+1" as primed or unprimed regions, or partially as both, depending on whether they continue on to cross-section "I+2" or not. However, these other regions drop one region number with each succeeding layer until they get included into regions 1 or 1' if they are not lost by inclusion in one of the higher prime regions prior to this.

For example, cross-section I, region 3 becomes cross-section "I+1" region 2 or 2', etc. Therefore we can see how the different curing regions on each cross-section are determined on successive layers based on the previous layers and on the initial cross-section boundary of the following layer. For example, cross-section 1 (the first cross-section of the object) can include only type N+1 and type N+1' regions. Whereas cross-section 2 can contain type N+1, N+1', N, and N' regions depending on how the regions of cross-section 1 and cross-section 3 relate to cross-section 2, etc.

These concepts can be implemented in a variety of ways. One method of implementation was discussed in relation to a presently preferred version of Slice (Version 3.64). Another preferred implementation of the present invention is based on the slicing techniques described in concurrently filed U.S. patent application Ser. No. 07/606,191, entitled "Boolean Layer Comparison Slice", filed by Snead et al.

This referenced application discloses a layer comparison method to determine how to transform the object representation into buildable cross-sections. The primary embodiment of this application is directed towards building oversized parts, but the techniques of the invention can easily be modified to produced undersized parts. This referenced application discloses methods of comparing successive cross-sections to determine the up-facing and down-facing features of each cross-section as well as the non-up-facing and down-facing regions.

The distinguishable regions described above associated with each initial cross-section were described in terms of relationships between the present cross-section and adjoining cross-sections. Therefore, a method of generically comparing neighboring cross-sections to determine overlapping regions (intersecting areas on two cross-sections) as well as non-overlapping regions (either included on one cross-section or the other cross-section but not on both) can be used to implement the present invention. There are various ways to optimize the processing of such information to obtain the regions, and their cure depths, associated with each layer. For example we may obtain the boundary (or area) data associated with each region on a given cross-section according to the steps described in Table 2. Table 2 depicts Boolean operations that can be utilized to obtain the regions described in association with Table 1 for an arbitrary cross-section I. These regions, as indicated, are obtainable by intersection and differencing operations. These operations are performed on intermediate boundaries indicated by an * and initial cross-section boundaries of layer (I−1−N) up to layer (I+1).

TABLE 2

Summary Table of some possible area comparisons that can be used to obtain regional information for a given cross-section when using an Up-Facing Feature Priority Embodiment.

| Step No. | Steps | Region |
|---|---|---|
| 1 | {I}(ISCB) n {I + 1}(ISCB) = {I}(*) | |
| 2 | {I}(ISCB) − {I + 1}(ISCB) = {I}(*') | |
| 3 | {I}(*) − (I − 1)(ISCB) = | {I}(N + 1) |
| 4 | {I}(*') − {I − 1}(ISCB) = | {I}(N + 1') |
| 5 | {I}(*) n {I − 1}(ISCB) = {I}(N + 1*) | |
| 6 | {I}(*') n {I − 1}(ISCB) = {I}(N + 1'*) | |
| 7 | {I}(N + 1*) − {I − 2}(ISCB) = | {I}(N) |
| 8 | {I}(N + 1'*) − {I − 2}(ISCB) = | {I}(N') |
| 9 | {I}(N + 1*) n {I − 2}(ISCB) = {I}(N*) | |
| 10 | {I}(N + 1'*) n {I − 2}(ISCB) = {I}(N'*) | |
| 11 | {I}(N*) − {I − 3}(ISCB) = | {I}(N − 1) |
| 12 | {I}(N'*) − {I − 3}(ISCB) = | {I}(N − 1') |
| 13 | {I}(N*) n {I − 3}(ISCB) = {I}(N − 2*) | |
| 14 | {I}(N'*) n {I − 3}(ISCB) = {I}(N − 2'*) | |
| 15 | " | " |
| 16 | " | " |
| 17 | {I}(5*) n {I + 2 − N}(ISCB) = {I}(4*) | |
| 18 | {I}(5*') n {I + 2 − N}(ISCB) = {I}(4*') | |
| 19 | {I}(4*) − {I + 1 − N}(ISCB) | {I}(3) |
| 20 | {I}(4*') − {I + 1 − N}(ISCB) | {I}(3') |
| 21 | {I}(4*) n {I + 1 − N}(ISCB) = {I}(3*) | |
| 22 | {I}(4*') n {I + 1 − N}(ISCB) = {I}(3'*) | |
| 23 | {I}(3*) − {I − N}(ISCB) = | {I}(2) |
| 24 | {I}(3'*) − {I − N}(ISCB) = | {I}(2') |
| 25 | {I}(3*) n {I − N}(ISCB) = {I}(2*) | |
| 26 | {I}(3'*) n {I − N}(ISCB) = {I}(2'*) | |
| 27 | {I}(2*) − {I − 1 − N}(ISCB) = | {I}(1) |
| 28 | {I}(2'*) − {I − 1 − N}(ISCB) = | {I}(1') |
| 29 | {I}(2*) n {I − 1 − N}(ISCB) = {I}(N − 1 2*) | |
| 30 | {I}(2'*) n {I − 1 − N}(ISCB) = {I}(N − 2'*) | |

Where
{ } indicates the Cross-section Number e.g. {I}=The Present Cross-Section
( ) indicates the particular region of the cross-section in the preceding { }. e.g. (ISCB)=The Initial Cross-Section Boundary Area e.g. (N)=The Boundary Area of the Nth region
"n"=the intersection operation
"−"=the difference operation
"="=the result of the particular operation This generalized up-facing embodiment can be modified for utilization with materials that are not limited, for a given layer thickness, by the first type of MSD (inability to form a cohesive structure thinner than the MSD), but instead are limited by the second type of MSD (inability to form non-curling or low-curling layers thinner than the MSD when higher layers are adhered to them). In this case the primed regions of the previous disclosure can all be cured to the proper depth. This is because one doesn't need to worry about the next higher layer inducing curl in the material transformed in association with the primed regions of the present cross-section since the next higher layer doesn't exist above these regions. Therefore, each of these primed regions can be given the appropriate cure depth. The unprimed regions, on the other hand, must be cured according to the previous teachings. We can conclude that material/layer thickness combinations not limited by the first type of MSD but instead that are limited by the second type of MSD can be used to form all types of high resolution objects (of vertical resolution equal to the layer thickness) without loss of accuracy due to the misplacement of features and with only little or no loss of accuracy due to curl. This represents a significant improvement to the simple approaches to stereolithography that don't address the issue of curl distortion. If this method doesn't completely lead to the desired level of curl reduction it can be combined with the other methods of curl reduction described in the previously referenced applications.

For combinations that are limited by both types of MSD an intermediate method can be developed that maximizes the overall accuracy of the object to be formed.

As with the above Up-facing Priority approach other approaches can be developed regarding the placement of features when regions become thinner than the MSD. Similarly other approaches can be developed regarding the curing of regions that are thicker than the MSD.

Down-Facing Priority

As with up-facing priority embodiments, as well as other priority embodiments, there are many methods for implementing a down-facing priority embodiment. These various methods may have their origin in different algorithms that are used to obtain the desired data or they may have their differences arise from the desire to obtain different types of data. For example, one embodiment may require knowledge of which regions are up-facing while another embodiment may not require such information. As another example, embodiments may differ due to the desired method of curing internal regions of the object. Such differences are depicted in the cure styles of FIGS. 5 and 6.

A simple down-facing priority embodiment has one major aspect that differs form a simple up-facing priority embodiment. When a down-facing feature is encountered on a given layer "I", the area of the feature is conceptually pushed up through the next N−1 layers (assuming the MSD=N layer thicknesses). This down-facing feature will be associated with layer "I+N−1" for curing instead of layer "I" from which it was derived. This down-facing feature is cured to a depth equal to the MSD, thereby placing the lower surface of the down-facing feature at the proper vertical level of the part. As a down-facing region is pushed up through the next N−1 layers its area is removed from curing consideration on the first N−2 of these higher layers.

This above discussion refers to layers not slicing planes. One can consider a down-facing feature to be found at a slicing plane which indicates the lower extent of a layer, whereas the vertical level or value associated with the layer is equal to the value of the next higher slicing plane. This next higher slicing plane indicates the upper extent of the layer which contains the down-facing feature. Presently preferred methods (as taught in the above referenced application) form down-facing features by curing them from the top of their associated layers down to the bottom of their layers.

The following steps can be followed in implementing a simple Down-Facing Priority Embodiment of the present invention. These steps are based on the ability to perform boolean layer comparisons as disclosed in the previously referenced U.S. patent application Ser. No. 07/606,191 entitled "Boolean Layer Comparison Slice", filed concurrently herewith. These steps can be performed by processing data one layer at a time followed by transformation of material for that layer (this does require some memory of previously formed layers and it does assume that knowledge about up-facing regions isn't necessary) and then processing the data for the next successive layer. This first possibility relates to slicing and obtaining data as needed. This is sometimes referred to as "Slicing on the Fly". Alternatively, these steps may be performed on a multiple layer basis prior to material transformation or on all the layers of the object prior to transforming material.

The procedure begins by processing each layer of the object according to the teachings of U.S. patent application Ser. No. 07/606,191. One first obtains down-facing, up-facing, and continuing (volume) regions for each layer. Only the boundaries need be determined for these individual regions. It is not necessary to determine cross-hatch and fill at this point.

In standard stereolithography the $LB_f(I)$, i.e., layer boundary vectors, are cured to a depth of 1 layer thickness plus any necessary overcure to obtain adhesion to the previous cross-section. The area within the $LB_f(I)$ can be cured in any appropriate manner including complete solidification (e.g. skintinuous methods as described in U.S. patent application Ser. No 429,435) or partial solidification (e.g. hatching methods). Additionally, these areas can be cured by methods that include various curl reduction techniques (e.g. multipass, rivets, tiles, or the like).

Likewise in standard stereolithography, the $UB_f(I)$ are similarly cured except that the entire upper surface of the region must be transformed to form a smooth up-facing feature. The $DB_f(I)$ are to be cured to a depth of 1 layer thickness and are formed so that a substantially uniform cure depth is supplied so that a smooth down-facing feature is formed.

In the present embodiment, the $DB_f(I)$ are shifted up by N−1 layers to become the final down-facing boundaries of layer "I+N−1", $DB_f(I+N-1)$. This leaves the $UB_f(I)$ and $LB_f(I)$ associated with layer I.

Next, the $DB_f(I-N+1)$ are shifted up to layer I to become the final down-facing boundaries of layer "I", $DB_f(I)$.

Next, any area within the $UB_f(I)$ and $LB_f(I)$ which is also in the $DB_f(I)$ is removed from the $UB_i(I)$ and $LB_i(I)$ to form the first modified up-facing boundaries and continuing boundaries of layer "I", $UB_{m1}(I)$ and $LB_{m1}(I)$.

Next, the $UB_{m1}(I)$ and $LB_{m1}(I)$ undergo a second modification by removal of any intersecting area with the $DB_f(I-N+2)$ for N>2 yielding the $UB_{m2}(I)$ and $LB_{m2}(I)$.

Similar modifications continue to occur until any down-facing features originally associated with the previous layer are removed from the $UB_{mn-2}(I)$ and the $LB_{mn-2}(I)$ to form the $UB_{mn-1}(I)=UB_f(I)$ and the $LB_{mn-1}(I)=LB_f(I)$ wherein m=modification and n=N and f=final.

The $LB_f(I)$, $UB_f(I)$, and the $DB_f(I)$ represent the regions which will be cured in association with layer I. Appropriate cross-hatch, fill or other area transformation parameters are determined for these areas. Methods for making such determinations are described in detail in the previously referenced patent application.

The $DB_f(I)$ is cured to the MSD with appropriate parameters for creating a smooth lower surface. The down-facing features created by following these teachings will be appropriately placed.

The $LB_f(I)$ is cured to an appropriate depth which is generally greater than or equal to one layer thickness (the exact depth depends on the MSD for supported regions). By definition, there is material transformed one layer thickness below this region. Furthermore, by definition this region does not form an up-facing feature of the object. Therefore, this region can be cured to an appropriate depth to form an adequately cohesive layer as well as to insure adequate adhesion to the previously cured layer of material without regard to the necessity of complete area transformation. Various curl reduction methods can be utilized in transforming this region, including an open crosshatch structure, if desired.

The $UB_f(I)$ region is cured to a similar depth as the $LB_f(I)$ region but the region is cured so as to form a continuously transformed upper surface resulting in a smooth up-facing feature.

This procedure is followed for all layers. The data obtained from this embodiment can be used to form a substantially high resolution object, wherein any deviations, due to features being thinner than the MSD, will result in placing the upper surfaces of the up-facing features out of position. Down-facing features will be accurately placed. This is indicated in FIG. 13e.

Other down-facing priority embodiments are possible as well as embodiments implementing the other styles of FIG. 13 or the like.

Even though the embodiments of this disclosure have been directed toward obtaining cure parameters through data processing, this only represents one approach to causing appropriate transformation of material in association with each layer. Therefore, the data processing terminology should be interpreted to include any means for modifying original object descriptive parameters that result in the transformation of material according to the teaching of this invention. The teachings of this invention relate to interpreting object descriptive parameters and reproducing the object in a manner which deviates from a strict layer by layer formation, as necessary to achieve a higher accuracy reproduction. The methods and apparatus of this invention lead to higher accuracy reproductions by utilization of the simultaneous multiple layer curing techniques disclosed herein.

Thus, while several embodiments have been shown and described, it will be obvious that many changes and modifications may be made thereunto, without departing from the spirit and scope of the present invention.

What is claimed is:

1. A method of making at least a portion of an object, the object defining an object an object envelope, by stereolithography from layers of a medium being stacked along a z-dimension, the medium having a minimum solidification depth and being solidifiable upon exposure to synergistic stimulation, comprising the steps of:
    selecting an area element of a first cross-section at an upper surface of a first layer of medium, the area element having a z-dimension value corresponding to a z-dimension value of said first cross-section of the object;
    determining a thickness along the z-dimension between the area element at the upper surface of the first layer of medium and the object envelope underlying the area element;
    comparing the determined thickness to the maximum solidification depth;
    forming at least one next layer of medium over the first layer, thereby increasing the thickness along said z-dimension, without exposing the area element of the first cross-section to synergistic stimulation, until said at least one next layer of medium is formed over the first layer and said thickness is at least approximately as great as said minimum solidification depth; and
    exposing at least the area element to synergistic stimulation to form said at least portion of the object.

2. The method of claim 1 wherein the layers have a thickness selected such that the minimum solidification depth is approximately an integer multiple of the layer thickness.

3. The method of claim 1 wherein the thickness along the z-dimension between the area element of the first layer and the underlying object envelope is determined based upon a sum of thickness of consecutive uninterrupted initial cross-sections below the area element plus a thickness of the first cross-section.

4. The method of claim 1 wherein the medium is a photopolymer.

5. The method of claim 1 wherein the synergistic stimulation is laser light.

6. A method of making at least a portion of an object by stereolithography from layers of a medium having a minimum solidification depth and solidifiable upon exposure to synergistic stimulation, comprising the steps of:
    selecting an least one area element of a first cross-section of a first layer of medium comprising a non-up-facing area element;
    determining an uninterrupted thickness of the object at the at least one non-up-facing area element between an upper surface of the first layer of medium and a lower object surface underlying said at least one non-up-facing area element;
    creating a next layer of medium over the first layer without exposing said at least one non-up-facing area element to synergistic stimulation until the thickness below said at least one non-up-facing area element is not less than the minimum solidification depth; and
    exposing said at least one non-up-facing area element to synergistic stimulation to form at least said portion of the object.

7. The method of claim 1 comprising the additional steps of:
    selecting a plurality of area elements of the first cross-section;
    determining the object thickness of along the z-dimension below each of the plurality of area elements;
    comparing the thickness below each of the plurality of area elements to the minimum solidification depth, wherein the object is determined to have a thickness below at least one area element less than the minimum solidification depth; and
    exposing said at least one of the at least one area elements determined to have a thickness less than the minimum solidification depth after the at least one next layer is formed over the first layer.

8. The method of claim 6, further comprising the steps of:
    selecting a plurality of area elements on the firs cross section;
    determining that at least one area element of the plurality of area elements is an up-facing area element; and
    exposing the at least one up-facing area element to synergistic stimulation prior to creating said next layer.

9. The method of claim 6 comprising the additional step of coating over said next layer of medium with a second layer of medium prior to the exposing said at least one non-up-facial area element.

10. In a method for stereolithographically forming a three-dimensional object from layers of a material capable of physical transformation upon exposure to synergistic stimulation comprising the formation of layers of said material and selectively exposing said layers to synergistic stimulation corresponding to cross-sections of the three-dimensional object to build up the three-dimensional object layer by layer, the improvement comprising the step of:

leaving untransformed material on at least one portion of one cross-section, at least until after that cross-section has been coated over with at least one layer of additional untransformed material, in preparation for formation of at least one successive layer of the object, wherein the at least one portion is transformed by exposure to synergistic stimulation through the material in the at least layer of additional material that has been applied.

11. The method of claim 10, wherein the at least one portion includes at least a portion of a down-facing feature.

12. The method of claim 10, wherein the at least one portion includes at least a portion of an up-facing feature.

13. The method of claim 10, wherein the at least one portion includes at least a portion of a non-up-facing region.

14. The method of claim 10, wherein the step of leaving comprises comparing a plurality of successive cross-sections by processing boundary data of said plurality of successive cross-sections.

15. The method of claim 14, wherein the processing of boundary data comprises processing of data representative of vectors.

16. The method of claim 10, wherein the step of leaving comprises processing of data representation of vectors.

17. In a method for stereolithographically forming a three-dimensional object from layers of a material capable of physical transformation upon curing by exposure to synergistic stimulation comprising the formation of layers of said material and selectively exposing said layers to synergistic situation corresponding to cross-sections of the three-dimensional object to build up the three-dimensional object layer by layer, the improvement comprising the steps of:

forming said object from a material that has a minimum solidification depth which is greater than a thickness of at least a first layer being used in the formation of a first cross-section of the object;

curing at least some of any portions of at least said first cross-section of the object that have an object thickness at least as great as the minimum solidification depth;

curing any portions of said at least first cross-section that are up-facing portions; and refraining from curing at least one portion of said at least first cross-section, which does not have an object thickness at least as great as said minimum solidification depth and which is not an up-facing portion, at least until after a coating of unsolidified building material has been formed over said at least first cross-section in preparation for formation of at least a second cross-section of said object.

18. In a method for stereolithographically forming a three-dimensional object from layers of a material capable of physical transformation upon exposure to synergistic stimulation comprising the formation of layers of the material and selectively exposing the layers to synergistic situation corresponding to cross-sections of the three-dimensional object to build up the three-dimensional object layer by layer, the improvement comprising the steps of:

forming the object from a material that has a minimum solidification depth which is greater than a thickness of at least a first layer of material formed in preparation for formation of a first cross-section of the object;

comparing successive initial cross-sections of said three-dimensional object to determine in association with which layers of material individual portions of at least said first cross-section will be cured by exposure to synergistic stimulation.

19. The method of claim 18, wherein the minimum solidification depth is defined as a minimum cure depth, rounded to a thickness equivalent of a combination of thicknesses of successive layers of material, necessary to form an adequately cohesive layer.

20. The method of claim 18, wherein the minimum solidification depth is defined as a cure depth, rounded to a thickness equivalent of a combination of thicknesses of successive layers of material, necessary to form a layer of sufficient strength to substantially withstand curl forming stresses.

21. The method of claim 18, wherein the step of forming comprises the substep of determining the object thickness below at least one of said portions of said first cross-section.

22. The method of claim 21, wherein the step of comparing comprises determining that at least one portion, which has an object thickness of less than said minimum solidification depth, is not to be cured in association with said first layer but instead is to be cured in association with a successive layer.

23. The method of claim 21, wherein the step of comparing comprises determining the object thickness below at least a portion of an up-facing feature of said first cross-section wherein it is determined that said object thickness of said at least portion is less than the minimum solidification depth and it is further determined that said portion should not be solidified during build up of the object.

24. The method of claim 21, wherein the step of comparing comprises determining the object thickness below at least a portion of an up-facing feature of said first cross-section wherein it is determined that said object thickness of said at least a portion is less than the minimum solidification depth and it is further determined that said at least portion of an up-facing feature should not be cured in association with said first layer but should be cured in association with a successive layer of material such that at least a portion of down-facing feature below said up-facing feature is not cured below its appropriate position when a cure depth at least as great as said minimum solidification depth is achieved when exposing said up-facing feature.

25. The method of claim 21, wherein the step of comparing comprises determining the object thickness below at least a portion of an up-facing feature on said first cross-section, wherein it is determined that said object thickness below said portion is less than the minimum solidification depth, and it is further determined that said at least portion of said up-facing feature should be cured in association with said first layer to a depth approximately equal to said minimum solidification depth.

26. The method of claim 21, wherein the step of comparing comprises determining the object thickness below at least a portion of an up-facing feature on said first cross-section wherein it is determined that said object thickness below said at least portion is less than the minimum solidification depth and it is further determined that said at least portion of an up-facing feature should be cured in association with said first layer but should be cured in association with a successive layer of material, such that vertical shifting of the feature occurs in proportion to slopes of said up-facing feature and a down-facing feature below said up-facing feature.

27. The method of claim 18, wherein the step of comparing comprises the substep of determining a thickness between at least a portion of said first cross-section and an upper surface of material most recently transformed directly below said portion.

28. The method of claim 27, wherein said at least portion of said first cross-section is a non-up-facing portion and the determined thickness directly below said at least portion is less than said minimum solidification depth and it is determined that said at least portion of said first cross-section should not be cured in association with said first layer of material but should instead be cured in association with a successive layer of material.

29. The method of claim 27, wherein said at least portion of said first cross-section is a non-up-facing portion and the determined thickness directly below said at least portion is less than said minimum solidification depth and it is determined that said at least portion of said first cross-section should be cured in association with said first layer of material.

30. The method of claim 27, wherein the at least portion of said first layer is a non-up-facing portion and the determined thickness directly below said at least portion is less than said minimum solidification depth and it is determined that said at least portion of said first cross-section should not be cured in association with said first layer of material but should instead be cured in association with a successive layer of material.

31. The method of claim 27, wherein the at least portion of said first layer is an up-facing portion and the determined thickness directly below said portion is less than said minimum solidification depth and it is determined that said at least portion of said first cross-section should be cured in association with said first layer.

32. The method of claim 18, wherein the step of comparing comprises processing boundary data of said successive initial cross-sections.

33. The method of claim 32, wherein the processing of boundary data comprises processing of data representative of vectors.

34. The method of claim 18, wherein the step of comparing comprises processing of data representative of vectors.

35. In an apparatus for stereolithographically forming a three-dimensional object from layers of a material capable of physical transformation upon exposure to synergistic stimulation comprising the formation of layers of said material and selectively exposing said layers to synergistic situation corresponding to cross-sections of the three-dimensional object to build up the three-dimensional object layer by layer, the improvement comprising:

means for leaving untransformed material on at least one portion of one cross-section, at least until after that cross-section has been coated over with a least one layer of additional untransformed material, in preparation for formation of at least one successive cross-section of the object;

means for forming a coating of additional material over said at least one portion; and means for exposing said at least one portion to synergistic stimulation through the material in the at least one layer of additional material.

36. The method of claim 35, wherein the means for leaving comprises means for comparing a plurality of successive cross-section comprising means for processing boundary data of said plurality of successive cross-sections.

37. The method of claim 36, wherein the means for processing boundary data comprises means for processing data representative of vectors.

38. The method of claim 35, wherein the means for leaving comprises means for processing data representative of vectors.

39. In an apparatus for stereolithographically forming at least a portion of a three-dimensional object from layers of a material capable of physical transformation upon exposure to synergistic stimulation comprising the formation of layers of said material and selectively exposing said layers to synergistic situation corresponding to cross-sections of the three-dimensional object to build up the three-dimensional object layer by layer, the improvement comprising:

means for building with a material that has a minimum solidification depth which is greater than thickness of at least a first layer of material formed in preparation for formation of a first cross-section of the object; and means for comparing a plurality of successive initial cross-sections of said three-dimensional object to determine in association with which layers of material individual portions of at least said first cross-section should be cured by exposure to synergistic situation.

40. The method of claim 39 wherein the means for comparing comprises means for processing boundary data of said plurality of successive initial cross-sections.

41. The method of claim 40 wherein the means for processing boundary data comprises means for processing data representative of vectors.

42. The method of claim 39 wherein the means for comparing comprises means for processing data representative of vectors.

* * * * *

UNITED STATES PATENT AND TRADEMARK OFFICE
CERTIFICATE OF CORRECTION

PATENT NO. : 5,192,469
DATED : March 9, 1993
INVENTOR(S) : Smalley, et. al.

It is certified that error appears in the above-indentified patent and that said Letters Patent is hereby corrected as shown below:

| | |
|---|---|
| Column 7, Line 52 | "FIG. 4 shows cross-sections" should read --FIG. 4 shows the object of FIG. 2 again depicted but built with 10 mil cross-sections--. |
| Column 17, Line 32 | "boundary 1)" should read --boundary loops: 1)--. |
| Column 17, Line 33 | "alone, loops: 3)" should read --alone, 3)--. |
| Column 21, Line 24 | "conceptionally for" should read --conceptually created for--. |
| Column 21, Line 44 | "the designed" should read --the CAD designed--. |
| Column 23, Line 11 | "FIG. 17 a" should read --FIG. 17 using a--. |
| Column 30, Line 46 | "1 layer" should read --1 layer thickness--. |
| Column 35, Line 44 | "defining an object an object" should read --defining an object--. |
| Column 35, Line 59 | "to the maximum" should read --to the minimum--. |
| Column 36, Line 10 | "of thickness" should read --of thicknesses--. |
| Column 36, Line 22 | "selecting an" should read --selecting at--. |
| Column 36, Line 43 | "thickness of along" should read --thickness along--. |
| Column 36, Line 51 | "exposing said at" should read --exposing at--. |
| Column 36, Line 57 | "the firs cross" should read --the first cross--. |
| Column 37, Line 17 | "least layer" should read --least one layer--. |

Page 1 of 3

UNITED STATES PATENT AND TRADEMARK OFFICE
CERTIFICATE OF CORRECTION

PATENT NO. : 5,192,469  
DATED : March 9, 1993  
INVENTOR(S) : Smalley, et. al.

Page 2 of 3

It is certified that error appears in the above-indentified patent and that said Letters Patent is hereby corrected as shown below:

| | |
|---|---|
| Column 37, Line 36 | "data representation" should read --data representative--. |
| Column 37, Line 43 | "synergistic situation" should read --synergistic stimulation--. |
| Column 38, Line 2 | "ergistic situation" should read --ergistic stimulation--. |
| Column 38, lines 27 & 28 | "of forming" should read --of comparing--. |
| Column 39, Line 8 | "should be cured" should read --should not be cured--. |
| Column 39, Line 35 | "is a non-up-facing" should read --is an up-facing--. |
| Column 40, Line 9 | "with a least" should read --with at least--. |
| Column 40, Line 18 | "The method" should read --The apparatus--. |
| Column 40, Line 20 | "cross-section comprising" should read --cross-sections comprising--. |
| Column 40, Line 23 | "The method" should read --The apparatus--. |
| Column 40, Line 26 | "The method" should read --The apparatus--. |
| Column 40, Line 34 | "synergistic situation" should read --synergistic stimulation--. |
| Column 40, Line 40 | "greater than" should read --greater than a--. |
| Column 40, Line 49 | "situation." should read --stimulation--. |
| Column 40, Line 50 | "The method" should read --The apparatus--. |

UNITED STATES PATENT AND TRADEMARK OFFICE
CERTIFICATE OF CORRECTION

PATENT NO. : 5,192,469
DATED : March 9, 1993
INVENTOR(S) : Smalley, et. al.

It is certified that error appears in the above-indentified patent and that said Letters Patent is hereby corrected as shown below:

Column 40, Line 53   "The method" should read --The apparatus--.

Column 40, Line 56   "The method" should read --The apparatus--.

Signed and Sealed this

Twenty-fifth Day of October, 1994

Attest:

BRUCE LEHMAN

Attesting Officer     Commissioner of Patents and Trademarks